(12) United States Patent
Ohki

(10) Patent No.: US 7,486,318 B2
(45) Date of Patent: Feb. 3, 2009

(54) METHOD, APPARATUS, AND PROGRAM FOR PROCESSING AN IMAGE

(75) Inventor: Mitsuharu Ohki, Tokyo (JP)

(73) Assignee: Sony Corporation, Tokyo (JP)

( * ) Notice: Subject to any disclaimer, the term of this patent is extended or adjusted under 35 U.S.C. 154(b) by 190 days.

(21) Appl. No.: 10/525,028

(22) PCT Filed: May 28, 2004

(86) PCT No.: PCT/JP2004/007790

§ 371 (c)(1),
(2), (4) Date: Dec. 22, 2005

(87) PCT Pub. No.: WO2004/114677

PCT Pub. Date: Dec. 29, 2004

(65) Prior Publication Data

US 2006/0140507 A1 Jun. 29, 2006

(30) Foreign Application Priority Data

Jun. 23, 2003 (JP) ............................ 2003-178404

(51) Int. Cl.
H04N 3/14 (2006.01)
(52) U.S. Cl. ................. 348/276; 348/208.99
(58) Field of Classification Search ............ 348/208.13, 348/36, 218.1, 219.1, 208.6, 222.1, 234, 348/237, 208.99, 363, 229.1
See application file for complete search history.

(56) References Cited

U.S. PATENT DOCUMENTS

| 5,696,848 | A | 12/1997 | Patti et al. | |
|---|---|---|---|---|
| 5,877,807 | A | 3/1999 | Lenz | |
| 6,466,253 | B1 * | 10/2002 | Honjoh | 348/36 |
| 6,801,248 | B1 * | 10/2004 | Horiuchi | 348/208.13 |
| 6,987,530 | B2 * | 1/2006 | McConica | 348/208.6 |
| 7,180,043 | B2 * | 2/2007 | Washisu | 250/208.1 |
| 7,301,563 | B1 * | 11/2007 | Kakinuma et al. | 348/208.13 |
| 2005/0061952 | A1 * | 3/2005 | Kawahara | 250/208.1 |

FOREIGN PATENT DOCUMENTS

EP    0 396 687    6/1995

(Continued)

OTHER PUBLICATIONS

D.C. Youla et al.; "Image Restoration by the Method of Convex Projections Part I Theory"; IEEE Trans. Med. Image; vol. 1, No. 2, pp. 81-94; Oct. 1982.

*Primary Examiner*—Lin Ye
*Assistant Examiner*—Amy Hsu
(74) *Attorney, Agent, or Firm*—Finegan, Henderson, Farabow, Garrett & Dunner, L.L.P.

(57) ABSTRACT

The present invention relates to a method, apparatus and program for processing an image, capable of producing a sharp image. A digital camera 1 includes an imaging device 4 formed of a single-plane sensor that provides one color signal for each pixel. A plurality of images are captured at a high shutter speed by the imaging device 4 and stored in a frame memory 22 of a signal processor 7. The signal processor 7 detects a positional relationship among the plurality of images stored in the frame memory 22 and estimates a correct image with three color signals at each pixel, based on the detected positional relationship. The present invention is applicable, for example, to a digital camera.

26 Claims, 55 Drawing Sheets

FOREIGN PATENT DOCUMENTS

| | | |
|---|---|---|
| EP | 0 731 600 | 9/1996 |
| JP | 3-502755 | 6/1991 |
| JP | 5-236422 | 9/1993 |
| JP | 8-263639 | 10/1996 |
| JP | 09-261526 | 10/1997 |
| JP | 10-341367 | 12/1998 |
| JP | 2000-069352 | 3/2000 |
| JP | 2000-69352 | 3/2000 |
| JP | 2000-217032 | 8/2000 |
| JP | 2000-224460 | 8/2000 |
| JP | 2000-244797 | 9/2000 |
| JP | 2000-244803 | 9/2000 |
| JP | 2000-244932 | 9/2000 |
| WO | WO 90/05424 | 5/1990 |

* cited by examiner

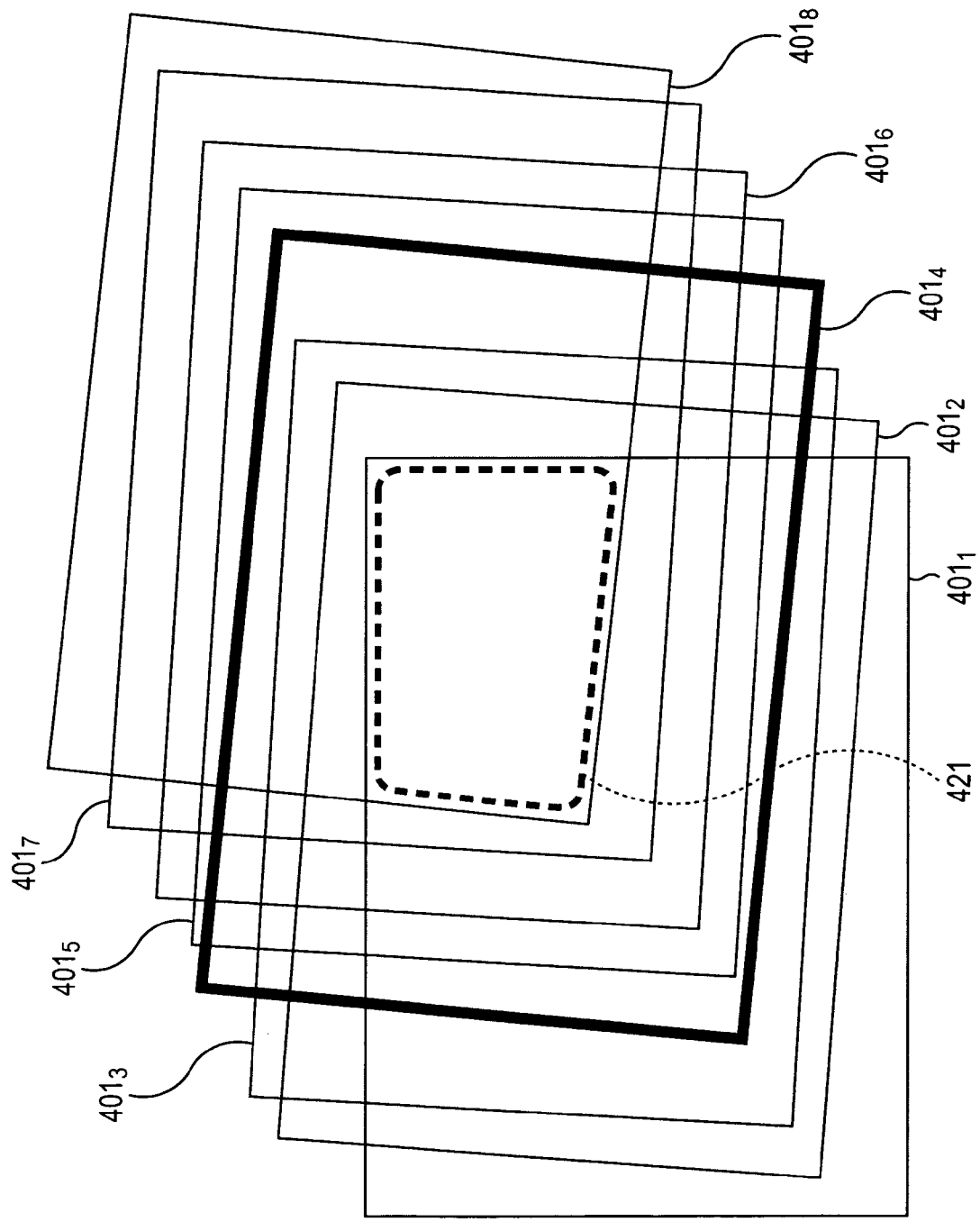

METHOD, APPARATUS, AND PROGRAM FOR PROCESSING AN IMAGE

TECHNICAL FIELD

The present invention relates to a method, apparatus and program for processing an image, and more particularly, to a method, apparatus and program for processing an image to obtain a sharp image using an imaging device including a single-plane sensor.

BACKGROUND ART

In recent years, a digital camera has become very popular as a camera. In the digital camera, an image is taken using an imaging device such as a CCD (Charge Coupled Device) or a CMOS (Complementary Metal Oxide Semiconductor) and the image is displayed on a monitor such as a LCD (Liquid Crystal Display) disposed on the digital camera such that a user can view the image (hereinafter, such an image taken by the imaging device will be referred to simply as a captured image). An image signal of the captured image is converted into digital form and transferred to an image processing apparatus such as a personal computer (PC) via a storage medium such as a flash memory or via wired or wireless communication using a cable or an infrared ray. On receiving the image data captured by the digital camera, the personal computer displays the image on a monitor such as a CRT (Cathode Ray Tube) or a LCD (Liquid Crystal Display) so that a user can view the image and edit it.

When an image of a subject that is not well lighted is taken by a digital camera in a darkish environment such as a shaded place or a poorly lighted room, the shutter speed should be set to be low enough to obtain sufficient exposure (that is, the exposure time should be long enough).

When the exposure time is long, if the digital camera is firmly held, for example, by placing it on a tripod such that the digital camera does not shake, a good image can be obtained. However, in a case in which the digital camera is held in hands, the digital camera can shake. If the camera shakes when the shutter is in an open state (during a shutter time), a resultant captured image of a subject is blurred. The blurred image is called a "hand shake blurred" image or a "camera shake blurred" image.

It is known to obtain equivalently sufficient exposure by simply cumulatively superimposing two or more captured images, instead of decreasing the shutter speed (increasing the shutter time) (an example of such a technique may be found, for example, in Japanese Unexamined Patent Application Publication No. 05-236422).

However, in the technique disclosed in Japanese Unexamined Patent Application Publication No. 05-236422, because two or more captured images are simply superimposed, an image is blurred if the digital camera shakes, as in the case in which an image is captured at a low shutter speed.

In some digital cameras available from Canon Kabushiki Kaisha, a technique called an image stabilizer (IS) is used to prevent an image from being blurred when a digital camera shakes.

In the technique using the image stabilizer, a shake or vibration of a digital camera is detected by a pre-sensor disposed in an optical lens system, and a part (correction optical system) of the lens system is moved in a direction perpendicular to the optical axis in accordance with a digital signal indicating the detected shape or vibration of the digital camera so that refraction of light is changed to prevent the image from being blurred.

The image stabilizer makes it possible to cancel out blurring of an image due to shaking of a camera or a stage on which the camera is placed caused by shaking of a hand or a wind, which is significant in particular when an image is taken at a low shutter speed by a digital camera held in hands, thereby allowing a user to obtain a sharp image.

However, the image stabilizer needs a dedicated sensor responsible for sensing shaking of the camera and also needs a mechanism for quickly moving a part (correction optical system) of the lens system, and thus the image stabilizer has a complicated structure, which results in an increase in production cost.

Another known technique to prevent an image from being blurred when the image is captured by a shaking camera is to successively capture a plurality of images at a high shutter speed, detect the displacement of second and following captured images relative to a first captured image, compensate for the displacement of the second and following captured images, and superimposing the compensated images on the first captured image (examples of this technique may be found, for example, in Japanese Unexamined Patent Application Publications Nos. 2000-217032, 2000-224460, 2000-244803, 2000-244797, 2000-069352, 10-341367, and 09-261526). Basically, in this conventional technique, images similar to a first captured image are produced from second and following captured images by means of correction or interpolation, and the resultant images are simply added or linearly added on a pixel-by-pixel basis to the first captured image.

In this technique, each of images successively captured at a high shutter speed has practically no blur although images are dark. An image finally obtained by superimposing of second and following captured images on a first image can have high brightness similar to that obtained when the exposure time is set properly.

In this technique, the correction of the detected displacement of the second and following captured images relative to the first captured image is made by interpolating color signals (data) including a R (Red) signal (red data), a G (Green) signal (green data), and a B (Blue) signal (blue data) for each pixel, by using an interpolation function based on linear interpolation, bicubit interpolation, or the like.

However, in the case of an imaging device using a single-plane sensor as an imaging device, each pixel outputs only one of color signals, that is, an R signal, a G signal, or a B signal. This makes it impossible to correct displacements of a plurality of images by means of interpolation described above, and any interpolation method applicable to the single-plane sensor is known.

DISCLOSURE OF INVENTION

In view of the above, it is an object of the present invention to provide a technique of obtaining a sharp image captured by, for example, an imaging device using a single-plane sensor even in a state in which camera shake occurs.

The present invention provides an image processing method, comprising the steps of detecting a positional relationship among a plurality of input images captured by image capture means for capturing an image each pixel of which has one of n pixel values, and estimating an output image by identifying observed pixel components that should be taken into consideration from the plurality of input images for each pixel position of the output image, and producing the output image having (n+1) or more pixel values for each pixel based on the identified observed pixel components.

In the step of estimating the output image, observed pixel components that should be taken into consideration may be selected from the plurality of input images for each pixel position of the output image, and the output image having (n+1) or more pixel values for each pixel may be produced based on the selected observed pixel components.

In the step of estimating the output image, the output image having (n+1) or more color signals for each pixel may be produced from the plurality of input images, based on the positional relationship detected in the detection step.

In the step of estimating the output image, the output image may be determined taking into account a color correlation at each pixel position and/or in the vicinity of each pixel position of the output image. In the step of estimating the output image, pixel values of pixels of the input images may be changed to pixel values depending on the degree of steepness of an edge, and the output image may be estimated based on the resultant changed pixel values. n may be equal to 1, and in the step of estimating the output image, the output image having three pixel values for each pixel may be produced from the plurality of input images, based on the positional relationship detected in the detection step.

The image capture means may be a single-plane sensor, in which a color signal observed varies depending on the position of each input image.

The image capture means may capture the plurality of input images with underexposure, and the image processing method may further comprise the step of correcting the exposure by gaining up each pixel value of the plurality of input images.

The step of estimating the output image may comprise the steps of determining a corrected position of each pixel depending on the positional relationship detected in the detection step for each pixel of each of the plurality of input images, producing a light intensity integral constraint formula indicating that the difference between the integral of light intensity in a region centered at the corrected position and a pixel value of a pixel at the corrected position should be less than a predetermined error; and calculating the light intensity integral constraint formula.

When the light intensity integral constraint formula is produced, if the plurality of input images have been gained up, the error may be changed depending on the factor of the gaining up.

In the step of estimating the output image, a corrected position of each pixel may be determined depending on the positional relationship detected in the detection step for each pixel of each of the plurality of input images, and the output image may be determined taking into account a pixel value of a pixel of the input images whose corrected position is located in the vicinity of each pixel position of the output image and also taking into account the distance between the corrected position and the position of the corresponding pixel of the output image.

In the step of estimating the output image, a corrected position of each pixel may be determined depending on the positional relationship detected in the detection step for each pixel of each of the plurality of input images, and the output image may be determined taking into account a pixel value of a pixel of the input images whose corrected position is located in the vicinity of each pixel position of the output image and also taking into account the error depending on the factor of the gaining up.

In the step of estimating the output image, a corrected position of each pixel may be determined depending on the positional relationship detected in the detection step for each pixel of each of the plurality of input images, and the output image may be estimated by determining the weighted sum of pixel values of the input images whose corrected position is located in the vicinity of each pixel position of the output image.

In the step of estimating the output image, the correct pixel value of a pixel of interest may be determined by determining the weighted sum of pixel values of the input images whose corrected position is located in the vicinity of each pixel position of the output image, weights of the weighted sum being determined using a function having a lowpass-filter characteristic with respect to the distance between the position of the pixel of interest in the output image and the corrected position.

In the step of estimating the output image, the correct pixel value of the pixel of interest may be estimated by selectively performing a first calculation process of determining the weighted sum of pixel values of the input images whose corrected position is located in the vicinity of the position of the pixel of interest, or a second calculation process of determining the weighted sum of pixel values of the input images whose corrected position is located in the vicinity of the position of a pixel of the output image located adjacent to the pixel of interest.

In the step of estimating the output image, the second calculation process may be selected when the sum of weights in the first calculation process is equal or nearly equal to 0.

In the step of estimating the output image, the correct pixel value of the pixel of interest may be determined by selectively performing a first calculation process of determining the weighted sum of pixel values of the input images whose corrected position is located in the vicinity of the position of the pixel of interest, or a second calculation process of determining the weighted sum of pixel values of the input images whose corrected position is located in a second vicinity of the position of the pixel of interest, the second vicinity being greater than the first vicinity.

In the step of estimating the output image, the second calculation process may be selected when the sum of weights in the first calculation process is equal or nearly equal to 0.

In the step of estimating the output image, the correct pixel value of the pixel of interest may be determined by selectively performing a first calculation process of determining the sum of pixel values weighted by a first weighting factor of the input images whose corrected position is located in the vicinity of the position of the pixel of interest, or a second calculation process of determining the sum of pixel values weighted by a second weighting factor of the input images whose corrected position is located in the vicinity of the position of the pixel of interest.

In the step of estimating the output image, the second calculation process may be selected when the sum of weights in the first calculation process is equal or nearly equal to 0.

In the detection step, the positional relationship among the plurality of input images may be detected with reference to an input image captured at the exact or nearly exact center of a time during which the plurality of input images were captured.

The present invention provides an image processing apparatus comprising image capture means for capturing a plurality of input images having n pixel values for each pixel; detection means for detecting a positional relationship among the plurality of input images, and means for estimating an output image by identifying observed pixel components that should be taken into consideration from the plurality of input images for each pixel position of the output image, and producing the output image having (n+1) or more pixel values for each pixel based on the identified observed pixel components.

The present invention provides a program for causing a computer to execute a process comprising the steps of detecting a positional relationship among a plurality of input images captured by image capture means for capturing an image each pixel of which has one of n pixel values, and estimating an output image by identifying observed pixel components that should be taken into consideration from the plurality of input images for each pixel position of the output image, and producing the output image having (n+1) or more pixel values for each pixel based on the identified observed pixel components.

According to the present invention, a positional relationship among a plurality of input images having n pixel values at each pixel is detected. Of observed pixel components of the plurality of input images, observed pixel components that should be taken into consideration are identified for each pixel position of an output image, based on the detected positional relationship. Based on the observed pixel components identified, an output image having (n+1) or more pixel values at each pixel is. estimated.

The image processing apparatus may be in the form of a self-contained apparatus or a block responsible for image processing in an apparatus.

BRIEF DESCRIPTION OF THE DRAWINGS

FIG. 56 is a diagram showing an output image produced from captured images by using an intermediate captured image as a reference image.

BEST MODE FOR CARRYING OUT THE INVENTION

Figure 1:
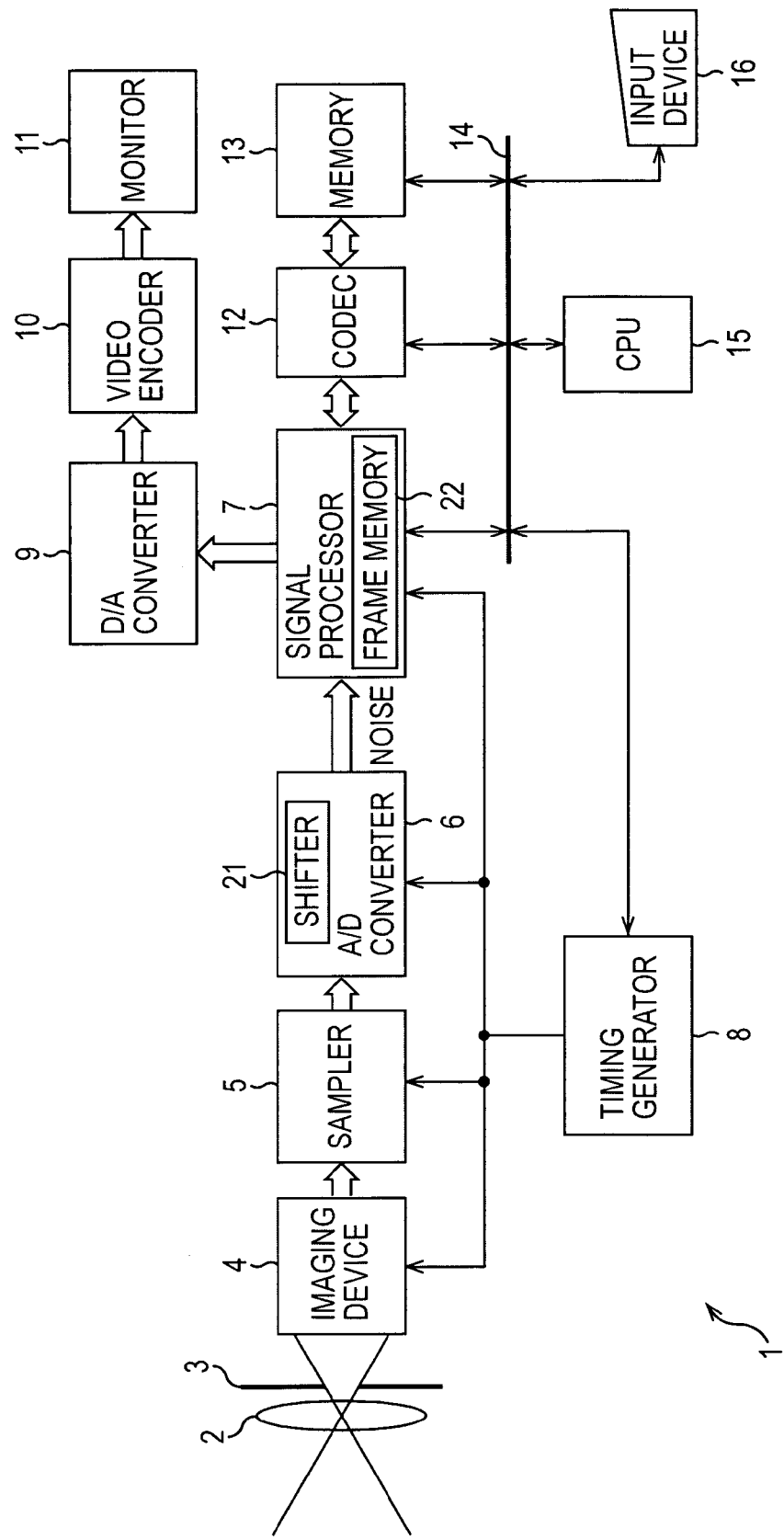
FIG. 1 is a block diagram showing an example of a configuration of a digital camera 1 according to an embodiment of the present invention.

FIG. 1 is a block diagram showing an example of a configuration of a digital (still) camera 1 according to an embodiment of the present invention.

The digital camera 1 shown in FIG. 1 includes a lens 2, an aperture 3, an imaging device 4, a correlated double sampler 5, a A/D (Analog/Digital) computer 6, a signal processor 7, a timing generator 8, a D/A (Digital/Analog) converter 9, a video encoder 10, a monitor 11, a codec 12, a memory 13, a bus 14, a CPU (Central Processing Unit) 15, and an input device 16. The A/D converter 6 includes a shifter 12, and the signal processor 7 includes a frame memory 22.

Light originating from a subject (not shown) passes through an optical system including the lens 2 and the aperture 3, and is incident on the imaging device 4. The imaging device 4 is in the form of a single-plane sensor made of a CCD or a CMOS including a particular number of pixels (picture elements).

The imaging device 4 senses the incident light originating from the subject for a specified period (shutter time) at specified intervals in accordance with an exposure timing signal supplied from the timing generator 8. The imaging device 4 converts the intensity of light sensed by each of photosensor elements disposed in an image sensing plane to an electric signal by means of photoelectric conversion. The resultant electric signal is supplied as an image signal to the correlated double sampler 5. Because the imaging device 4 is constructed in the form of the single-plane sensor, each pixel of the image supplied in the form of the electric image signal to the correlated double sampler 5 is one of R, G, and B signals (data).

The imaging device 4 captures a plurality of images (N images) at a higher shutter speed (with a longer shutter time) than a shutter speed (shutter timer (exposure time)) necessary to obtain optimum exposure for one image, for use to produce a sharp output image even if a camera shake occurs. Each of N images (input images) captured (with underexposure) by the imaging device 4 is darker than is obtained if the image is captured with optimum exposure. That is, the brightness of each image is lower by a factor of Mk (k=1 to N) than that obtained with optimum exposure (that is, equal to 1/Mk times that obtained with optimum exposure). The value of Mk is determined by the shutter speed.

The correlated double sampler 5 removes noise from the image signal (electric signal) received from the imaging device 4 by means of correlated double sampling and supplies the resultant image signal to the A/D converter 6. On receiving the noise-removed image signal of the subject from the correlated double sampler 5, the A/D converter 6 converts it into a digital signal, that is, the A/D converter 6 samples the received image signal and quantizes it. Thereafter, the shifter 21 increases (gains up) the magnitude of the digital image signal representing a dark image captured with underexposure by a factor of Mk, for example, by means of n'-bit shifting so as to obtain an image with brightness (signal level) similar to that obtained with optimum exposure. The resultant image signal is supplied to the signal processor 7.

Note that the correlated double sampler 5 cannot remove all noise components in the above-described process of removing noise from the image signal, and thus the image signal output from the correlated double sampler 5 includes a residual noise component. The residual noise component remaining without being removed by the correlated double sampler 5 causes an error for the true value of the image signal, and the error is also increased by the shifter 21 by a factor of Mk as well as the image signal. Thus, the resultant error depends on the factor of the gaining up performed by the shifter 21. Let E denote the magnitude of the residual noise component including the image signal output from the correlated double sampler 5. The noise E is set to a maximum possible value depending on the characteristic of the imaging device 4. The image signal supplied from the A/D converter 6 to the signal processor 7 includes noise with a magnitude approximately equal to Mk times the noise E (E×Mk). For example, when Mk=8, n'=set to be 3, and the shifter 21 performs 3-bit shifting on the k-th captured image to increase the brightness of the k-th captured image to proper brightness.

After the image signal is gained up by the factor of Mk such that the brightness is increased to the optimum level, the image signal of each of N captured images is output from the A/D converter 6 and temporarily stored in the frame memory 22 of the signal processor 7.

In accordance with programs prepared in advance, the signal processor 7 performs a process on the image signal of each of N captured images with brightness gained up to the proper level stored in the frame memory 22.

More specifically, the signal processor 7 employs the first one of the N captured image as a reference image, and sequentially selects second and N-th captured image as a target image. The signal processor 7 detects the positional displacement of the target image relative to the reference image. The signal processor 7 compensates for the camera shake based on the detected positional displacement and produces a displacement-compensated sharp image (to be output) having all G, R, and B signals for each pixel. The resultant output image signal is supplied to one or both of the D/A converter 9 and codec 12. The signal processor 7 may be realized using a DSP (Digital Signal Processor) or the like. In the following discussion, it is assumed that the image signal processed by parts following the A/D converter 6 has been gained up in brightness to a level similar to that obtained with optimum exposure.

The timing generator 8 supplies the exposure timing signal to the imaging device 4, the correlated double sampler 5, the A/D converter 6, and the signal processor 7 such that N images are captured at the specified intervals. An use may change the interval, for example, depending on the brightness of a subject. If the interval is changed by the user via the input device 16, the data indicating the changed value of the interval is supplied from the CPU 15 to the timing generator 8 via the bus 14.

The D/A converter 9 converts the image signal output from the signal processor 7 into an analog signal and supplies the resultant analog image signal to the video encoder 10. The video encoder 10 converts the image signal (in the form of the analog signal) supplied from the D/A converter 9 into a video signal in a form capable of being displayed on the monitor 11. The resultant video signal is supplied to the monitor 11. The monitor 11 serves as a viewfinder of the digital camera 1, and it may be realized using a LCD or a CRT. The video signal supplied from the video encoder 10 is displayed on the monitor 11. Thus, a sharp image is displayed on the monitor 11.

The codec 12 encodes the image signal output from the signal processor 7 in according to a particular coding technique such as that according to the JPEG (Joint Photographic Exerts Group) standard, the MPEG (Moving Picture Experts Group) standard, or the DV (Digital Video) standard. The resultant encoded image signal is supplied to the memory 13.

The memory 13 is made of a semiconductor memory such as a flash memory and servers to temporarily or permanently store the encoded image signal supplied from the codec 12. Instead of the memory 13, a storage medium such as a magnetic disk or an optical (magnetooptical) disk may be used. The memory 13 or the storage medium used instead of the memory 13 may be removable from the digital camera 1. The digital camera 1 may include both a storage medium disposed in a fixed fashion in the digital camera 1 and a storage medium disposed in a removable fashion on the digital camera 1.

The CPU 15 supplies a control signal to various parts via the bus 14 to control various processes. For example, in accordance with an image capture start signal issued by a user via the input device 16, the CPU 15 supplies the control signal to various parts to capture an image of a subject and store the captured image in the memory 13.

The input device 16 includes operation buttons such as a release button disposed on the main part of the digital camera 1. If an operation button is operated by a user, a signal is generated and supplied to the CPU 15 via the bus 14. In accordance with the signal received from the input device 16 via the bus 14, the CPU 15 controls various parts. One or more of the operation buttons of the input device 16 may be displayed on the monitor 11. The operation imposed on an operation button displayed on the monitor 11 may be detected by a transparent tablet disposed on the monitor 11.

Referring to a flow chart shown in FIG. 2, a process of taking an image performed by the digital camera 1 is described below.

First, in step S1, the imaging device 4 takes an image of a subject. More specifically, each time the release button (shutter button) is pressed, the imaging device 4 successively captures N images at a high shutter speed by sensing incident light originating from the subject in accordance with the exposure timing signal supplied from the timing generator 8. Thus, each time an image is taken, dark N captured images with a brightness level lower than that obtained with optimum exposure are obtained. The light originating from the subject is sensed and converted into an electric signal. The resultant image signal in the form of the electric signal is supplied to the correlated double sampler 5. The correlated double sampler 5 removes a noise component from the image signal and supplies the resultant image signal to the A/D converter 6. Thereafter, the process proceeds to step S2.

In step S2, the D/A converter 6 converts the noise-removed image signal of the subject received from the correlated double sampler 5 into a digital signal. Furthermore, the shifter 21 converts the underexposed dark image into an image with brightness (signal level) similar to that obtained with optimum exposure by means of n'-bit shifting. The resultant image signal is supplied to the signal processor 7. Thereafter, the process proceeds to step S3.

In step S3, the signal processor 7 takes the first captured image as a reference image and sequentially selects one of image following the first image as a target image. The signal processor 7 detects a positional displacement (amount of motion) of the target image (one of second to N-th images) with respect to the reference image. Thereafter, the process proceeds to step S4.

In step S4, the signal processor 7 performs the correct image estimation process, based on the positional displacement of the N-th captured image relative to the reference image detected in step S3. Thereafter, the process proceeds to step S5. In this correct image estimation process the details of which will be described later, the signal processor 7 produces a displacement-compensated sharp image (output image) including all G, R, and B signals for each pixel and supplies the resultant image signal to one or both of the D/A converter 9 and codec 12.

In step S5, the output image is displayed on the monitor 11, and the output image is stored in the memory 13 such as a flash memory. Thus, the process is completed. More specifically, in step S5, the image signal supplied in step S4 from the signal processor 7 to the D/A converter 9 is converted into an analog signal and supplied to the video converter 10. Furthermore, in step S5, the video encoder 10 converts the analog image signal supplied from the D/A converter 9 into a video signal in a form capable of being displayed on the monitor 11. The resultant video signal is supplied to the monitor 11. Furthermore, in step S5, the monitor 11 displays the image in accordance with the video signal supplied from the video encoder 10. Furthermore, in step S5, the image signal supplied in step S4 from the signal processor 7 to the codec 12 is encoded according to an encoding scheme such as that based on the JPEG standard or the MPEG standard, and the resultant image signal is stored in the memory 13 such as a flash memory. Thus, the process is exited.

Figure 3:
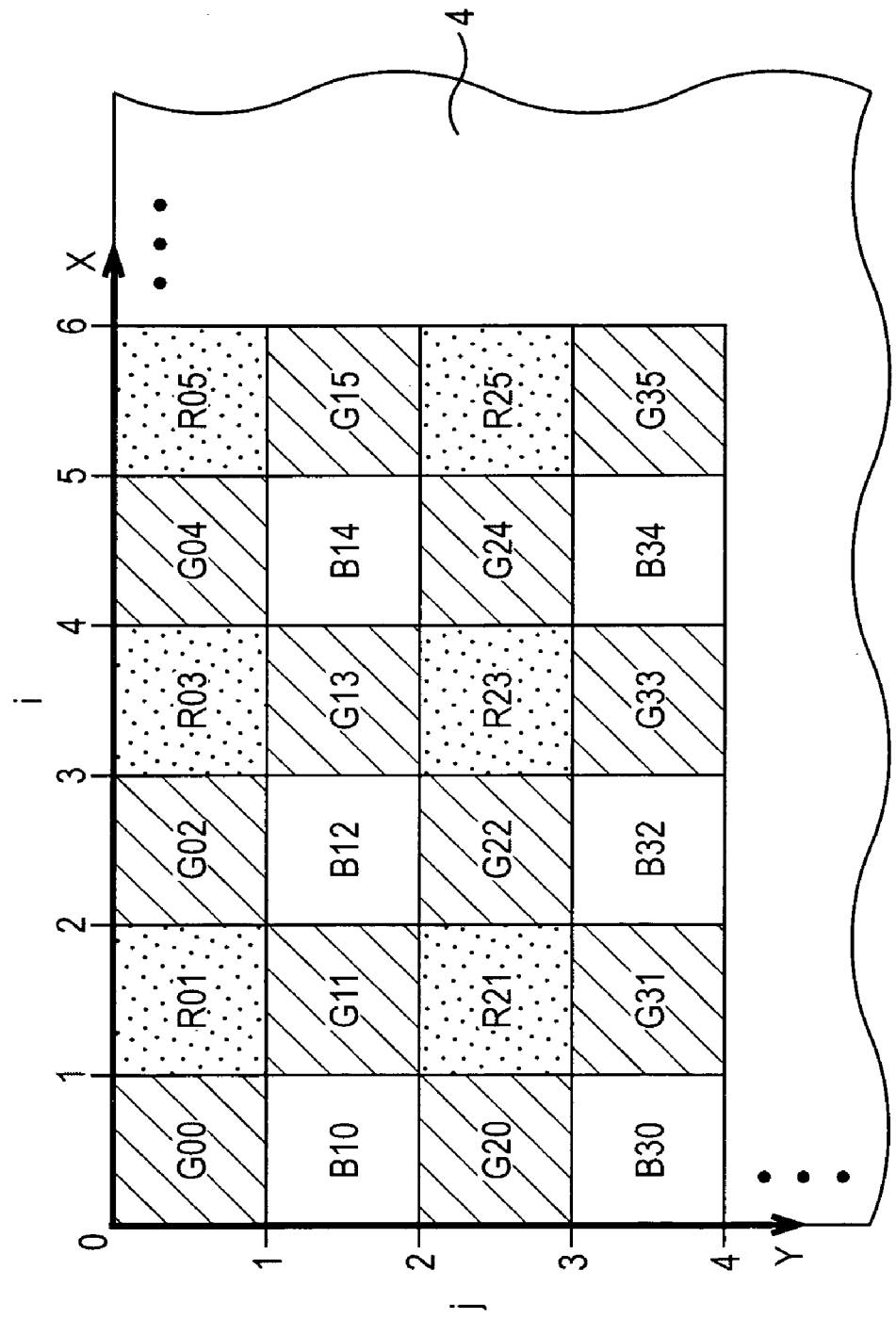
FIG. 3 is a diagram showing a manner in which pixels of an imaging device 4 shown in FIG. 1 are arranged.

FIG. 3 is a diagram showing a manner in which pixels of the imaging device 4 are arranged. Although only some pixels (6 pixels in a horizontal direction by 4 pixels in a vertical direction, and thus a total of 24 pixels) in an upper left area of the imaging device 4 are shown in FIG. 3, the remaining pixels are arranged in a similar manner.

In FIG. 3, an X-Y coordinate system is defined such that the upper left corner of the imaging device 4 is employed as an origin, an X axis is taken in a horizontal direction (to the right), and a Y axis is taken in a vertical direction (upwardly). The horizontal length and the vertical length of one pixel are set to be 1. The position (center position) of the pixel at an i-th position from the left end and at a j-th position from the upper end can be expressed as (i−0.5, j−0.5). In the imaging device 4 shown in FIG. 3, pixels are arranged in the form of a Bayer array.

Pixels that provide G signals include a pixel G00 at a first position in the X direction and at a first position in the Y direction, a pixel G02 at a third position in the X direction and at the first position in the Y direction, a pixel G04 at a fifth position in the X direction and at the first position in the Y direction, a pixel G11 at a second position in the X direction and at a second position in the Y direction, and further a pixel G13, a pixel G15, a pixel G20, a pixel G22, a pixel G24, a pixel G31, a pixel G33, and a pixel G35.

Pixels that provide R signals include a pixel R01 at the second position in the X direction and at the first position in the Y direction, a pixel R03 at a fourth position in the X direction and at the first position in the Y direction, a pixel R05 at a sixth position in the X direction and at the first position in the Y direction, a pixel R21 at the second position in the X direction and at a third first position in the Y direction, and further a pixel R23, and a pixel R25.

Pixels that provide B signals include a pixel B10 at the first position in the X direction and at the second position in the Y direction, a pixel B12 at the third position in the X direction and at the second position in the Y direction, a pixel B14 at the fifth position in the X direction and at the second position in the Y direction, a pixel B30 at the first position in the X direction and at the fourth position in the Y direction, and further a pixel B32, and a pixel B34.

For a sharp image with no blur due to a camera shake, a G signal, a R signal, and a B signal at a particular position (x, y) in the X-Y coordinate system of the imaging device 4 are respectively denoted by Lg(x, y), Lr(x, y), and Lb(x, y). Furthermore, for a sharp image with no blur due to a camera shake, a G signal, a R signal, and a B signal of a (i-th, j-th) pixel located at an i-th position as counted from the left end and at a j-th position as counted from the upper end are respectively denoted by Lg(i, j), Lr(i, j), and Lb(i, j). That is, Lg(x, y), Lr(x, y), and Lb(x, y) (Lg(i, j), Lr(i, j), and Lb(i, j)) respectively indicate the true green light intensity (data), the true red light intensity (data), the true blue light intensity (data) at the particular position (x, y) (at the (i-th, j-th) pixel) of an image having neither blur nor noise. Hereinafter, Lg(x, y), Lr(x, y), and Lb(x, y) (Lg(i, j), Lr(i, j), and Lb(i, j)) will be referred to as the true green light intensity Lg(x, y) (Lg(i, j)), the true red light intensity Lr(x, y) (Lr(i, j)), and the true blue light intensity Lb(x, y) (Lb(i, j)). When x=i−0.5 and y=j−0.5, Lg(x, y)=Lg(i, j), Lr(x, y)=Lr(i, j), and Lb(x, y)=Lb(i, j).

Although in the present embodiment, the pixels of the imaging device 4 are arranged in the form of a Bayer array, the pixels may be arranged in another fashion.

Variables ig, jg, ir, jr, ib, and jb associated with pixels of the G signal, the R signal, and the B signal are defined as follows.

Variables ig and jg respectively indicate a position i in the X direction and a position j in the Y direction at which a pixel responsible for providing a G signal is located. That is, combinations of variables ig and jg are equal to combinations of variables i and j for pixels responsible for providing the G signal. In the case in which pixel are arranged in the form of a Bayer array, variables ig and jg are given by variables i and j whose difference i−j is even. Note that, as a matter of course, the difference between variables ig and jg, that is, ig−jg, is also even. Thus, a "pixel located at an ig-th position and at a jg-th position" is a pixel that is responsible for providing the G signal. In a case in which pixels are arranged in the form of an array other than the Bayer array, variables ig and jg are given differently depending on the array.

Variables ir and jr respectively indicate a position i in the X direction and a position j in the Y direction at which a pixel responsible for providing a R signal is located. That is, combinations of variables ir and jr are equal to combinations of variables i and j for pixels responsible for providing the R signal. In the case in which pixel are arranged in the form of the Bayer array, variables ir and jr are given by variables i and j that satisfy the constraint that the variable i is even and the difference between variables i and j, that is, i−j is odd. Note that, as a matter of course, the difference between variables ir and jr, that is, ir−jr, is also odd. Thus, a "pixel located at an ir-th position and at a jr-th position" is a pixel that is responsible for providing the R signal. In a case in which pixels are arranged in the form of an array other than the Bayer array, variables ir and jr are given differently depending on the array.

Variables ib and jb respectively indicate a position i in the X direction and a position j in the Y direction at which a pixel responsible for providing a B signal is located. That is, combinations of variables ib and jb are equal to combinations of variables i and j for pixels responsible for providing the B signal. In the case in which pixel are arranged in the form of the Bayer array, variables ib and jb are given by variables i and j that satisfy the constraint that the variable i is odd and the difference between variables i and j, that is, i−j is odd. Note that, as a matter of course, the difference between variables ib and jb, that is, ib−jb, is also odd. Thus, a "pixel located at an ib-th position and at a jb-th position" is a pixel that is responsible for providing the B signal. In a case in which pixels are arranged in the form of an array other than the Bayer array, variables ib and jb are given differently depending on the array.

Values (pixel values) of color signals (a G signal, a R signal, and a B signal) output from respective pixels of the imaging device 4 shown in FIG. 3 are defined as follows.

As described earlier, N images are taken by the imaging device 4, and thus N pixel values are obtained for each pixel of the imaging device 4. A pixel value of a pixel at an ig-th position and at a jg-th position of a k-th image (k=1 to N) is denoted by Gobs(k, ig, jg), a pixel value of a pixel at an ir-th position and at a jr-th position of a k-th image (k=1 to N) is denoted by Robs(k, ir, jr), and a pixel value of a pixel at an ib-th position and at a jb-th position of a k-th image (k=1 to N) is denoted by Bobs(k, ib, jb). For example, a pixel value of a pixel G00 of a first image is given by Gobs(1, 1, 1), and a pixel value of a pixel G04 of a second image is given by Gobs(2, 5, 1). Herein, and also in the following description, k denotes an integer in the range from 1 to N, unless otherwise specified.

In other words, pixel values Gobs(k, ig, jg), Robs(k, ir, jr), Bobs(k, ib, jb) respectively indicate pixel values obtained by pixels G(jg−1)(ig−1), R(jr−1)(ir−1), and B(jb−1)(ib−1).

Figure 4:
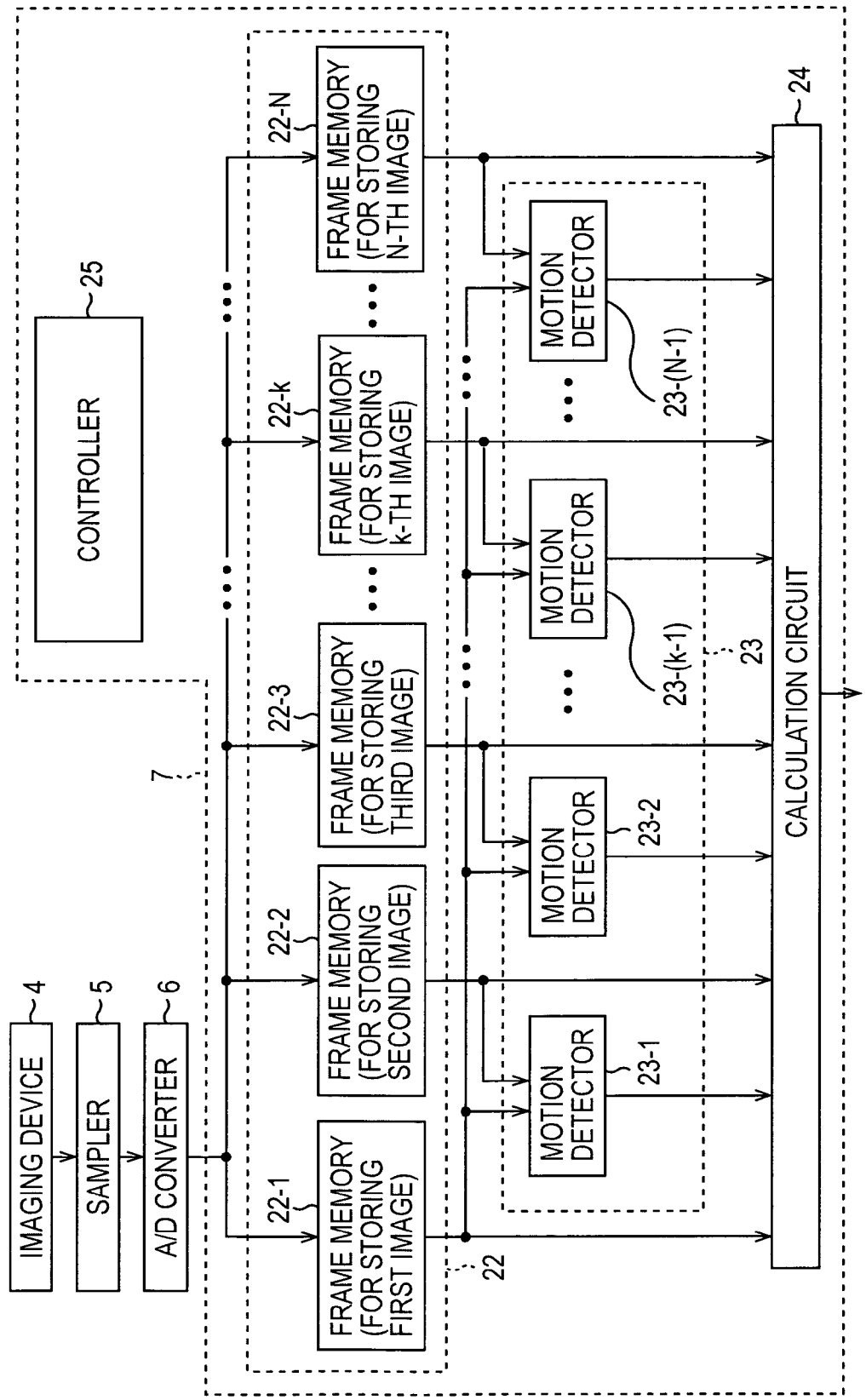
FIG. 4 is a block diagram showing an example of detailed configuration of a signal processor 7 shown in FIG. 1.

FIG. 4 shows an example of detailed configuration of a part of the signal processor 7 shown in FIG. 1. The signal processor 7 includes a frame memory 22, a motion detector 23, a calculation circuit 24, and a controller 25. The frame memory 22 includes frame memories 22-1 to 22-N, and the motion detector 23 includes motion detectors 23-1 to 23-(N−1).

As described earlier, the A/D converter 6 supplies N captured images to the frame memory 22. The frame memory 22-1 stores a first captured image supplied from the A/D converter 6. The frame memory 22-2 stores a second captured image supplied from the A/D converter 6. Similarly, the frame memory 22-k stores a k-th captured image supplied from the A/D converter 6 (where k=3 to N).

The frame memory 22-1 supplies the first captured image stored therein to the calculation circuit 24 and the motion detectors 23-1 to 23-(N−1) with proper timing. The frame memory 22-2 supplies the second captured image stored therein to the calculation circuit 24 and the motion detector 23-1 with proper timing. Similarly, the frame memory 22-k supplies the k-th captured image stored therein to the calculation circuit 24 and the motion detector 23-(k−1) with proper timing.

The motion detector 23 detects a positional relationship between two captured images. More specifically, the motion detector 23 takes the first captured image as a reference image and one of captured images following the first captured image as a target image, and the motion detector 23 detects a positional displacement (amount of motion) of the target image (one of second to N-th images) with respect to the reference image. For example, a camera shake can cause a positional displacement.

The first captured image used as the reference image is supplied to the motion detector 23-1 from the frame memory 22-1, and the second captured image used as the target image is supplied to the motion detector 23-1 from the frame memory 22-2.

The motion detector 23-1 detects the correspondence between the position of each pixel (or each block when the image is divided into a plurality of blocks) of the second captured image and the position of the first captured image by determining conversion parameters (θ, T2x, T2y, S2) of equation (1) representing the positional relationship between the first captured image and the second captured image, where θ2 denotes a rotation angle, S2 denotes a scale, and (T2x, T2y) denotes a parallel displacement. The resultant conversion parameters are supplied to the calculation circuit 24.

$$\begin{pmatrix} X1_{(2)} \\ Y1_{(2)} \end{pmatrix} = S2 \begin{pmatrix} \cos(\theta 2) & -\sin(\theta 2) \\ \sin(\theta 2) & \cos(\theta 2) \end{pmatrix} \begin{pmatrix} X2 \\ Y2 \end{pmatrix} + \begin{pmatrix} T2x \\ T2y \end{pmatrix} \quad (1)$$

equation (1) is in the form of a so-called affine transformation, in which (x2, y2) represents the position of a pixel of the second captured image, and ($X1_{(2)}$, $Y1_{(2)}$) represents the corresponding position on the first captured image. Note that a subscript (2) is used to indicate a converted position of a position on the second captured image.

The conversion parameters (θ2, T2x, T2y, S2) represent that a position (x2, y2) on the second captured image is displaced with respect to a corresponding position (x1, y1) on the first captured image by an angle θ2 due to a camera shake, enlarged (or reduced if S2<1) by a factor of S2 due to movement of the digital camera 1 toward a subject, and displaced parallel to the subject by (T2x, T2y). In most cases, of various displacement components of camera shake, a component in a direction parallel to the plane of the imaging device 4 has a significant effect, but a displacement component in a direction from the digital camera 1 to the subject is small enough to neglect it. That is, S2 can be approximated as S2=1.

The first captured image used as the reference image is supplied to the motion detector 23-2 from the frame memory 22-1, and the third captured image used as the target image is supplied to the motion detector 23-2 from the frame memory 22-3.

The motion detector 23-2 detects the correspondence between the position of each pixel (or each block when the image is divided into a plurality of blocks) of the third captured image and the position of the first captured image by determining conversion parameters (θ3, T3x, T3y, S3) of equation (1) representing the positional relationship between the first captured image and the second captured image, where θ3 denotes a rotation angle, S3 denotes a scale, and (T3x, T3y) denotes a parallel displacement. The resultant conversion parameters are supplied to the calculation circuit 24.

$$\begin{pmatrix} X1_{(3)} \\ Y1_{(3)} \end{pmatrix} = S3 \begin{pmatrix} \cos(\theta 3) & -\sin(\theta 3) \\ \sin(\theta 3) & \cos(\theta 3) \end{pmatrix} \begin{pmatrix} X3 \\ Y3 \end{pmatrix} + \begin{pmatrix} T3x \\ T3y \end{pmatrix} \quad (2)$$

equation (2) is also in the form of an affine transformation, in which (X3, Y3) represents the position of a pixel of the second captured image, and ($X1_{(3)}$, $Y1_{(3)}$) represents the corresponding position on the first captured image. Note that a subscript (3) is used to indicate that a position of the third captured image is converted to a position with the subscript (3).

The conversion parameters (θ3, T3x, T3y, S3) represent that a position (X3, Y3) on the third captured image is displaced with respect to a corresponding position (x1, y1) on the first captured image by an angle θ3 due to a camera shake, enlarged (or reduced if S3<1) by a factor of S3 due to movement of the digital camera 1 toward the subject, and displaced parallel to the subject by (T3x, T3y). In most cases, of various displacement components of camera shake, a component in a direction parallel to the plane of the imaging device 4 has a significant effect, but a displacement component in a direction from the digital camera 1 to the subject is small enough to neglect it. That is, S2 can be approximated by S3=1.

Similarly, the first captured image used as the reference image is supplied to the motion detector 23-(k–1) from the frame memory 22-1, and the k-th captured image used as the target image is supplied to the motion detector 23-(k–1) from the frame memory 22-k.

The motion detector 23-(k–1) detects the correspondence between the position of each pixel (or each block when the image is divided into a plurality of blocks) of the k-th captured image and the position of the first captured image by determining conversion parameters (θk, Tkx, Tky, Sk) of equation (1) representing the positional relationship between the first captured image and the second captured image, where θk denotes a rotation angle, Sk denotes a scale, and (Tkx, Tky) denotes a parallel displacement. The resultant conversion parameters (θk, Tkx, Tky, Sk) are supplied to the calculation circuit 24.

$$\begin{pmatrix} X1_{(k)} \\ Y1_{(k)} \end{pmatrix} = Sk \begin{pmatrix} \cos(\theta k) & -\sin(\theta k) \\ \sin(\theta k) & \cos(\theta k) \end{pmatrix} \begin{pmatrix} Xk \\ Yk \end{pmatrix} + \begin{pmatrix} Tkx \\ Tky \end{pmatrix} (k = 4 \text{ to } N) \quad (3)$$

equation (3) is also in the form of an affine transformation, in which (Xk, Yk) represents the position of a pixel of the second captured image, and (X1(k), Y1(k)) represents the corresponding position on the first captured image. Note that a subscript (k) is used to indicate that a position of the second captured image is converted to a position with the subscript (k).

The conversion parameters (θk, Tkx, Tky, Sk) represent that a position (Xk, Yk) on the k-th captured image is displaced with respect to a corresponding position (x1, y1) on the first captured image by an angle θk due to a camera shake, enlarged (or reduced if Sk<1) by a factor of Sk due to movement of the digital camera 1 toward the subject, and displaced parallel to the subject by (Tkx, Tky). In most cases, of various displacement components of camera shake, a component in a direction parallel to the plane of the imaging device 4 has a significant effect, but a displacement component in a direction from the digital camera 1 to the subject is small enough to neglect it. That is, Sk can be approximated by Sk=1.

Instead of determining the conversion parameters (θk, Tkx, Tky, Sk) from the positional relationship of the k-th captured image with respect to the first captured image in the above-described manner, the conversion parameters (θk, Tkx, Tky, Sk) may be mechanically determined from a signal output from an acceleration sensor disposed on the digital camera 1.

N captured images are supplied to the calculation circuit 24 from the frame memories 22-1 to 22-N, and the conversion parameters (θk, Tkx, Tky, Sk) representing the positional relationship between the first captured image and the k-th captured image are supplied to the calculation circuit 24 from the motion detectors 23-1 to 23-(N–1).

The calculation circuit 24 produces a displacement-compensated sharp image signal (including a G signal component, R signal component, and B signal component) by performing a correct image estimation process, which will be described later, based on the positional relationships of the second to N-th captured images supplied from the motion detectors 23-1 to 23-(N–1) with respect to the first captured image, and the calculation circuit 24 supplies resultant displacement-compensated image signal to the D/A converter 9 or the codec 12. In each of the N captured images supplied from the A/D converter 6 to the signal processor 7, each pixel has one of G, R, and B signals. On the other hand, in the compensated image signal produced by the calculation circuit 24, each pixel has all of G, R, and B signals (data).

Under the control of the CPU 15, the controller 25 controls various parts of the signal processor 7, such as the frame memories 22-1 to 22-N, the motion detectors 23-1 to 23-(N−1), the calculation circuit 24, etc. Instead of the controller 25, the CPU 15 (FIG. 1) may control parts of the signal processor 7, such as the frame memories 22-1 to 22-N, the motion detectors 23-1 to 23-(N−1), and calculation circuit 24. In this case, the controller 25 is not necessary.

In the single-plane sensor using the Bayer array, the number of pixels for R or B signals is less than the number of pixels for the G signal. This can cause the R signal or the B signal in the image output from the signal processor 7 to have a greater error than an error the G signal has. In such a case, a lowpass filter, which limits only a high-frequency component of the color signal without limiting the luminance signal, is disposed at a stage following the calculation circuit 24 thereby removing noise.

If the calculation circuit 24 is designed to be capable of processing images at a high speed on a real-time basis while the images are sequentially captured, the processing can be performed using a less number of frame memories 22-1 to 22-N and a less number of motion detectors 23-1 to 23-(N−1), and thus the signal processor 7 can be constructed in a simpler form with less complexity.

Now, a correct image estimation process performed by the signal processor 7 according to a first embodiment of the present invention is described.

Although not shown in the figures, an on-chip lens is disposed directly on each pixel (photosensing part of each pixel) of the imaging device 4. Each on-chip lens focuses all light originating from a subject and incident on the on-chip lens into one point. Therefore, each pixel located immediately under its own on-chip lens receives the integral of all light incident on the on-chip lens. This results in an improvement in sensitivity of each pixel.

Therefore, data (light intensity) received by each pixel of the imaging device 4 is not the light intensity of light originating from a subject and incident on a point (that is, not point-sampled data) but the integral of light originating from the subject and incident on a finite area of a plane (photosensing plane).

In the first embodiment, the characteristic of the on-chip lens is precisely formulated so that a sharp image (output image) is produced via a correct image estimation process. Note that in the conventional techniques, it is assumed that data is point-sampled at each pixel. However, in an actual imaging device 4, as described above, each pixel receives the integral of light incident on a finite area of a plane, and thus the assumption of point-sampling results in an error in estimation (restoration) of a correct image.

Now, for the first image stored in the frame memory 22-1, the relationship between the pixel value obtained at each pixel and light incident via the on-chip lens is formulated.

For example, for a pixel G00 at a (1st, 1st) position in upper left corner shown in FIG. 3, the relationship between the pixel value Gobs(1, 1, 1) of that pixel and the true green light intensity Lg(x, y) is given by a following equation (4).

$$\int_0^1 \int_0^1 Lg(x, y) dx dy = Gobs(1, 1, 1) \tag{4}$$

The pixel G00 in upper left corner of the photosensor 4 serving as the single-plane sensor is covered with a green filter such that only a green component of incident light can reach the pixel G00. Because of the provision of the on-chip lens, light incident on a rectangular region whose corners are at coordinates (0, 0), (0, 1), (1, 0), and (1, 1) in FIG. 3 reaches the pixel G00. That is, all of light incident on the rectangular region whose corners are at coordinates (0, 0), (0, 1), (1, 0), and (1, 1) is sensed by the pixel G00 located at the (1st, 1st) position.

The left-hand part in equation (4) represents the integral of the true green light intensity Lg(x, y) (incident) at a position (x, y) in the coordinate system of the first captured image taken over a rectangular range whose corners are located at (0, 0), (0, 1), (1, 0), and (1, 1), that is, over a range defined by $0 \leq x < 1$ and $0 \leq y < 1$. The right-hand part of equation (4) represents the pixel value Gobs(1, 1, 1) obtained (observed) by the pixel at the (1st, 1st) position of the first image. Thus, equation (4) represents that the integral of the true green light intensity Lg(x, y) incident on the light sensing plane of the pixel G00 taken over the light sensing plane of the pixel G00 is equal to the pixel value Gobs(1, 1, 1) observed by the pixel G00 for the first image.

Depending on the characteristic of the on-chip lens, light originating from a subject and being incident on a peripheral area (close to edges) of each pixel is not focused. In such a case, the range over which the integral of the left-hand part of equation (4) is calculated is slightly reduced. For example, the integral is calculated over a range whose corners are at (0.1, 0.1), (0.1, 0.9), (0.9, 0.1), and (0.9, 0.9).

In many digital cameras, to avoid false color, which is a drawback of a single-plane sensor, an optical lowpass filter is disposed on each pixel. In this configuration, each pixel receives light incident on an area slightly greater than a rectangular area of the pixel. In such a case, the rectangular range over which the integral of the left-hand part of equation (4) is calculated is slightly expanded.

The discussion will be continued by taking as an example a (2nd, 1st) pixel R00 located immediately adjacent to the right of the pixel G00 in FIG. 3.

For the pixel R01 at the (2nd, 1st) position, the relationship between the pixel value Robs(1, 2, 1) of that pixel and the true green light intensity Lg(x, y) is given by a following equation (5).

$$\int_0^1 \int_1^2 Lr(x, y) dx dy = Robs(1, 2, 1) \tag{5}$$

The pixel R01 in upper left corner of the photosensor 4 serving as the single-plane sensor is covered with a red filter such that only a red component of incident light can reach the pixel R01. Because of the provision of the on-chip lens, light incident on a rectangular region whose corners are at coordinates (1, 0), (1, 1), (2, 0), and (2, 1) in FIG. 3 reaches the pixel R01. That is, all of light incident on the rectangular region whose corners are at coordinates (1, 0), (1, 1), (2, 0), and (2, 1) is sensed by the pixel R01 located at the (2nd, 1st) position.

The left-hand part in equation (5) represents the integral of the true red light intensity Lr(x, y) (incident) at a position (x, y) in the coordinate system of the first captured image over a rectangular range whose corners are located at (1, 0), (1, 1), (2, 0), and (2, 1), that is, over a range defined by $1 \leq x < 2$ and $0 \leq y < 1$. The right-hand part of equation (5) represents the pixel value Robs(1, 2, 1) obtained (observed) by the pixel at the (2nd, 1st) position of the first image. Thus, equation (5)

represents that the integral of the true red light intensity Lr(x, y) incident on the light sensing plane of the pixel R01 over the light sensing plane of the pixel R01 is equal to the pixel value Robs(1, 2, 1) observed by the pixel R01 for the first image.

Depending on the characteristic of the on-chip lens, light originating from a subject and being incident on an a peripheral area (close to edges) of each pixel is not focused. In such a case, the range over which the integral of the left-hand part of equation (5) is calculated is slightly reduced. For example, the integral is calculated over a range whose corners are at (1.1, 0.1), (1.1, 0.9), (1.9, 0.1), and (1.9, 0.9).

In many digital cameras, to avoid false color, which is a drawback of a single-plane sensor, an optical lowpass filter is disposed on each pixel. In this configuration, each pixel receives light incident on an area slightly greater than a rectangular area of the pixel. In such a case, the rectangular range over which the integral of the left-hand part of equation (5) is calculated is slightly expanded.

Similar equations are defined for the other pixels of the first captured image.

That is, for a pixel G(jg−1)(ig−1) at a (ig-th, jg-th) position shown in FIG. 3, the relationship between the pixel value Gobs(1, ig, jg) of that pixel and the true green light intensity Lg(x, y) is given by a following equation (6).

$$\int_{jg-1}^{jg}\int_{ig-1}^{ig} Lg(x, y)\,dx\,dy = Gobs(1, ig, jg) \qquad (6)$$

equation (6) represents that the pixel value Gobs(1, ig, jg) is equal to the integral of the true green light intensity Lg(x, y) over a rectangular range whose corners are located at (ig−1, jg−1), (ig−1, jg), (ig, jg−1) and (ig, jg) in the coordinate system shown in FIG. 3, that is, over a range defined by ig−1≦x<ig and jg−1≦y<jg.

For a pixel R(jr−1) (ir−1) at a (ir-th, jr-th) position shown in FIG. 3, the relationship between the pixel value Robs(1, ir, jr) of that pixel and the true red light intensity Lr(x, y) is given by a following equation (7).

$$\int_{jr-1}^{jr}\int_{ir-1}^{ir} Lr(x, y)\,dx\,dy = Robs(1, ir, jr) \qquad (7)$$

equation (7) represents that the pixel value Robs(1, ir, jr) is equal to the integral of the true red light intensity Lr(x, y) over a rectangular range whose corners are located at (ir−1, jr−1), (ir−1, jr), (ir, jr−1), and (ir, jr) in the coordinate system shown in FIG. 3, that is, over a range defined by ir−1≦x<ir and jr−1≦y<jr.

For a pixel B(jb−1)(ib−1) at a (ib-th, jb-th) position shown in FIG. 3, the relationship between the pixel value Bobs(1, ib, jb) of that pixel and the true blue light intensity Lb(x, y) is given by a following equation (8).

$$\int_{jb-1}^{jb}\int_{ib-1}^{ib} Lb(x, y)\,dx\,dy = Bobs(1, ib, jb) \qquad (8)$$

equation (8) represents that the pixel value Bobs(1, ib, jb) is equal to the integral of the true blue light intensity Lb(x, y) over a rectangular range whose corners are located at (ib−1, jb−1), (ib−1, jb), (ib, jb−1), and (ib, jb) in the coordinate system shown in FIG. 3, that is, over a range defined by ib−1≦x<ib and jb−1≦y<jb.

In practice, as described earlier, the image signal (the observed pixel value) includes noise E, which is gained up by a factor of Mk. If noise components E×Mk are taken into account, formulas (6), (7), and (8) are respectively rewritten into formulas (9), (10), and (11) indicating constraints that light intensity integrals should satisfy.

$$\left|\int_{jg-1}^{jg}\int_{ig-1}^{ig} Lg(x, y)\,dx\,dy - Gobs(1, ig, jg)\right| \le M1 \times E \qquad (9)$$

$$\left|\int_{jr-1}^{jr}\int_{ir-1}^{ir} Lr(x, y)\,dx\,dy - Robs(1, ir, jr)\right| \le M1 \times E \qquad (10)$$

$$\left|\int_{jb-1}^{jb}\int_{ib-1}^{ib} Lb(x, y)\,dx\,dy - Bobs(1, ib, jb)\right| \le M1 \times E \qquad (11)$$

where |x| denotes the absolute value of x.

Formula (9) represents that the difference between the integral of light intensity Lg(x, y) and the observed pixel value Gobs(1, ig, jg) is equal to or less than a maximum possible value M1×E of noise. Inequalities (10) and (11) represent similar constraints.

In the following description, the k-th captured image will also be referred to simply as the k-th image.

Now, for the second image stored in the frame memory 22-2, as for the first image, the relationship between the pixel value obtained (observed) at each pixel and light incident via the on-chip lens is represented in the form of a mathematical expression.

The coordinate system of the second and further following captured images is converted to the coordinate system of the first captured image based on the conversion parameters (θk, Tkx, Tky, Sk)(k=2 to N) detected by the motion detector 23.

For a pixel G00 at a (1st, 1st) position of the second image, the relationship between the pixel value Gobs(2, 1, 1) of that pixel and the true green light intensity Lg(x, y) is given by a following equation (12).

$$\int_{0_{(2)}}^{1_{(2)}}\int_{0_{(2)}}^{1_{(2)}} Lg(x, y)\,dx\,dy = Gobs(2, 1, 1) \qquad (12)$$

The pixel G00 in upper left corner of the photosensor 4 is covered with a green filter such that only a green component of incident light can reach the pixel G00. Because of the provision of the on-chip lens, light incident on a rectangular region whose corners are at coordinates (0, 0), (0, 1), (1, 0), and (1, 1) in the coordinate system of the second image reaches the pixel G00.

If positions (0, 0), (0, 1), (1, 0), and (1, 1) in the coordinate system of the second image are converted to positions in the coordinate system of the first image based on the conversion parameters (θ2, T2x, T2y, S2), the resultant positions are given as $(0_{(2)}, 0_{(2)})$, $(0_{(2)}, 1_{(2)})$, $(1_{(2)}, 0_{(2)})$, and $(1_{(2)}, 1_{(2)})$. That is, all of light incident on the rectangular region whose corners are at coordinates $(0_{(2)}, 0_{(2)})$, $(0_{(2)}, 1_{(2)})$, $(1_{(2)}, 0_{(2)})$ and $(1_{(2)}, 1_{(2)})$ is sensed by the pixel G00 located at the (1st, 1st) position. Hereinafter, when a position (x, y) of the second image is converted into a position in the coordinate system of the first image, a resultant position will be referred to as P(2, x, y).

The left-hand part in equation (12) represents the integral of the true green light intensity Lg(x, y) over a rectangular region whose corners are at P(2, 0, 0), P(2, 0, 1), P(2, 1, 0), and P(2, 1, 1), that is, over a rectangular range whose corners are located at coordinates $(0_{(2)}, 0_{(2)})$, $(0_{(2)}, 1_{(2)})$, $(1_{(2)}, 0_{(2)})$, and $(1_{(2)}, 1_{(2)})$ in the coordinate system of the first image. The right-hand part of equation (12) represents the pixel value Gobs(2, 1, 1) obtained at the pixel at the (1st, 1st) position of the second image. equation (12) represents that the pixel value Gobs(2, 1, 1) observed at the pixel G00 of the second image is equal to the integral of the true green light intensity Lg(x, y) incident on a rectangular region whose corners are located at $(0_{(2)}, 0_{(2)})$, $(0_{(2)}, 1_{(2)})$, $(1_{(2)}, 0_{(2)})$, and $(1_{(2)}, 1_{(2)})$ in the coordinate system of the first image. In equation (12), $\iint dxdy$ represents the integral taken over a rectangular region whose corners are at $(0_{(2)}, 0_{(2)})$, $(0_{(2)}, 1_{(2)})$, $(1_{(2)}, 0_{(2)})$, and $(1_{(2)}, 1_{(2)})$. In equation (13) and other similar equations appearing in the following description, $\iint dxdy$ will be also used to represent a similar integral.

Depending on the characteristic of the on-chip lens, light originating from a subject and being incident on an a peripheral area (close to edges) of each pixel is not focused. In such a case, the range over which the integral in the left-hand part of equation (12) is taken is slightly shrunk as in the first image.

In many digital cameras, to avoid false color, which is a drawback of a single-plane sensor, an optical lowpass filter is disposed on each pixel. In this configuration, each pixel receives light incident on an area slightly greater than a rectangular area of the pixel. In such a case, the rectangular range over which the integral of the left-hand part of equation (12) is calculated is slightly expanded.

The discussion will be continued by taking as an example the (2nd, 1st) pixel R01 located immediately adjacent to the right of the pixel G00.

For the pixel R01 at the (2nd, 1st) position of the second image, the relationship between the pixel value Robs(2, 2, 1) of that pixel and the true red light intensity Lr(x, y) is given by a following equation (13).

$$\int_{0_{(2)}}^{1_{(2)}} \int_{1_{(2)}}^{2_{(2)}} Lr(x, y) dx dy = Robs(2, 2, 1) \qquad (13)$$

The pixel R01 in upper left corner of the photosensor 4 is covered with a red filter such that only a red component of incident light can reach the pixel R01. Because of the provision of the on-chip lens, light incident on a rectangular region whose corners are at coordinates (1, 0), (1, 1), (2, 0), and (2, 1) in the coordinate system of the second image reaches the pixel R01.

If positions (1, 0), (1, 1), (2, 0), and (2, 1) in the coordinate system of the second image are converted to positions in the coordinate system of the first image based on the conversion parameters (θ2, T2x, T2y, S2), the resultant positions are given as $(1_{(2)}, 0_{(2)})$, $(1_{(2)}, 1_{(2)})$, $(2_{(2)}, 0_{(2)})$, and $(2_{(2)}, 1_{(2)})$. That is, all of light incident on the rectangular region whose corners are at coordinates $(1_{(2)}, 0_{(2)})$, $(1_{(2)}, 1_{(2)})$, $(2_{(2)}, 0_{(2)})$, and $(2_{(2)} 1_{(2)})$ is sensed by the pixel R01 located at the (2nd, 1st) position.

The left-hand part in equation (13) represents the integral of the true red light intensity Lr(x, y) over a rectangular region whose corners are at P(2, 1, 0), P(2, 1, 1), P(2, 2, 0), and P(2, 2, 1), that is, over a rectangular range whose corners are located at coordinates $(1_{(2)}, 0_{(2)})$, $(1_{(2)}, 1_{(2)})$, $(2_{(2)}, 0_{(2)})$, and $(2_{(2)}, 1_{(2)})$ in the coordinate system of the first image. The right-hand part of equation (13) represents the pixel value Robs(2, 2, 1) obtained at the pixel at the (2nd, 1st) position of the second image. equation (13) represents that the pixel value Robs(2, 2, 1) observed at the pixel R01 of the second image is equal to the integral of the true green light intensity Lr(x, y) incident on a rectangular region whose corners are located at $(1_{(2)}, 0_{(2)})$, $(1_{(2)}, 1_{(2)})$, $(2_{(2)}, 1_{(2)})$, and $(2_{(2)}, 1_{(2)})$ in the coordinate system of the first image.

Depending on the characteristic of the on-chip lens, light originating from a subject and being incident on an a peripheral area (close to edges) of each pixel is not focused. In such a case, the range over which the integral in the left-hand part of equation (13) is taken is slightly.

In many digital cameras, to avoid false color, which is a drawback of a single-plane sensor, an optical lowpass filter is disposed on each pixel. In this configuration, each pixel receives light incident on an area slightly greater than a rectangular area of the pixel. In such a case, the rectangular range over which the integral of the left-hand part of equation (13) is calculated is slightly expanded.

Similar equations are defined for the other pixels of the second captured image.

That is, for a pixel G(jg−1)(ig−1) at a (ig-th, jg-th) position of the second image, the relationship between the pixel value Gobs(2, ig, jg) of that pixel and the true green light intensity Lg(x, y) is given by a following equation (14).

$$\int_{jg-1_{(2)}}^{jg_{(2)}} \int_{ig-1_{(2)}}^{ig_{(2)}} Lg(x, y) dx dy = Gobs(2, ig, jg) \qquad (14)$$

equation (14) represents that the pixel value Gobs(2, ig, jg) is equal to the integral of the true green light intensity Lg(x, y) over a rectangular range whose corners are located at (ig−1, jg−1), (ig−1, jg), (ig, jg−1), and (ig, jg) in the coordinate system of the second image, that is, over a rectangular range whose corners are located at $(ig-1_{(2)}, jg-1_{(2)})$, $(ig-1_{(2)}, jg_{(2)})$, $(ig_{(2)}, jg-1_{(2)})$, and $(ig_{(2)}, jg_{(2)})$ in the coordinate system of the first image.

That is, for a pixel R(jr−1)(ir−1) at a (ir-th, jr-th) position of the second image, the relationship between the pixel value Robs(2, ir, jr) of that pixel and the true red light intensity Lr(x, y) is given by a following equation (15).

$$\int_{jg-1_{(2)}}^{jg_{(2)}} \int_{ir-1_{(2)}}^{ir_{(2)}} Lr(x, y) dx dy = Robs(2, ir, jr) \qquad (15)$$

equation (15) represents that the pixel value Robs(2, ir, jr) is equal to the integral of the true red light intensity Lr(x, y) over a rectangular range whose corners are located at (ir−1, jr−1), (ir−1, jr), (ir, jr−1), and (ir, jr) in the coordinate system of the second image, that is, over a rectangular range whose corners are located at $(ir-1_{(2)}, jr-1_{(2)})$, $(ir-1_{(2)}, jr_{(2)})$, $(ir_{(2)}, jr-1_{(2)})$, and $(ir_{(2)}, jr_{(2)})$ in the coordinate system of the first image.

That is, for a pixel B(jb−1)(ib−1) at a (ib-th, jb-th) position of the second image, the relationship between the pixel value Bobs(2, ib, jb) of that pixel and the true red light intensity Lb(x, y) is given by a following equation (16).

$$\int_{jb-1_{(2)}}^{jb_{(2)}}\int_{ib-1_{(2)}}^{ib_{(2)}} Lb(x, y)\,dx\,dy = Bobs(2, ib, jb) \quad (16)$$

equation (16) represents that the pixel value Bobs(2, ib, jb) is equal to the integral of the true blue light intensity Lb(x, y) over a rectangular range whose corners are located at (ib−1, jb−1), (ib−1, jb), (ib, jb−1), and (ib, jb) in the coordinate system of the second image, that is, over a rectangular range whose corners are located at (ib−1$_{(2)}$, jb−1$_{(2)}$), (ib−1$_{(2)}$, jb$_{(2)}$), (ib$_{(2)}$, jb−1$_{(2)}$), and (ib$_{(2)}$, jb$_{(2)}$) in the coordinate system of the first image.

In practice, as described earlier, the image signal (the observed pixel value) includes noise E, which is gained up by a factor of Mk. If noise components E×Mk are taken into account, formulas (14), (15), and (16) are respectively rewritten into formulas (17), (18), and (19) indicating constraints that light intensity integrals should satisfy.

$$\left| \int_{jg-1_{(2)}}^{jg_{(2)}}\int_{ig-1_{(2)}}^{ig_{(2)}} Lg(x, y)\,dx\,dy - Gobs(2, ig, jg) \right| \leq M2 \times E \quad (17)$$

$$\left| \int_{jr-1_{(2)}}^{jr_{(2)}}\int_{ir-1_{(2)}}^{ir_{(2)}} Lr(x, y)\,dx\,dy - Robs(2, ir, jr) \right| \leq M2 \times E \quad (18)$$

$$\left| \int_{jb-1_{(2)}}^{jb_{(2)}}\int_{ib-1_{(2)}}^{ib_{(2)}} Lb(x, y)\,dx\,dy - Bobs(2, ib, jb) \right| \leq M2 \times E \quad (19)$$

where |x| denotes the absolute value of x.

Formula (17) represents that the difference between the integral of light intensity Lg(x, y) and the observed pixel value Gobs(2, ig, jg) is equal to or less than a maximum possible value M2×E of noise. Inequalities (18) and (19) represent similar constrains.

Figure 5:
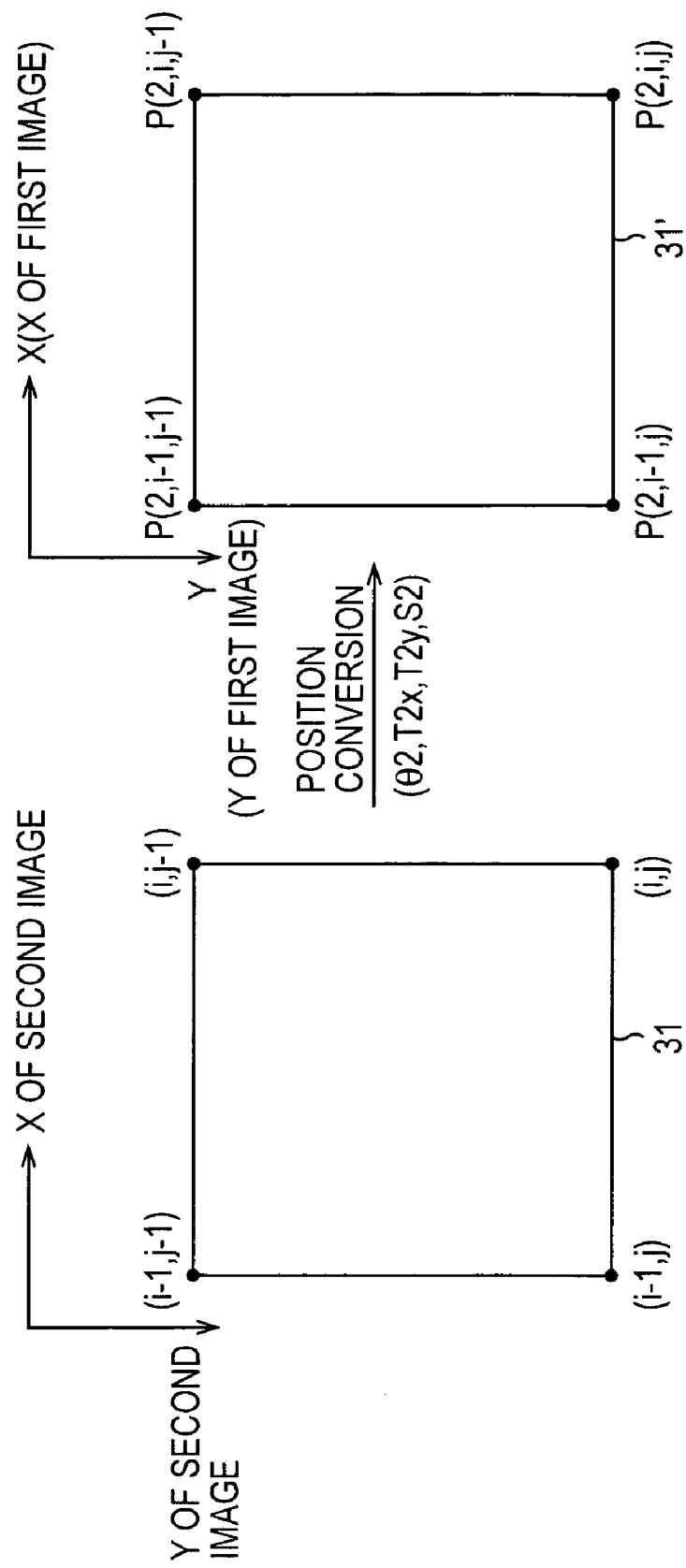
FIG. 5 is a diagram showing a relationship in terms of coordinates between a first image and a second image.

Now, referring to FIG. 5, the relationship between a position (x, y) of the second image and a position P(2, x, y) obtained by converting the position (x, y) into coordinate system of the first image.

A pixel 31 in a rectangular region whose four corners are at (i−1, j−1), (I−1, j), (i, 1−1), and (i, j) in the coordinate system of the second image is shown on the left-hand side of FIG. 5.

The pixel 31 on the left-hand side is converted to a pixel 31' in the coordinate system of the first image, as shown on the right-hand side of FIG. 5. Note that light of the same part of a subject (for example, a landscape scene) falls on the pixel 31 on the left-hand side of FIG. 5 and the pixel 31' on the right-hand side of FIG. 5.

The pixel value of each pixel of second and following captured images is determined as the integral of light in a particular region in the first image employed as the reference image. By properly setting the integration region, the first to N-th captured images having displacement are aligned into a correct position (with reference to the first captured image).

A position (i−1, j−1) in the coordinate system of the second image is converted to a position P(2, i−1, j−1) in the coordinate system of the first image as a result of the conversion based on the conversion parameters (θ2, T2x, T2y, S2). A position (i−1, j) in the coordinate system of the second image is converted to a position P(2, i−1, j) in the coordinate system of the first image as a result of the conversion based on the conversion parameters (θ2, T2x, T2y, S2). Similarly, positions (i, j−1) and (i, j) in the coordinate system of the second image are converted to positions P(2, i, j−1) and P(2, i, j) in the coordinate system of the first image as a result of the conversion based on the conversion parameters (θ2, T2x, T2y, S2). Hereinafter, the X coordinate axis and the Y coordinate axis in the coordinate system of the first image will be simply referred to as X and Y, respectively.

As with the second image, positions (i−1, j−1), (i−1, j), (i, j−1) and (i, j) in the coordinate system of the k-th (k=3 to N) image are converted to position P(k, i−1, j−1), P(k, i−1, j), P(k, i, j−1) and P(k, i, j) in the coordinate system of the first image as a result of the conversion based on the conversion parameters (θk, Tkx, Tky, Sk).

In the k-th image (k=3 to N), if noise E with a magnitude gained up by a factor Mk is taken into account, formulas (20) and (22) similar to formulas (17) and (19) indicating constraint imposed on the integral of light density are obtained.

$$\left| \int_{jg-1_{(k)}}^{jg_{(k)}}\int_{ig-1_{(k)}}^{ig_{(k)}} Lg(x, y)\,dx\,dy - Gobs(k, ig, jg) \right| \leq Mk \times E \quad (20)$$

Formula (20) represents that the pixel value Gobs(k, ig, jg) obtained by a pixel located at a (ig-th, jg-th) position of the k-th image is equal to the integral of the true green light intensity Lg(x, y) taken over a rectangular range whose corners are located at P(k, ig−1, ig−1), P(k, ig−1, ig), P(k, ig, jg−1), and P(k, ig, jg), that is, over a rectangular range whose corners are located at (ig−1$_{(k)}$, jg−1$_{(k)}$), (ig−1$_{(k)}$, 1$_{(k)}$), (ig$_{(k)}$, jig−1$_{(k)}$), and (ig$_{(k)}$, jg$_{(k)}$) in the coordinate system of the first image, with a maximum possible error equal to noise E with a magnitude gained up by a factor Mk. That is, the (absolute value of) difference between the integral of true green light intensity Lg(x, y) and the observed pixel value Gobs(k, ig, jg) is equal to or less than a maximum possible value of noise. Note that in formula (20), |x| denotes the absolute value of x.

$$\left| \int_{jr-1_{(k)}}^{jr_{(k)}}\int_{ir-1_{(k)}}^{ir_{(k)}} Lr(x, y)\,dx\,dy - Robs(k, ir, jr) \right| \leq Mk \times E \quad (21)$$

Formula (21) represents that the pixel value Robs(k, ir, jr) obtained by a pixel located at a (ir-th, jr-th) position of the k-th image is equal to the integral of the true red light intensity Lr(x, y) taken over a rectangular range whose corners are located at P(k, ir−1, jr−1), P(k, ir−1, jr), P(k, ir, jr−1), and P(k, ir, jr), that is, over a rectangular range whose corners are located at (ir−1$_{(k)}$, jr−1$_{(k)}$), (ir−1$_{(k)}$, jr(k)), (ir(k), jr−1$_{(k)}$), and (ir$_{(k)}$, jr$_{(k)}$) in the coordinate system of the first image, with a maximum possible error equal to noise E with a magnitude gained up by a factor Mk. That is, the (absolute value of) difference between the integral of true red light intensity Lr(x, y) and the observed pixel value Robs(k, ir, jr) is equal to or less than a maximum possible value of noise. Note that in formula (21), |x| denotes the absolute value of x.

$$\left| \int_{jb-1_{(k)}}^{jb_{(k)}}\int_{ib-1_{(k)}}^{ib_{(k)}} Lb(x, y)\,dx\,dy - Bobs(k, ib, jb) \right| \leq Mk \times E \quad (22)$$

Formula (22) represents that the pixel value Bobs(k, ib, jb) obtained by a pixel located at a (ib-th, jb-th) position of the k-th image is equal to the integral of the true blue light intensity Lb(x, y) taken over a rectangular range whose corners are located at P(k, ib−1, jb−1), P(k, ib−1, jb), P(k, ib, jb−1), and P(k, ib, jb), that is, over a rectangular range whose corners are located at (ib−1$_{(k)}$, jb−1$_{(k)}$), (ib−1$_{(k)}$, jb$_{(k)}$), (ib$_{(k)}$, jb−1$_{(k)}$), and (ib$_{(k)}$, jb$_{(k)}$) in the coordinate system of the first image, with a maximum possible error equal to noise E with a magnitude gained up by a factor Mk. That is, the (absolute value of) difference between the integral of true blue light intensity Lb(x, y) and the observed pixel value Bobs(k, ib, jb) is equal to or less than a maximum possible value of noise. Note that in formula (22), |x| denotes the absolute value of x.

Figure 2:
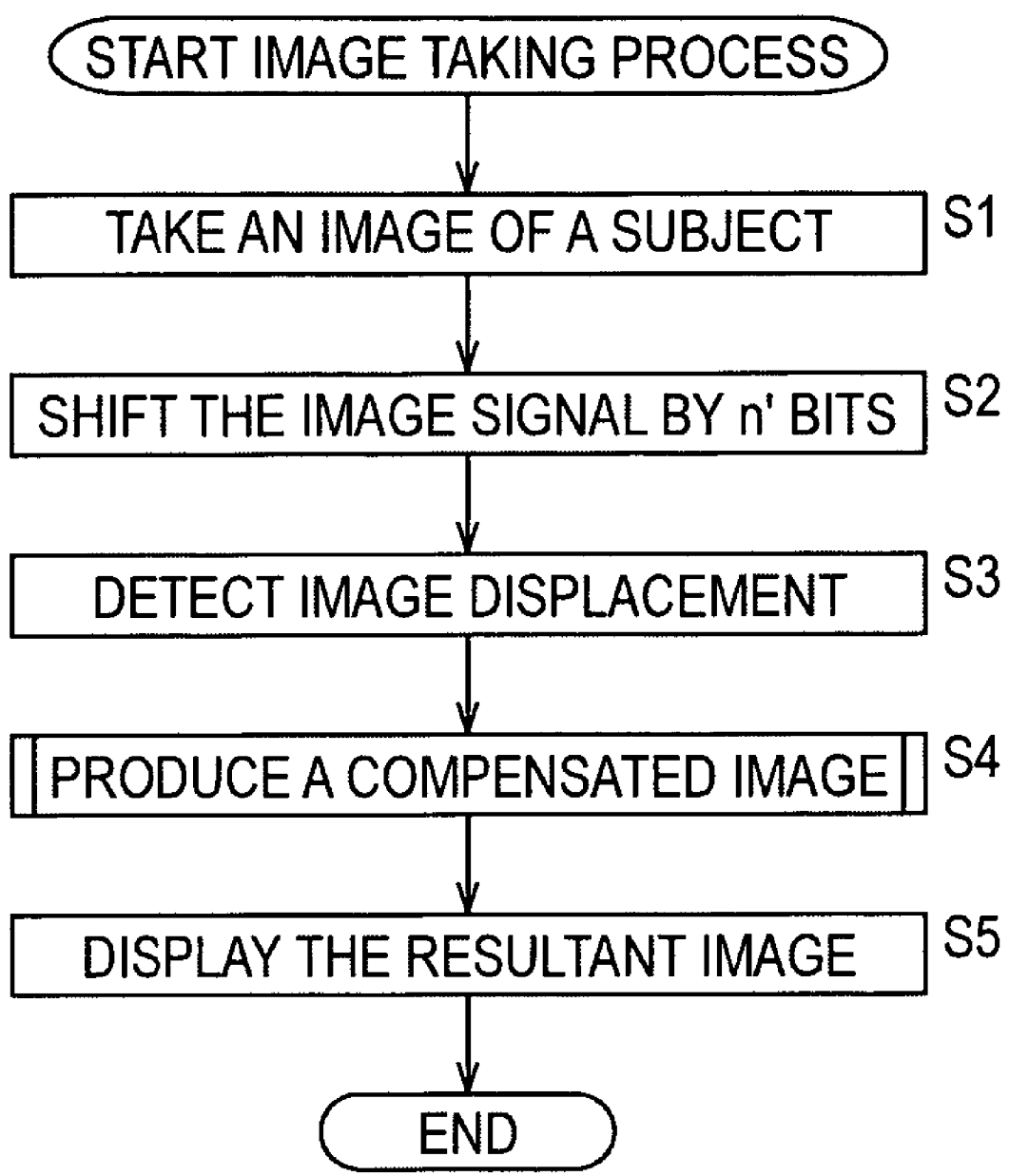
FIG. 2 is a flow chart of a process performed by the digital camera 1 shown in FIG. 1 to take an image.
Figure 6:
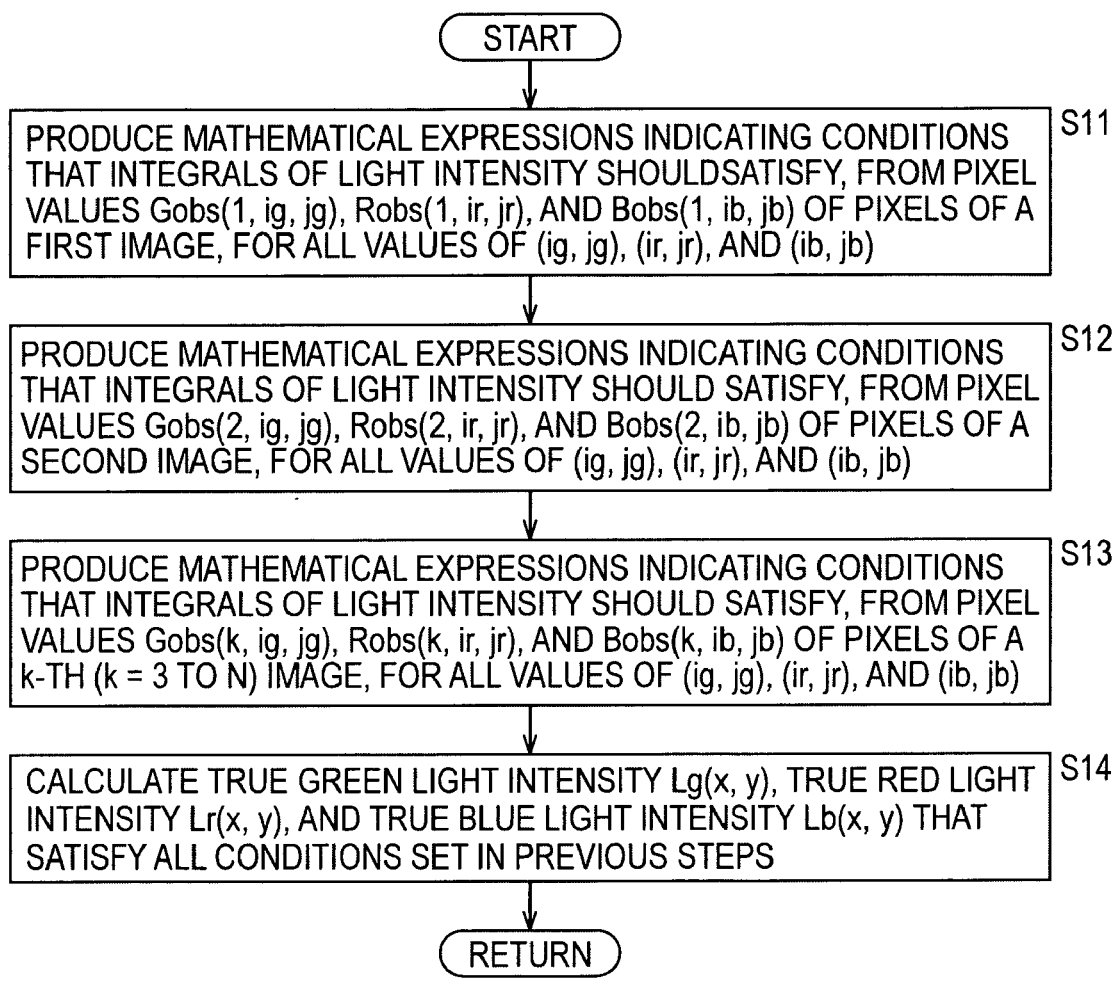
FIG. 6 a flow chart showing an image estimation process according to a first embodiment.

Now, referring to a flow chart shown in FIG. 6, a correct image estimation process in step S4 shown in FIG. 2 according to a first embodiment of the present invention is described.

First, in step S11, the calculation circuit 24 produces a light intensity integral formula in the form (9) from the pixel value Gobs(1, ig, jg) of each pixel of the first image for each (ig, jg), a light intensity integral formula in the form (10) from Robs(1, ir, jr) for each (ir, jr), and a light intensity integral formula in the form (11) from Bobs(1, ib, jb) for each (ib, jb). Thereafter, the process proceeds to step S12.

In step S12, the calculation circuit 24 produces a light intensity integral formula in the form (17) from the pixel value Gobs(2, ig, jg) of each pixel of the second image for each (ig, jg), a light intensity integral formula in the form (18) from Robs(2, ir, jr) for each (ir, jr), and a light intensity integral formula in the form (19) from Bobs(2, ib, jb) for each (ib, jb). Thereafter, the process proceeds to step S13. In the above process, the calculation circuit 24 converts positions of the second image to corresponding position of the first image by using the conversion parameters (θ2, T2x, T2y, S2) supplied from the motion detector 23-1.

In step S13, the calculation circuit 24 produces a light intensity integral formula in the form (20) from the pixel value Gobs(k, ig, jg) of each pixel of the k-th (k=3 to N) image for each (ig, jg), a light intensity integral formula in the form (21) from Robs(k, ir, jr) for each (ir, jr), and a light intensity integral formula in the form (22) from Bobs(k, ib, jb) for each (ib, jb). Thereafter, the process proceeds to step S14. In the above process, the calculation circuit 24 converts positions of the k-th image to corresponding position of the first image by using the conversion parameters (θk, Tkx, Tky, Sk) supplied from the motion detector 23-(k−1).

In step S14, the calculation circuit 24 estimates the true green light intensity Lg(x, y), the true red light intensity Lr(x, y) and the true blue light intensity Lb(x, y) by solving formulas associated with the light density integral constraints (9), (10), (11), (17), (18), (19), (20), (21), and (22) produced in steps S11 to S13. If these values have been determined, the process is exited. The obtained values of the true green light intensity Lg(x, y), the true red light intensity Lr(x, y) and the true blue light intensity Lb(x, y) (estimated values thereof) are supplied as resultant image signals (a G signal, a R signal, and B signal) representing a sharp image to the D/A converter 9 or the codec 12.

In this step S14, when the formulas associated with the light intensity integral constraint are solved to determine the true green light intensity Lg(x, y), the true red light intensity Lr(x, y) and true the blue light intensity Lb(x, y), a method of determining image data that satisfies a plurality of constraints is used. A specific example of such a method is a POCS (Projection Onto Convex Sets) method. In the POCS method, a maximum-likelihood solution that satisfies given constraints is estimated by repeatedly performing projection onto convex sets. A description of the details of this method may be found, for example, in a paper "Image Restoration by the Method of Convex Projections: part 1 theory" (D. C. Youla and H. Webb, IEEE Trans. Med. Image., vol. 1, No. 2, pp 81-94, October, 1982). Japanese Unexamined Patent Application Publication No. 8-263639 discloses a technique of producing high-resolution still image from a plurality of low-resolution motion images by using the POCS method. In this technique disclosed in Japanese Unexamined Patent Application Publication No. 8-263639, motion compensation is performed using motion vectors, and identification accuracy is equal to one or ½ pixels. The number of pixels used to estimate a most-likelihood pixel value of each pixel is fixed depending on the identification accuracy. In contrast, in the present embodiment, motion compensation is performed based on a semi-analog process, and the number of pixels used to estimate a most-likelihood pixel value of each pixel is adaptively changed depending on the state associated with the displacement due to the camera shake.

Figure 7:
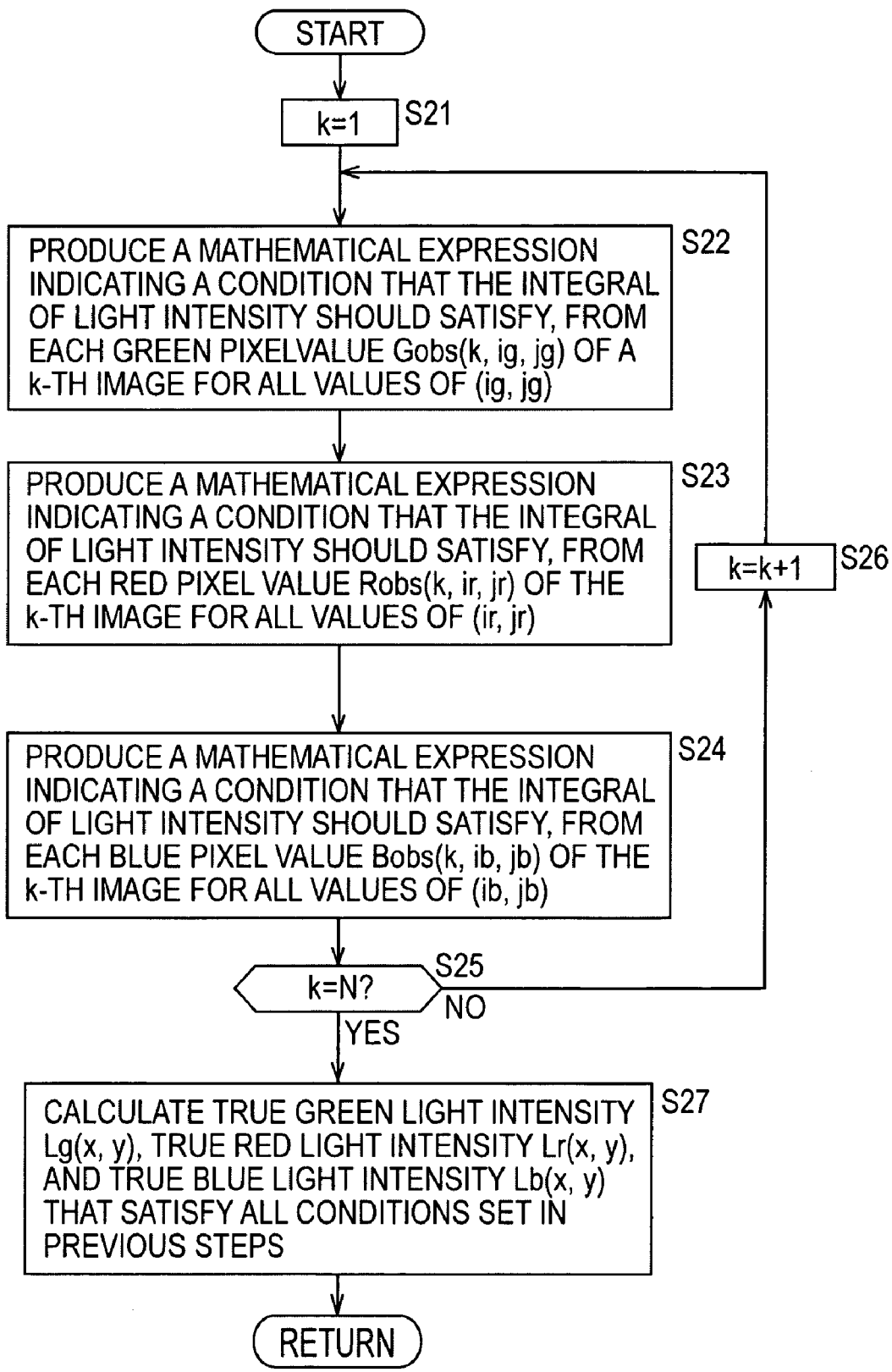
FIG. 7 a flow chart showing an image estimation process according to the first embodiment.

Now, referring to a flow chart shown in FIG. 7, a correct image estimation processing step S4 shown in FIG. 2 according to the first embodiment of the present invention is further described.

First, in step S21, the calculation circuit 24 sets a variable k indicating the count of the number of images stored in the calculation circuit 24 to 1. Thereafter, the process proceeds to step S22.

In step S22, the calculation circuit 24 produces a light intensity integral formula in the form (20) from the pixel value Gobs(k, ig, jg) of each pixel of the k-th image for each (ig, jg). Thereafter, the process proceeds to step S23.

In step S23, the calculation circuit 24 produces a light intensity integral formula in the form (21) from the pixel value Robs(k, ir, jr) of each pixel of the k-th image for each (ir, jr). Thereafter, the process proceeds to step S24.

In step S24, the calculation circuit 24 produces a light intensity integral formula in the form (22) from the pixel value Bobs(k, ib, jb) of each pixel of the k-th image for each (ib, jb). Thereafter, the process proceeds to step S25.

When the inequalities associated with the light intensity integral are produced in steps S22 to S24 described above, the conversion parameters supplied from the motion detectors 23-1 to 23-(N−1) are used as required.

In step S25, the calculation circuit 24 determines whether the internal variable k is equal to the number of images N supplied from the frame memories 22-1 to 22-N. If it is determined that the variable k is not equal to the number of images N, the process proceeds to step S26 in which the calculation circuit 24 increments the variable k by 1. Thereafter, the calculation circuit 24 returns the processing flow to step S22 and repeats the process from S22 to S25.

On the other hand, if it is determined that the variable k is equal to the number of images N, the process proceeds to step S27 in which the calculation circuit 24 estimates the true green light intensity Lg(x, y), the true red light intensity Lr(x, y) and the true blue light intensity Lb(x, y) by solving inequalities (20), (21), and (22) produced in steps S22 to S24. If these values have been determined, the process is completed. The obtained values of the green light intensity Lg(x, y), the red light intensity Lr(x, y) and the blue light intensity Lb(x, y) that are likely to be true values are supplied as resultant image signals (a G signal, a R signal, and B signal) representing a sharp image to the D/A converter 9 or the codec 12.

The true green light intensity Lg(x, y), the true red light intensity Lr(x, y), and the true blue light intensity Lb(x, y) obtained herein are analog signals. That is, Lg(x, y), Lr(x, y), and Lb(x, y) are functions of (x, y) wherein, as described earlier, variables x and y are not integers but real numbers that can include decimal fractions. In general, each decimal fraction has two or three digits in binary, although the number of digits depends on the precision of the apparatus. Because Lg(x, y), Lr(x, y), and Lb(x, y) are functions of real numbers (x, y), resampling is performed at integral numbers of (x, y) as required, and the resultant digital image signal is supplied to the D/A converter 9 or the codec 12.

In a case in which a subject moves during a period in which N images are taken at a high shutter speed, the true green light intensity Lg(x, y), the true red light intensity Lr(x, y), and the true blue light intensity Lb(x, y) of a moving part of the subject change with time. In such a case, the method described above does not provide a correct solution.

Thus, when the subject includes a moving part, an exception handling process is performed. In the exception handling process, simple superposition is performed. More specifically, from Bayer-array image data of each N images (having only one of R, G, and B signals at each pixel), three signals consisting of R, G, and B signals are restored for each pixel by means of a demosacing process. After the demosacing process, alignment is performed by rotating, increasing or reducing in size, and/or parallel displacing N images such that the N images are brought to correct positions, and the N images are superimposed together. The demosacing process may be performed using any known technique.

In the first embodiment, as described above, the processing is performed taking into account the characteristic of the on-chip lens disposed directly on each pixel, and thus a sharp displacement-compensated image can be produced.

Now, a correct image estimation process performed by the signal processor 7 according to a second embodiment of the present invention is described.

In the second embodiment, in addition to the constraint associated with the light intensity integral given by formulas (20) to (21) for k=1 to N, a constraint associated with color correlation among R, G, and B signals is imposed on the process of determining the true green light Lg(x, y), the true red light intensity, and the blue light intensity Lb(x, y).

In a local area of an image, there is a color correlation among colors of the true green light intensity Lg(x, y), the true red light intensity Lr(x, y), and the true blue light intensity Lb(x, y) corresponding to light originating from a subject and being incident on the imaging device 4. By imposing the color correlation in addition to the constraint associated with the light intensity integral given in formulas (20) to (22), it becomes possible to obtain a better solution, that is, a sharper image more likely to be a correct image.

Figure 8:
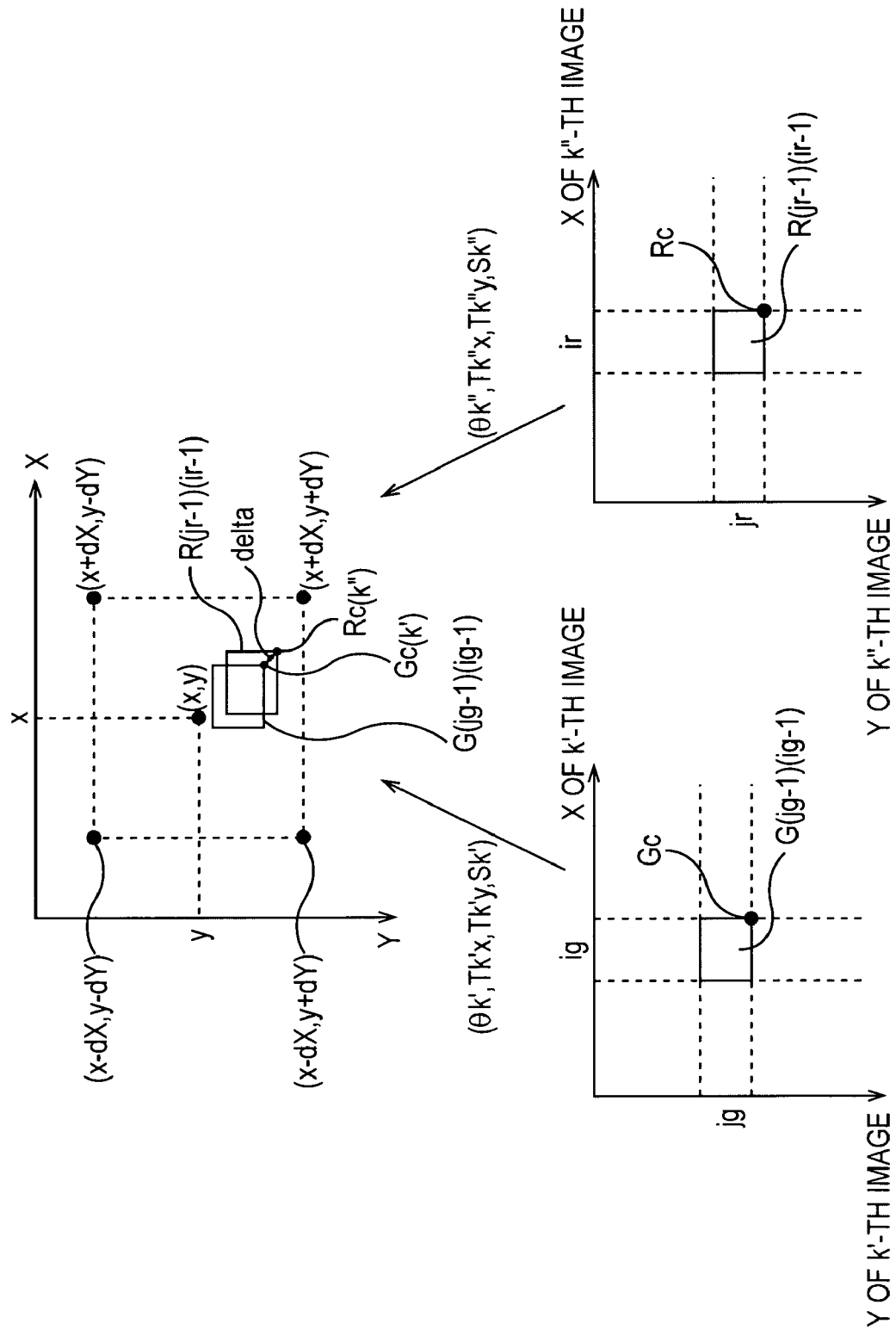
FIG. 8 is a diagram showing a color correlation constraint according to a second embodiment.
Figure 9:
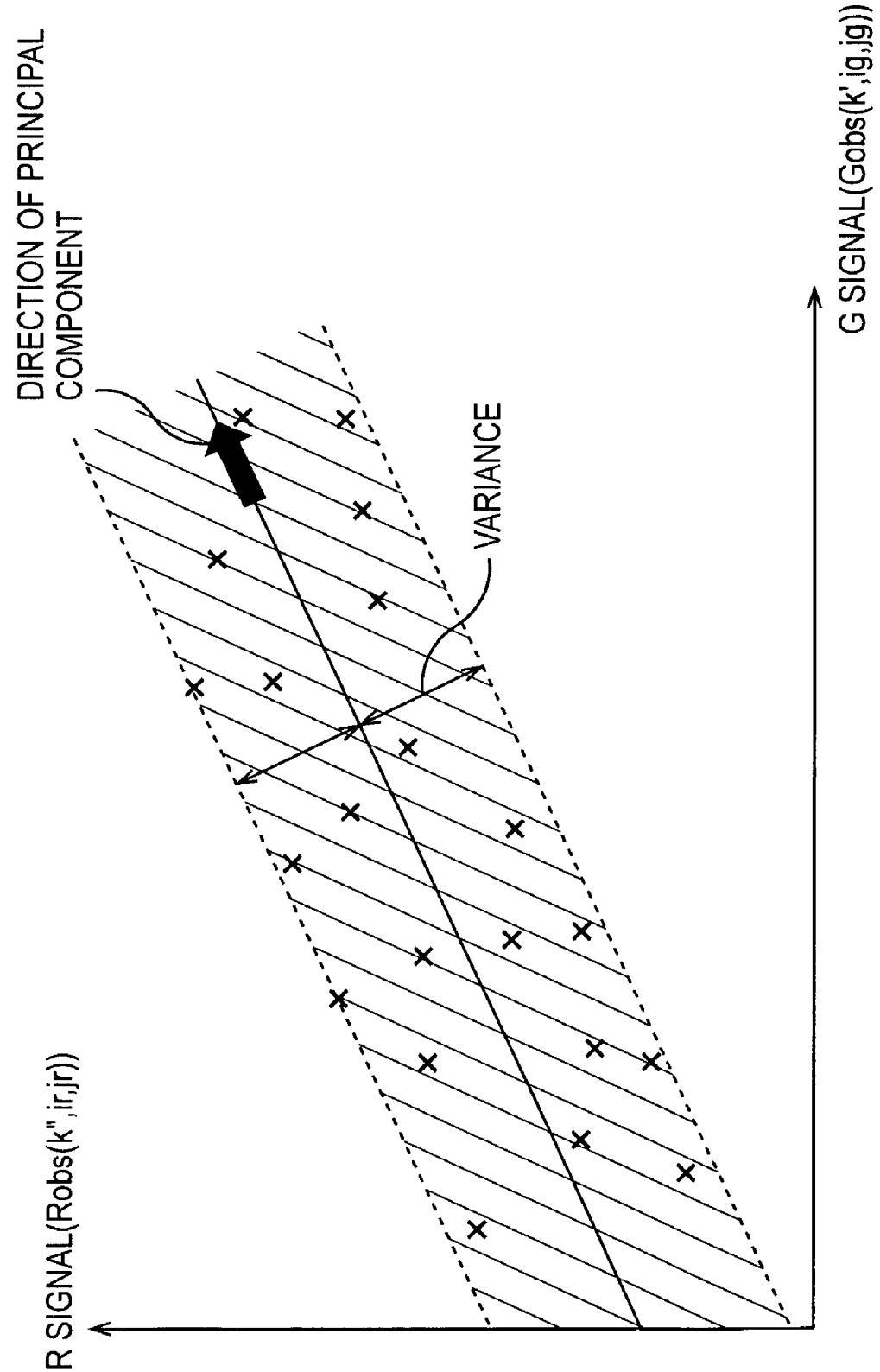
FIG. 9 is a diagram showing a color correlation constraint according to a second embodiment.

Referring to FIGS. 8 and 9, a specific method of determining a color correlation constraint is described below. In the following description referring to FIGS. 8 and 9, the correlation between green and red colors will be discussed.

By way of example, the discussion will be made for a green pixel G(jg−1)(ig−1) at a (ig-th, jg-th) position of a k'-th image shown in a lower left part of FIG. 8 a red pixel G(jg−1)(ig−1) at a (ir-th, jr-th) position of a k"-th image shown in a lower right part of FIG. 8.

The calculation circuit 24 converts positions of the green pixel G(jg−1)(ig−1) of the k'-th image and the red pixel R(jr−1)(ir−1) of the k"-th image into positions in the coordinate system of the first image on the upper side of FIG. 8 by using conversion parameters (θk', Tk'x, Tk'y, Sk') and (θk", Tk"x, Tk"y, Sk") in a similar manner to that according to the first embodiment. Note that k' and k" can be equal to 1. When k' or k" is equal to 1, the conversion parameters are given as (θ1, T1x, T1y, S1)=(0, 0, 0, 1).

The calculation circuit 24 then calculates the distance between the green pixel G(jg−1)(ig−1) of the k'-th image at the position converted into the coordinate system of the first image and the red pixel R(jr−1)(ir−1) of the k"-th image at the position converted into the coordinate system of the first image. Furthermore, the calculation circuit 24 determines whether these two pixels can be regarded as locating at the same position by determining whether the calculated distance is less than a maximum allowable value (threshold value) delta (set to, for example, 0.25 times the pixel size).

When positions of pixels G(jg−1)(ig−1) and R(jr−1)(ir−1) are respectively given as positions (ig, jg) and (ir, jr), if the position (ig, jg) of the pixel G(jg−1)(ig−1) in the coordinate system of the k'-th image is denoted as point $G_{(c)}$, the position (ir, jr) of the pixel R(jg−1)(ig−1) in the coordinate system of the k"-th image is denoted as point $R_{(c)}$, the position (ig, jg) of the pixel G(jg−1)(ig−1) in the coordinate system of the first image is denoted as $G_{c(k')}$, and the position (ir, jr) of the pixel R(jg−1)(ig−1) in the coordinate system of the first image is denoted as $R_{c(k)}$, then a constraint requiring that the distance between the point $G_{c(k')}$ and point $R_{c(k'')}$ should be within an allowable value delta is given by formula (23) shown below.

$$Dis(G_{c(k')}, R_{c(k'')}) = Dis\left[Sk'\begin{pmatrix}\cos(\theta k') & -\sin(\theta k') \\ \sin(\theta k') & \cos(\theta k')\end{pmatrix}\begin{pmatrix}ig \\ jg\end{pmatrix} + \begin{pmatrix}Tk'x \\ Tk'y\end{pmatrix},\right. \quad (23)$$

$$\left. Sk''\begin{pmatrix}\cos(\theta k'') & -\sin(\theta k'') \\ \sin(\theta k'') & \cos(\theta k'')\end{pmatrix}\begin{pmatrix}ir \\ jr\end{pmatrix} + \begin{pmatrix}Tk''x \\ Tk''y\end{pmatrix}\right] \le \text{delta}$$

Formula (23) is referred to as a distance constraint formula. In formula (23), $Dis[G_{c(k')}, R_{c(k'')}]$ denotes the distance between point $G_{c(k')}$ and point $R_{c(k'')}$. The positions of point $G_{c(k')}$ and point $R_{c(k'')}$ are obtained by performing the affine transformation on positions (ig, jg) and (ir, jr) using conversion parameters (θk', Tk'x, Tk'y, Sk') and (θk", Tk"x, Tk"y, Sk") according to an equation similar to equations (1) to (3).

The calculation circuit 24 determines whether there are a green pixel G(jg−1)(ig−1) of the k'-th image and a red pixel R(jr−1)(ir−1) of the k"-th image at positions that can be regarded as being the same within an allowable margin delta in a small region (x±dX, y±dY) centered at a position (x, y) in the coordinate system of the first image, that is, in a rectangular region whose corners are at (x−dX, y−dY), (x−dX, y+dY), (x+dX, y−dY), and (x+dX, y+dY), wherein dX and dY are values that define the region in the vicinity of the position (x, y) and they are set to be equal to, for example, 2 times the size of a pixel in the X direction and Y direction, respectively.

In other words, the calculation circuit 24 determines (k', ig, jg) and (k", ir, jr) that satisfy formula (23) within the small region (x±dX, y±dY) centered at the position (x, y) in the coordinate system of the first image, that is, in the rectangular region whose corners are at (x−dX, y−dY), (x−dX, y+dY), (x+dX, y−dY), and (x+dX, y+dY).

The calculation circuit 24 then acquires pixel values Gobs (k', ig, jg) and Robs(k", ir, jr) respectively corresponding to (k', ig, jg) and (k", ir, jr) determined.

The calculation circuit 24 determines (k', ig, jg) and (k", ir, jr) that satisfy formula (23) for all possible combinations of k' and k" within the range form 1 to N.

In general, a plurality of combinations of (k', ig, jg) and (k", ir, jr) is detected, and the calculation circuit 24 plots pixel values Gobs(k', ig, jg) and Robs(k", ir, jr) corresponding to the detected (k', ig, jg) and (k", ir, jr) in the GR space in which the horizontal axis represents the G signal (Gobs(k', ig, jg)) and the vertical axis represents the R signal (Robs(k", ir, jr)), as shown in FIG. 9.

FIG. 9 is a schematic diagram showing pixel values Gobs (k', ig, jg) and Robs(k", ir, jr) regarded as locating at same positions and plotted in the GR space.

In FIG. 9, each x-like mark indicates a pair of pixel values Gobs(k', ig, jg) and Robs(k", ir, jr) corresponding to (k', ig, jg) and (k", ir, jr) detected by the calculation circuit 24.

The plots shown in FIG. 9 indicate that there is a correlation between the true green light intensity Lg(x, y) and the true red light intensity Lr(x, y) to be determined in the vicinity of the position (x, y).

Thus, in the second embodiment, in addition to constraints associated with the light intensity integral given by formulas (20) to (22) in the first embodiment, the correlation between green and red colors shown in FIG. 9 is added as a constrain.

The calculation circuit 24 performs principal component analysis for the plurality of points plotted in the GR space shown in FIG. 9, wherein each plotted point corresponds to a pair of pixel values Gobs(k', ig, jg) and Robs(k", ir, jr) that the calculation circuit 24 has detected as satisfying the distance constraint (23).

The calculation circuit 24 then determines the variance of a component (for example, a second principal component) in a direction perpendicular to a direction (denoted by a great arrow in FIG. 9) of a principal component (first principal component) obtained as a result of the principal component analysis. Furthermore, the calculation circuit 24 expresses a color correlation constraint in the form of a mathematical expression asserting that, for the position (x, y), a point corresponding to true green light intensity Lg(x, y) and true red light intensity Lr(x, y) should be within a band extending in the GR space in the direction of principal component and having a width equal to the variance of the component in the direction perpendicular to the direction of the principal component.

The color correlation constraint between green and blue is also introduced in a similar manner as described below.

As with the green and red pixels shown in FIG. 8, the calculation circuit 24 converts positions of a green pixel G(jg−1)(ig−1) of the k'-th image and a blue pixel B(jb−1)(jb−1) of the k'''-th image into positions in the coordinate system of the first image by using conversion parameters (θk', Tk'x, Tk'y, Sk') and (θk''', Tk'''x, Tk'''y, Sk''') in a similar manner to that according to the first embodiment.

The calculation circuit 24 then calculates the distance between the green pixel G(jg−1)(ig−1) of the k'-th image at the position converted into the coordinate system of the first image and the blue pixel V(jb−1)(ib−1) of the k'''-th image at the position converted into the coordinate system of the first image. Furthermore, the calculation circuit 24 determines whether these two pixels can be regarded as locating at the same position by determining whether the calculated distance is less than a maximum allowable value (threshold value) delta in a similar manner to FIG. 8.

When positions of pixels G(jg−1)(ig−1) and B(jb−1)(ib−1) are respectively given as positions (ig, jg) and (ib, jb), if the position (ig, jg) of the pixel G(jg−1)(ig−1) in the coordinate system of the k'-th image is denoted as G(c), the position (ib, jb) of the pixel B(jb−1)(ib−1) in the coordinate system of the k'''-th image is denoted as point $B_{(c)}$, the position (ig, jg) of the pixel G(jg−1)(ig−1) in the coordinate system of the first image is denoted as $G_{c(k')}$, and the position (ib, jb) of the pixel B(jb−1) (ib−1) in the coordinate system of the first image is denoted as $B_{c(k''')}$, then a constraint requiring that the distance between point $G_{c(k')}$ and point $B_{c(k''')}$ should be within the allowable value delta is given by formula (24) shown below.

$$Dis(G_{c(k')}, B_{c(k''')}) = Dis\left[ Sk'\begin{pmatrix} \cos(\theta k') & -\sin(\theta k') \\ \sin(\theta k') & \cos(\theta k') \end{pmatrix}\begin{pmatrix} ig \\ jg \end{pmatrix} + \begin{pmatrix} Tk'x \\ Tk'y \end{pmatrix}, \right. \quad (24)$$
$$\left. Sk'''\begin{pmatrix} \cos(\theta k''') & -\sin(\theta k''') \\ \sin(\theta k''') & \cos(\theta k''') \end{pmatrix}\begin{pmatrix} ib \\ jb \end{pmatrix} + \begin{pmatrix} Tk'''x \\ Tk'''y \end{pmatrix} \right] \leq \text{delta}$$

Formula (24) is referred to as a distance constraint formula. In formula (24), $Dis[G_{c(k')}, B_{c(k''')}]$ denotes the distance between point $G_{c(k')}$ and point $B_{c(k''')}$. The positions of point $G_{c(k')}$ and point $B_{c(k''')}$ are obtained by performing the affine transformation on positions (ig, jg) and (ib, jb) using conversion parameters (θk', Tk'x, Tk'y, Sk') and (θk''', Tk'''x, Tk'''y, Sk''') according to an equation similar to equations (1) to (3).

The calculation circuit 24 determines whether there are a green pixel G(jg−1)(ig−1) of the k'-th image and a blue pixel B(jb−1)(ib−1) of the k'''-th image at positions that can be regarded as being the same within an allowable margin delta in a small region (x±dX, y±dY) centered at a position (x, y) in the coordinate system of the first image, that is, in a rectangular region whose corners are at (x−dX, y−dY), (x−dX, y+dY), (x+dX, y−dY), and (x+dX, y+dY) wherein dX and dY are values that define the region in the vicinity of the position (x, y) and they are set to be equal to, for example, 2 times the size of a pixel in the X direction and Y direction, respectively.

In other words, the calculation circuit 24 determines (k', ig, jg) and (k'', ib, jb) that satisfy formula (24) within the small region (x±dX, y±dY) centered at the position (x, y) in the coordinate system of the first image, that is, in the rectangular region whose corners are at (x−dX, y−dY), (x−dX, y+dY), (x+dX, y−dY), and (x+dX, y+dY).

The calculation circuit 24 then acquires pixel values Gobs (k', ig, jg) and Bobs(k''', ib, jb) respectively corresponding to (k', ig, jg) and (k''', ib, jb) determined.

The calculation circuit 24 determines (k', ig, jg) and (k'', ib, jb) that satisfy formula (24) for all possible combinations of k' and k''' within the range form 1 to N.

In general, a plurality of combinations of (k', ig, jg) and (k''', ib, jb) is detected, and the calculation circuit 24 plots pixel values Gobs(k', ig, jg) and Bobs(k''', ib, jb) corresponding to the detected (k', ig, jg) and (k''', ib, jb) in the GB space in which the horizontal axis represents the G signal (Gobs(k', ig, jg)) and the vertical axis represents the B signal (Bobs(k''', ib, jb)).

Thus, in the second embodiment, in addition to constraints associated with the light intensity integral given by formulas (20) to (22) in the first embodiment, the correlation between green and blue colors similar to the correlation between green and red shown in FIG. 9 is added as a constrain.

The calculation circuit 24 performs principal component analysis for the plurality of points plotted in the GB space, wherein each plotted point corresponds to a pair of pixel values Gobs(k', ig, jg) and Bobs(k''', ib, jb) detected by the calculation circuit 24.

The calculation circuit 24 then determines the variance of a component (for example, a second principal component) in a direction perpendicular to a direction of a principal component (first principal component) obtained as a result of the principal component analysis. Furthermore, the calculation circuit 24 expresses a color correlation constraint in the form of a mathematical expression asserting that, for the position (x, y), a point corresponding to true green light intensity Lg(x, y) and true blue light intensity Lb(x, y) should be within a band extending in the GB space in the direction of principal component and having a width equal to the variance of the component in the direction perpendicular to the direction of the principal component.

Thus, the true green light intensity Lg(x, y), the true red light intensity Lr(x, y), and the true blue light intensity Lb(x, y) finally obtained by the calculation circuit 24 are limited to those satisfying the constraint that a point corresponding to the true green light intensity Lg(x, y) and the true red light intensity Lr(x, y) at the position (x, y) exists within a band extending, in the GR space, in the direction of the principal component and having a width equal to the variance of the component perpendicular to the direction of the principal component, and satisfying the constraint that a point corresponding to the true green light intensity Lg(x, y) and the true blue light intensity Lb(x, y) at the position (x, y) exists within a band extending, in the GB space, in the direction of the principal component and having a width equal to the variance of the component perpendicular to the direction of the principal component.

Although in the present embodiment, the constraint associated with the color correlation in the GR space and the constraint associated with the color correlation in the GB space, a similar constraint associated with a color correlation between the R signal and the B signal (in a RB space) may also be employed in addition to the above constraints.

As in the first embodiment, for example, the POCS method may be used to determine the true green light intensity Lg(x, y), the true red intensity Lr(x, y), and the true blue light intensity Lb(x, y) that satisfy both the constraint associated with the light intensity integrals and the constraint associated with the color correlations.

The color correlation constraints may be imposed on all positions (x, y) or only particular positions such as lattice points at which x and y are equal to integers.

Figure 10:
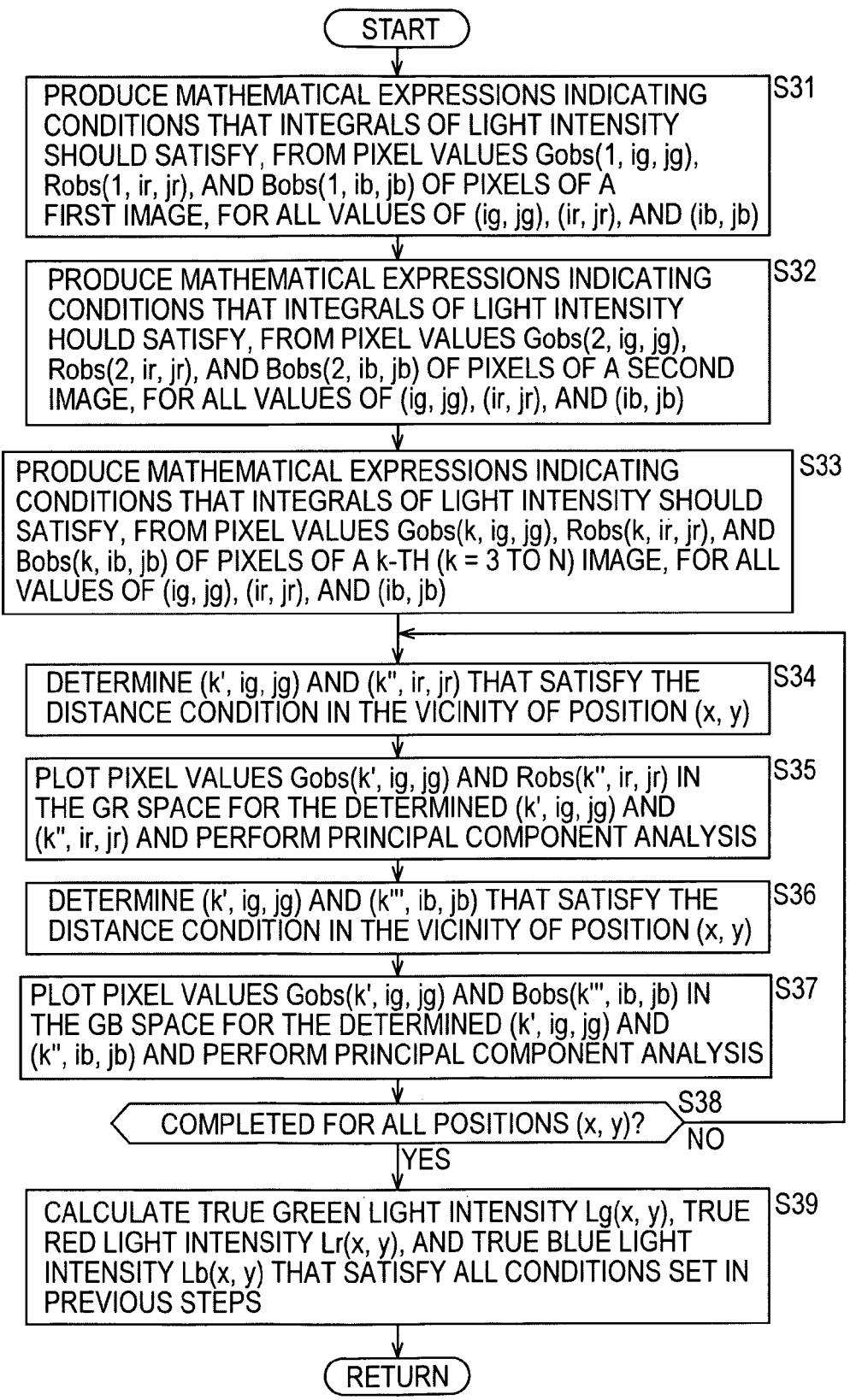
FIG. 10 a flow chart showing an image estimation process according to a second embodiment.

Now, referring to a flow chart shown in FIG. 10, a correct image estimation process in step S4 shown in FIG. 2 according to a second embodiment of the present invention is described.

Steps S31 to S33 are similar to steps S11 to S13 in the correct image estimation process according to the first embodiment shown in FIG. 6.

That is, in step S31, the calculation circuit 24 produces a light intensity integral formula in the form (9) from the pixel value Gobs(1, ig, jg) of each pixel of the first image for each (ig, jg), a light intensity integral formula in the form (10) from Robs(1, ir, jr)for each (ir, jr), and a light intensity integral formula in the form (11) from Bobs(1, ib, jb) for each (ib, jb). Thereafter, the process proceeds to step S32.

In step S32, the calculation circuit 24 produces a light intensity integral formula in the form (17) from the pixel value Gobs(2, ig, jg) of each pixel of the second image for each (ig, jg), a light intensity integral formula in the form (18) from Robs(2, ir, jr)for each (ir, jr), and a light intensity integral formula in the form (19) from Bobs(2, ib, jb) for each (ib, jb). Thereafter, the process proceeds to step S33. In the above process, the calculation circuit 24 converts positions of the second image to corresponding position of the first image by using the conversion parameters (θ2, T2x, T2y, S2) supplied from the motion detector 23-1.

In step S33, the calculation circuit 24 produces a light intensity integral formula in the form (20) from the pixel value Gobs(k, ig, jg) of each pixel of the k-th (k=3 to N) image for each (ig, jg), a light intensity integral formula in the form (21) from Robs(k, ir, jr)for each (ir, jr), and a light intensity integral formula in the form (22) from Bobs(k, ib, jb) for each (ib, jb). Thereafter, the process proceeds to step S34. In the above process, the calculation circuit 24 converts positions of the k-th image to corresponding position of the first image by using the conversion parameters (θk, Tkx, Tky, Sk) supplied from the motion detector 23-(k−1).

In step S34, for a position (x, y) of interest, the calculation circuit 24 determines a pair of (k', ig, jg) and (k", ir, jr) that satisfy the distance constraint represented in equality (23) in the vicinity of the position (x, y). Thereafter, the process proceeds to step S35.

In step S35, the calculation circuit 24 plots, in the GR space, the pixel values Gobs(k', ig, jg) and Robs(k", ir, jr) at respective positions (k', ig, jg) and (k", ir, jr) determined in step S34 and performs principal component analysis. The calculation circuit 24 then determines the variance in a direction perpendicular to a principal direction determined as a result of the principal component analysis, and represents a color correlation constraint in the form of a mathematical expression asserting that the G signal and the R signal of the same pixel exist within the range equal to the determined variance. Thereafter, the process proceeds from step S35 to step S36.

In step S36, for a position (x, y) of interest, the calculation circuit 24 determines a pair of (k', ig, jg) and (k''', ib, jb) that satisfy the distance constraint represented in equality (24) in the vicinity of the position (x, y). Thereafter, the process proceeds to step S37.

In step S37, the calculation circuit 24 plots, in the GB space, the pixel values Gobs(k', ig, jg) and Bobs(k''', ib, jb) at respective positions (k', ig, jg) and (k''', ib, jb) determined in step S36 and performs principal component analysis. The calculation circuit 24 then determines the variance in a direction perpendicular to a principal direction determined as a result of the principal component analysis, and represents a color correlation constraint in the form of a mathematical expression asserting that the G signal and the B signal of the same pixel exist within the range equal to the determined variance. Thereafter, the process proceeds from step S37 to step S38.

In step S38, the calculation circuit 24 determines whether the color correlation constraint has been determined in the form of a mathematical expression for all positions (x, y). If it is determined in step S38 that the color correlation constraint has not been determined for all positions (x, y), the process returns to step S34. In step S34, the calculation circuit 24 selects a position (x, y) for which the color correlation constraint has not been determined, and repeats the process from S34 to S38.

On the other hand, in the case in which it is determined in step S38 that the color correlation constraint has been determined for all positions (x, y), the process proceeds to step S39. In step S39, the calculation circuit 24 calculates the true green light density Lg(x, y), the true red light density Lr(x, y), and the true blue light density Lb(x, y) that satisfy all constraints determined in steps S31, S32, S33, S35, and S37. Thereafter, the processing flow returns from the current process. In the above calculation, the calculation circuit 24 determines the true green light intensity Lg(x, y), the true red light intensity Lr(x, y), and the true blue light intensity Lb(x, y) that satisfy all the light intensity constraint formulas determined in steps S31 to S33 and the color correlation constraints determined in steps S35 and S37.

Figure 11:
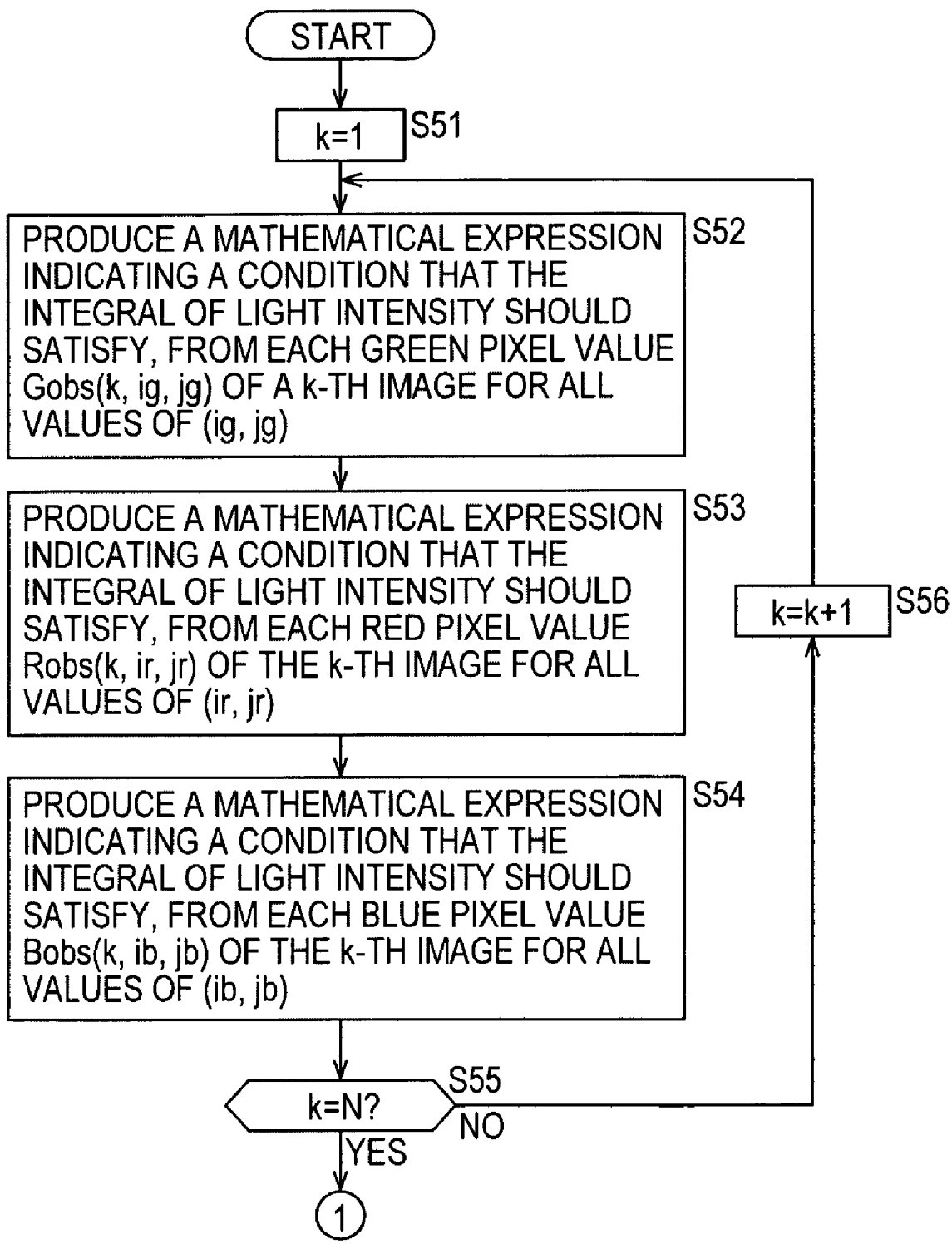
FIG. 11 a flow chart showing an image estimation process according to the second embodiment.
Figure 12:
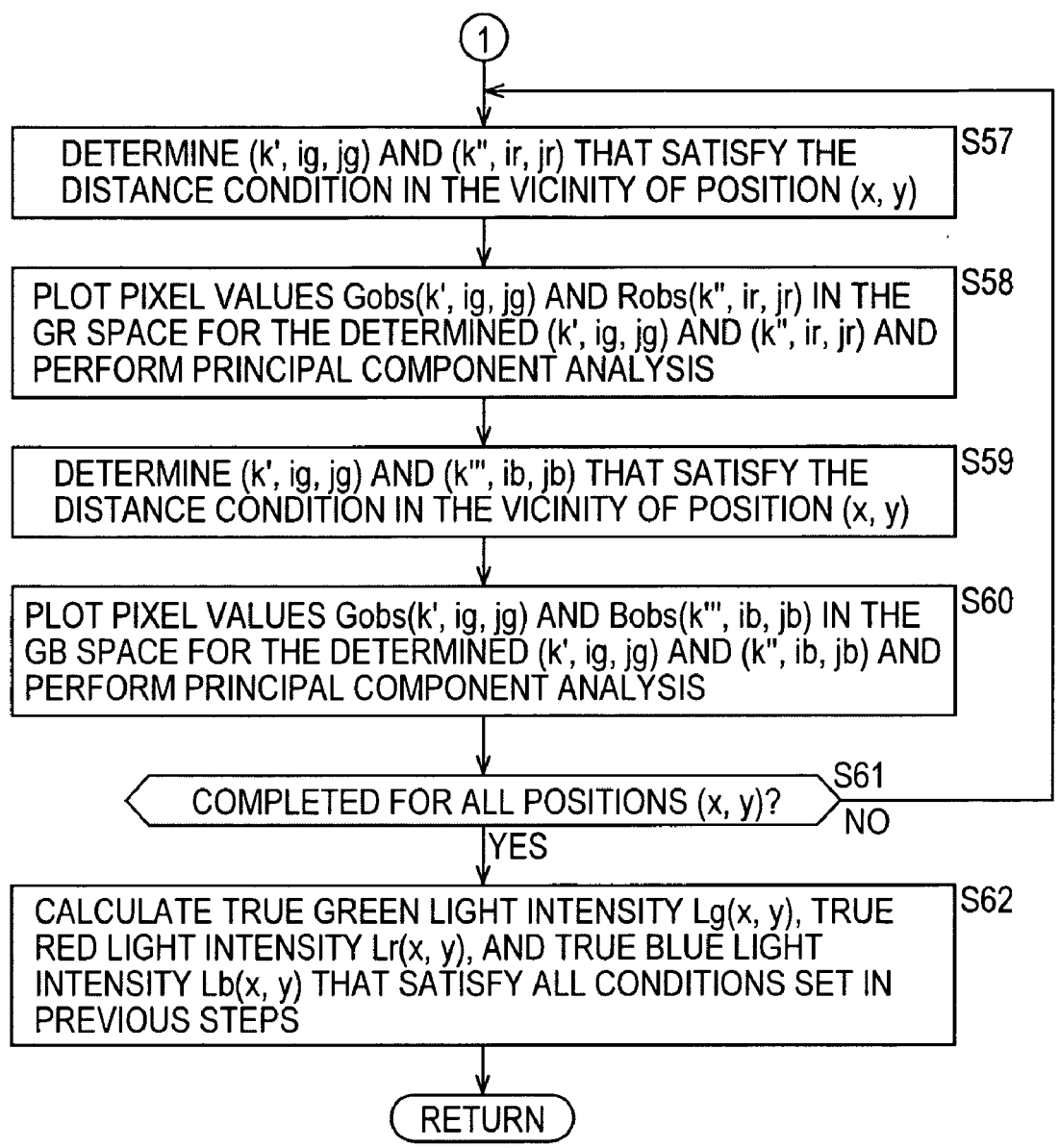
FIG. 12 a flow chart showing an image estimation process according to the second embodiment.

Now, referring to flow charts shown in FIGS. 11 and 12, a correct image estimation process in step S4 shown in FIG. 2 according to the second embodiment of the present invention is further described.

Steps S51 to S56 are similar to steps S21 to S26 in the correct image estimation process according to the first embodiment shown in FIG. 7.

That is, in step S51, the calculation circuit 24 sets a variable k indicating the count of the number of images stored in the calculation circuit 24 to 1. Thereafter, the process proceeds to step S52.

In step S52, the calculation circuit 24 produces a light intensity integral formula in the form (20) from the pixel value Gobs(k, ig, jg) of each pixel of the k-th image for each (ig, jg). Thereafter, the process proceeds to step S53.

In step S53, the calculation circuit 24 produces a light intensity integral formula in the form (21) from the pixel value Robs(k, ir, jr) of each pixel of the k-th image for each (ir, jr). Thereafter, the process proceeds to step S54.

In step S54, the calculation circuit 24 produces a light intensity integral formula in the form (22)' from the pixel value Bobs(k, ib, jb) of each pixel of the k-th image for each (ib, jb). Thereafter, the process proceeds to step S55.

When the inequalities associated with the light intensity integral are produced in steps S52 to S54 described above, the conversion parameters supplied from the motion detectors 23-1 to 23-(N−1) are used as required.

In step S55, the calculation circuit 24 determines whether the internal variable k is equal to the number of images N supplied from the frame memories 22-1 to 22-N. If it is determined that the variable k is not equal to the number of images N, the process proceeds to step S56 in which the calculation circuit 24 increments the variable k by 1. Thereafter, the calculation circuit 24 returns the processing flow to step S52 and repeats the process from S52 to S56.

On the other hand, if it is determined in step S55 that the variable k is equal to the number of images N, the process proceeds to step S57. Steps S57 to S62 are similar to steps S34 to S39 shown in FIG. 10.

That is, in step S57, for a position (x, y) of interest, the calculation circuit 24 determines a pair of (k', ig, jg) and (k", ir, jr) that satisfy the distance constraint represented in equality (23) in the vicinity of the position (x, y). Thereafter, the process proceeds to step S58.

In step S58, the calculation circuit 24 plots, in the GR space, the pixel values Gobs(k', ig, jg) and Robs(k", ir, jr) at respective positions (k', ig, jg) and (k", ir, jr) determined in step S57 and performs principal component analysis. The calculation circuit 24 then determines the variance in a direction perpendicular to a principal direction determined as a result of the principal component analysis, and represents a color correlation constraint in the form of a mathematical expression asserting that the G signal and the R signal of the same pixel exist within the range equal to the determined variance. Thereafter, the process proceeds from step S58 to step S59.

In step S59, for a position (x, y) of interest, the calculation circuit 24 determines a pair of (k', ig, jg) and (k''', ib, jb) that satisfy the distance constraint represented in equality (24) in the vicinity of the position (x, y). Thereafter, the process proceeds to step S60.

In step S60, the calculation circuit 24 plots, in the GB space, the pixel values Gobs(k', ig, jg) and Bobs(k''', ib, jb) at respective positions (k', ig, jg) and (k''', ib, jb) determined in step S59 and performs principal component analysis. The calculation circuit 24 then determines the variance in a direction perpendicular to a principal direction determined as a result of the principal component analysis, and represents a color correlation constraint in the form of a mathematical expression asserting that the G signal and the B signal of the same pixel exist within the range equal to the determined variance. Thereafter, the process proceeds from step S60 to step S61.

In step S61, the calculation circuit 24 determines whether the color correlation constraint has been determined in the form of a mathematical expression for all positions (x, y). If it is determined in step S61 that the color correlation constraint has not been determined for all positions (x, y), the process returns to step S57. In step S57, the calculation circuit 24 selects a position (x, y) for which the color correlation constraint has not been determined, and repeats the process from S57 to S61.

On the other hand, in the case in which it is determined in step S61 that the color correlation constraint has been determined for all positions (x, y), the process proceeds to step S62. In step S62, the calculation circuit 24 calculates the true green light density $Lg(x, y)$, the true red light density $Lr(x, y)$, and the true blue light density $Lb(x, y)$ that satisfy all constraints determined in steps S52, S53, S54, S58, and S60. Thereafter, the processing flow returns from the current process. In the above calculation, the calculation circuit 24 determines the true green light intensity $Lg(x, y)$, the true red light intensity $Lr(x, y)$, and the true blue light intensity $Lb(x, y)$ that satisfy all the light intensity constraint formulas determined in steps S52 to S54 and the color correlation constraints determined in steps S58 and S60.

In the present embodiment, as described above, the constraint associated with correlation among the R signal, the G signal and the B signal is added to the constraints associated with light intensity integrals given by inequalities (20), (21), and (22) for k=1 to N in the first embodiment, and the true green light intensity $Lg(x, y)$, the true red light intensity $Lr(x, y)$, and the true blue light intensity $Lb(x y)$ satisfying all above constraints. This makes it possible to obtain a sharp image close to an ideal image.

Although in the example described above, the color correlation constraints are defined in the 2-dimensional color spaces, the color correlation constraint may be defined in a 3-dimensional color space.

Now, a correct image estimation process performed by the signal processor 7 according to a third embodiment of the present invention is described.

In the first and second embodiments described above, the true green light intensity $Lg(x, y)$, the true red light intensity $Lr(x, y)$, and the true blue light intensity $Lb(x, y)$ are estimated taking into account the accurately formulated characteristic of the on-chip lens disposed direction on each pixel of the imaging device 4, thereby obtaining a sharp image.

In the third embodiment, the effects of the on-chip lens are ignored, and it is assumed that the intensity of light originating from a subject and being incident on a point (for example, the barycenter of each pixel) of each pixel is detected by that pixel of the imaging device 4 (that is, point-sampled data is obtained by each pixel).

Furthermore, as will be described in detail later, a spring model is used in this third embodiment. This makes it possible to reduce the computational complexity required to determine the true green light intensity $Lg(x, y)$, the true red light intensity $Lr(x, y)$, and the true blue light intensity $Lb(x, y)$, compared with the POCS method used in the first and second embodiments. The third embodiment also provides an advantage that it is possible to produce a compensated image with sharpness similar to that achieved by the first or second embodiment and better than can be achieved by the conventional techniques.

In the third embodiment, as described above, data sensed by each pixel is regarded as point-sampled data. More specifically, at a pixel at a (i-th, j-th) position of the imaging device 4 shown in FIG. 3, data is regarded as being sensed at a central point (with coordinates (i−0.5, j−0.5)) of the pixel at the (i-th, j-th) position.

Therefore, for example, a pixel value Gobs(1, ig, jg) obtained as data by a pixel at a (ig-th, jg-th) position of a first image is green light intensity Lg(ig−0.5, jg−0.5) sensed at a position (ig−0.5, jg−0.5) in the coordinate system of the first image. Similarly, a pixel value Robs(1, ir, jr) obtained as data by a pixel at a (ir-th, jr-th) position of the first image is red light intensity Lr(ir−0.5, jr−0.5) sensed at a position (ir−0.5, jr−0.5) in the coordinate system of the first image, and a pixel value Bobs(1, ib, jb) obtained as data by a pixel at a (ib-th, jb-th) position of the first image is blue light intensity Lb(ib−0.5, jb−0.5) sensed at a position (ib−0.5, jb−0.5) in the coordinate system of the first image.

Figure 13:
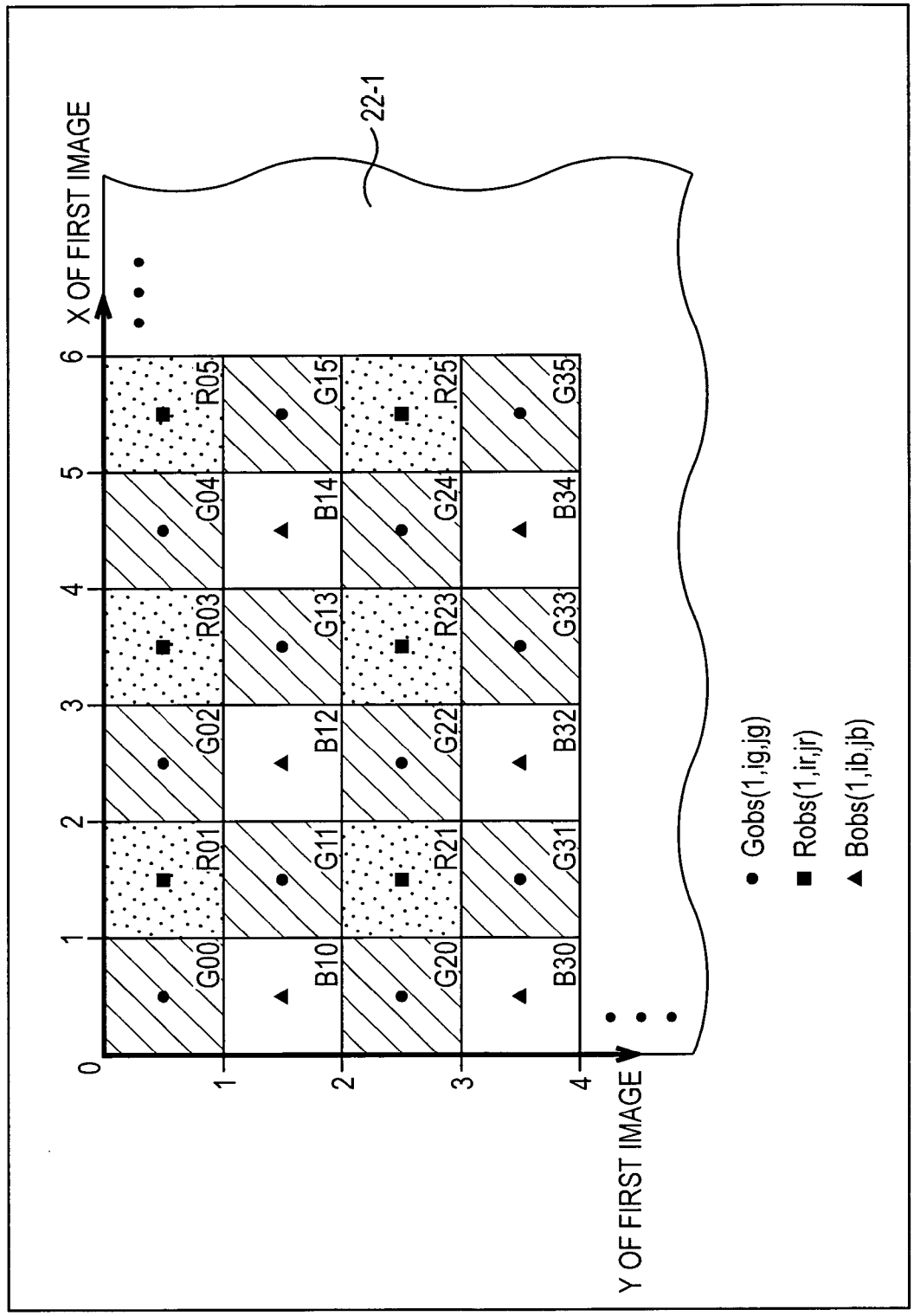
FIG. 13 is a diagram showing a first image stored in a frame memory 22-1.

FIG. 13 shows the first image stored in the frame memory 22-1.

In FIG. 13, as for the pixel G(jg−1)(ig−1) that senses a green component, a pixel value Gobs(1, ig, jg) is observed at a position denoted by a solid circle. As for the pixel R(jr−1)(ir−1) that senses a red component, a pixel value Robs(1, ir, jr) is observed at a position denoted by a solid square. As for the pixel B(jb−1)(ib−1) that senses a blue component, a pixel value Bobs(1, ib, jb) is observed at a position denoted by a solid triangle. As described above, the pixel value of each pixel of the first image is observed at the center (barycenter), as represented in the coordinate system of the first image, of each pixel. For example, in the case of a pixel at a (i-th, j-th) position, the pixel value is observed at a position (i−0.5, j−0.5).

Figure 14:
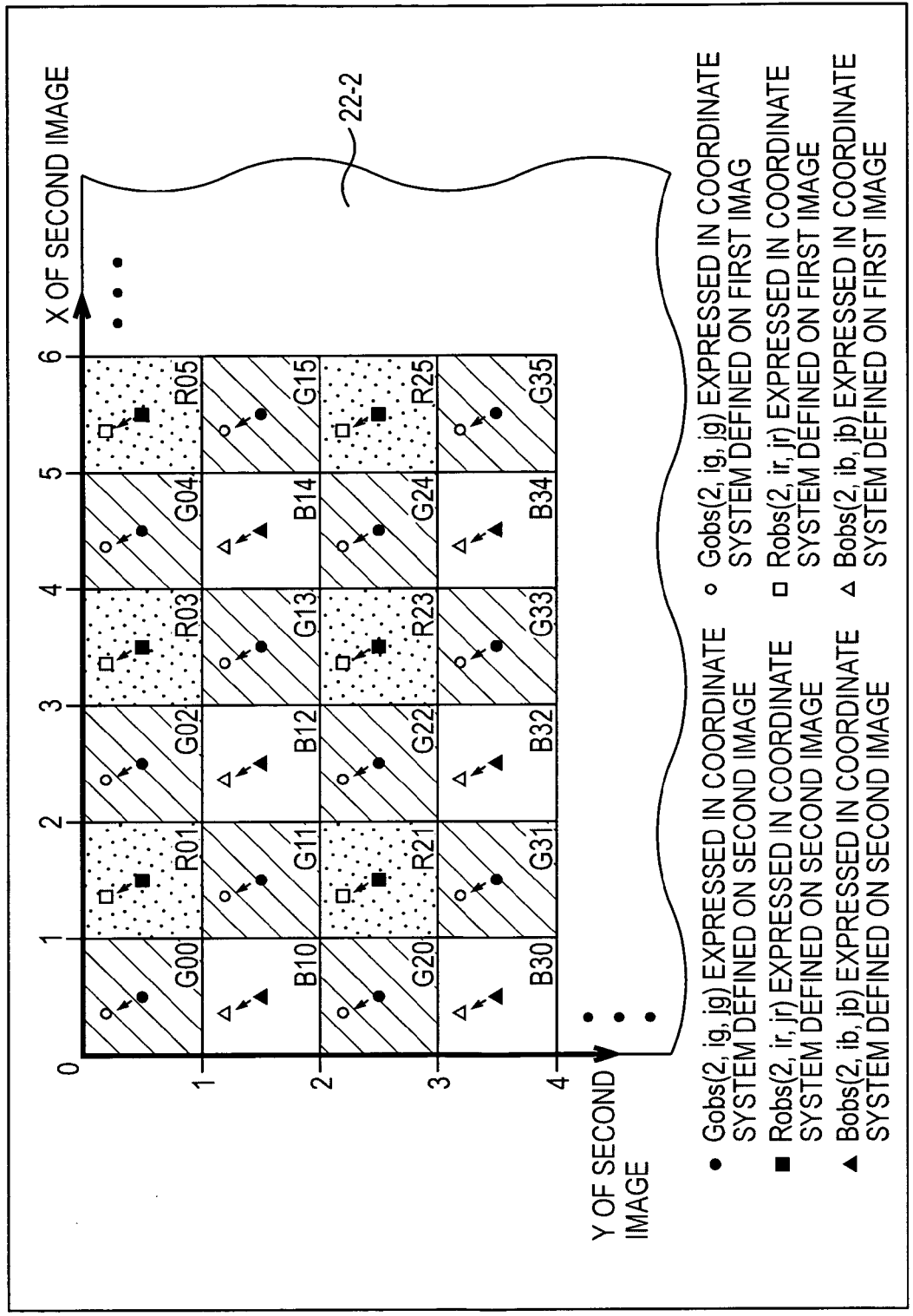
FIG. 14 is a diagram showing a second image stored in a frame memory 22-2.

FIG. 14 shows a second image stored in the frame memory 22-2.

In FIG. 14, as for the pixel G(jg−1)(ig−1) that senses a green component, a pixel value Gobs(2, ig, jg) is observed at a position denoted by a solid circle. As for the pixel R(jr−1)(ir−1) that senses a red component, a pixel value Robs(2, ir, jr) is observed at a position denoted by a solid square. As for the pixel B(jb−1)(ib−1) that senses a blue component, a pixel value Bobs(2, ib, jb) is observed at a position denoted by a solid triangle. As described above, the pixel value of each pixel of the second image is observed at the center (barycenter), as represented in the coordinate system of the second image, of each pixel. For example, in the case of a pixel at a (i-th, j-th) position, the pixel value is observed at a position (i−0.5, j−0.5).

As in the first and second embodiments, points on the second image are converted to corresponding points in the coordinate system of the first image. More specifically, each point on the second image is converted to a corresponding point in the coordinate system of the first image by using conversion parameters (θ2, T2x, T2y, S2) detected by the motion detector 23-1.

Corresponding points in the coordinate system of the first image converted from points on the second image are also shown in FIG. 14, for pixel values Gobs(2, ig, jg), Robs(2, ir, jr), and Bobs(2, ib, jb).

That is, the pixel value Gobs(2, ig, jg) of a pixel G(jg−1)(ig−1) in the coordinate system of the second image is green light intensity Lg(x, y) observed at a position ((ig−0.5)$_{(2)}$, (jg−0.5)$_{(2)}$) in the coordinate system of the first image obtained by converting a position (ig−0.5, jg−0.5) in the coordinate system of the second image using conversion parameters (θ2, T2x, T2y, S2) detected by the motion detector 23-1. In FIG. 14, the position ((ig−0.5)$_{(2)}$, (jg−0.5)$_{(2)}$) in the coordinate system of the first image where the pixel value Gobs(2, ig, jg) is indicated by an open circle.

The pixel value Robs(2, ir, jr) of a pixel R(jr−1)(ir−1) in the coordinate system of the second image is red light intensity Lr(x, y) observed at a position ((ir−0.5)$_{(2)}$, (jr−0.5)$_{(2)}$) in the coordinate system of the first image obtained by converting a position (ir−0.5, jr−0.5) in the coordinate system of the second image using conversion parameters (θ2, T2x, T2y, S2) detected by the motion detector 23-1. In FIG. 14, the position ((ir−0.5)$_{(2)}$, (jr−0.5)$_{(2)}$) in the coordinate system of the first image where the pixel value Robs(2, ir, jr) is indicated by an open square.

The pixel value Bobs(2, ib, jb) of a pixel B(jb−1)(ib−1) in the coordinate system of the second image is blue light intensity Lb(x, y) observed at a position ((ib−0.5)$_{(2)}$, (jb−0.5)$_{(2)}$) in the coordinate system of the first image obtained by converting a position (ib−0.5, jb−0.5) in the coordinate system of the second image using conversion parameters (θ2, T2x, T2y, S2) detected by the motion detector 23-1. In FIG. 14, the position ((ib−0.5)$_{(2)}$, (jb−0.5)$_{(2)}$) in the coordinate system of the first image where the pixel value Bobs(2, ib, jb) is indicated by an open triangle.

Figure 15:
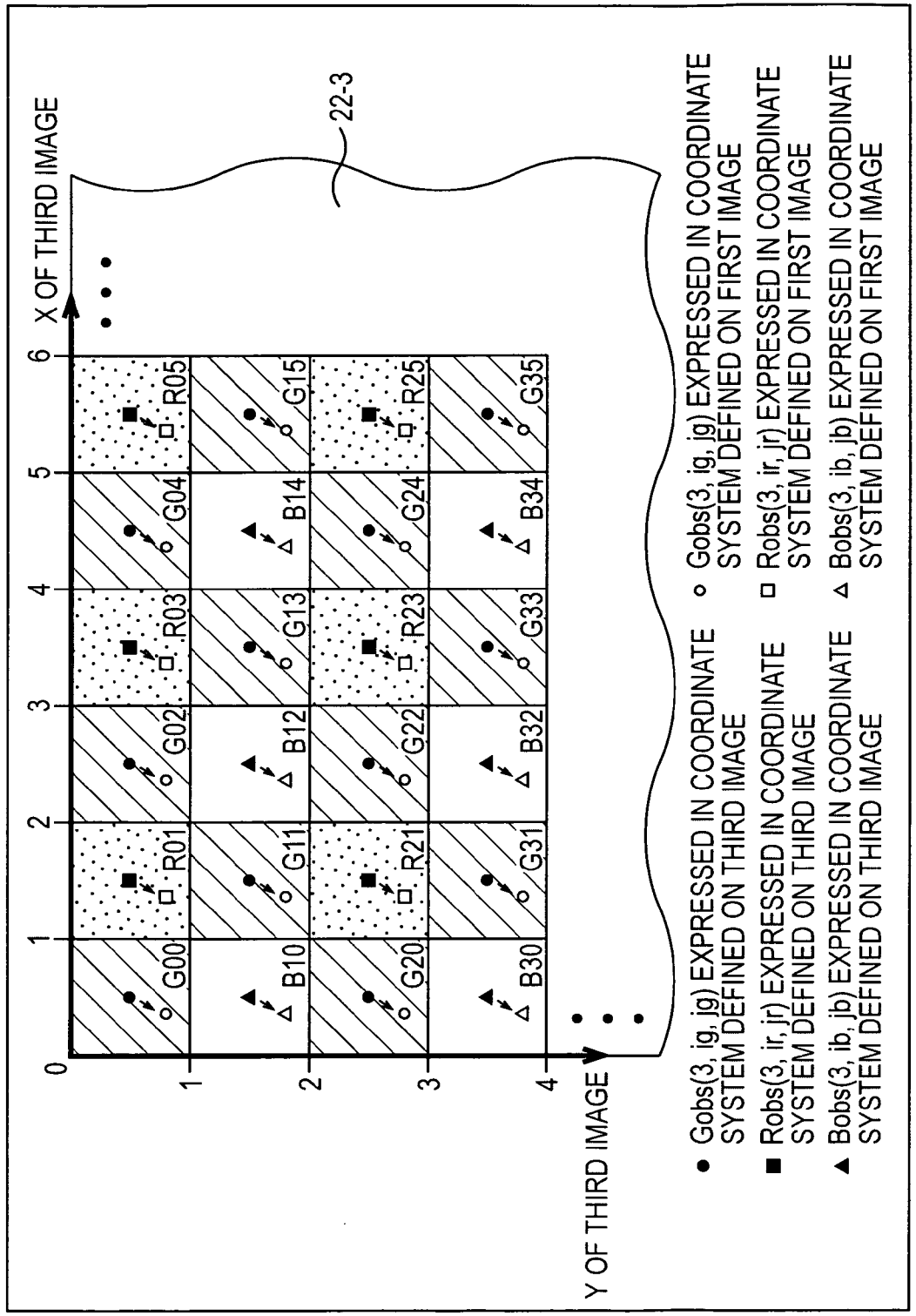
FIG. 15 is a diagram showing a third image stored in a frame memory 22-3.

FIG. 15 shows a third image stored in the frame memory 22-3.

In FIG. 15, as for the pixel G(jg−1)(ig−1) that senses a green component, a pixel value Gobs(3, ig, jg) is observed at a position denoted by a solid circle. As for the pixel R(jr−1)(ir−1) that senses a red component, a pixel value Robs(3, ir, jr) is observed at a position denoted by a solid square. As for the pixel B(jb−1)(ib−1) that senses a blue component, a pixel value Bobs(3, ib, jb) is observed at a position denoted by a solid triangle. As described above, the pixel value of each pixel of the third image is observed at the center (barycenter), as represented in the coordinate system of the third image, of each pixel. For example, in the case of a pixel at a (i-th, j-th) position, the pixel value is observed at a position (i−0.5, j−0.5).

As in the first and second embodiments, points on the third image are converted to corresponding points in the coordinate system of the first image. More specifically, each point on the third image is converted to a corresponding point in the coordinate system of the first image by using conversion parameters (θ3, T3x, T3y, S3) detected by the motion detector 23-2.

Corresponding points in the coordinate system of the first image converted from points on the third image are also shown in FIG. 15, for pixel values Gobs(3, ig, jg), Robs(3, ir, jr), and Bobs(3, ib, jb).

That is, the pixel value Gobs(3, ig, jg) of a pixel G(jg−1)(ig−1) in the coordinate system of the third image is green light intensity Lg(x, y) observed at a position ((ig−0.5)$_{(3)}$, (jg−0.5)$_{(3)}$) in the coordinate system of the first image obtained by converting a position (ig−0.5, jg−0.5) in the coordinate system of the third image using conversion parameters (θ3, T3x, T3y, S3) detected by the motion detector 23-2. In FIG. 15, the position ((ig−0.5)$_{(3)}$, (jg−0.5)$_{(3)}$) in the coordinate system of the first image where the pixel value Gobs(3, ig, jg) is indicated by an open circle.

The pixel value Robs(3, ir, jr) of a pixel R(jr−1)(ir−1) in the coordinate system of the second image is red light intensity Lr(x, y) observed at a position ((ir−0.5)$_{(3)}$, (jr−0.5)$_{(3)}$) in the coordinate system of the first image obtained by converting a position (ir−0.5, jr−0.5) in the coordinate system of the third image using conversion parameters (θ3, T3x, T3y, S3) detected by the motion detector 23-2. In FIG. 15, the position ((ir−0.5)$_{(3)}$, (jr−0.5)$_{(3)}$) in the coordinate system of the first image where the pixel value Robs(3, ir, jr) is indicated by an open square.

The pixel value Bobs(3, ib, jb) of a pixel B(jb−1)(ib−1) in the coordinate system of the third image is blue light intensity Lb(x, y) observed at a position ((ib−0.5)$_{(3)}$, (jb−0.5)$_{(3)}$) in the coordinate system of the first image obtained by converting a position (ib−0.5, jb−0.5) in the coordinate system of the third image using conversion parameters (θ3, T3x, T3y, S3) detected by the motion detector 23-2. In FIG. 15, the position ((ib−0.5)$_{(3)}$, (jb−0.5)$_{(3)}$) in the coordinate system of the first image where the pixel value Bobs(3, ib, jb) is indicated by an open triangle.

Figure 16:
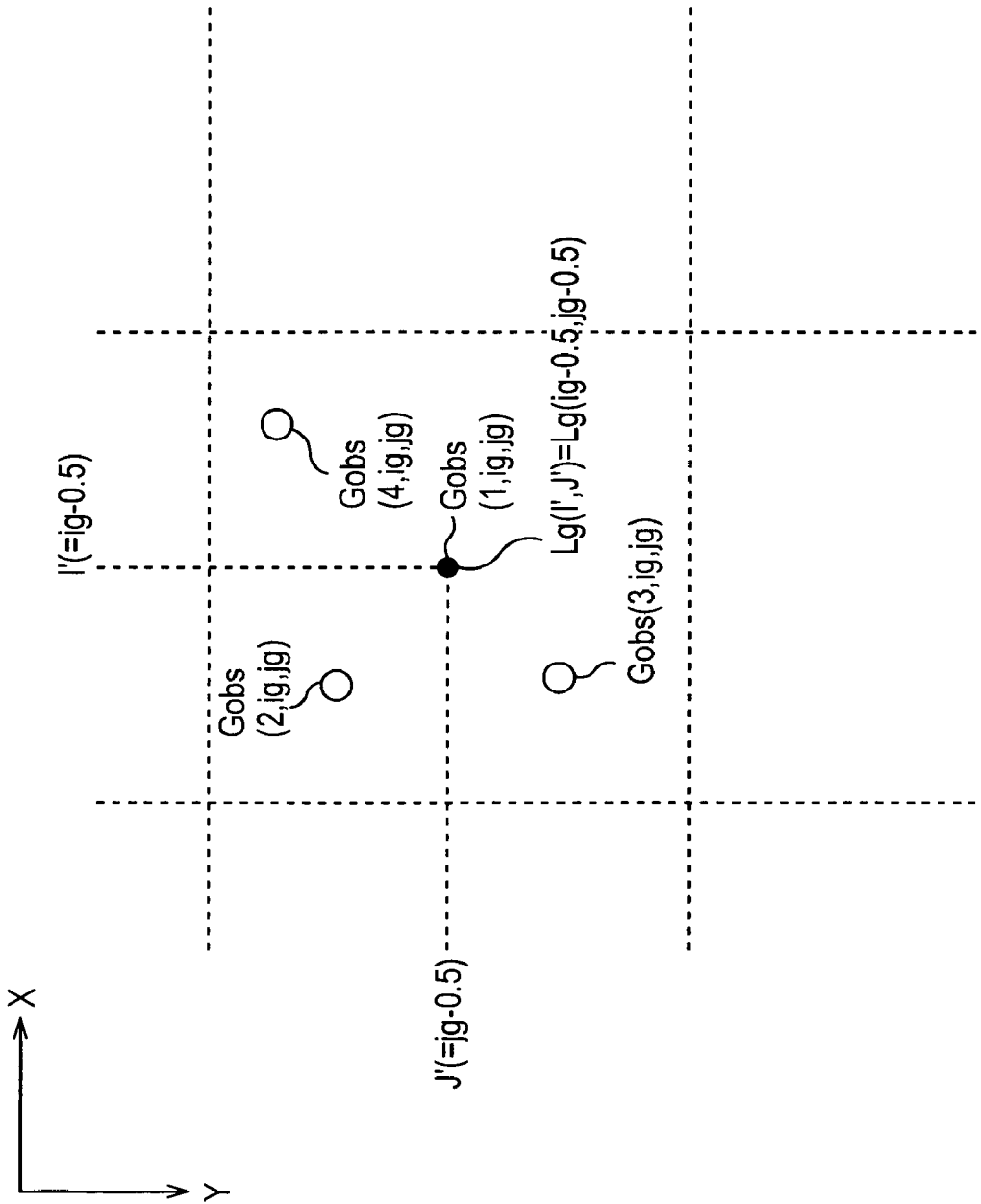
FIG. 16 is a diagram showing pixels of the imaging device 4.

FIG. 16 shows positions, converted into the coordinate system of the first image, at which pixel values Gobs(1, ig, jg) to Gobs(N, ig, jg) of respective first to N-th images are observed at a pixel G(jg−1)(ig−1) that senses a green component.

In the example shown in FIG. 16, a pixel value Gobs(1, ig, jg) of the first image is observed at the center (pixel center) of a pixel G(jg−1)(ig−1) at a (ig-th, jg-th) position in the coordinate system of the first image. A pixel value Gobs(2, ig, jg) of the second image is observed at a position converted into the coordinate system of the first image in an upper-left area of the pixel G(jg−1)(ig−1). A pixel value Gobs(3, ig, jg) of the third image is observed at a position converted into the coordinate system of the first image in a lower-left area of the pixel G(jg−1) (ig−1). A pixel value Gobs(4, ig, jg) of the fourth image is observed at a position converted into the coordinate system of the first image in an upper-right area of the pixel G(jg−1)(ig−1). Note that pixel values Gobs(k, ig, jg) (k=5 to N) of fifth to N-th images are not shown in FIG. 16.

In this third embodiment, the calculation circuit 24 determines the true green light intensity, based on pixel values Gobs(k, ig, jg) (k=1 to N) of respective first to N-th images.

Herein, the center position (i−0.5, j−0.5) of a pixel at a (i-th, j-th) position in the coordinate system of the first image used as a reference image is rewritten as (I', J').

That is, I'=i−0.5 and J'=j−0.5.

Figure 17:
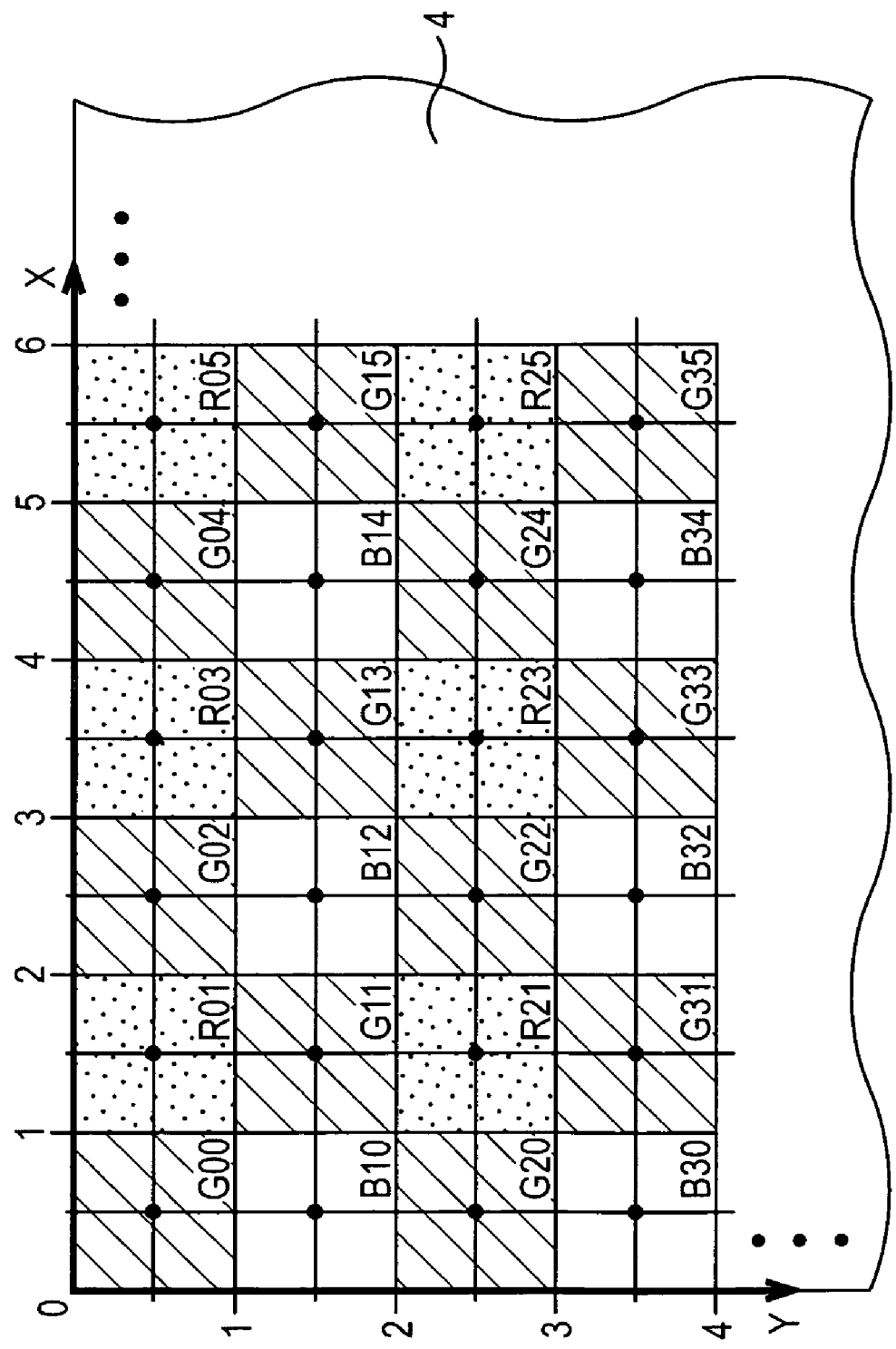
FIG. 17 is a diagram showing a manner in which pixels of the imaging device 4 shown in FIG. 1 are arranged.

FIG. 17 shows positions, as represented in the coordinate system of the first image, of the true green light intensity Lg(I', J'), the true red light intensity Lr(I', J'), and the true blue light intensity Lb(I', J') to be determined by the calculation circuit 24 as image signals of a sharp image.

That is, in FIG. 17, the center positions (I', J'), as represented in the coordinate system of the first image, of respective pixels of the imaging device 4 at which the true green light intensity Lg(I', J'), the true red light intensity Lr(I', J'), and the true blue light intensity Lb(I', J') to be determined are indicated by solid circles.

Figure 18:
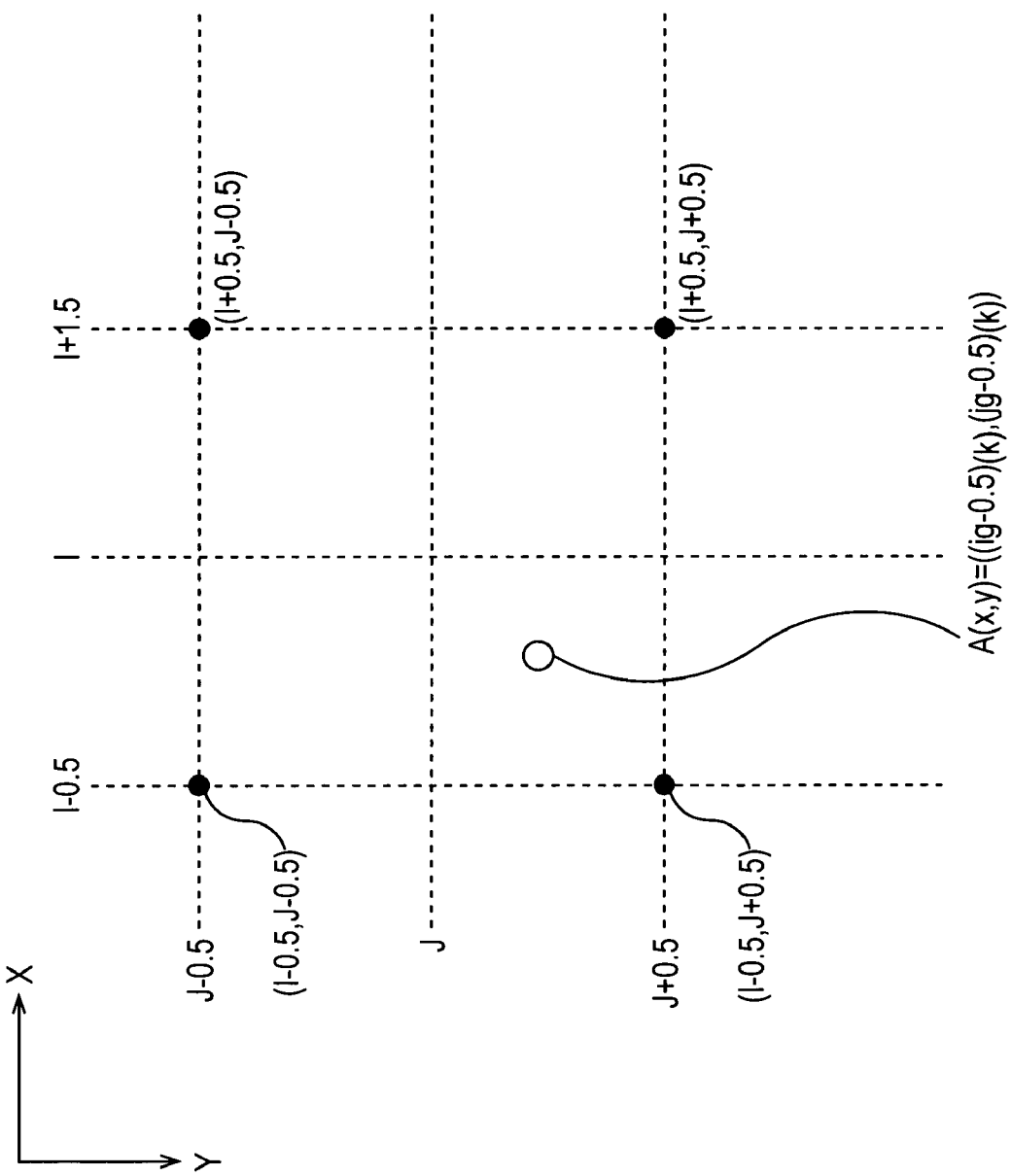
FIG. 18 is a diagram showing a spring model.

Referring to FIGS. 18 to 23, the spring model is described taking, as an example, a pixel that senses a green component. In FIG. 18 and following figures, the positions (I', i'), as represented in the coordinate system of the first image, of the true green light intensity Lg(I', J'), the true red light intensity Lr(I', J'), and the true blue light intensity Lb(I', J') to be determined are indicated by solid circles, positions, as represented in the coordinate system of the first image, of observed pixel values Gobs(k, ig, jg), Robs(k, ir, jr), Bobs(k, ib, jb) (k=1 to N) are indicated by open circles. Hereinafter, the coordinate system of the first image used as the reference image will also be referred to as a reference coordinate system.

In FIG. 18, a position (x, y) of a point A indicates a position ((ig−0.5)(k), (jg−0.5)$_{(k)}$) in the reference coordinate system obtained by converting a position (ig−0.5, jg−0.5) at which a pixel value Gobs(k, ig, jg) of a pixel at a (ig-th, jg-th) position of a k-th image was observed, by using conversion parameters (θk, Tkx, Tky, Sk) detected by the motion detector 23-(k−1). When K=1, the conversion parameters are regarded as (θk, Tkx, Tky, Sk)=(0, 0, 0, 1), and thus (x, y)=(ig−0.5, jg−0.5). Note that the pixel value at point A(x, y) is Gobs(k, ig, jg).

For the given point A(x, y), integers I and J that satisfy I−0.5≦x<I+0.5 and J−0.5≦y<J+0.5, respectively, are determined. Positions (I', J') at which to determine the true green light intensity Lg(I', J') are given by four corners (I−0.5, J−0.5), (I−0.5, J+0.5), (I+0.5, J−0.5), and (I+0.5, J+0.5) of a rectangle (I±0.5, J±0.5).

The pixel value Gobs(k, ig, jg) at the point A(x, y) can be regarded as being nearly equal to true green light intensities Lg(I−0.5, J−0.5), Lg(I−0.5, J+0.5), Lg(I+0.5, J−0.5), and Lg(I+0.5, J+0.5) at respectively positions (I−0.5, J−0.5), (I−0.5, J+0.5), (I+0.5, J−0.5), and (I+0.5, J+0.5) close to the point A(x, y). That is, the true green light intensities Lg(I−0.5, J−0.5), Lg(I−0.5, J+0.5), Lg(I+0.5, J−0.5), and Lg(I+0.5, J+0.5) can be approximated by the pixel value Gobs(k, ig, jg) at the point A(x, y).

As described in the first and second embodiments, the pixel value Gobs(k, ig, jg) observed at the point A(x, y) includes an error (noise) Mk×E. Furthermore, each of the true green light intensities Lg(I−0.5, J−0.5), Lg(I−0.5, J+0.5), Lg(I+0.5, J−0.5), and Lg(I+0.5, J+0.5) at respective positions (I−0.5, J−0.5), (I−0.5, J+0.5), (I+0.5, J−0.5), and (I+0.5, J+0.5) includes an additional error caused by approximating them by the pixel value Gobs(k, ig, jg) at the point A(x, y). (Hereinafter, such an error will be referred to as an approximation error).

The approximation of the true green light intensity, for example, Lg(I−0.5, J−0.5) at the position (I−0.5, J−0.5) by the pixel value Gobs(k, ig, jg) at the point A(x, y) can be represented by the spring model using a spring.

Figure 19:
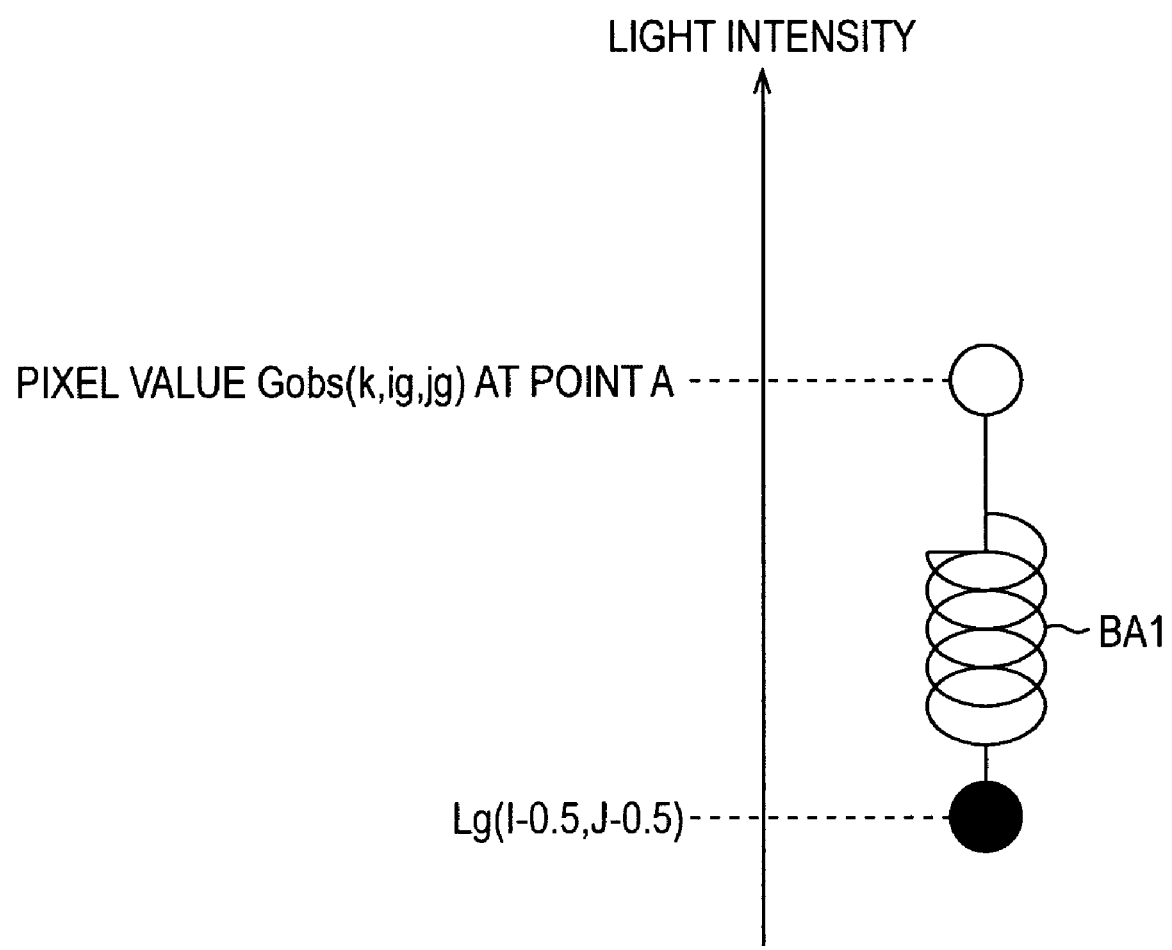
FIG. 19 is a diagram showing a spring model.

FIG. 19 shows the concepts of the spring model by which the true green light intensity Lg(I−0.5, J−0.5) at the position (I−0.5, J−0.5) is approximated by the pixel value Gobs(k, ig, jg) at the point A(x, y).

As shown in FIG. 19, one end of a spring BA1 is connected to the pixel value Gobs(k, ig, jg) and the other end of the spring BA1 is connected to the true green light intensity Lg(I−0.5, J−0.5). In a particular state shown in FIG. 19, the true green light intensity Lg(I−0.5, J−0.5) is being pulled toward the pixel value Gobs(k, ig, jg). In the spring model shown in FIG. 19, the degree to which the true green light intensity Lg(I−0.5, J−0.5) is pulled toward the pixel value Gobs(k, ig, jg) increases with the likelihood that the pixel value Gobs(k, ig, jg) at the point A(x, y) is the true green light intensity Lg(I−0.5, J−0.5). Conversely, the true green light intensity Lg(I−0.5, J−0.5) moves away from the pixel value Gobs(k, ig, jg) when the likelihood is low.

The approximation error caused by approximating the true green light intensity Lg(I−0.5, J−0.5) by the pixel value Gobs (k, ig, jg) increases with the distance between the point A(x, y) and the position (I−0.5, J−0.5). Thus, herein, a function F((x1, y1), (x2, y2)) that increases with the distance between a point (x1, y1) and a point (x2, y2) is introduced. As for the function F((x1, y1), (x2, y2)), for example, F((x1, y1), (x2, y2))=$\sqrt{\{(x1-x2)^2+(y1-y2)^2\}}$ may be employed.

As described earlier, the pixel value Gobs(k, ig, jg) observed at the point A(x, y) includes an error (noise) Mk×E caused by noise.

The likelihood of equality between the true green light intensity Lg(I−0.5, J−0.5) and the pixel value Gobs(k, ig, jg), that is, the approximation accuracy of the true green light intensity Lg(I−0.5, J−0.5) approximated by the pixel value Gobs(k, ig, jg) decreases or increases with increasing or decreasing approximation error and noise E×Mk. Therefore, the approximation accuracy (likelihood) decreases with (in inverse proportion to) Mk×E×F((x, y), (I−0.5, J−0.5)). That is, the likelihood that the true green light intensity Lg(I−0.5, J−0.5) is equal to the pixel value Gobs(k, ig, jg) at the point A(x, y) is high when the value of Mk×E×F((x, y), (I−0.5, J−0.5)) is large. Conversely, the likelihood low is high when the value of Mk×E×F((x, y), (I−0.5, J−0.5)) is small.

If the likelihood of equality of the true green light intensity Lg(I−0.5, J−0.5) to the pixel value Gobs(k, ig, jg) is represented by the spring constant (strength) of the spring BA1, then the spring constant is given, for example, as $\{\sqrt{2}-F((x, y), (I-0.5, J-0.5))\}/(Mk \times E)$. The denominator (Mk×E) is equal to Mk times the noise E. Therefore, as noise increases, the strength of the spring BA1 decreases and thus the force of pulling the true green light intensity Lg(I−0.5, J−0.5) toward the pixel value Gobs(k, ig, jg) at the point A decreases. The numerator $\{\sqrt{2}-F((x, y), (I-0.5, J-0.5))\}$ is equal to the value (difference) obtained by subtracting the distance between the point A and the point (I−0.5, J−0.5) from $\sqrt{(1^2+1^2)}=\sqrt{2}$, that is, the maximum possible value of the distance between two arbitrary points within the rectangular region (I±0.5, J±0.5) shown in FIG. 18. Therefore, as the distance increases between the point A(x, y) at which the pixel value Gobs(k, ig, jg) is observed and the position (I−0.5, J−0.5) of the true green light intensity Lg(I−0.5, J−0.5) to be determined, $\sqrt{2}-F((x, y), (I-0.5, J-0.5))$ decreases and thus the strength of the spring BA1 decreases. Thus, the force of the spring BA1 to pull the true green light intensity Lg(I−0.5, J−0.5) toward the pixel value Gobs(k, ig, jg) at the point A decreases. Instead of $\{\sqrt{2}-F((x, y), (I-0.5, J-0.5))\}$, other functions such as the inverse of F((x, y), (I−0.5, J−0.5)) may be used as the numerator of the spring constant.

In the spring model, if the spring BA1 is assumed to have a natural length of 0 (that is, the length is equal to 0 when no load is imposed on the spring), then the length (extension) of the spring BA1 along an axis of light intensity (pixel value) can be written as |Gobs(k, ig, jg)−Lg(I−0.5, J−0.5)|, and the force exerted by the spring BA1 on the true green light intensity Lg(I−0.5, J−0.5) to pull it toward the pixel value Gobs(k, ig, jg) at the point A (x, y) can be written as the spring constant × the length of the spring=$\{\sqrt{2}-F((x, y), (I-0.5, J-0.5))\}/(Mk \times E)\} \times$|Gobs(k, ig, jg)−Lg(I−0.5, J−0.5)|.

Figure 20:
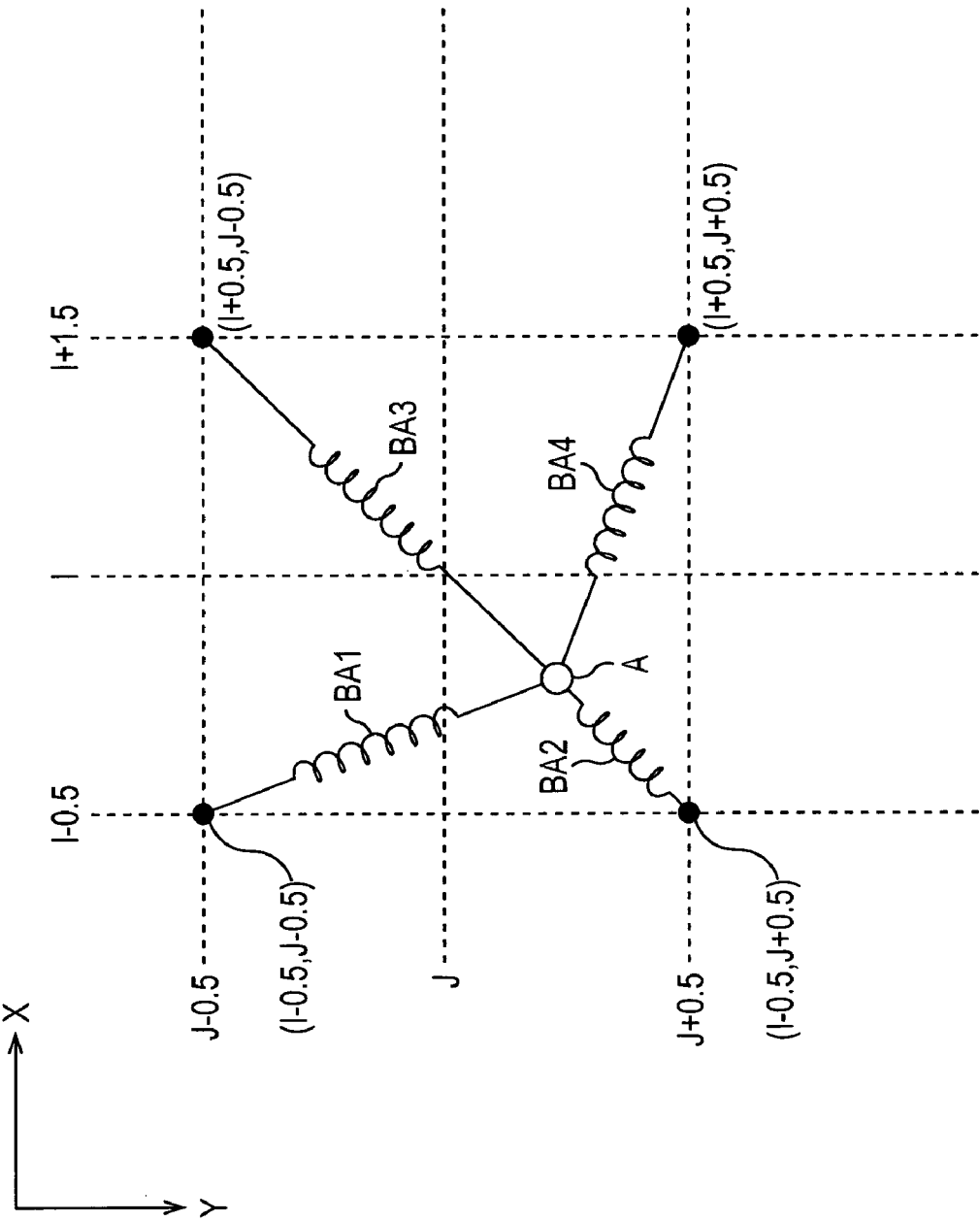
FIG. 20 is a diagram showing a spring model.

FIG. 20 shows the concepts of the spring model of the relationship between the pixel value Gobs(k, ig, jg) at the point A(x, y) and true green light intensities Lg(I−0.5, J−0.5), Lg(I−0.5, J+0.5), Lg(I+0.5, J−0.5), and Lg(I+0.5, J+0.5) at respective positions (I−0.5, J−0.5), (I−0.5, J+0.5), (I+0.5, J−0.5), and (I+0.5, J+0.5).

As with the spring model of the relationship between the pixel value Gobs(k, ig, jg) at the point A(x, y) and the true green light intensity Lg(I−0.5, J−0.5) described above with reference to FIG. 19, the relationship of the true green light intensities Lg(I−0.5, J+0.5), Lg(I+0.5, J−0.5), and Lg(I+0.5, J+0.5) with the pixel value Gobs(k, ig, jg) at the point A(x, y) is also represented by the spring model.

As shown in FIG. 20, one end of a spring BA2 is connected to the pixel value Gobs(k, ig, jg) and the other end of the spring BA2 is connected to the true green light intensity Lg(I−0.5, J+0.5), and the true green light intensity Lg(I−0.5, J+0.5) is being pulled toward the pixel value Gobs(k, ig, jg). In the spring model shown in FIG. 20, the degree to which the true green light intensity Lg(I−0.5, J+0.5) is pulled toward the pixel value Gobs(k, ig, jg) increases with the likelihood that the pixel value Gobs(k, ig, jg) at the point A(x, y) is the true green light intensity Lg(I−0.5, J+0.5). Conversely, the true green light intensity Lg(I−0.5, J+0.5) moves away from the pixel value Gobs(k, ig, jg) when the likelihood is low.

The approximation error caused by approximating the true green light intensity Lg(I−0.5, J+0.5) by the pixel value Gobs(k, ig, jg) increases with the distance between the point A(x, y) and the position (I−0.5, J+0.5). Thus, herein, a function F((x1, y1), (x2, y2)) that increases with the distance between a point (x1, y1) and a point (x2, y2) is introduced. As for the function F((x1, y1), (x2, y2)), for example, F((x1, y1), (x2, y2))=$\sqrt{\{(x1-x2)^2+(y1-Y2)^2\}}$ may be employed.

As described earlier, the pixel value Gobs(k, ig, jg) observed at the point A(x, y) includes an error (noise) Mk×E caused by noise.

The likelihood of equality between the true green light intensity Lg(I−0.5, J+0.5) and the pixel value Gobs(k, ig, jg), that is, the approximation accuracy of the true green light intensity Lg(I−0.5, J+0.5) approximated by the pixel value Gobs(k, ig, jg) decreases or increases with increasing or decreasing approximation error and noise E×Mk. Therefore, the approximation accuracy (likelihood) decreases with (in inverse proportion to) Mk×E×F((x, y), (I−0.5, J+0.5)). That is, the likelihood that the true green light intensity Lg(I−0.5, J+0.5) is equal to the pixel value Gobs(k, ig, jg) at the point A(x, y) is high when the value of Mk×E×F((x, y), (I−0.5, J+0.5)) is large. Conversely, the likelihood low is high when the value of Mk×E×F((x, y), (I−0.5, J+0.5)) is small.

If the likelihood of equality of the true green light intensity Lg(I−0.5, J+0.5) to the pixel value Gobs(k, ig, jg) is represented by the spring constant (strength) of the spring BA2, then the spring constant is given, for example, as $\{\sqrt{2}-F((x, y), (I-0.5, J+0.5))\}/(Mk \times E)$. The denominator (Mk×E) is equal to Mk times the noise E. Therefore, as noise increases, the strength of the spring BA2 decreases and thus the force of pulling the true green light intensity Lg(I−0.5, J+0.5) toward the pixel value Gobs(k, ig, jg) at the point A decreases. The numerator $\{\sqrt{2}-F((x, y), (I-0.5, J+0.5))\}$ is equal to the value (difference) obtained by subtracting the distance between the point A and the point (I−0.5, J+0.5) from $\sqrt{(1^2+1^2)}=\sqrt{2}$, that is, the maximum possible value of the distance between two arbitrary points within the rectangular region (I±0.5, J±0.5) shown in FIG. 18. Therefore, as the distance increases between the point A(x, y) at which the pixel value Gobs(k, ig, jg) is observed and the position (I−0.5, J+0.5) of the true green light intensity Lg(I−0.5, J+0.5) to be determined, $\sqrt{2}-F((x, y), (I-0.5, J+0.5))$ decreases and thus the strength of the spring BA2 decreases. Thus, the force of the spring BA2 to pull the true green light intensity Lg(I−0.5, J+0.5) toward the pixel value Gobs(k, ig, jg) at the point A decreases. Instead of $\{\sqrt{2}-F((x, y), (I-0.5, J+0.5))\}$, other functions such as the inverse of F((x, y), (I−0.5, J+0.5)) may be used as the numerator of the spring constant.

In the spring model, if the spring BA2 is assumed to have a natural length of 0 (that is, the length is equal to 0 when no load is imposed on the spring), then the length (extension) of the spring BA2 along an axis of light intensity (pixel value) can be written as |Gobs(k, ig, jg)−Lg(I−0.5, J+0.5)|, and the force exerted by the spring BA2 on the true green light intensity Lg(I−0.5, J+0.5) to pull it toward the pixel value Gobs(k, ig, jg) at the point A (x, y) can be written as the spring constant × the length of the spring=$\{\sqrt{2}-F((x, y), (I-0.5, J+0.5))\}/(Mk \times E)\} \times$|Gobs(k, ig, jg)−Lg(I−0.5, J+0.5)|. Furthermore, as shown in FIG. 20, one end of a spring BA3 is connected to the pixel value Gobs(k, ig, jg) and the other end of the spring BA3 is connected to the true green light intensity Lg(I+0.5, J−0.5), and the true green light intensity Lg(I+0.5, J−0.5) is being pulled toward the pixel value Gobs(k, ig, jg). In the spring model shown in FIG. 20, the degree to which the true green light intensity Lg(I+0.5, J−0.5) is pulled toward the pixel value Gobs(k, ig, jg) increases with the likelihood that the pixel value Gobs(k, ig, jg) at the point A(x, y) is the true green light intensity Lg(I+0.5, J−0.5). Conversely, the true green light intensity Lg(I+0.5, J−0.5) moves away from the pixel value Gobs(k, ig, jg) when the likelihood is low.

The approximation error caused by approximating the true green light intensity Lg(I+0.5, J−0.5) by the pixel value Gobs (k, ig, jg) increases with the distance between the point A(x, y) and the position (I+0.5, J−0.5). Thus, herein, a function F((x1, y1), (x2, y2)) that increases with the distance between a point (x1, y1) and a point (x2, y2) is introduced. As for the function F((x1, y1), (x2, y2)), for example, F((x1, y1), (x2, y2))=$\sqrt{\{(x1-x2)^2+(y1-y2)^2\}}$ may be employed.

As described earlier, the pixel value Gobs(k, ig, jg) observed at the point A(x, y) includes an error (noise) Mk×E caused by noise.

The likelihood of equality between the true green light intensity Lg(I+0.5, J−0.5) and the pixel value Gobs(k, ig, jg), that is, the approximation accuracy of the true green light intensity Lg(I+0.5, J−0.5) approximated by the pixel value Gobs(k, ig, jg) decreases or increases with increasing or decreasing approximation error and noise E×Mk. Therefore, the approximation accuracy (likelihood) decreases with (in inverse proportion to) Mk×E×F((x, y), (I+0.5, J−0.5)). That is, the likelihood that the true green light intensity Lg(I+0.5, J−0.5) is equal to the pixel value Gobs(k, ig, jg) at the point A(x, y) is high when the value of Mk×E×F((x, y), (I+0.5, J−0.5)) is large. Conversely, the likelihood low is high when the value of Mk×E×F((x, y), (I+0.5, J−0.5)) is small.

If the likelihood of equality of the true green light intensity Lg(I+0.5, J−0.5) to the pixel value Gobs(k, ig, jg) is represented by the spring constant (strength) of the spring BA3, then the spring constant is given, for example, as $\{\sqrt{2}-F((x, y), (I+0.5, J-0.5))\}/(Mk\times E)$. The denominator (Mk×E) is equal to Mk times the noise E. Therefore, as noise increases, the strength of the spring BA3 decreases and thus the force of pulling the true green light intensity Lg(I+0.5, J−0.5) toward the pixel value Gobs(k, ig, jg) at the point A decreases. The numerator $\{\sqrt{2}-F((x, y), (I+0.5, J-0.5))\}$ is equal to the value (difference) obtained by subtracting the distance between the point A and the point (I+0.5, J−0.5) from $\sqrt{(1^2+1^2)}=\sqrt{2}$, that is, the maximum possible value of the distance between two arbitrary points within the rectangular region (I±0.5, J±0.5) shown in FIG. 18. Therefore, as the distance increases between the point A(x, y) at which the pixel value Gobs(k, ig, jg) is observed and the position (I+0.5, J−0.5) of the true green light intensity Lg(I+0.5, J−0.5) to be determined, $\sqrt{2}-F((x, y), (I+0.5, J-0.5))$ decreases and thus the strength of the spring BA3 decreases. Thus, the force of the spring BA3 to pull the true green light intensity Lg(I+0.5, J−0.5) toward the pixel value Gobs(k, ig, jg) at the point A decreases. Instead of $\{\sqrt{2}-F((x, y), (I+0.5, J-0.5))\}$, other functions such as the inverse of F((x, y), (I+0.5, J−0.5)) may be used as the numerator of the spring constant.

In the spring model, if the spring BA3 is assumed to have a natural length of 0 (that is, the length is equal to 0 when no load is imposed on the spring), then the length (extension) of the spring BA3 along an axis of light intensity (pixel value) can be written as |Gobs(k, ig, jg)−Lg(I+0.5, J−0.5)|, and the force exerted by the spring BA3 on the true green light intensity Lg(I+0.5, J−0.5) to pull it toward the pixel value Gobs(k, ig, jg) at the point A (x, y) can be written as the spring constant × the length of the spring=$\{\sqrt{2}-F((x, y), (I+0.5, J-0.5))\}/(Mk\times E)\}\times$|Gobs(k, ig, jg)−Lg(I+0.5, J−0.5)|.

Furthermore, in FIG. 20, one end of a spring BA4 is connected to the pixel value Gobs(k, ig, jg) and the other end of the spring BA4 is connected to the true green light intensity Lg(I+0.5, J+0.5), and the true green light intensity Lg(I+0.5, J+0.5) is being pulled toward the pixel value Gobs(k, ig, jg). In the spring model shown in FIG. 20, the degree to which the true green light intensity Lg(I+0.5, J+0.5) is pulled toward the pixel value Gobs(k, ig, jg) increases with the likelihood that the pixel value Gobs(k, ig, jg) at the point A(x, y) is the true green light intensity Lg(I+0.5, J+0.5). Conversely, the true green light intensity Lg(I+0.5, J+0.5) moves away from the pixel value Gobs(k, ig, jg) when the likelihood is low.

The approximation error caused by approximating the true green light intensity Lg(I+0.5, J+0.5) by the pixel value Gobs (k, ig, jg) increases with the distance between the point A(x, y) and the position (I+0.5, J+0.5). Thus, herein, a function F((x1, y1), (x2, y2)) that increases with the distance between a point (x1, y1) and a point (x2, y2) is introduced. As for the function F((x1, y1), (x2, y2)), for example, F((x1, y1), (x2, y2))=$\sqrt{\{(x1-x2)^2+(y1-y2)^2\}}$ may be employed.

As described earlier, the pixel value Gobs(k, ig, jg) observed at the point A(x, y) includes an error (noise) Mk×E caused by noise.

The likelihood of equality between the true green light intensity Lg(I+0.5, J+0.5) and the pixel value Gobs(k, ig, jg), that is, the approximation accuracy of the true green light intensity Lg(I+0.5, J+0.5) approximated by the pixel value Gobs(k, ig, jg) decreases or increases with increasing or decreasing approximation error and noise E×Mk. Therefore, the approximation accuracy (likelihood) decreases with (in inverse proportion to) Mk×E×F((x, y), (I+0.5, J+0.5)). That is, the likelihood that the true green light intensity Lg(I+0.5, J+0.5) is equal to the pixel value Gobs(k, ig, jg) at the point A(x, y) is high when the value of Mk×E×F((x, y), (I+0.5, J+0.5)) is large. Conversely, the likelihood low is high when the value of Mk×E×F((x, y), (I+0.5, J+0.5)) is small.

If the likelihood of equality of the true green light intensity Lg(I+0.5, J+0.5) to the pixel value Gobs(k, ig, jg) is represented by the spring constant (strength) of the spring BA4, then the spring constant is given, for example, as $\{\sqrt{2}-F((x, y), (I+0.5, J+0.5))\}/(Mk\times E)$. The denominator (Mk×E) is equal to Mk times the noise E. Therefore, as noise increases, the strength of the spring BA4 decreases and thus the force of pulling the true green light intensity Lg(I+0.5, J+0.5) toward the pixel value Gobs(k, ig, jg) at the point A decreases. The numerator $\{\sqrt{2}-F((x, y), (I+0.5, J+0.5))\}$ is equal to the value (difference) obtained by subtracting the distance between the point A and the point (I+0.5, J+0.5) from $\sqrt{(1^2+1^2)}=\sqrt{2}$, that is, the maximum possible value of the distance between two arbitrary points within the rectangular region (I±0.5, J±0.5) shown in FIG. 18. Therefore, as the distance increases between the point A(x, y) at which the pixel value Gobs(k, ig, jg) is observed and the position (I+0.5, J+0.5) of the true green light intensity Lg(I+0.5, J+0.5) to be determined, $\sqrt{2}-F((x, y), (I+0.5, J+0.5))$ decreases and thus the strength of the spring BA4 decreases. Thus, the force of the spring BA4 to pull the true green light intensity Lg(I+0.5, J+0.5) toward the pixel value Gobs(k, ig, jg) at the point A decreases. Instead of $\{\sqrt{2}-F((x, y), (I+0.5, J+0.5))\}$, other functions such as the inverse of F((x, y), (I+0.5, J+0.5)) may be used as the numerator of the spring constant.

In the spring model, if the spring BA4 is assumed to have a natural length of 0 (that is, the length is equal to 0 when no load is imposed on the spring), then the length (extension) of the spring BA4 along an axis of light intensity (pixel value) can be written as |Gobs(k, ig, ig)−Lg(I+0.5, J+0.5)|, and the force exerted by the spring BA4 on the true green light intensity Lg(I+0.5, J+0.5) to pull it toward the pixel value Gobs(k, ig, jg) at the point A (x, y) can be written as the spring constant × the length of the spring=$\{\sqrt{2}-F((x, y), (I+0.5, J+0.5))\}/(Mk\times E)\}\times$|Gobs(k, ig, jg)−Lg(I+0.5, J+0.5)|.

In the process described above, for a given arbitrary position A(x, y) in the reference coordinate system, the spring model is introduced to express the relationship between the pixel value Gobs(k, ig, jg) at the position A(x, y) and the true green light intensities Lg(I−0.5, J−0.5), Lg(I−0.5, J+0.5), Lg(I+0.5, J−0.5), and Lg(I+0.5, J+0.5) at positions in the vicinity of the position (x, y), that is, at positions indicated by integers I and J that satisfy inequalities I−0.5≦x<I+0.5 and J−0.5≦y<J+0.5. Instead, for a given position (I', J') of interest in the reference coordinate system at which the center of a pixel is located, the relationship between the true green light intensity Lg(I', J') at the position (I', J') and pixel values Gobs(k, ig, jg) observed in the vicinity of the position (I', J') may be expressed by a spring model, as will be described below.

Note that (I', J') indicates the center position of a pixel, and thus I', and J' have a value whose fractional portion is equal to 0.5. Therefore, in the specific example shown in FIG. 20, positions denoted by solid circles such as (I−0.5, J−0.5) are regarded as positions (I', J').

Figure 21:
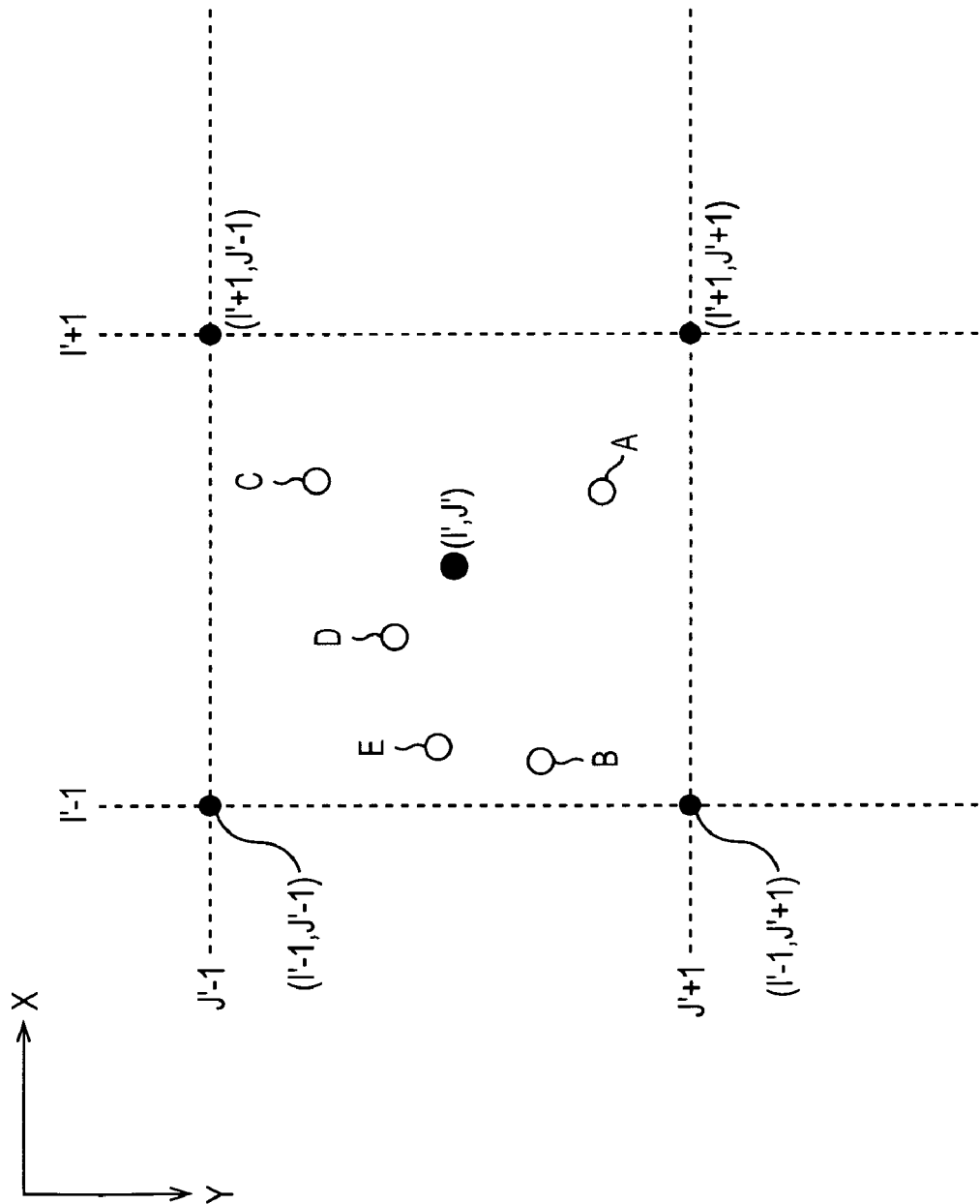
FIG. 21 is a diagram showing a spring model.

As shown in FIG. 20, a spring model is defined for four true green light intensities Lg(I−0.5, J−0.5), Lg(I−0.5, J+0.5), Lg(I+0.5, J−0.5), and Lg(I+0.5, J+0.5) in the vicinity of the point A(x, y). Similarly, in addition to the point A(x, y), a spring model using four springs is defined for each point at which a pixel value Gobs(k, ig, jg) of first to N-th captured images is observed. Thus, for the position (I', J'), as shown in FIG. 21, the spring model is defined so as to represent the relationship between the true green light intensity Lg(I', J') at the position (I', J') and pixel values Gobs(k, ig, jg) observed, for example, at points A to E in the vicinity of the position (I', J').

That is, for the given position (I', J') of interest, all combinations of integral values of k, ig, and jg are determined which satisfy I'−1≦x<I'+1 and J'−1≦y<J'+1 with respect to the position (x, y) in the reference coordinate system obtained by converting, based on conversion parameters (θk, Tkx, Tky, Sk), the position (ig−0.5, jg−0.5). By way of example, let us assume that combinations of integers (k, ig, jg) identifying respective five pixel values Gobs(k, ig, jg) observed at points A to E are obtained for the position (I', J') as shown in FIG. 21.

Figure 22:
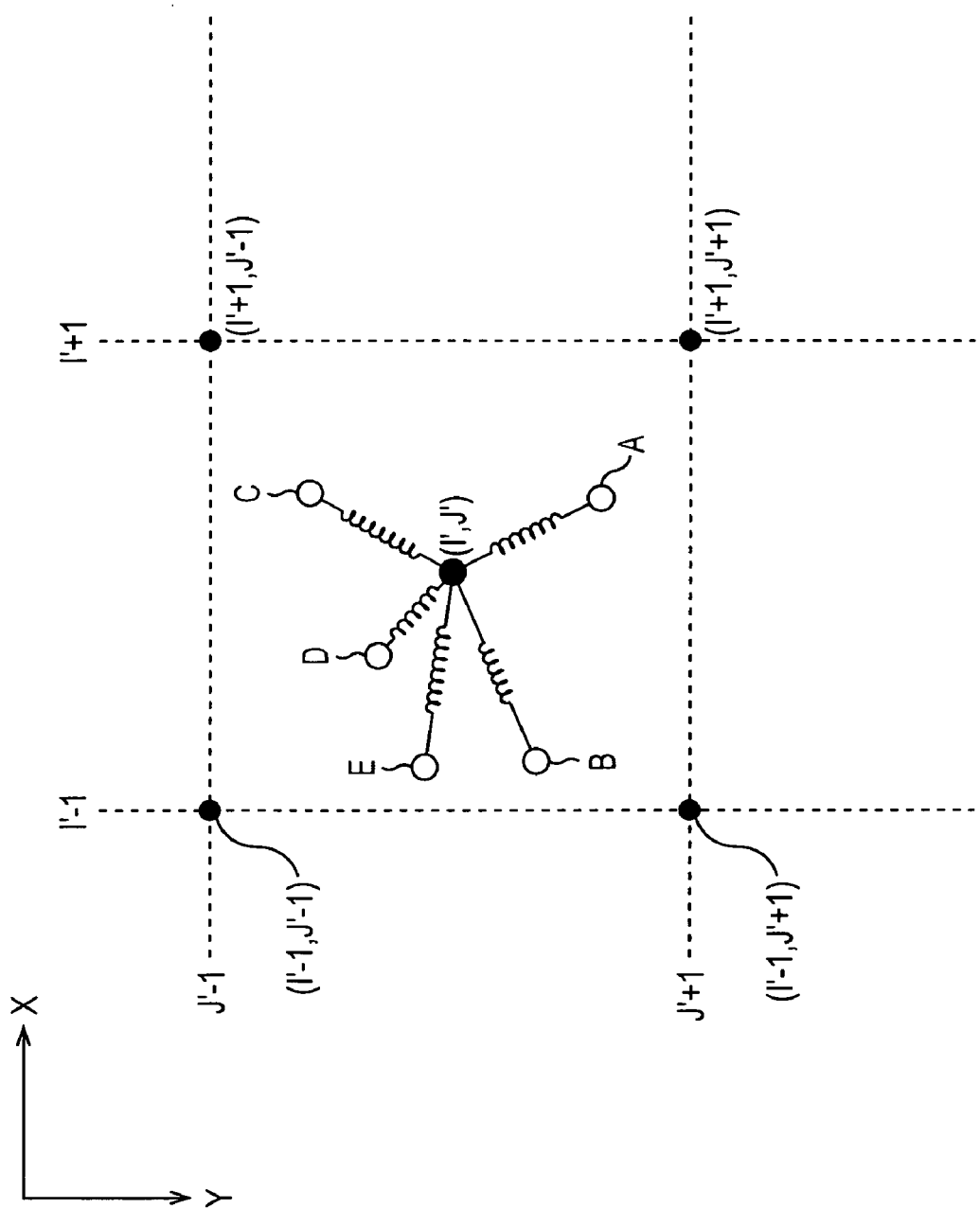
FIG. 22 is a diagram showing a spring model.

In this case, as shown in FIG. 22, a spring model is defined to represent the relationship between the true green light intensity Lg(I', J') at the position (I', J') and each of the five pixel values Gobs(k, ig, jg) observed at points A to E. That is, for the given position (I', J') at which the true green light intensity Lg(I', J') is to be determined, the relationship between the true green light intensity Lg(I', J') and each observed pixel value Gobs(k, ig, jg) is represented by the spring model.

Figure 23:
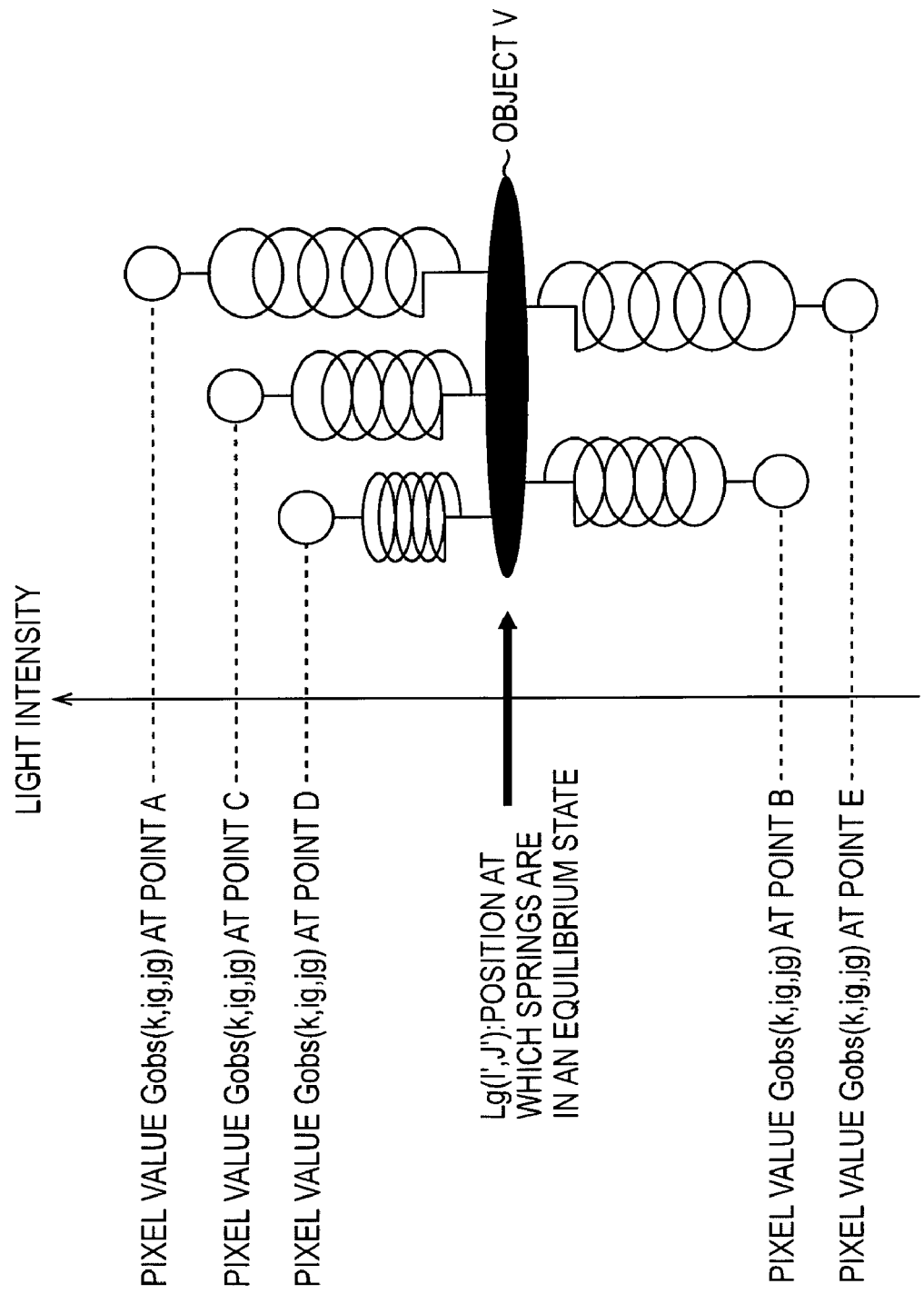
FIG. 23 is a diagram showing a spring model.

FIG. 23 shows a method of estimating a true green light intensity Lg(I', J') at the position (I', J'), based on the spring model associated with the position (I', J') of interest. In FIG. 23, an axis represents the green light intensity (G signal).

In the spring model shown in FIG. 23, one end of each of five springs is connected to an object V with a mass of 0, and the other end of each spring is connected to one of five pixel values Gobs(k, ig, jg) at points A to E. That is, five pixel values Gobs(k, ig, jg) at respective points A to E correspond to combinations of (k, ig, jg) that satisfy I'−1≦x<I'+1 and J'−1≦y<J'+1 with respect to the position (x, y) in the reference coordinate system obtained by converting, based on conversion parameters (θk, Tkx, Tky, Sk), the position (ig−0.5, jg−0.5) for the given position (I', J') shown in FIG. 22.

The five springs have a natural length of 0. A spring whose end is connected to a pixel value Gobs(k, ig, jg) observed at a point (x, y) has a spring constant equal to $\{\sqrt{2}-F((x, y), (I', J'))\}/(Mk \times E)$, as described earlier.

The five springs pull the object V toward the five pixel values Gobs(k, ig, jg), respectively, by forces proportional to the spring constants of the respective springs, and an equilibrium is achieved when the object V is at a particular location. The light intensity obtained at the location at which the equilibrium is achieved is employed as an estimate of the true green light intensity Lg(I', J'). The springs are in an equilibrium state when the sum of forces applied to the object V is equal to 0. That is, the equilibrium is achieved when the following equation is satisfied.

$$\sum \left\{ \frac{\sqrt{2} - F((x, y), (I', J'))}{(Mk \times E)} \times \{Gobs(k, ig, jg) - Lg(I', J')\} \right\} = 0 \quad (25)$$

Hereinafter, equation (25) will be referred to as a spring equation associated with the green light intensity. For the given position (I', J'), the sum Σ in equation (25) is taken for all combinations (k, ig, jg) that satisfy I'−1≦x<I'+1 and j'−1≦y<J'+1 with respect to the position (x, y) in the reference coordinate system obtained by converting, based on conversion parameters (θk, Tkx, Tky, Sk), the position (ig−0.5, jg−0.5). More specifically, in the example shown in FIG. 23, the sum is taken for five combinations of integers (k, ig, jg) corresponding to points A to E.

equation (25) is in the form of a linear equation including Lg(I', J') as an unknown. By solving equation (25), the true green light intensity Lg(I', J') at the position (I', J') can be determined.

For the true red light intensity Lr(I', J') and the true blue light intensity Lb(I', J') at the position (I', J'), linear equations (26) and (27) can be written in a similar manner to that in which equation (25) is written for the pixel that senses the green light component as described above with reference to FIGS. 18 to 23.

$$\sum \left\{ \frac{\sqrt{2} - F((x, y), (I', J'))}{(Mk \times E)} \times \{Robs(k, ir, jr) - Lr(I', J')\} \right\} = 0 \quad (26)$$

Hereinafter, equation (26) will be referred to as a spring equation associated with the red light intensity. For the given position (I', J'), the sum Σ in equation (26) is taken for all combinations (k, ir, jr) that satisfy I'−1≦x<I'+1 and J'−1≦y<J'+1 with respect to the position (x, y) in the reference coordinate system obtained by converting, based on conversion parameters (θk, Tkx, Tky, Sk), the position (ir−0.5, jr−0.5).

$$\sum \left\{ \frac{\sqrt{2} - F((x, y), (I', J'))}{(Mk \times E)} \times \{Bobs(k, ib, jb) - Lb(I', J')\} \right\} = 0 \quad (27)$$

Hereinafter, equation (27) will be referred to as a spring equation associated with the blue light intensity. For the given position (I', J'), the sum Σ in equation (27) is taken for all combinations (k, ib, jb) that satisfy I'−1≦x<I'+1 and J'−1≦y<J'+1 with respect to the position (x, y) in the reference coordinate system obtained by converting, based on conversion parameters (θk, Tkx, Tky, Sk), the position (ib−0.5, jb−0.5).

Thus, in this third embodiment, for the given position (I', J'), the true green light intensity Lg(I', J'), the true red light intensity Lr(I', J'), and the true blue light intensity Lb(I', J') are determined based on pixel values corresponding to combinations (k, ib, jb) that satisfy I'−1≦x<I'+1 and J'−1≦y<J'+1 with respect to the position (x, y) in the reference coordinate system obtained by converting, based on conversion parameters (θk, Tkx, Tky, Sk), the position (i−0.5, j−0.5).

Figure 24:
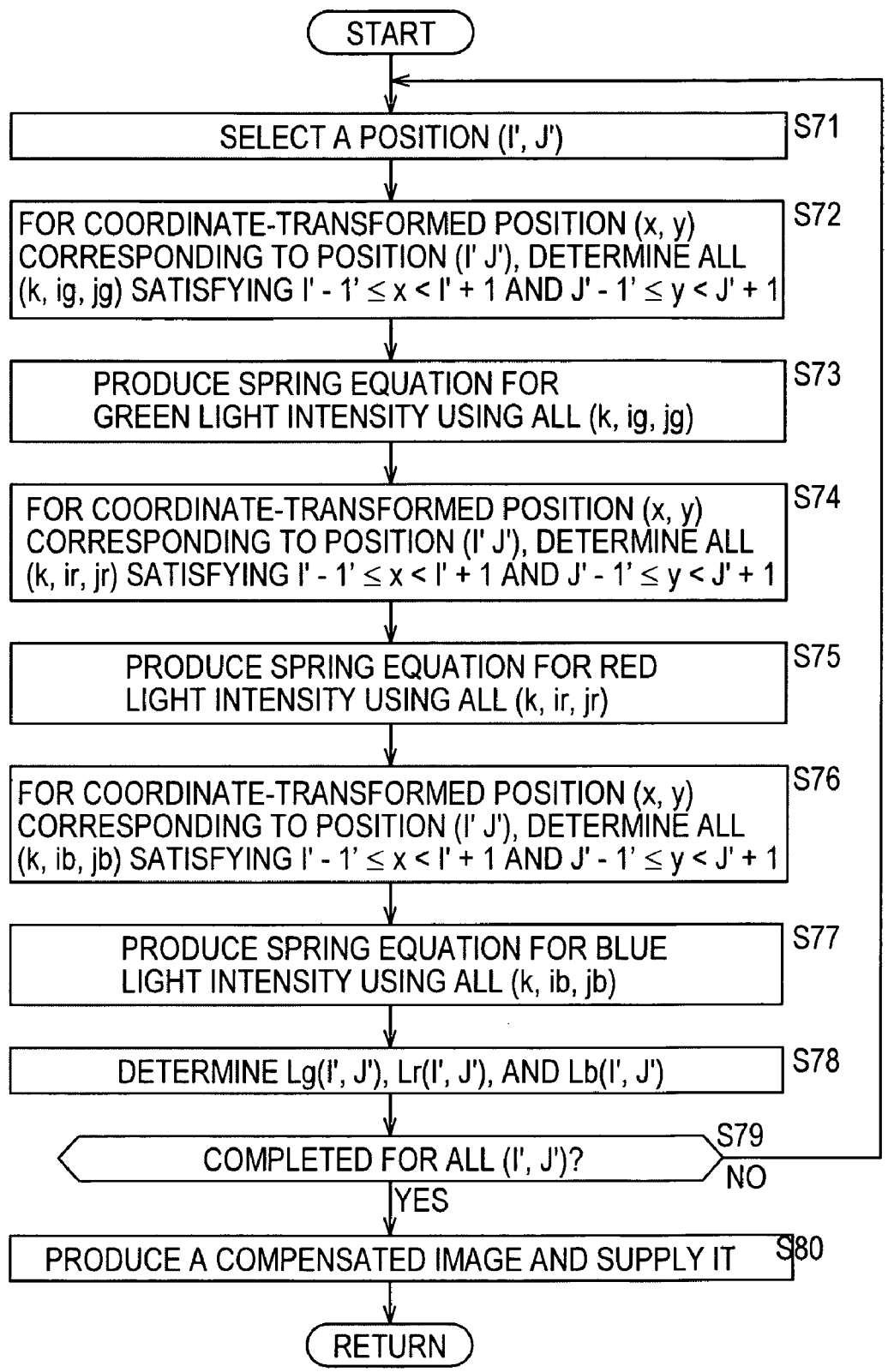
FIG. 24 a flow chart showing an image estimation process according to a third embodiment.

Now, referring to a flow chart shown in FIG. 24, a correct image estimation process in step S4 shown in FIG. 2 according to a third embodiment of the present invention is described.

First, in step S71, the calculation circuit 24 selects a position (I', J') in the reference coordinate system (hereinafter, such a selected position will be referred to a position (I', J') of interest). Note that the position (I', J') of interest is at the center (i−0.5, j−0.5) of a (i-th, j-th) pixel of the first image taken as the reference image.

Thereafter, the process proceeds from step S71 to step S72. In step S72, the calculation circuit 24 determines all combinations of integers (k, ig, jg) that satisfy I'−1≦x<I'+1 and J'−1≦y<J'+1 with respect to the position (x, y) in the reference coordinate system obtained by converting, based on conversion parameters (θk, Tkx, Tky, Sk), the center position (ig−0.5, jg−0.5) of the pixel that senses a green component of the k-th image, for the position (I', J') of interest of each of first to N-th images. Thereafter, the process proceeds to step S73.

In step S73, the calculation circuit 24 produces a spring equation in the form (25) for green light intensity, using all combinations of (k, ig, jg) determined in step S72. Thereafter, the process proceeds to step S74.

In step S74, the calculation circuit 24 determines all combinations of integers (k, ir, jr) that satisfy I'−1≦x<I'+1 and J'−1≦y<J'+1 with respect to the position (x, y) in the reference coordinate system obtained by converting, based on conversion parameters (θk, Tkx, Tky, Sk), the center position (ir−0.5, jr−0.5) of the pixel that senses a red component of the k-th image, for the position (I', J') of interest of each of first to N-th images. Thereafter, the process proceeds to step S75.

In step S75, the calculation circuit 24 produces a spring equation in the form (26) for red light intensity, using all combinations of (k, ir, jr) determined in step S74. Thereafter, the process proceeds to step S76.

In step S76, the calculation circuit 24 determines all combinations of integers (k, ib, jb) that satisfy I'−1≦x<I'+1 and J'−1≦y<J'+1 with respect to the position (x, y) in the reference coordinate system obtained by converting, based on conversion parameters (θk, Tkx, Tky, Sk), the center position (ib−0.5, jb−0.5) of the pixel that senses a blue component of the k-th image, for the position (I', J') of interest of each of first to N-th images. Thereafter, the process proceeds to step S77.

In step S77, the calculation circuit 24 produces a spring equation in the form (27) for blue light intensity, using all combinations of (k, ib, jb) determined in step S76. Thereafter, the process proceeds to step S78.

In step S78, the calculation circuit 24 solves the spring equation (25) associated with the green light intensity determined in step S73, the spring equation (26) associated with the red light intensity determined-in step S75, and the spring equation (27) associated with the blue light intensity determined in step S77, which are all in the form of a linear equation, thereby determining the true green light intensity Lg(I', J'), the true red light intensity Lr(I', J'), and the true blue light intensity Lb(I', J') at the position (I', J') of interest. Thereafter, the process proceeds to step S79.

In step S79, the calculation circuit 24 determines whether the above-described process is completed for all possible positions (I', J'), that is, whether the true green light intensity Lg(I', J'), the true red light intensity Lr(I', J'), and the true blue light intensity Lb(I', J') have been determined by taking the center position of each of all pixels of the first image as the position (I', J') of interest.

If it is determined in step S79 that the process is not completed for all possible positions (I', Jo) of interest, the process returns to step S71 to repeat steps S71 to S79. That is, the calculation circuit 24 selects, as a new position of interest, a position (I', J') that has not yet been selected as the position of infest, and determines the true green light intensity Lg(I', J'), the true red light intensity Lr(I', J'), and the true blue light intensity Lb(I', J') at the position (I', J') of interest.

On the other hand in the case in which it is determined in step S79 that the process is completed by taking all possible position (I', J') as the position of interest, the process proceeds to step S80. In step S80, the calculation circuit 24 estimates a correct image (signal) from the true green light intensity Lg(I', J'), the true red light intensity Lr(I', J'), and the true blue light intensity Lb(I', J') determined in step S78. The resultant image is supplied as an output image to the D/A converter 9 or the codec 12, and the current process is exited. For example, for the (i-th, j-th) pixel, the calculation circuit 24 estimates (produces) the correct image signal thereof from the true green light intensity Lg(i−0.5, j−0.5) determined as the green value (G signal) in step S78, the true red light intensity Lr(i−0.5, j−0.5) determined as the red value (R signal) in step S78, and the true blue light intensity Lb(i−0.5, j−0.5) determined as the blue value (B signal) in step S78. The calculation circuit 24 estimates the output image by estimating the image signal for all pixels whose center is located at the selected position (I', J').

In the third embodiment, as described above, data sensed by each pixel of the imaging device 4 is regarded as point-sampled data, the relationship between a pixel value observed at the center of each pixel and an ideal image signal of a sharp image including no blur due to a camera shake is represented by the spring model, and a sharp image likely to be a true image is determined based on the spring model.

Now, a correct image estimation process according to a fourth embodiment of the present invention is described. In this fourth embodiment, the third embodiment described above with reference to FIG. 24 is partially improved.

That is, in the third embodiment shown in FIG. 24, in step S72, the calculation circuit 24 determines all combinations of integers (k, ig, jg) that satisfy I'−1≦x<I'+1 and J'−1≦y<J'+1 with respect to the position (x, y) in the reference coordinate system obtained by converting, based on conversion parameters (θk, Tkx, Tky, Sk), the center position (ig−0.5, jg−0.5) of the pixel that senses a green component of the k-th image, for the position (I', J') of interest of each of first to N-th images. In step S73, the calculation circuit 24 produces a spring equation in the form (25) for green light intensity, using all combinations of integers (k, ig, jg) determined in step S72. Similarly, for the pixels that sense the red or blue component, combinations of integers (k, ig, jg) are determined for the position (I', J') of interest, and the spring equation in the form of (26) or (27) is produced using all determined combinations of integers (k, ig, jg).

There is a possibility that data of a particular pixel of a particular image of the first to N-th images is unreliable depending on the state in which the images are captured. In the digital camera 1 shown in FIG. 1, N images are taken and stored in the frame memory 22. Therefore, even if data with low reliability is discarded, the amount of remaining data can be sufficiently large.

In view of the above, in a fourth embodiment, only data with high reliability is used (and data with low reliability is discarded) to produce an image with better sharpness. More specifically, in the fourth embodiment, as many combinations of integers (k, ig, jg) as a predetermined number L are extracted as data with high reliability from all (k, ig, jg)

determined for a position (I', J') of interest. The number L may be fixed to a predetermined value such as 8 or may be set to a variable value specified by a user. The calculation circuit 24 calculates the mean value of pixel values Gobs(k, ig, jg) of all combinations of integers (k, ig, jg) and selects L (=8) combinations of integers (k, ig, jg) whose pixel value Gobs(k, ig, jg) is closest to the mean value. The selected L combinations are used to determine the true green light intensity Lg(I', J') at the position (I', J').

Thus, in this fourth embodiment, the spring equations (25), (26), and (27) associated with the green, red and blue light intensities used in the third embodiment are respectively rewritten into equations (28), (29) and (30), as shown below.

$$\sum \left[ \frac{\sqrt{2} - F((x, y), (I', J'))}{(Mk \times E)} \times \{Gobs(k, ig, jg) - Lg(I', J')\} \right] = 0 \quad (28)$$

where $\Sigma$ represents the sum taken for L combinations of integers (k, ig, jg) whose pixel value Gobs(k, ig, jg) is closest to the mean value of pixel values Gobs(k, ig, jg) of all combinations of integers (k, ig, jg) determined for the position (I', J') of interest.

$$\sum \left[ \frac{\sqrt{2} - F((x, y), (I', J'))}{(Mk \times E)} \times \{Robs(k, ir, jr) - Lr(I', J')\} \right] = 0 \quad (29)$$

where $\Sigma$ represents the sum taken for L combinations of integers (k, ir, jr) whose pixel value Robs(k, ir, jr) is closest to the mean value of pixel values Robs(k, ir, jr) of all combinations of integers (k, ir, jr) determined for the position (I', J') of interest.

$$\sum \left[ \frac{\sqrt{2} - F((x, y), (I', J'))}{(Mk \times E)} \times \{Bobs(k, ib, jb) - Lb(I', J')\} \right] = 0 \quad (30)$$

where $\Sigma$ represents the sum taken for L combinations of integers (k, ib, jb) whose pixel value Bobs(k, ib, jb) is closest to the mean value of pixel values Bobs(k, ib, jb) of all combinations of integers (k, ib, jb) determined for the position (I', J') of interest.

Figure 25:
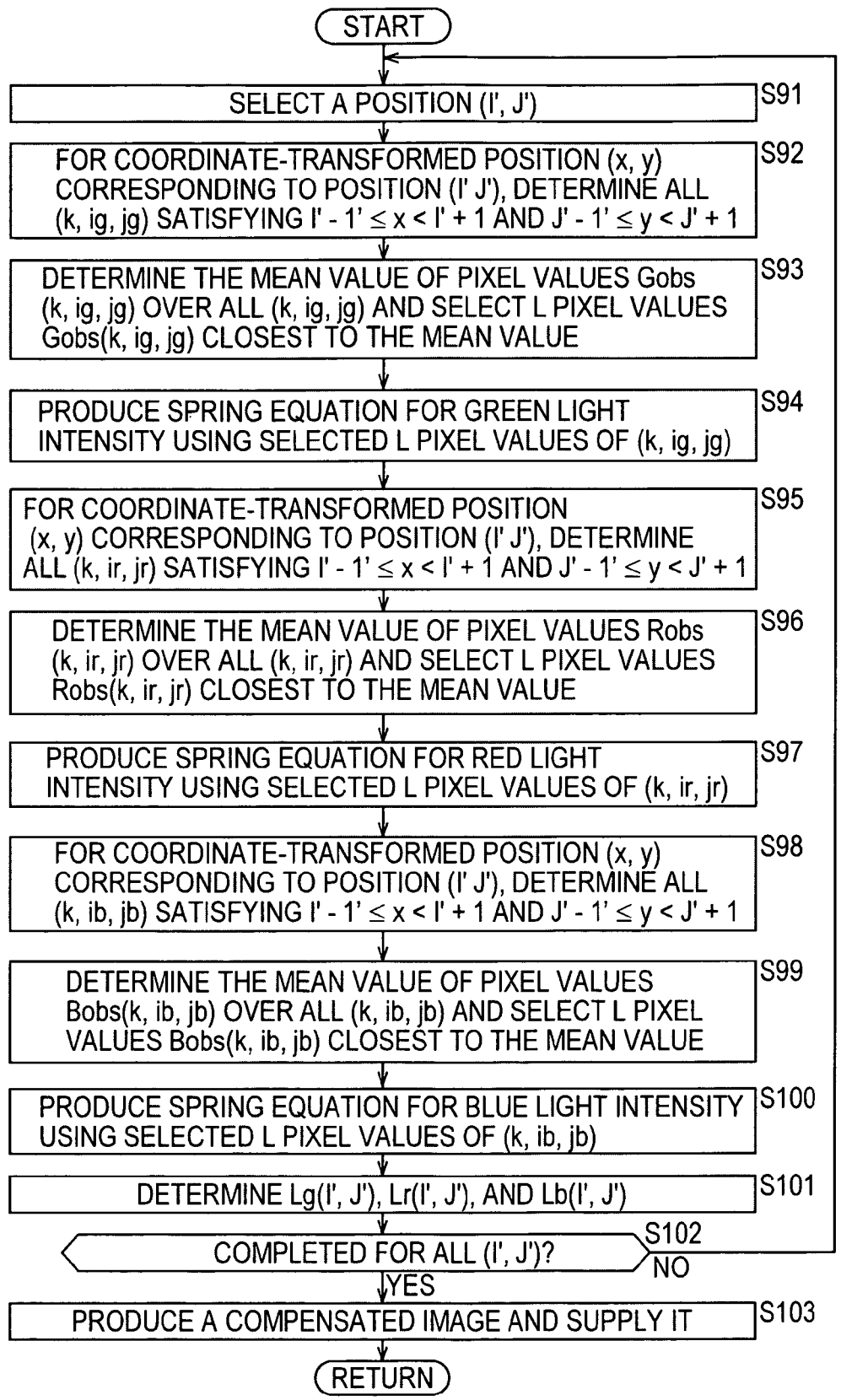
FIG. 25 a flow chart showing an image estimation process according to a fourth embodiment.

Now, referring to a flow chart shown in FIG. 25, a correct image estimation process in step S4 shown in FIG. 2 according to a fourth embodiment of the present invention is described.

First, in step S91, the calculation circuit 24 selects a position (I', J') in the reference coordinate system (hereinafter, such a selected position will be referred to a position (I', J') of interest). Note that the position (I', J') of interest is at the center (i−0.5, j−0.5) of a (i-th, j-th) pixel of the first image taken as the reference image.

Thereafter, the process proceeds from step S91 to step S92. In step S92, the calculation circuit 24 determines all combinations of integers (k, ig, jg) that satisfy I'−1≦x<I'+1 and J'−1≦y<J'+1 with respect to the position (x, y) in the reference coordinate system obtained by converting, based on conversion parameters (θk, Tkx, Tky, Sk), the center position (ig−0.5, jg−0.5) of the pixel that senses a green component of the k-th image, for the position (I', J') of interest of each of first to N-th images. Thereafter, the process proceeds to step S93.

In step S93, the calculation circuit 24 calculates the mean value of pixel values Gobs(k, ig, jg) for all combinations of integers (k, ig, jg) determined in step S92, and selects L combinations of integers (k, ig, jg) whose pixel value Gobs(k, ig, jg) is closest to the mean value. Thereafter, the process proceeds to step S94. That is, in step S93 described above, pixel values Gobs(k, ig, jg) that are not close to the mean value taken for all combinations of integers (k, ig, jg) determined in step S92 are regarded as data with low reliability and they are discarded. In a case in which the total number of combinations of integers (k, ig, jg) determined in step S92 is less than L, all combinations of integers (k, ig, jg) are selected (without discarding any data).

In step S94, the calculation circuit 24 produces a spring equation in the form (28) for green light intensity, using L combinations of (k, ig, jg) selected in step S93. Thereafter, the process proceeds to step S95.

In step S95, the calculation circuit 24 determines all combinations of integers (k, ir, jr) that satisfy I'−1≦x<I'+1 and J'−1≦y<J'+1 with respect to the position (x, y) in the reference coordinate system obtained by converting, based on conversion parameters (θk, Tkx, Tky, Sk), the center position (ir−0.5, jr−0.5) of the pixel that senses a red component of the k-th image, for the position (I', J') of interest of each of first to N-th images. Thereafter, the process proceeds to step S96.

In step S96, the calculation circuit 24 calculates the mean value of pixel values Robs(k, ir, jr) for all combinations of integers (k, ir, jr) determined in step S96, and selects L combinations of integers (k, ir, jr) whose pixel value Robs(k, ir, jr) is closest to the mean value. Thereafter, the process proceeds to step S97. That is, in step S96 described above, pixel values Robs(k, ir, jr) that are not close to the mean value taken for all combinations of integers (k, ir, jr) determined in step S95 are regarded as data with low reliability and they are discarded. In a case in which the total number of combinations of integers (k, ir, jr) determined in step S95 is less than L, all combinations of integers (k, ir, jr) are selected (without discarding any data).

In step S97, the calculation circuit 24 produces a spring equation in the form (29) for red light intensity, using L combinations of (k, ir, jr) selected in step S96. Thereafter, the process proceeds to step S98.

In step S98, the calculation circuit 24 determines all combinations of integers (k, ib, jb) that satisfy I'−1≦x<I'+1 and J'−1≦y<J'+1 with respect to the position (x, y) in the reference coordinate system obtained by converting, based on conversion parameters (θk, Tkx, Tky, Sk), the center position (ib−0.5, jb−0.5) of the pixel that senses a blue component of the k-th image, for the position (I', J') of interest of each of first to N-th images. Thereafter, the process proceeds to step S99.

In step S99, the calculation circuit 24 calculates the mean value of pixel values Bobs(k, ib, jb) for all combinations of integers (k, ib, jb) determined in step S98, and selects L combinations of integers (k, ib, jb) whose pixel value Bobs(k, ib, jb) is closest to the mean value. Thereafter, the process proceeds to step S100. That is, in step S99 described above, pixel values Bobs(k, ib, jb) that are not close to the mean value taken for all combinations of integers (k, ib, jb) determined in step S98 are regarded as data with low reliability and they are discarded. In a case in which the total number of combinations of integers (k, ib, jb) determined in step S98 is less than L, all combinations of integers (k, ib, jb) are selected (without discarding any data).

In step S100, the calculation circuit 24 produces a spring equation in the form (30) for blue light intensity, using L combinations of (k, ib, jb) selected in step S99. Thereafter, the process proceeds to step S101.

In step S101, the calculation circuit 24 solves the spring equation (28) associated with the green light intensity determined in step S94, the spring equation (29) associated with the red light intensity determined in step S97, and the spring equation (30) associated with the blue light intensity determined in step S100, which are all in the form of a linear equation, thereby determining the true green light intensity Lg(I', J'), the true red light intensity Lr(I', J'), and the true blue light intensity Lb(I', J') at the position (I', J') of interest. Thereafter, the process proceeds to step S102.

In step S102, the calculation circuit 24 determines whether the above-described process is completed for all possible positions (I', J'), that is, whether the true green light intensity Lg(I', J'), the true red light intensity Lr(I', J'), and the true blue light intensity Lb(I', J') have been determined by taking the center position of each of all pixels of the first image as the position (I', J') of interest.

If it is determined in step S102 that the process is not completed for all possible positions (I', J') of interest, the process returns to step S91 to repeat steps S91 to S102. That is, the calculation circuit 24 selects, as a new position of interest, a position (I', J') that has not yet been selected as the position of infest, and determines the true green light intensity Lg(I', J'), the true red light intensity Lr(I', J'), and the true blue light intensity Lb(I', J') at the position (I', J') of interest.

On the other hand in the case in which it is determined in step S102 that the process is completed by taking all possible position (I', J') as the position of interest, the process proceeds to step S103. In step S103, the calculation circuit 24 estimates a correct image (signal) from the true green light intensity Lg(I', J'), the true red light intensity Lr(I', J'), and the true blue light intensity Lb(I', J') determined in step S101. The resultant image is supplied as an output image to the D/A converter 9 or the codec 12, and the current process is exited. For example, for the (i-th, j-th) pixel, the calculation circuit 24 estimates a correct image signal thereof from the true green light intensity Lg(i–0.5, j–0.5) determined as the green value (G signal) in step S101, the true red light intensity Lr(i–0.5, j–0.5) determined as the red value (R signal) in step S101, and the true blue light intensity Lb(i–0.5, j–0.5) determined as the blue value (B signal) in step S101. The calculation circuit 24 estimates a correct image by performing the above-described process for all pixels whose center is located at the selected position (I', J').

In the fourth embodiment, as described above, pixel values close to the mean value are employed as reliable data, and the spring model is employed to only the employed reliable data. This makes it possible to obtain a sharper image more likely to be a correct image than can be obtained by the third embodiment described above.

Now, a correct image estimation process according to a fifth embodiment of the present invention is described. In this fifth embodiment, as in the fourth embodiment, as many combinations of integers (k, ig, jg) as a predetermined number L are extracted as reliable data from all combinations of integers (k, ig, jg) determined for a position (I', J') of interest. The true green light intensity Lg(I', J'), the true red light intensity Lr(I', J'), and the true blue light intensity Lb(I', J') are determined by solving spring equations associated with green, red, and blue light intensities each using L reliable data.

In the fourth embodiment described above, for example, in the determination of the true green light intensity Lg(I', J'), the mean value of pixel values Gobs(k, ig, jg) of all combinations of integers (k, ig, jg) is determined by the calculation circuit 24, and L combinations of integers (k, ig, jg) whose pixel value Gobs(k, ig, jg) is closest to the mean value are selected.

On the other hand, in the fifth embodiment, for a given position (I', J') of interest, the calculation circuit 24 extracts reliable data by selecting L combinations of integers (k, ig, jg) that are shortest in distance from the position of interest (I', J') to the position (x, y) in the reference coordinate system obtained by converting, based on conversion parameters (θk, Tkx, Tky, Sk), the center position (ig–0.5, jg–0.5) of the pixel which senses the green component of the k-th image. This is because, as described earlier with reference to FIG. 19, the approximation error that can occur when the true green light intensity Lg(I', J') at the position (I', J') of interest is approximated by the pixel value Gobs(k, ig, jg) observed at the position (x, y) increases with the distance between the position (I', J') of interest and the position (x, y). In other words, pixel values Gobs(k, ig, jg) observed at positions (x, y) distant from the position (I', J') of interest are low in reliability. To determined the distance between two points (x1, y1) and (x2, y2), for example, the function F((x1, y1), (x2, y2)) described earlier with reference to FIG. 19 can be used.

In the fifth embodiment, spring equations (31), (32), and (33) associated with green, red, and blue light intensities shown below are used instead of the spring equations (25), (26), and (27) used in the third embodiment.

$$\sum \left( \frac{\sqrt{2} - F((x, y), (I', J'))}{(Mk \times E)} \times \{Gobs(k, ig, jg) - Lg(I', J')\} \right) = 0 \quad (31)$$

where Σ denotes the sum taken for L combinations of integers (k, ig, jg) that are shortest in distance from the position (I', J') of interest to the position (x, y) in the reference coordinate system obtained by converting, based on conversion parameters (θk, Tkx, Tky, Sk), the center position (ig–0.5, jg–0.5) of the pixel which senses the green component of the k-th image.

$$\sum \left( \frac{\sqrt{2} - F((x, y), (I', J'))}{(Mk \times E)} \times \{Robs(k, ir, jr) - Lr(I', J')\} \right) = 0 \quad (32)$$

where Σ denotes the sum taken for L combinations of integers (k, ir, jr) that are shortest in distance from the position (I', J') of interest to the position (x, y) in the reference coordinate system obtained by converting, based on conversion parameters (θk, Tkx, Tky, Sk), the center position (ir–0.5, jr–0.5) of the pixel which senses the red component of the k-th image.

$$\sum \left( \frac{\sqrt{2} - F((x, y), (I', J'))}{(Mk \times E)} \times \{Bobs(k, ib, jb) - Lb(I', J')\} \right) = 0 \quad (33)$$

where Σ denotes the sum taken for L combinations of integers (k, ib, jb) that are shortest in distance from the position (I', J') of interest to the position (x, y) in the reference coordinate system obtained by converting, based on conversion parameters (θk, Tkx, Tky, Sk), the center position (ib–0.5, jb–0.5) of the pixel which senses the blue component of the k-th image.

Figure 26:
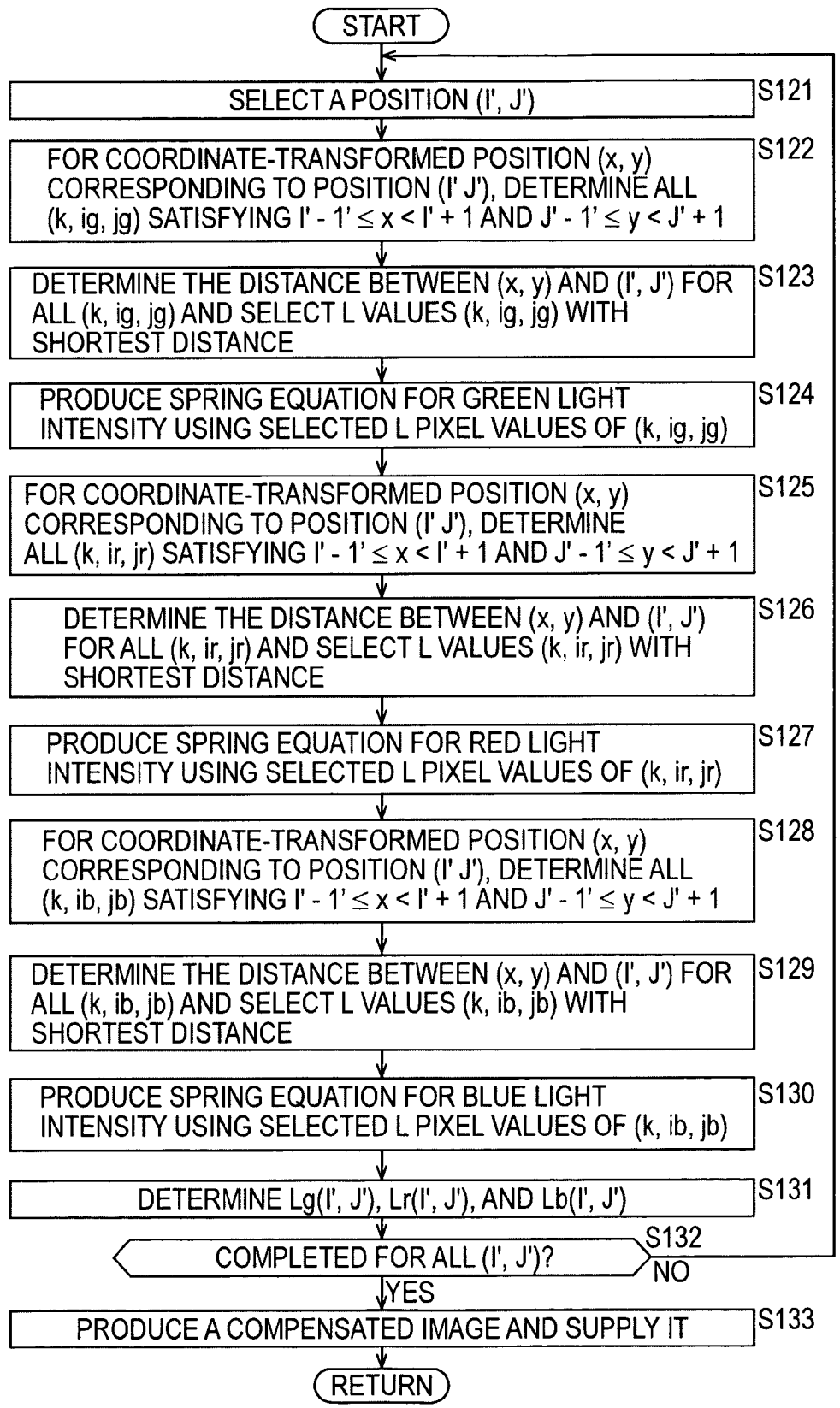
FIG. 26 a flow chart showing a correct image estimation process according to a fifth embodiment.

Now, referring to a flow chart shown in FIG. 26, a correct image estimation process in step S4 shown in FIG. 2 according to a fifth embodiment of the present invention is described.

First, in step S121, the calculation circuit 24 selects a position (I', J') in the reference coordinate system (hereinafter, such a selected position will be referred to a position (I', J') of interest). Note that the position (I', J') of interest is at the center (i−0.5, j−0.5) of a (i-th, j-th) pixel of the first image taken as the reference image.

Thereafter, the process proceeds from step S121 to step S122. In step S122, the calculation circuit 24 determines all combinations of integers (k, ig, jg) that satisfy I'−1≦x<I'+1 and J'−1≦y<J'+1 with respect to the position (x, y) in the reference coordinate system obtained by converting, based on conversion parameters (θk, Tkx, Tky, Sk), the center position (ig−0.5, jg−0.5) of the pixel that senses a green component of the k-th image, for the position (I', J') of interest of each of first to N-th images. Thereafter, the process proceeds to step S123.

In step S123, from all combinations of integers (k, ig, jg) determined in step S122, the calculation circuit 24 selects L combinations of integers (k, ig, jg) that are shortest in distance from the position of interest (I', J') to the position (x, y) in the reference coordinate system obtained by converting, based on conversion parameters (θk, Tkx, Tky, Sk), the center position (ig−0.5, jg−0.5) of the pixel which senses the green component of the k-th image. Thereafter, the process proceeds to step S124. That is, in step S123 described above, of all combinations of integers (k, ig, jg) determined in step S122, those that are long in distance between the position (x, y) and the position (I', J') of interest are regarded as data with low reliability and they are discarded. In a case in which the total number of combinations of integers (k, ig, jg) determined in step S122 is less than L, all combinations of integers (k, ig, jg) are selected (without discarding any data).

In step S124, the calculation circuit 24 produces a spring equation in the form (31) for green light intensity, using L combinations of (k, ig, jg) selected in step S123. Thereafter, the process proceeds to step S125.

In step S125, the calculation circuit 24 determines all combinations of integers (k, ir, jr) that satisfy I'−1≦x<I'+1 and J'−1≦y<J'+1 with respect to the position (x, y) in the reference coordinate system obtained by converting, based on conversion parameters (θk, Tkx, Tky, Sk), the center position (ir−0.5, jr−0.5) of the pixel that senses a red component of the k-th image, for the position (I', J') of interest of each of first to N-th images. Thereafter, the process proceeds to step S126.

In step S126, from all combinations of integers (k, ir, jr) determined in step S125, the calculation circuit 24 selects L combinations of integers (k, ir, jr) that are shortest in distance from the position of interest (I', J') to the position (x, y) in the reference coordinate system obtained by converting, based on conversion parameters (θk, Tkx, Tky, Sk), the center position (ir−0.5, jr−0.5) of the pixel which senses the green component of the k-th image. Thereafter, the process proceeds to step S127. That is, in step S126 described above, of all combinations of integers (k, ir, jr) determined in step S125, those that are long in distance between the position (x, y) and the position (I', J') of interest are regarded as data with low reliability and they are discarded. In a case in which the total number of combinations of integers (k, ir, jr) determined in step S125 is less than L, all combinations of integers (k, ir, jr) are selected (without discarding any data).

In step S127, the calculation circuit 24 produces a spring equation in the form (32) for red light intensity, using L combinations of (k, ir, jr) selected in step S126. Thereafter, the process proceeds to step S128.

In step S128, the calculation circuit 24 determines all combinations of integers (k, ib, jb) that satisfy I'−1≦x<I'+1 and J'−1≦y<J'+1 with respect to the position (x, y) in the reference coordinate system obtained by converting, based on conversion parameters (θk, Tkx, Tky, Sk), the center position (ib−0.5, jb−0.5) of the pixel that senses a blue component of the k-th image, for the position (I', J') of interest of each of first to N-th images. Thereafter, the process proceeds to step S129.

In step S129, from all combinations of integers (k, ib, jb) determined in step S128, the calculation circuit 24 selects L combinations of integers (k, ib, jb) that are shortest in distance from the position of interest (I', J') to the position (x, y) in the reference coordinate system obtained by converting, based on conversion parameters (θk, Tkx, Tky, Sk), the center position (ib−0.5, jb−0.5) of the pixel which senses the green component of the k-th image. Thereafter, the process proceeds to step S130. That is, in step S129 described above, of all combinations of integers (k, ib, jb) determined in step S128, those that are long in distance between the position (x, y) and the position (I', J') of interest are regarded as data with low reliability and they are discarded. In a case in which the total number of combinations of integers (k, ib, jb) determined in step S128 is less than L, all combinations of integers (k, ib, jb) are selected (without discarding any data).

In step S130, the calculation circuit 24 produces a spring equation in the form (33) for blue light intensity, using L combinations of (k, ib, jb) selected in step S129. Thereafter, the process proceeds to step S131.

In step S131, the calculation circuit 24 solves the spring equation (31) associated with the green light intensity determined in step S124, the spring equation (32) associated with the red light intensity determined in step S127, and the spring equation (33) associated with the blue light intensity determined in step S130, which are all in the form of a linear equation, thereby determining the true green light intensity Lg(I', J'), the true red light intensity Lr(I', J'), and the true blue light intensity Lb(I', J') at the position (I', J') of interest. Thereafter, the process proceeds to step S132.

In step S132, the calculation circuit 24 determines whether the above-described process is completed for all possible positions (I', J'), that is, whether the true green light intensity Lg(I', J'), the true red light intensity Lr(I', J'), and the true blue light intensity Lb(I', J') have been determined by taking the center position of each of all pixels of the first image as the position (I', J') of interest.

If it is determined in step S132 that the process is not completed for all possible positions (I', J') of interest, the process returns to step S121 to repeat steps S121 to S132. That is, the calculation circuit 24 selects, as a new position of interest, a position (I', J') that has not yet been selected as the position of infest, and determines the true green light intensity Lg(I', J'), the true red light intensity Lr(I', J'), and the true blue light intensity Lb(I', J') at the position (I', J') of interest.

On the other hand in the case in which it is determined in step S132 that the process is completed by taking all possible position (I', J') as the position of interest, the process proceeds to step S133. In step S133, the calculation circuit 24 estimates a correct image (signal) from the true green light intensity Lg(I', J'), the true red light intensity Lr(I', J'), and the true blue light intensity Lb(I', J') determined in step S131. The resultant image is supplied as an output image to the D/A converter 9 or the codec 12, and the current process is exited. For example, for the (i-th, j-th) pixel, the calculation circuit 24 estimates the correct image signal thereof from the true green light intensity Lg(i−0.5, j−0.5) determined as the green value (G signal) in step S131, the true red light intensity Lr(i−0.5, j−0.5) determined as the red value (R signal) in step S131, and the true blue light intensity Lb(i−0.5, j−0.5) determined as the blue value (B signal) in step S131. The calculation circuit 24 estimates the output image by estimating the image signal for all pixels whose center is located at the selected position (I', J').

In the fifth embodiment, as described above, pixel values observed at positions close to the position (I', J') of interest are selected as reliable data, and the spring model is applied only to the selected data. This makes it possible to obtain a more ideal image with better sharpness than can be obtained by the third embodiment described above.

Now, a correct image estimation process according to a sixth embodiment of the present invention is described.

In this sixth embodiment, the third embodiment described above is further improved. That is, in this sixth embodiment, edge parts of an image are detected, and spring equations in improved forms based on spring equations (25), (26), and (27) associated with green, red and blue light intensities are applied to pixel values in the detected edge parts.

Figure 27:
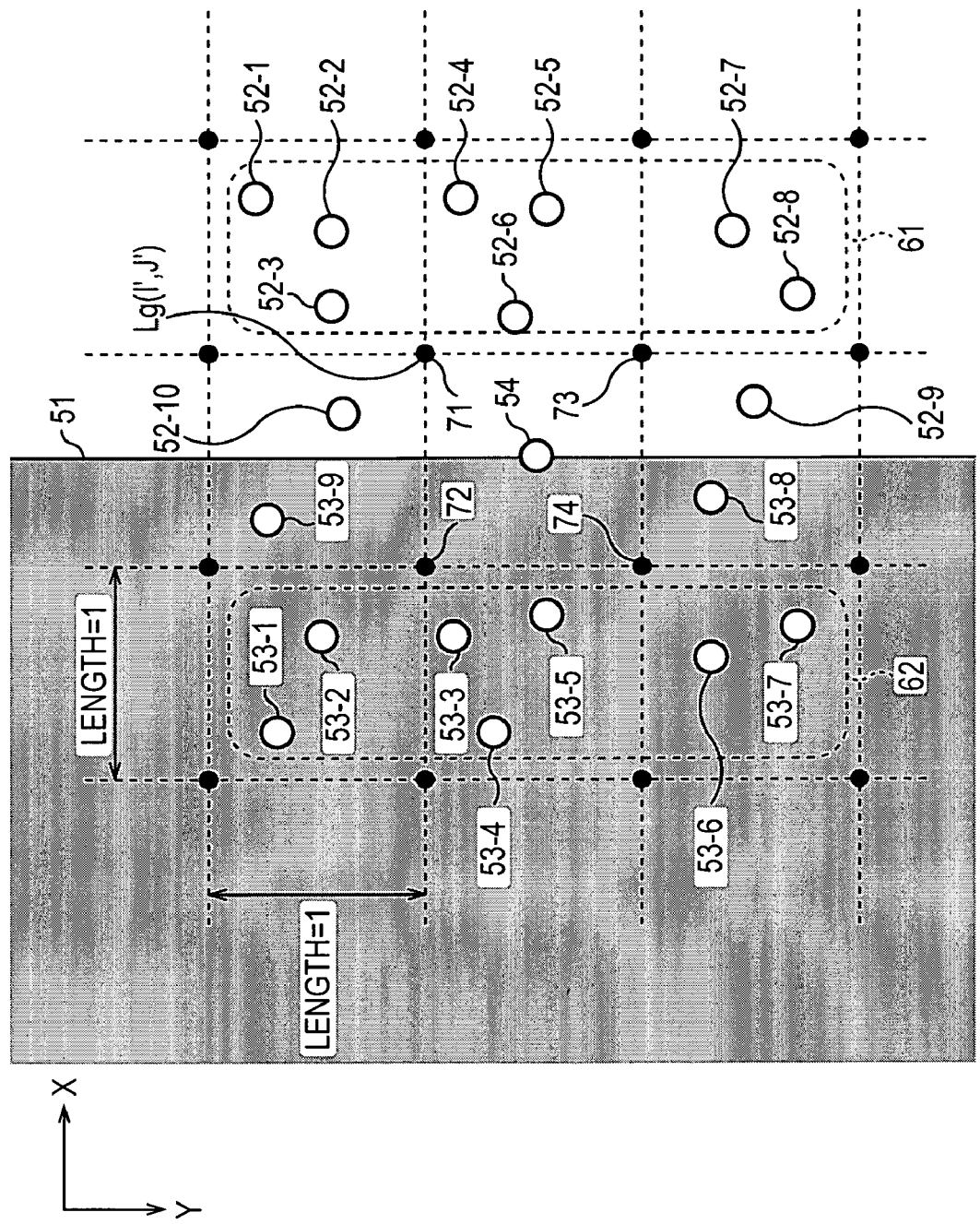
FIG. 27 is a diagram showing a state in which green components (G signals) are sensed by respective pixels of the imaging device 4.

Of green, red, and blue components, a reference coordinate system associated with the green component (G signal) is shown in FIG. 27.

In the example, shown in FIG. 27, pixel values with bright green are observed in an area to the right of a boundary (edge) 51, and pixel values with dark green are observed in an area to the left of the boundary (edge) 51. Each pixel value of green is represented in, for example, 8 bits. The bright green pixel value is equal to, for example, 240, and the dark green pixel value is equal to, for example, 16.

In FIG. 27, open circles 52-1 to 52-10, 53-1 to 53-9, and 54 indicate center positions (ig−0.5, jg−0.5) of (ig-th, jg-th) pixels of the k-th image converted, based on conversion parameters (θk, Tkx, Tky, Sk), to representation in the reference coordinate system. At those positions, green pixel values Gobs(k, ig, jg) are observed. Note that (k, ig, jg) is different among open circles 52-1 to 52-10, 53-1 to 53-9, and 54.

Each solid circle at an intersection of a lattice represented by dotted lines in FIG. 27 indicates a position (I', J') of green light intensity Lg(I', J') to be determined by the calculation circuit 24. As described earlier, the position (I', J') denotes the center position (i−0.5, j−0.5) of the (i-th, j-th) pixel of the first image employed as the reference image. The distance between adjacent Lg(I', J') is equal to 1 in both X and Y directions, and thus the pixel size is equal to 1 in both X and Y directions.

At positions denoted by open circles 52-1 to 52-8 in a region 61 shown in FIG. 27, bright green pixel values Gobs(k, ig, jg) equal to about 240 are observed.

At positions denoted by open circles 53-1 to 53-7 in a region 62 shown in FIG. 27, dark green pixel values Gobs(k, ig, jg) equal to about 16 are observed.

In FIG. 27, the position indicated by the open circle 54 is on the boundary 51. At such a position, because of the characteristic of the on-chip lens, the pixel receives equally both bright green light with a level of 240 and dark green light with a level of 16, and thus the pixel value Gobs(k, ig, jg) observed at the position denoted by the open circle 54 is equal to the mean value of 240 and 16, that is, 128(=(240+16)/2).

The pixel values Gobs(k, ig, jg) observed at positions denoted by open circles 52-1 to 52-8, 53-1 to 53-7 and 54 generally include an error component, and thus, from a strict point of view, pixel values are, for example, about 240, about 16, about 128, and so on. However, for the purpose of simplicity, error components are ignored and pixel values are simply expressed as 240, 16, 128, and so on.

For example, when the position denoted by the solid circle 71 in FIG. 27 is selected as the position (I', J') of interest, if the third embodiment described above is used, the true green light intensity Lg(I', J') at the position (I', J') of interest denoted by the solid circle 71 is determined as follows.

That is, when the position denoted by the solid circle 71 is selected as the position (I', J') of interest, pixel values Gobs(k, ig, jg) observed in the vicinity of the position (I', J') of interest, such as those observed at positions denoted by open circles 52-3, 52-6, 52-10, and 54, are employed as Gobs(k, ig, jg) in equation (25). In this case, the green light intensity Lg(I', J') obtained by solving equation (25) becomes lower than 240 because the true green light intensity Lg(I', J') is pulled (affected) by the pixel value of 128 observed at the position denoted by the open circle 54. However, because the position denoted by the solid circle 71 is located in an area to the right of the boundary 51 where the green pixel value observed is as high as 240, the really true green light intensity Lg(I', J') is 240. Thus, it is desirable that the green light intensity Lg(I', J') obtained by solving equation (25) be equal to 240.

When the position denoted by the solid circle 72 is selected as the position (I', J') of interest, pixel values Gobs(k, ig, jg) observed in the vicinity of the position (I', J') of interest, such as those observed at positions denoted by open circles 53-2, 53-3, 53-5, 53-9 and 54 are employed as Gobs(k, ig, jg) in equation (25). In this case, the true green light intensity Lg(I', J') obtained by solving equation (25) becomes greater than 16 because the true green light intensity Lg(I', J') is pulled (affected) by the pixel value of 128 observed at the position denoted by the open circle 54. However, because the position denoted by the solid circle 72 is located in an area to the left of the boundary 51 where the green pixel value observed is as low as 16, the really true green light intensity Lg(I', J') is 16. Thus, it is desirable that the green light intensity Lg(I', J') obtained by solving equation (25) be equal to 16.

The above discussion can also be applied to locations denoted by solid circles 73 and 74. As discussed above, in images produced by the correct image estimation process according to the third embodiment, in edge parts such as that in which the boundary 51 shown in FIG. 27 exists, there is a possibility that an edge is blurred (that is, differences among pixel values of adjacent pixels become small).

In the sixth embodiment, to avoid the above problem, an edge part including the boundary 51 shown in FIG. 27 is detected, and the special process is performed on pixel values Gobs(k, ig, jg) in the detected edge part, that is, pixel values Gobs(k, ig, jg) substituted into the spring equation (25) associated with the green light intensity are changed.

The method according to the sixth embodiment is described in further detail below for the case in which the green light intensity (G signal) is determined with reference to FIG. 27.

First, the calculation circuit 24 detects an edge part based on all pixel values Gobs(k, ig, jg) at positions converted into the reference coordinate system. That is, the calculation circuit 24 determines whether there is an edge extending in a vertical direction, in a horizontal direction, in a direction from upper left to lower right, or in a direction from lower right to lower left.

Figure 28:
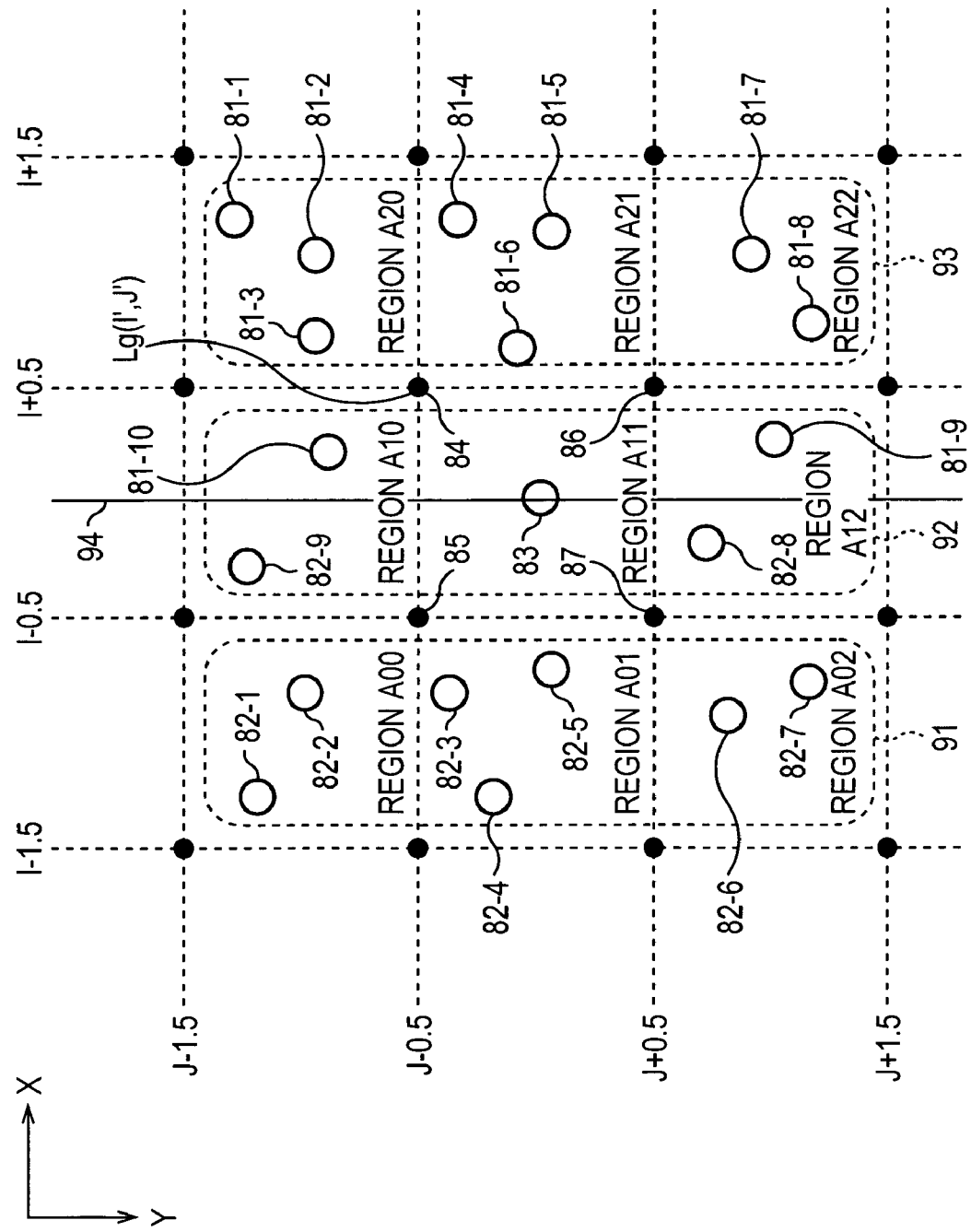
FIG. 28 is a diagram showing an edge extending in a vertical direction.

Referring to FIG. 28, a method of determining whether there is a vertical edge is described below.

FIG. 28 shows a reference coordinate system. In FIG. 28, open circles 81-1 to 81-10, 82-1 to 82-9, and 83 indicate center positions (ig−0.5, jg−0.5) of (ig-th, jg-th) pixels of the k-th image converted, based on conversion parameters (θk, Tkx, Tky, Sk), to representation in the reference coordinate system, and pixel values Gobs(k, ig, jg) are observed at those positions. Note that (k, ig, jg) is different among open circles 81-1 to 81-10, 82-1 to 82-9, and 83.

Each solid circle at an intersection of a lattice represented by dotted lines in FIG. 28 indicates a position (I', J') of green light intensity Lg(I', J') to be determined by the calculation circuit 24. As described earlier, the position (I', J') denotes the center position (i−0.5, j−0.5) of the (i-th, j-th) pixel of the first image employed as the reference image. As in the example shown in FIG. 27, the distance between adjacent Lg(I', J') is equal to 1 in both X and Y directions, and thus the pixel size is equal to 1 in both X and Y directions.

For example, the calculation circuit 24 selects a position denoted by an open circle 83 shown in FIG. 28 as a position of interest, and determines whether there is a vertical edge such as an edge 94 shown in FIG. 28. Herein, let us assume that the position (x, y) denoted by the open circle 83 satisfy inequality I−0.5≦x<I+0.5 and J−0.2≦y<J+0.5. In the example shown in FIG. 28, the position (x, y) denoted by the open circle 83 is located in a rectangular area A11 whose four corners are located at (I+0.5, J−0.5) denoted by a solid circle 84, (I−0.5, J−0.5) denoted by a solid circle 85, (I+0.5, J+0.5) denoted by a solid circle 86, and (I−0.5, J+0.5) denoted by a solid circle 87. I and J are integers as in the previous embodiments.

The calculation circuit 24 defines nine regions each having a size of 1 equal to the size of one pixel such that a region A11 including an open circle 83 of interest is located at the center of these nine regions. These nine regions are: a region A00 defined by I−1.5≦x<I−0.5 and J−1.5≦y<J−0.5; a region A01 defined by I−1.5≦x<I−0.5 and J−0.5≦y<J+0.5; a region A02 defined by I−1.5≦x<I−0.5 and J+0.5≦y<J+1.5; a region A10 defined by I−0.5≦x<I+0.5 and J−1.5≦y<J−0.5; the region A11 defined by I−0.5≦x<I+0.5 and J−0.5≦y<J+0.5; a region A12 defined by I−0.5≦x<I+0.5 and J+0.5≦y<J+1.5; a region A20 defined by I+0.2≦x<I+0.5 and J−1.5≦y<J−0.5; a region A21 defined by I+0.5≦x<I+1.5 and J−0.5≦y<J+0.5; and a region A22 defined by I+0.5≦x<I+0.5 and J+0.5≦y<J+1.5. The current position of interest denoted by the open circle 83 is in the region A11.

The total area including the nine regions A00 to A22 defined for the position of interest denoted by the open circle 83 is referred to as an edge judgment region.

To determine whether there is a horizontal edge such as the edge 94, the calculation circuit 24 calculates the mean value and the variance of pixel values Gobs(k, ig, jg) at locations denoted by open circles in a left region 91 including a region A00, a region A01, and a region A02 in the edge judgment region (hereinafter, this region 91 will be referred to simply as the left region 91), the mean value and the variance of pixel values Gobs(k, ig, jg) at locations denoted by open circles in a central region 92 including a region A10, a region A11, and a region A12 in the edge judgment region (hereinafter, this region 92 will be referred to simply as the central region 92), and the mean value and the variance of pixel values Gobs(k, ig, jg) at locations denoted by open circles in a right region 93 including a region A20, a region A21, and a region A22 in the edge judgment region (hereinafter, this region 93 will be referred to simply as the right region 93).

That is, the calculation circuit 24 determines the mean value EG0 of pixel values Gobs(k, ig, jg) at positions denoted by open circles 82-1 to 82-7 in a left-hand region 91 and also determines the variance SGO of those pixel values Gobs(k, ig, jg). The calculation circuit 24 also determines the mean value EG0" of pixel values Gobs(k, ig, jg) at positions denoted by open circles 81-9, 81-10, 82-8, 82-9, and 83 in a central region 92. Furthermore, the calculation circuit 24 determines the mean value EG0' of pixel values Gobs(k, ig, jg) at positions denoted by open circles 81-1 to 81-8 in a right-hand region 93 and also determines the variance SGO' of those pixel values Gobs(k, ig, jg).

By way of example, if there is a vertical edge 94 close to the position of interest denoted by the open circle 83, the following inequality (a) holds for the mean value EG0 of the left region 91, the mean value EG0" of the central region 92, and the mean value EG0' of the right region 93, and thus the calculation circuit 24 determines that there is a vertical edge when inequality (a) is satisfied.

$$EG0 < EG0'' < EG0' \text{ or } EG0' < EG0'' < EG0 \tag{a}$$

In practice, inequality (a) can be satisfied for an area that is not close to the edge 94, if there is a variation in data due to, for example, a fine pattern of a subject. To avoid the above problem and to make a more reliable determination, the calculation circuit 24 determines whether there is a vertical edge 94 by determining whether the following inequality including variances SG0 and SG0' as additional terms is satisfied, that is, the calculation circuit 24 determines that there is a vertical edge when inequality (b) shown below is satisfied.

$$EG0 + SG0 < EG0'' < EG0' - SG0'$$

or $$EG0' + SG0' < EG0'' < EG0 - SG0 \tag{b}$$

Use of inequality (b) makes it possible to prevent an area in which pixel values have variations due to a fine pattern or the like and thus in which variances SG0 and SG0' are large from being incorrectly identified as an area in which there is an edge.

Figure 29:
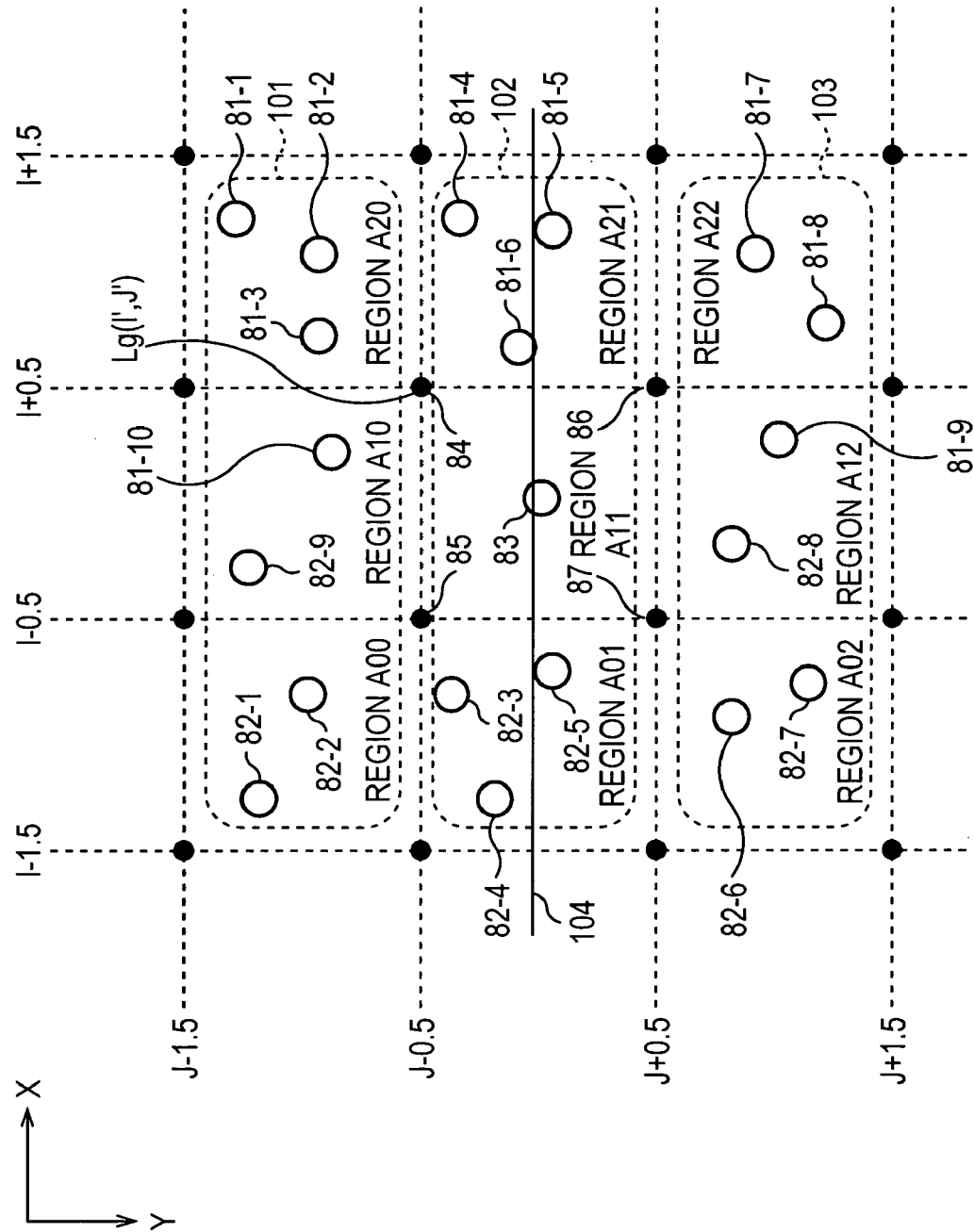
FIG. 29 is a diagram showing an edge extending in a horizontal direction.

A method of determining whether there is a horizontal edge is described below with reference to FIG. 29. In FIG. 29, similar parts to those in FIG. 28 are denoted by similar reference numerals, and a duplicated description thereof is not given herein.

To determine whether there is a horizontal edge 104, the calculation circuit 24 determines the mean value and the variance of pixel values Gobs(k, ig, jg) at positions denoted by open circles in an upper edge-judgment region 101 extending in a horizontal direction and including a region A00, a region A10, and a region A20 (hereinafter, the region 101 will be referred to simply as the upper region 101), the mean value and the variance of pixel values Gobs(k, ig, jg) at positions denoted by open circles in a central edge-judgment region 102 extending in a horizontal direction and including a region A01, a region A11, and a region A21 (hereinafter, the region 102 will be referred to simply as the central region 102), and the mean value and the variance of pixel values Gobs(k, ig, jg) at positions denoted by open circles in a lower edge-judgment region 103 extending in a horizontal direction and including a region A02, a region A12, and a region A22 (hereinafter, the region 103 will be referred to simply as the lower region 103).

That is, the calculation circuit 24 determines the mean value EG1 of pixel values Gobs(k, ig, jg) at positions denoted by open circles 81-1 to 81-3, 81-10, 82-1, 82-2, and 82-9 in an upper region 101 and also determines the variance SG1 of those pixel values Gobs(k, ig, jg). The calculation circuit 24 also determines the mean value EG1" of pixel values Gobs(k, ig, jg) at positions denoted by open circles 81-4 to 81-6, 82-3 to 82-5, and 83 in a central region 102. Furthermore, the calculation circuit 24 determines the mean value EG1' of pixel values Gobs(k, ig, jg) at positions denoted by open circles 81-7 to 81-9 and 82-6 to 82-8 in a lower region 103 and also determines the variance SG1' of those pixel values Gobs (k, ig, jg).

By way of example, if there is a horizontal edge 104 close to the position of interest denoted by the open circle 83, the following inequality (c) holds for the mean value EG1 of the upper region 101, the mean value EG1" of the central region 102, and the mean value EG1' of the lower region 103 taking into account variations in data due to a fine pattern of a subject, and thus the calculation circuit 24 determines that there is a horizontal edge when inequality (c) is satisfied.

$$EG1+SG1<EG1''<EG1'-SG1'$$

or $$EG1'+SG1'<EG1''<EG1-SG1 \quad (c)$$

Use of inequality (c) makes it possible to prevent an area in which pixel values have variations due to a fine pattern or the like and thus in which variances SG1 and SG1' are large from being incorrectly identified as an area in which there is an edge. Note that a determination as to whether there is a horizontal edge may be made based on inequality similar to (a) including only the mean values without taking into account variances.

Figure 30:
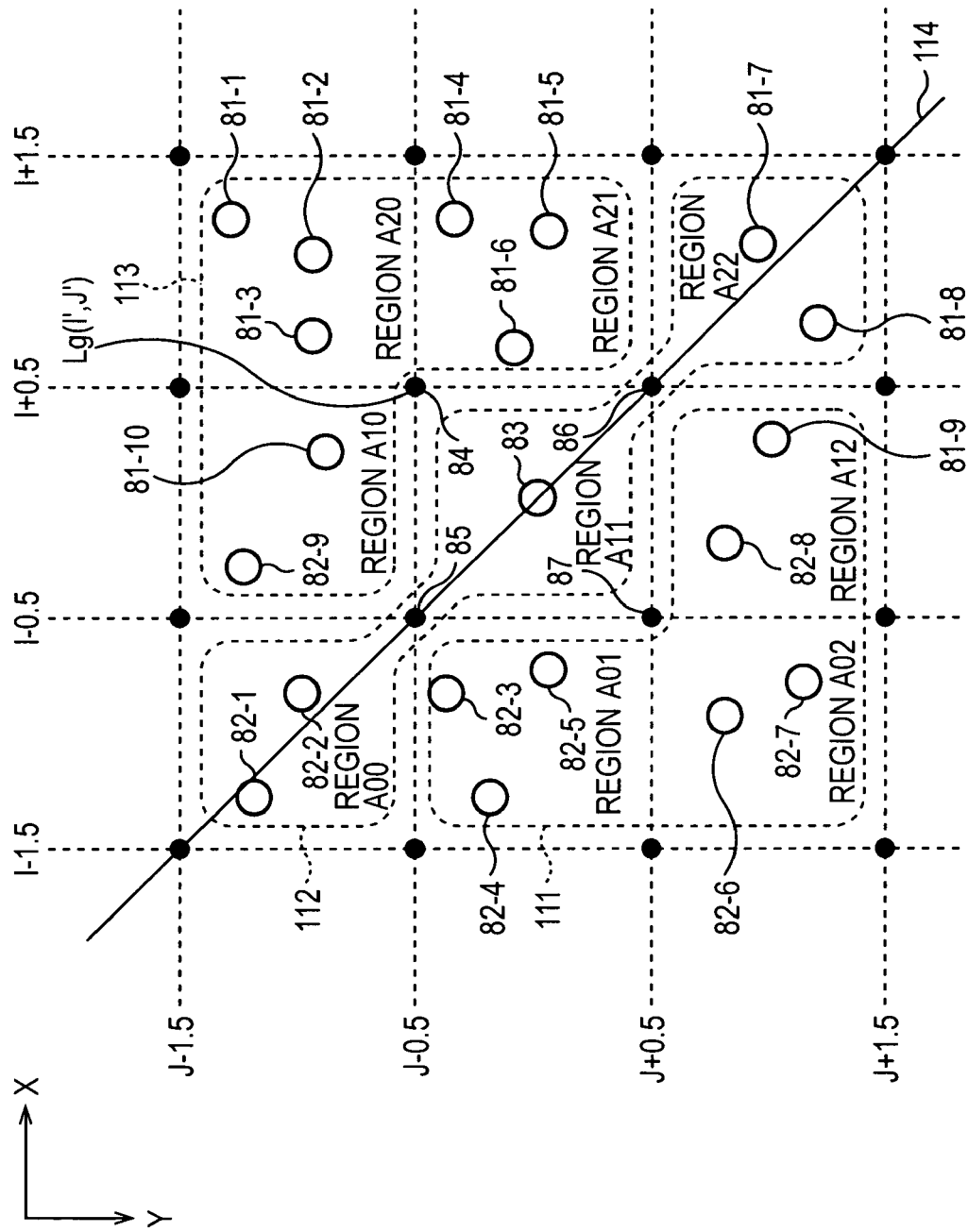
FIG. 30 is a diagram showing an edge extending in a direction from upper left to lower right.

A method of determining whether there is an edge extending from upper left to lower right is described below with reference to FIG. 30. In FIG. 30, similar parts to those in FIG. 28 are denoted by similar reference numerals, and a duplicated description thereof is not given herein.

To determine whether there is an edge 114 extending from upper left to lower right, the calculation circuit 24 determines the mean value and the variance of pixel values Gobs(k, ig, jg) at positions denoted by open circles in a lower-left edge-judgment region 111 including a region A01, a region A02, and a region A12 (hereinafter, the region 111 will be referred to simply as the lower left region 111), the mean value and the variance of pixel values Gobs(k, ig, jg) at positions denoted by open circles in a central edge-judgment region 112 including a region A00, a region A11, and a region A22 (hereinafter, the region 112 will be referred to simply as the central region 112), and the mean value and the variance of pixel values Gobs(k, ig, jg) at positions denoted by open circles in an upper-left edge-judgment region 113 including a region A10, a region A20, and a region A21 (hereinafter, the region 113 will be referred to simply as the upper left region 113).

That is, the calculation circuit 24 determines the mean value EG2 of pixel values Gobs(k, ig, jg) at positions denoted by open circles 81-9 and 82-3 to 82-8 in a lower-left region 111 and also determines the variance SG2 of those pixel values Gobs(k, ig, jg). The calculation circuit 24 also determines the mean value EG2' of pixel values Gobs(k, ig, jg) at positions denoted by open circles 81-7, 81-8, 82-1, 82-2, and 83 in a central region 112. Furthermore, the calculation circuit 24 determines the mean value EG2' of pixel values Gobs(k, ig, jg) at positions denoted by open circles 81-1 to 81-6, 81-10, and 82-9 in an upper right region 113 and also determines the variance SG2' of those pixel values Gobs(k, ig, jg).

By way of example, if there is an edge 114 extending from upper left to lower right at a location close to the position of interest denoted by the open circle 83, the following inequality (d) holds for the mean value EG2 of the left lower 111, the mean value EG2' of the central region 112, and the mean value EG2' of the upper right region 113, taking into account variations in data due to a fine pattern or the like of a subject, and thus the calculation circuit 24 determines that there is an edge extending from upper left to lower right when inequality (d) is satisfied.

$$EG2+SG2<EG2''<EG2'-SG2'$$

or $$EG2'+SG2'<EG2''<EG2-SG2 \quad (d)$$

Use of inequality (d) makes it possible to prevent an area in which pixel values have variations due to a fine pattern or the like and thus in which variances SG2 and SG2' are large from being incorrectly identified as an area in which there is an edge. Note that a determination as to whether there is an edge extending from upper left to lower right may be made based on inequality similar to (a) including only the mean values without taking into account variances.

Figure 31:
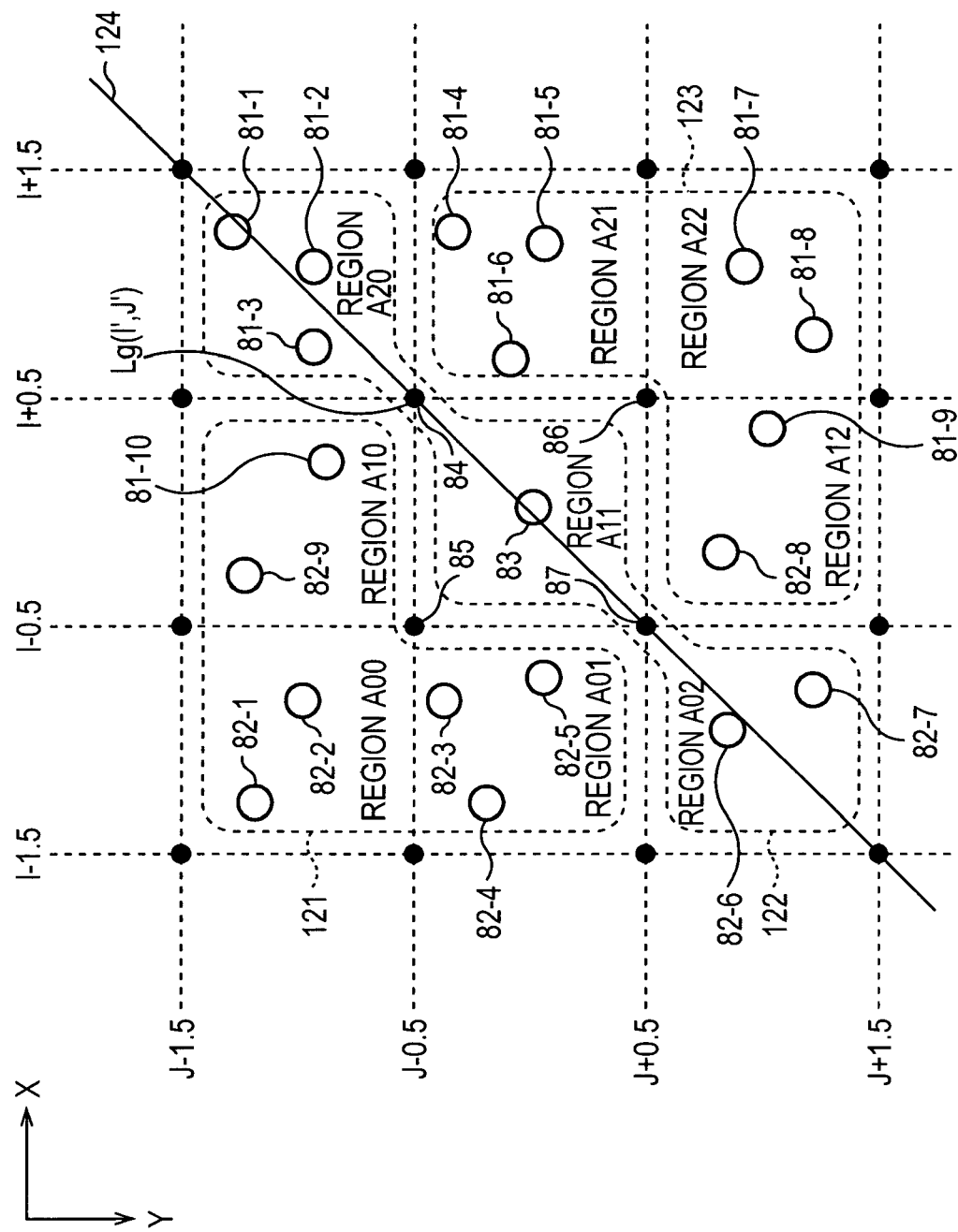
FIG. 31 is a diagram showing an edge extending in a direction from upper right to lower left.

A method of determining whether there is an edge extending from upper right to lower left is described below with reference to FIG. 31. In FIG. 31, similar parts to those in FIG. 28 are denoted by similar reference numerals, and a duplicated description thereof is not given herein.

To determine whether there is an edge 124 extending from upper right to lower left, the calculation circuit 24 determines the mean value and the variance of pixel values Gobs(k, ig, jg) at positions denoted by open circles in an upper-left edge-judgment region 121 including a region A00, a region A01, and a region A10 (hereinafter, the region 121 will be referred to simply as the upper left region 121), the mean value and the variance of pixel values Gobs(k, ig, jg) at positions denoted by open circles in a central edge-judgment region 122 including a region A02, a region A11, and a region A20 (hereinafter, the region 122 will be referred to simply as the central region 122), and the mean value and the variance of pixel values Gobs(k, ig, jg) at positions denoted by open circles in a lower-right edge-judgment region 123 including a region A12, a region A21, and a region A22 (hereinafter, the region 123 will be referred to simply as the lower right region 123).

That is, the calculation circuit 24 determines the mean value EG3 of pixel values Gobs(k, ig, jg) at positions denoted by open circles 81-10, 82-1 to 82-5, and 82-9 in an upper left 121 and also determines the variance SG3 of those pixel values Gobs(k, ig, jg). The calculation circuit 24 also determines the mean value EG3' of pixel values Gobs(k, ig, jg) at positions denoted by open circles 81-1 to 81-3, 82-6, 82-7, and 83 in a central region 122. Furthermore, the calculation circuit 24 determines the mean value EG3' of pixel values Gobs(k, ig, jg) at positions denoted by open circles 81-4 to 81-9 and 82-8 in a lower right region 123 and also determines the variance SG3' of those pixel values Gobs(k, ig, jg).

By way of example, if an edge 124 extending from upper left to lower right is located close to the position of interest denoted by the open circle 83, the following inequality (e) holds for the mean value EG3 of the upper left 121, the mean value EG3' of the central region 122, and the mean value EG3' of the lower right 123 taking into account variations in data due to a fine pattern of a subject, and thus the calculation circuit 24 determines that there is an edge extending from upper left to lower right when inequality (e) is satisfied.

$$EG3+SG3<EG3''<EG3'-SG3'$$

or $$EG3'+SG3'<EG3''<EG3-SG3' \quad (e)$$

Use of inequality (e) makes it possible to prevent an area in which pixel values have variations due to a fine pattern or the like and thus in which variances SG1 and SG1' are large from being incorrectly identified as an area in which there is an edge. Note that a determination as to whether there is an edge extending from upper right to lower left may be made based on inequality similar to (a) including only the mean values without taking into account variances.

As described above with reference to FIGS. 28 to 31, the calculation circuit 24 determines whether there is an edge in each of four directions, the vertical direction, the horizontal direction, the direction from upper left to lower right, and the direction from upper right to lower left, by determining whether inequalities described above are satisfied. Note that the calculation circuit 24 makes the determination as to whether there is an edge not only for the green color but also red and blue colors.

There is a possibility that inequalities described above are satisfied in for a plurality of directions of the above four directions. Because there can exist only one true edge, and thus only one most dominant edge is employed and the other edges are discarded.

More specifically, for example, the calculation circuit 24 calculates the following value in each of the directions in which edges are detected $$|(EGm'-EGm)/(SGm'+SGm)|$$

where m=0 to 3, and the calculation circuit 24 determines m corresponding to the greatest value. If the value is greatest when m=0, a vertical edge is determined to be dominant. If m=1, a horizontal edge is determined to be dominant, If m=2, an edge extending in a direction from upper left to lower right is determined to be dominant. If m=3, an edge extending in a direction from lower left to lower left is determined to be dominant. Note that in the above equation, |x| denotes the absolute value of x.

Depending on the direction of the edge detected at the position of interest, the calculation circuit 24 performs a special process described below on the pixel value Gobs(k, ig, jg) observed at the position of interest in the edge part.

That is, in the special process, when pixel values Gobs(k, ig, jg) are substituted into the spring equation (25) associated with green light intensities, the pixel value Gobs(k, ig, jg) is changed for the pixel value Gobs(k, ig, jg) observed at the position in the edge part.

The changing of the pixel value Gobs(k, ig, jg) to be substituted is performed, for example, in accordance to a first or second method described above.

In the first method, when an edge is detected, for example, at a position of interest denoted by an open circle 83 in FIGS. 28 to 31, the pixel value Gobs(k, ig, jg) at that position is discarded. That is, the pixel value Gobs(k, ig, jg) at the position at which the edge is detected is not incorporated into the spring equation (25) associated with the green light intensity. In other words, a spring that would pull the light intensity in a wrong direction is removed from the spring model shown in FIG. 22 (FIG. 23), and thus the value of Lg(I', J') can be determined more accurately (and thus a shaper image can be obtained).

In the second method, the pixel value Gobs(k, ig, jg) at the position of interest, for example, denoted by an open circle 83 in FIGS. 28 to 31 is replaced with a value calculated from pixel values Gobs(k, ig, jg) observed in nine regions A00 to A22 included in the edge judgment region defined at the position of interest in the edge detection process described above, and the resultant replaced value is substituted into the spring equation (25) associated with the green light intensity.

The second method is described in further detail below.

Figure 32:
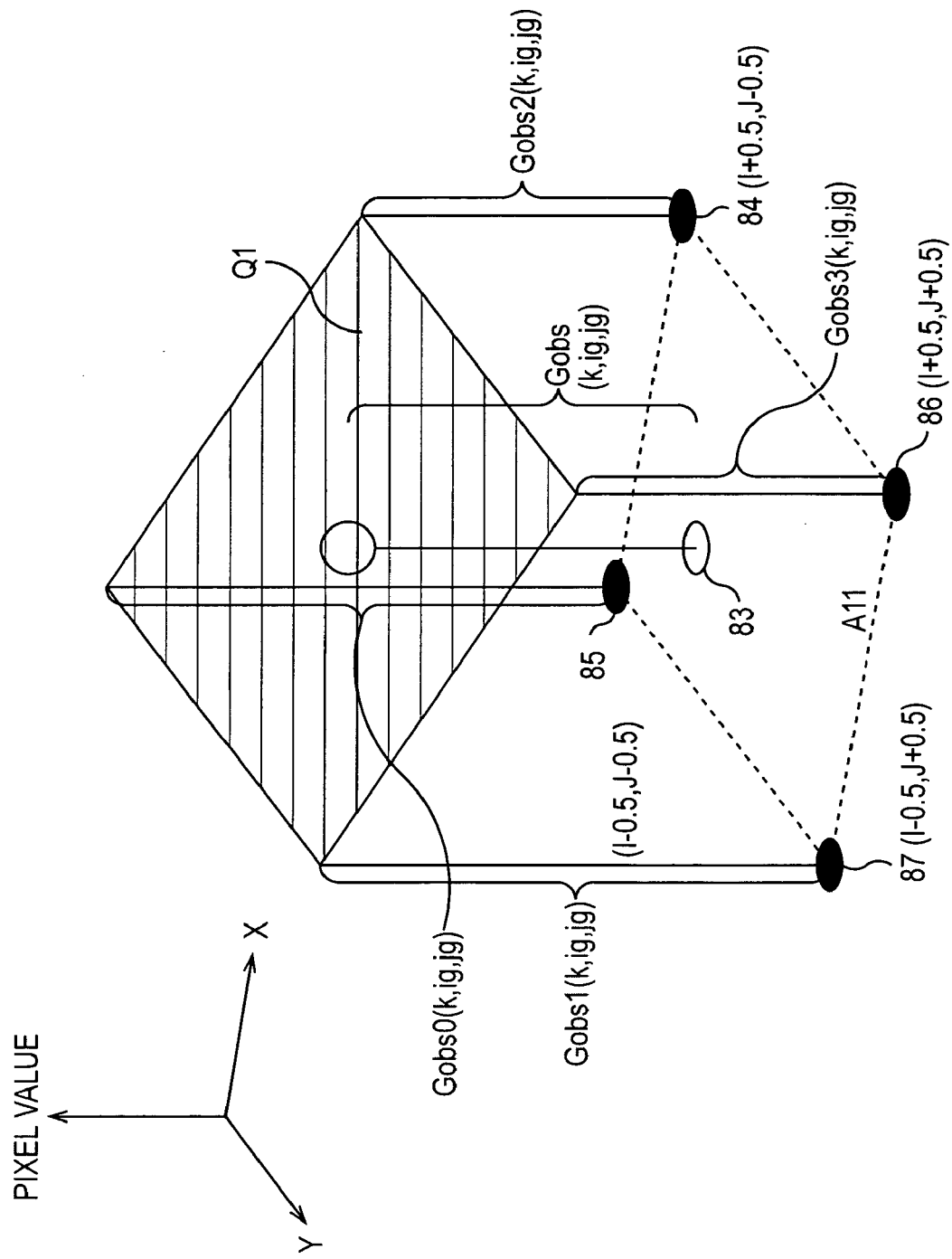
FIG. 32 is a diagram showing a plane Q1 produced when an edge extending in the vertical direction is detected.

FIG. 32 shows a region A11 including a position of interest denoted by an open circle 83 in a state in which a vertical edge shown in FIG. 28 is detected. In FIG. 32, one axis is defined in a X direction in the reference coordinate system, a Y direction in the reference coordinate system is defined in a direction perpendicular to the X direction, and an axis perpendicular to both the X direction and the Y direction represents pixel values.

In the example shown in FIG. 32, the mean values EG0, EG0', and EG0" and the variances SG0 and SG0' determined for the edge judgment region satisfy the condition EG0'+SG0'<EG0"<EG0-SG0, and thus there is a vertical edge.

In this case, the true green light intensity Lg(I−0.5, J−0.5) at a-position (I−0.5, J−0.5) denoted by a solid circle 85 and the true green light intensity Lg(I−0.5, J+0.5) at a position (I−0.5, J+0.5) denoted by a solid circle 87 are greater than the pixel value Gobs(k, ig, jg) observed at a position (x, y) of interest denoted by the open circle 83. The difference between the true green light intensity Lg(I−0.5, J−0.5) at the position (I−0.5, J−0.5) denoted by the solid circle 85 and the pixel value Gobs(k, ig, jg) at the position (x, y) denoted by the open circle 83 and the difference between the true green light intensity Lg(I−0.5, J+0.5) at the position (I−0.5, J+0.5) denoted by the solid circle 87 and the pixel value Gobs(k, ig, jg) at the position (x, y) denoted by the open circle 83 depend on the difference between the mean values EG0 and EG0', that is, EG0−EG0'.

The true green light intensity Lg(I+0.5, J−0.5) at a position (I+0.5, J−0.5) denoted by a solid circle 84 and the true green light intensity Lg(I+0.5, J+0.5) at a position (I+0.5, J+0.5) denoted by a solid circle 86 are greater than the pixel value Gobs(k, ig, jg) observed at the position (x, y) of interest denoted by the open circle 83. The difference between the true green light intensity Lg(I+0.5, J−0.5) at the position (I+0.5, J−0.5) denoted by the solid circle 84 and the pixel value Gobs(k, ig, jg) at the position (x, y) denoted by the open circle 83 and the difference between the true green light intensity Lg(I+0.5, J+0.5) at the position (I+0.5, J+0.5) denoted by the solid circle 86 and the pixel value Gobs(k, ig, jg) at the position (x, y) denoted by the open circle 83 depend on the difference between the mean values EG0 and EG0', that is, EG0−EG0'.

In view of the above, the calculation circuit 24 determines a plane Q1 passing through the pixel value Gobs(k, ig, jg) at the position (x, y) denoted by the open circle 83 and having a slope p in the X direction, where p=(EG0−EG0')/2. The slope p is determined by dividing the difference between the mean value EG0 of pixel values in the left region 91 in FIG. 28 and the mean value EG0' of pixel values in the right region 93 by the center-to-center distance in the X direction between the left region 91 and the right region 92, that is, by 2. Note that the slope p indicates the degree of change in light intensity in a vertical edge part in a direction perpendicular to the edge, that is, the slope p indicates the slope of the edge.

Furthermore, the calculation circuit 24 calculates the value (pixel value) at the position (I−0.5, J−0.5) denoted by the solid circle 85 in the plane Q1. The calculated pixel value is denoted by Gobs0(k, ig, jg). Furthermore, the calculation circuit 24 calculates the value (pixel value) at the position (I−0.5, J+0.5) denoted by the solid circle 87 in the plane Q1 The calculated pixel value is denoted by Gobs1(k, ig, jg). Similarly, the calculation circuit 24 calculates the value (pixel value) at the position (I+0.5, J−0.5) denoted by the solid circle 84 in the plane Q1 and the value (pixel value) at the position (I+0.5, J+0.5) denoted by the solid circle 86 in the plane Q1. The resultant calculated pixel values are denoted as Gobs2(k, ig, jg) and Gobs3(k, ig, jg), respectively.

Because the plane Q1 has a slope p only in the X direction, the pixel value Gobs0(k, ig, jg) and the pixel Gobs1(k, ig, jg) are equal to each other, and the pixel value Gobs2(k, ig, jg) and the pixel Gobs3(k, ig, jg) are equal to each other.

In the third embodiment described above, as shown in FIG. 22, equation (25) is written based on the spring model representing the equilibrium among the tree green intensity Lg(I', J') at the position (I', J') and pixel values Gobs(k, ig, jg)

observed in the vicinity of the position (I', J'). Herein, the pixel values Gobs(k, ig, jg) observed in the vicinity of the position (I', J') refer to those pixel values Gobs(k, ig, jg) whose (k, ig, jg) satisfies I'−1≦x<I'+1 and J'−1≦y<J'+1 with respect to the converted position (x, y) in the reference coordinate system obtained by converting, based on conversion parameters (θk, Tkx, Tky, Sk), the position (ig−0.5, jg−0.5) in the coordinate system of the k-th image.

In FIG. 32, for example, when the position (I+0.5, J −0.5) denoted by the solid circle 84 is selected as the potion (I', J') of interest, the pixel value Gobs(k, ig, jg) at the position (x, y) denoted by the open circle 83 is included in a group of pixel values Gobs(k, ig, jg) observed in the vicinity of the position denoted by the solid circle 84. Therefore, in the third embodiment described above, the pixel value Gobs(k, ig, jg) at the position (x, y) denoted by the open circle 83 is substituted into equation (25).

In contrast, in the sixth embodiment, instead of the pixel value Gobs(k, ig, jg) at the position (x, y) denoted by the open circle 83, the calculated value, that is, the pixel value Gobs2 (k, ig, jg) at the position (I+0.5, J−0.5) denoted by the solid circle 84 in the plane Q1 is substituted into equation (25).

When the position (I−0.5, J−0.5) denoted by the solid circle 85 is selected as the potion (I', J') of interest, instead of the pixel value Gobs(k, ig, jg) at the position (x, y) denoted by the open circle 83, the calculated pixel value Gobs0(k, ig, jg) at the position (I−0.5, J−0.5) denoted by the solid circle 85 in the plane Q1 is substituted into equation (25).

In a case in which the position (I+0.5, J+0.5) denoted by the solid circle 86 is selected as the potion (I', J') of interest, instead of the pixel value Gobs(k, ig, jg) at the position (x, y) denoted by the open circle 83, the calculated pixel value Gobs3(k, ig, jg) at the position (I+0.5, J+0.5) denoted by the solid circle 86 in the plane Q1 is substituted into equation (25).

When the position (I−0.5, J+0.5) denoted by the solid circle 87 is selected as the potion (I', J') of interest, instead of the pixel value Gobs(k, ig, jg) at the position (x, y) denoted by the open circle 83, the calculated pixel value Gobs1(k, ig, jg) at the position (I−0.5, J+0.5) denoted by the solid circle 87 in the plane Q1 is substituted into equation (25).

As described above, when a pixel value Gobs(k, ig, jg) (such as that at the position denoted by the open circle 83 in FIG. 32) is observed in a vertical edge part (where there is an abrupt change in green light intensity), the pixel value is changed (corrected) to a pixel value (Gobs0(k, ig, jg), Gobs1 (k, ig, jg), Gobs2(k, ig, jg), or Gobs3(k, ig, jg)) depending on the slope p of the edge (the degree of change in pixel value), the changed pixel value is substituted into equation (25). As a result, in the spring model, the object V indicating Lg(I', J') shown in FIG. 23 is pulled to a correct position, and thus the obtained value Lg(I', J') is more likely to be the true green light intensity (and thus a shaper image can be obtained).

Figure 33:
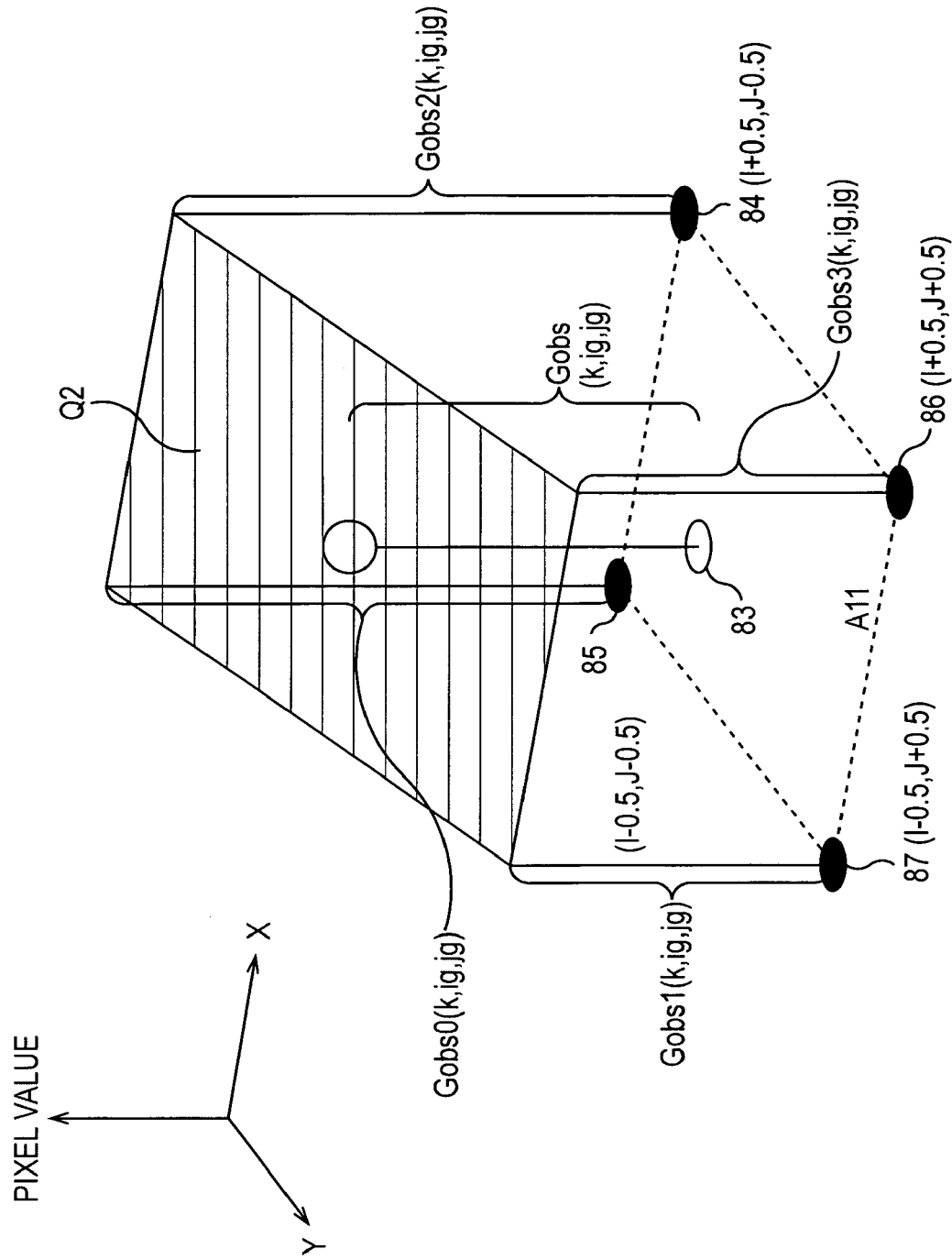
FIG. 33 is a diagram showing a plane Q2 produced when an edge extending in the horizontal direction is detected.

FIG. 33 shows the region A11 including the position of interest denoted by then open circle 83 in a state in which a horizontal edge shown in FIG. 29 is detected. In FIG. 33, one axis is defined in a X direction in the reference coordinate system, a Y direction in the reference coordinate system is defined in a direction perpendicular to the X direction, and an axis perpendicular to both the X direction and the Y direction represents pixel values.

In the example shown in FIG. 33, the mean values EG1, EG1', and EG1" and the variances SG1 and SG1' determined for the edge judgment region satisfy the condition EG1'+SG1'<EG1"<EG1−SG1, and thus there is a horizontal edge.

In this case, the true green light intensity Lg(I+0.5, J−0.5) at a position (I+0.5, J−0.5) denoted by the solid circle 84 and the true green light intensity Lg(I−0.5, J−0.5) at the position (I−0.5, J−0.5) denoted by the solid circle 85 are greater than the pixel value Gobs(k, ig, jg) observed at a position (x, y) of interest denoted by the open circle 83. The difference between the true green light intensity Lg(I+0.5, J−0.5) at the position (I+0.5, J−0.5) denoted by the solid circle 84 and the pixel value Gobs(k, ig, jg) at the position (x, y) denoted by the open circle 83 and the difference between the true green light intensity Lg(I−0.5, J−0.5) at the position (I−0.5, J−0.5) denoted by the solid circle 85 and the pixel value Gobs(k, ig, jg) at the position (x, y) denoted by the open circle 83 depend on the difference between the mean values EG1 and EG1', that is, EG1−EG1'.

The true green light intensity Lg(I+0.5, J+0.5) at a position (I+0.5, J+0.5) denoted by a solid circle 86 and the true green light intensity Lg(I−0.5, J+0.5) at a position (I−0.5, J+0.5) denoted by a solid circle 87 are greater than the pixel value Gobs(k, ig, jg) observed at the position (x, y) of interest denoted by the open circle 83. The difference between the true green light intensity Lg(I+0.5, J+0.5) at the position (I+0.5, J+0.5) denoted by the solid circle 86 and the pixel value Gobs(k, ig, jg) at the position (x, y) denoted by the open circle 83 and the difference between the true green light intensity Lg(I−0.5, J+0.5) at the position (I−0.5, J+0.5) denoted by the solid circle 87 and the pixel value Gobs(k, ig, jg) at the position (x, y) denoted by the open circle 83 depend on the difference between the mean values EG1 and EG1', that is, EG1−EG1'.

In view of the above, the calculation circuit 24 determines a plane Q2 passing through the pixel value Gobs(k, ig, jg) at the position (x, y) denoted by the open circle 83 and having a slope p in the Y direction, where p=(EG1−EG01)/2. The slope p is determined by dividing the difference between the mean value EG1 of pixel values in the upper region 101 in FIG. 29 and the mean value EG1' of pixel values in the lower region 103 by the center-to-center distance in the Y direction between the upper region 101 and the lower region 103, that is, by 2. Note that the slope p indicates the degree of change in light intensity in a horizontal edge part in a direction perpendicular to the edge, that is, the slope p indicates the slope of the edge.

Furthermore, the calculation circuit 24 calculates the value (pixel value) at the position (I−0.5, J−0.5) denoted by the solid circle 85 in the plane Q2. The calculated pixel value is denoted by Gobs0(k, ig, jg). Furthermore, the calculation circuit 24 calculates the value (pixel value) at the position (I−0.5, J+0.5) denoted by the solid circle 87 in the plane Q2. The calculated pixel value is denoted by Gobs1(k, ig, jg). Similarly, the calculation circuit 24 calculates the value (pixel value) at the position (I+0.5, J−0.5) denoted by the solid circle 84 in the plane Q2 and the value (pixel value) at the position (I+0.5, J+0.5) denoted by the solid circle 86 in the plane Q2. The resultant calculated pixel values are denoted as Gobs2(k, ig, jg) and Gobs3(k, ig, jg), respectively.

Because the plane Q2 has a slope p only in the Y direction, the pixel value Gobs0(k, ig, jg) and the pixel Gobs2(k, ig, jg) are equal to each other, and the pixel value Gobs1(k, ig, jg) and the pixel Gobs3(k, ig, jg) are equal to each other.

For the horizontal edge, substitution is performed in a similar manner to the vertical edge shown in FIG. 32. That is, when the position (I+0.5, J−0.5) denoted by the solid circle 84 is selected as the potion (I', J') of interest, instead of the pixel value Gobs(k, ig, jg) at the position (x, y) denoted by the open circle 83, the calculated pixel value Gobs2(k, ig, jg) at the position (I+0.5, J−0.5) denoted by the solid circle 84 in the plane Q2 is substituted into equation (25).

When the position (I−0.5, J−0.5) denoted by the solid circle 85 is selected as the potion (I', J') of interest, instead of the pixel value Gobs(k, ig, jg) at the position (x, y) denoted by the open circle 83, the calculated pixel value Gobs0(k, ig, jg) at the position (I−0.5, J−0.5) denoted by the solid circle 85 in the plane Q2 is substituted into equation (25).

When the position (I+0.5, J+0.5) denoted by the solid circle 86 is selected as the potion (I', J') of interest, instead of the pixel value Gobs(k, ig, jg) at the position (x, y) denoted by the open circle 83, the calculated pixel value Gobs3(k, ig, jg) at the position (I+0.5, J+0.5) denoted by the solid circle 86 in the plane Q2 is substituted into equation (25).

When the position (I−0.5, J+0.5) denoted by the solid circle 87 is selected as the potion (I', J') of interest, instead of the pixel value Gobs(k, ig, jg) at the position (x, y) denoted by the open circle 83, the calculated pixel value Gobs1(k, ig, jg) at the position (x, y) denoted by the solid circle 87 in the plane Q2 is substituted into equation (25).

As described above, when a pixel value Gobs(k, ig, jg) (such as that at the position denoted by the open circle 83 in FIG. 33) is observed in a horizontal edge part (where there is an abrupt change in green light intensity), the pixel value is changed (corrected) to a pixel value (Gobs0(k, ig, jg), Gobs1 (k, ig, jg), Gobs2(k, ig, jg), or Gobs3(k, ig, jg)) depending on the slope p of the edge (the degree of change in pixel value), the changed pixel value is substituted into equation (25). As a result, in the spring model, the object V indicating Lg(I', J') shown in FIG. 23 is pulled to a correct position, and thus the obtained value Lg(I', J') is more likely to be the true green light intensity (and thus a shaper image can be obtained).

Figure 34:
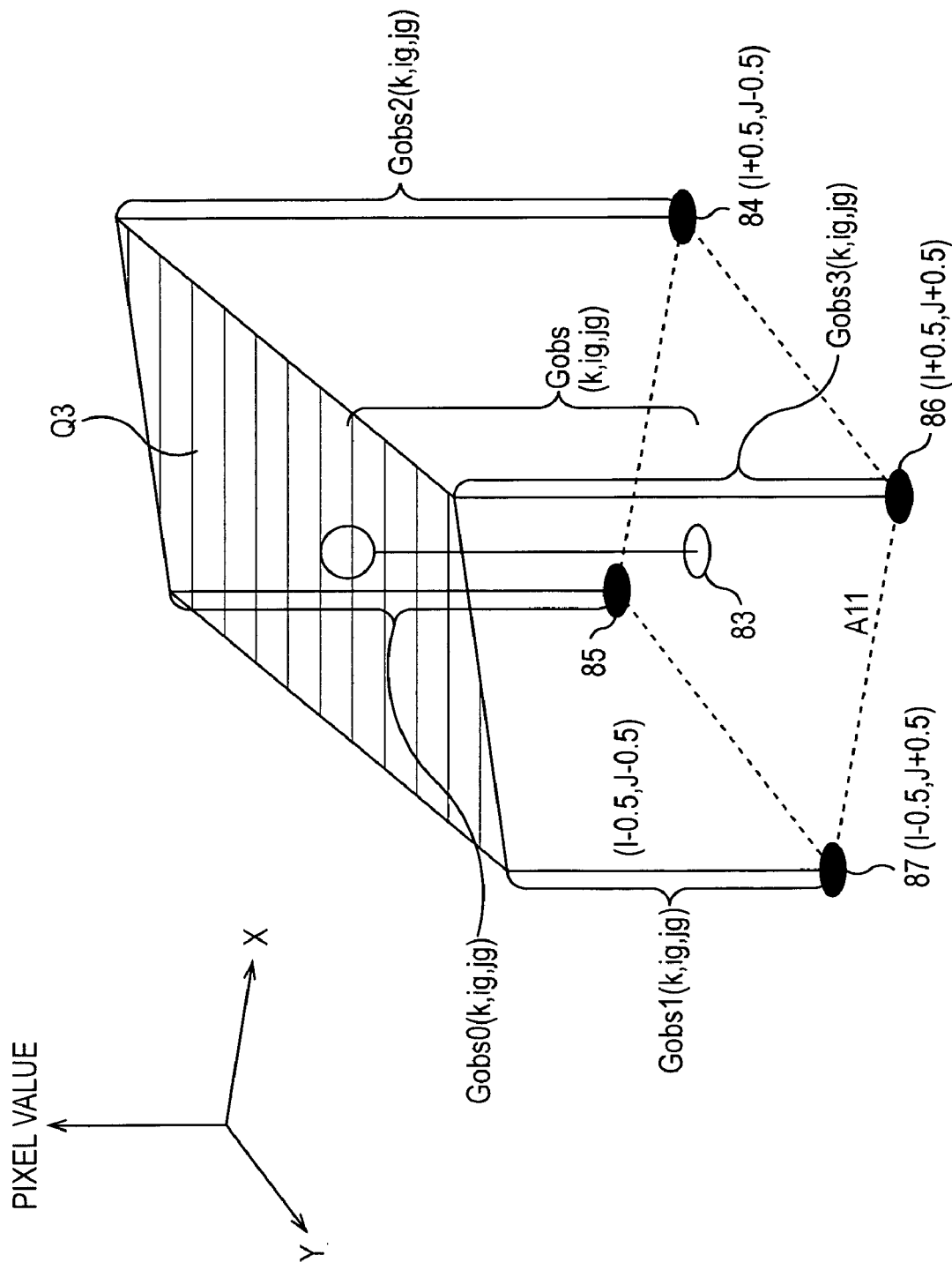
FIG. 34 is a diagram showing a plane Q3 produced when an edge extending in the direction from upper left to lower right.

FIG. 34 shows the region A11 including the position of interest denoted by then open circle 83 in a state in which an edge extending in a direction from upper left to lower right shown in FIG. 30 is detected. In FIG. 34, one axis is defined in a X direction in the reference coordinate system, a Y direction in the reference coordinate system is defined in a direction perpendicular to the X direction, and an axis perpendicular to both the X direction and the Y direction represents pixel values.

In the example shown in FIG. 34, the mean values EG2, EG2', and EG2" and the variances SG2 and SG2' determined for the edge judgment region satisfy the condition EG2'+SG2'<EG2"<EG2'−SG2', and thus there is an edge extending in the direction from upper left to lower right.

In this case, the true green light intensity Lg(I+0.5, J−0.5) at a position (I+0.5, J−0.5) denoted by a solid circle 84 is greater than the pixel value Gobs(k, ig, jg) observed at the position (x, y) of interest denoted by the open circle 83. The difference between the true green light intensity Lg(I+0.5, J−0.5) at the position (I+0.5, J−0.5) denoted by the solid circle 84 and the pixel value Gobs(k, ig, jg) at the position (x, y) denoted by the open circle 83 depend on the difference between the mean values EG2 and EG2', that is, EG2−EG2'.

The true green light intensity Lg(I−0.5, J+0.5) at a position (I−0.5, J+0.5) denoted by a solid circle 87 is greater than the pixel value Gobs(k, ig, jg) observed at the position (x, y) of interest denoted by the open circle 83. The difference between the true green light intensity Lg(I−0.5, J+0.5) at the position (I−0.5, J+0.5) denoted by the solid circle 87 and the pixel value Gobs(k, ig, jg) at the position (x, y) denoted by the open circle 83 depend on the difference between the mean values EG2' and EG2, that is, EG2'−EG2.

In view of the above, the calculation circuit 24 determines a plane Q3 passing through the pixel value Gobs(k, ig, jg) at the position (x, y) of interest denoted by the open circle 83 and having a slope p in a diagonal direction of the region A11, that is, in a direction from the position (I+0.5, J−0.5) denoted by the solid circle 84 to the position (I−0.5, J+0.5) denoted by the solid circle 87, where p=(EG2'−EG2)/2√2. The slope p is determined by dividing the difference between the mean value EG2' of pixel values in the upper right region 113 in FIG. 30 and the mean value EG2 of pixel values in the lower left region 111 by 2√2, that is, the center-to-center distance in a diagonal direction from the position (I+0.5, J−0.5) denoted by the solid circle 84 to the position (I−0.5, J+0.5) denoted by the solid circle 87 between the region A20 in the upper right region 113 and the region A02 in the lower left region 111. Note that the slope p of an edge part extending in the direction from upper left to lower right indicates the degree of change in light intensity in a direction perpendicular to the edge, that is, the slope p indicates the slope of the edge.

Furthermore, the calculation circuit 24 calculates the value (pixel value) at the position (I−0.5, J−0.5) denoted by the solid circle 85 in the plane Q3. The calculated pixel value is denoted by Gobs0(k, ig, jg). The calculation circuit 24 also calculates the value (pixel value) at the position (I−0.5, J+0.5) denoted by the solid circle 87 in the plane Q3. The calculated pixel value is denoted by Gobs1(k, ig, jg). Similarly, the calculation circuit 24 calculates the value (pixel value) at the position (I+0.5, J−0.5) denoted by the solid circle 84 in the plane Q3 and the value (pixel value) at the position (I+0.5, J+0.5) denoted by the solid circle 86 in the plane Q3. The resultant calculated pixel values are denoted as Gobs2(k, ig, jg) and Gobs3(k, ig, jg), respectively.

Because the plane Q3 has a slope p only in the diagonal direction of the region A11, that is, in the direction from the position (I+0.5, J−0.5) denoted by the solid circle 84 to the position (I−0.5, J+0.5) denoted by the solid circle 87, the pixel value Gobs0(k, ig, jg) and the pixel Gobs3(k, ig, jg) are equal to each other.

For the edge extending in the direction from upper left to lower right, substitution is performed in a similar manner to the vertical edge shown in FIG. 32. That is, when the position (I+0.5, J−0.5) denoted by the solid circle 84 is selected as the potion (I', J') of interest, instead of the pixel value Gobs(k, ig, jg) at the position (x, y) denoted by the open circle 83, the calculated pixel value Gobs2(k, ig, jg) at the position (I+0.5, J−0.5) denoted by the solid circle 84 in the plane Q3 is substituted into equation (25).

When the position (I−0.5, J−0.5) denoted by the solid circle 85 is selected as the potion (I', J') of interest, instead of the pixel value Gobs(k, ig, jg) at the position (x, y) denoted by the open circle 83, the calculated pixel value Gobs0(k, ig, jg) at the position (I−0.5, J−0.5) denoted by the solid circle 85 in the plane Q3 is substituted into equation (25).

When the position (I+0.5, J+0.5) denoted by the solid circle 86 is selected as the potion (I', J') of interest, instead of the pixel value Gobs(k, ig, jg) at the position (x, y) denoted by the open circle 83, the calculated pixel value Gobs3(k, ig, jg) at the position (I+0.5, J+0.5) denoted by the solid circle 86 in the plane Q3 is substituted into equation (25).

When the position (I−0.5, J+0.5) denoted by the solid circle 87 is selected as the potion (I', J') of interest, instead of the pixel value Gobs(k, ig, jg) at the position (x, y) denoted by the open circle 83, the calculated pixel value Gobs1(k, ig, jg) at the position (I−0.5, J+0.5) denoted by the solid circle 87 in the plane Q3 is substituted into equation (25).

As described above, when a pixel value Gobs(k, ig, jg) (such as that at the position denoted by the open circle 83 in FIG. 34) is observed in an edge part extending in the direction from upper left to lower right (where there is an abrupt change in green light intensity), the pixel value is changed (corrected) to a pixel value (Gobs0(k, ig, jg), Gobs1(k, ig, jg), Gobs2(k, ig, jg), or Gobs3(k, ig, jg)) depending on the slope p of the edge (the degree of change in pixel value), the changed pixel value is substituted into equation (25). As a result, in the spring model, the object V indicating Lg(I', J') shown in FIG. 23 is pulled to a correct position, and thus the obtained value Lg(I', J') is more likely to be the true green light intensity (and thus a shaper image can be obtained).

Figure 35:
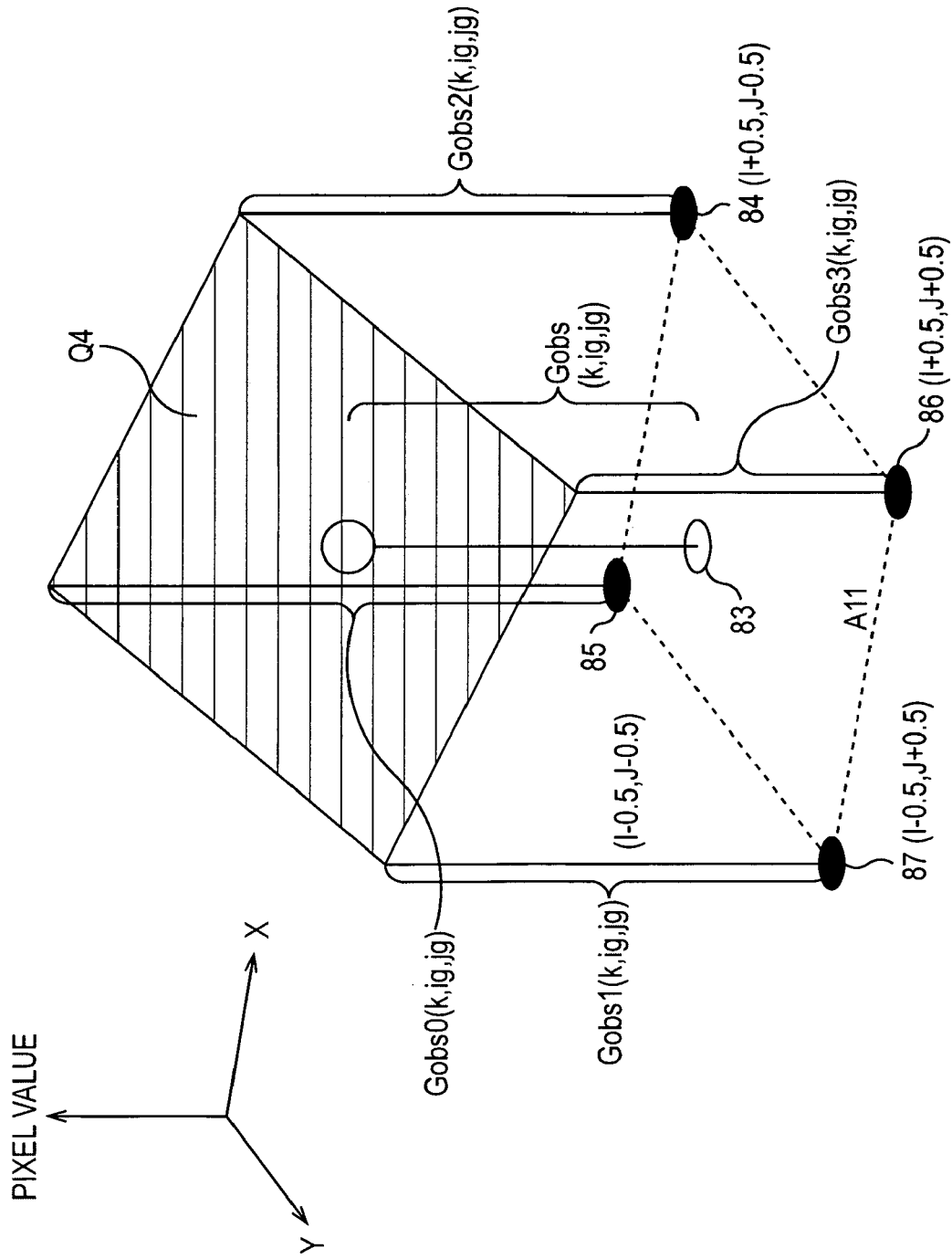
FIG. 35 is a diagram showing a plane Q4 produced when an edge extending in the direction from upper right to lower left.

FIG. 35 shows the region A11 including the position of interest denoted by then open circle 83 in a state in which an edge extending in a direction from upper right to lower left shown in FIG. 31 is detected. In FIG. 34, one axis is defined in a X direction in the reference coordinate system, a Y direction in the reference coordinate system is defined in a direction perpendicular to the X direction, and an axis perpendicular to both the X direction and the Y direction represents pixel values.

In the example shown in FIG. 35, the mean values EG3, EG3', and EG3" and the variances SG3 and SG3' determined for the edge judgment region satisfy the condition EG3'+SG3'<EG3"<EG3- SG3, and thus there is an edge extending in the direction from upper right to lower left.

In this case, the true green light intensity Lg(I−0.5, J−0.5) at the position (I−0.5, J−0.5) denoted by the solid circle 85 is greater than the pixel value Gobs(k, ig, jg) observed at the position (x, y) of interest denoted by the open circle 83. The difference between the true green light intensity Lg(I−0.5, J−0.5) at the position (I−0.5, J−0.5) denoted by the solid circle 85 and the pixel value Gobs(k, ig, jg) at the position (x, y) denoted by the open circle 83 depend on the difference between the mean values EG3 and EG3', that is, EG3−EG3'.

The true green light intensity Lg(I+0.5, J+0.5) at the position (I+0.5, J+0.5) denoted by the solid circle 86 is greater than the pixel value Gobs(k, ig, jg) observed at the position (x, y) of interest denoted by the open circle 83. The difference between the true green light intensity Lg(I+0.5, J+0.5) at the position (I+0.5, J+0.5) denoted by the solid circle 86 and the pixel value Gobs(k, ig, jg) at the position (x, y) denoted by the open circle 83 depend on the difference between the mean values EG3 and EG3', that is, EG3−EG3'.

In view of the above, the calculation circuit 24 determines a plane Q4 passing through the pixel value Gobs(k, ig, jg) at the position (x, y) of interest denoted by the open circle 83 and having a slope p in a diagonal direction of the region A11, that is, in a direction from the position (I−0.5, J−0.5) denoted by the solid circle 85 to the position (I+0.5, J+0.5) denoted by the solid circle 86, where p=(EG3−EG3')/2√2. The slope p is determined by dividing the difference between the mean value EG3 of pixel values in the upper left region 121 in FIG. 31 and the mean value EG3' of pixel values in the lower right region 123 by 2√2, that is, the center-to-center distance in a diagonal direction from the position (I−0.5, J−0.5) denoted by the solid circle 85 to the position (I+0.5, J+0.5) denoted by the solid circle 86 between the region A00 in the upper left region 121 and the region A22 in the lower right region 123. Note that the slope p of an edge part extending in the direction from upper right to lower left indicates the degree of change in light intensity in a direction perpendicular to the edge, that is, the slope p indicates the slope of the edge.

Furthermore, the calculation circuit 24 calculates the value (pixel value) at the position (I−0.5, J−0.5) denoted by the solid circle 85 in the plane Q4. The calculated pixel value is denoted by Gobs0(k, ig, jg). The calculation circuit 24 also calculates the value (pixel value) at the position (I−0.5, J+0.5) denoted by the solid circle 87 in the plane Q4. The calculated pixel value is denoted by Gobs1(k, ig, jg). Similarly, the calculation circuit 24 calculates the value (pixel value) at the position (I+0.5, J−0.5) denoted by the solid circle 84 in the plane Q4 and the value (pixel value) at the position (I+0.5, J+0.5) denoted by the solid circle 86 in the plane Q4. The resultant calculated pixel values are denoted as Gobs2(k, ig, jg) and Gobs3(k, ig, jg), respectively.

Because the plane Q4 has a slope p only in the diagonal direction of the region A11, that is, in the direction from the position (I−0.5, J−0.5) denoted by the solid circle 85 to the position (I+0.5, J+0.5) denoted by the solid circle 86, the pixel value Gobs1(k, ig, jg) and the pixel Gobs2(k, ig, jg) are equal to each other.

For the edge extending in the direction from upper right to lower left, substitution is performed in a similar manner to the vertical edge shown in FIG. 32. That is, when the position (I+0.5, J−0.5) denoted by the solid circle 84 is selected as the potion (I', J') of interest, instead of the pixel value Gobs(k, ig, jg) at the position (x, y) denoted by the open circle 83, the calculated pixel value Gobs2(k, ig, jg) at the position (I+0.5, J−0.5) denoted by the solid circle 84 in the plane Q4 is substituted into equation (25).

When the position (I−0.5, J−0.5) denoted by the solid circle 85 is selected as the potion (I', J') of interest, instead of the pixel value Gobs(k, ig, jg) at the position (x, y) denoted by the open circle 83, the calculated pixel value Gobs0(k, ig, jg) at the position (I−0.5, J−0.5) denoted by the solid circle 85 in the plane Q4 is substituted into equation (25).

When the position (I+0.5, J+0.5) denoted by the solid circle 86 is selected as the potion (I', J') of interest, instead of the pixel value Gobs(k, ig, jg) at the position (x, y) denoted by the open circle 83, the calculated pixel value Gobs3(k, ig, jg) at the position (I+0.5, J+0.5) denoted by the solid circle 86 in the plane Q4 is substituted into equation (25).

When the position (I−0.5, J+0.5) denoted by the solid circle 87 is selected as the potion (I', J') of interest, instead of the pixel value Gobs(k, ig, jg) at the position (x, y) denoted by the open circle 83, the calculated pixel value Gobs1(k, ig, jg) at the position (I−0.5, J+0.5) denoted by the solid circle 87 in the plane Q4 is substituted into equation (25).

As described above, when a pixel value Gobs(k, ig, jg) (such as that at the position denoted by the open circle 83 in FIG. 35) is observed in an edge part extending in the direction from upper right to lower left (where there is an abrupt change in green light intensity), the pixel value is changed (corrected) to a pixel value (Gobs0(k, ig, jg), Gobs1(k, ig, jg), Gobs2(k, ig, jg), or Gobs3(k, ig, jg)) depending on the slope p of the edge (the degree of change in pixel value), the changed pixel value is substituted into equation (25). As a result, in the spring model, the object V indicating Lg(I', J') shown in FIG. 23 is pulled to a correct position, and thus the obtained value Lg(I', J') is more likely to be the true green light intensity (and thus a shaper image can be obtained).

From the above discussion, in this sixth embodiment, a spring equation associated with the green light intensity corresponding to equation (25) according to the third embodiment is given by equation (34) shown below. Note that the true red light intensity Lr(I', J') and the true blue light intensity Lb(I', J') can be determined in a similar manner to the true green light intensity Lg(I', J').

$$\sum \left[ \frac{\sqrt{2} - F((x, y), (I', J'))}{(Mk \times E)} \times \{Gobs'(k, ig, jg) - Lg(I', J')\} \right] = 0 \quad (34)$$

For the given position (I', J'), the sum Σ in equation (34) is taken for all combinations (k, ig, jg) that satisfy I'−1≦x<I'+1 and J'−1≦y<J'+1 with respect to the position (x, y) in the reference coordinate system obtained by converting, based on conversion parameters (θk, Tkx, Tky, Sk), the position (ig−0.5, jg−0.5) on the k-th image.

Note that when one of a vertical edge, a horizontal edge, an edge extending from upper left to lower right, and an edge extending from upper right to lower left is detected at a position of a pixel value Gobs(k, ig, jg) of one of combinations of integers (k, ig, jg) included in equation (34), a calculated pixel value at a position (I', J') in a plane passing through that pixel value Gobs(k, ig, jg) of (k, ig, jg) and having the slope p equal to the slope of the edge is substituted into Gobs'(k, ig, jg) of equation (34) instead of the pixel value Gobs(k, ig, jg) of (k, ig, jg). When none of a vertical edge, a horizontal edge, an edge extending from upper left to lower right, and an edge extending from upper right to lower left is detected at a position of a pixel value Gobs(k, ig, jg) of any of combinations of integers (k, ig, jg) included in equation (34), the pixel value Gobs(k, ig, jg) of (k, ig, jg) is directly substituted into Gobs'(k, ig, jg) in equation (34).

Furthermore, in this sixth embodiment, a spring equation associated with the green light intensity and a spring equation associated with the blue light intensity corresponding to equations (26) and (27) according to the third embodiment are is given by equations (35) and (36) shown below.

$$\sum \left\{ \frac{\sqrt{2} - F((x, y), (I', J'))}{(Mk \times E)} \times \{Robs'(k, ir, jr) - Lr(I', J')\} \right\} = 0 \quad (35)$$

For the given position (I', J'), the sum Σ in equation (35) is taken for all combinations (k, ir, jr) that satisfy I'−1≦x<I'+1 and J'−1≦y<J'+1 with respect to the position (x, y) in the reference coordinate system obtained by converting, based on conversion parameters (θk, Tkx, Tky, Sk), the position (ir−0.5, jr−0.5) on the k-th image.

Note that when one of a vertical edge, a horizontal edge, an edge extending from upper left to lower right, and an edge extending from upper right to lower left is detected at a position of a pixel value Robs(k, ir, jr) of one of combinations of integers (k, ir, jr) included in equation (35), a calculated pixel value at a position (I', J') in a plane passing through that pixel value Robs(k, ir, jr) of (k, ir, jr) and having the slope p equal to the slope of the edge is substituted into Robs'(k, ir, jr) in equation (35) instead of the pixel value Robs(k, ir, jr) of (k, ir, jr). When none of a vertical edge, a horizontal edge, an edge extending from upper left to lower right, and an edge extending from upper right to lower left is detected at a position of a pixel value Gobs(k, ig, jg) of any of combinations of integers (k, ig, jg) included in equation (35), the pixel value Robs(k, ir, jr) of (k, ir, jr) is directly substituted into Robs'(k, ir, jr) in equation (35).

$$\sum \left\{ \frac{\sqrt{2} - F((x, y), (I', J'))}{(Mk \times E)} \times \{Bobs'(k, ib, jb) - Lb(I', J')\} \right\} = 0 \quad (36)$$

For the given position (I', J'), the sum I in equation (36) is taken for all combinations (k, ib, jb) that satisfy I'−1≦x<I'+1 and J'−1≦y<J'+1 with respect to the position (x, y) in the reference coordinate system obtained by converting, based on conversion parameters (θk, Tkx, Tky, Sk), the position (ib−0.5, jb−0.5) on the k-th image.

Note that when one of a vertical edge, a horizontal edge, an edge extending from upper left to lower right, and an edge extending from upper right to lower left is detected at a position of a pixel value Bobs(k, ib, jb) of one of combinations of integers (k, ib, jb) included in equation (36), a calculated pixel value at a position (I', J') in a plane passing through that pixel value Bobs(k, ib, jb) of (k, ib, jb) and having the slope equal to the slope of the edge is substituted into Bobs'(k, ib, jb) of equation (36) instead of the pixel value Bobs(k, ib, jb) of (k, ib, jb). When none of a vertical edge, a horizontal edge, an edge extending from upper left to lower right, and an edge extending from upper right to lower left is detected at a position of a pixel value Gobs(k, ig, jg) of any of combinations of integers (k, ig, jg) included in equation (36), the pixel value Bobs(k, ib, jb) of (k, ib, jb) is directly substituted into Bobs'(k, ib, jb) in equation (36).

Figure 36:
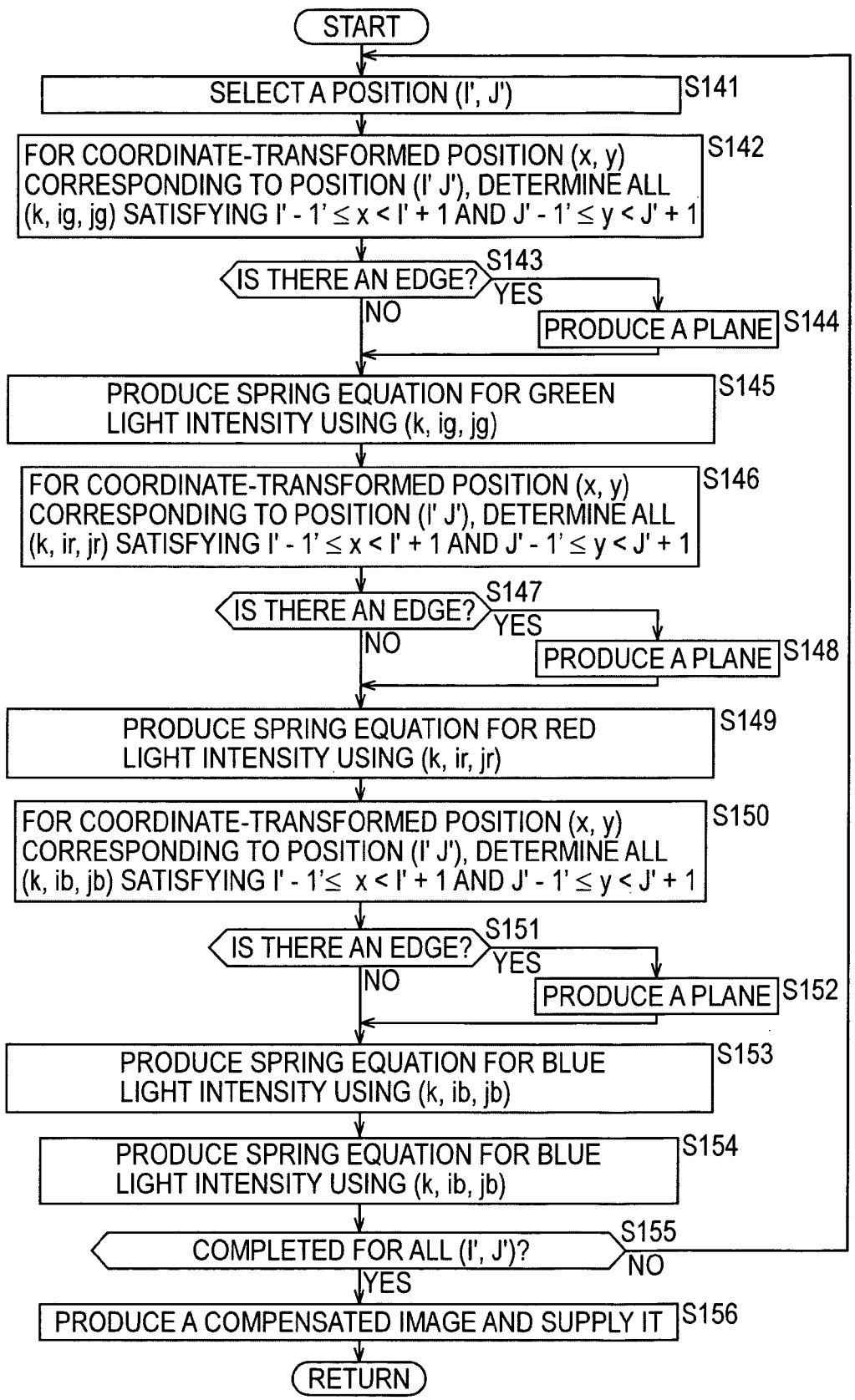
FIG. 36 a flow chart showing an image estimation process according to a sixth embodiment.

Now, referring to a flow chart shown in FIG. 36, a correct image estimation process in step S4 shown in FIG. 2 according to a sixth embodiment of the present invention is described.

First, in step S141, the calculation circuit 24 selects a position (I', J') in the reference coordinate system (hereinafter, such a selected position will be referred to a position (I', J') of interest). Note that the position (I', J') of interest is at the center (i−0.5, j−0.5) of a (i-th, j-th) pixel of the first image taken as the reference image.

Thereafter, the process proceeds from step S141 to step S142. In step S142, the calculation circuit 24 determines all combinations of integers (k, ig, jg) that satisfy I'−1≦x<I'+1 and J'−1≦y<J'+1 with respect to the position (x, y) in the reference coordinate system obtained by converting, based on conversion parameters (θk, Tkx, Tky, Sk), the center position (ig−0.5, jg−0.5) of the pixel that senses a green component of the k-th image, for the position (I', J') of interest of each of first to N-th images. Thereafter, the process proceeds to step S143.

In step S143, the calculation circuit 24 determines whether there is a vertical edge, a horizontal edge, an edge extending from upper left to lower right, or an edge extending from upper right to lower left, for each of combinations of integers (k, ig, jg) determined in step S142. If it is determined in step S143 that there is an edge extending in one of the four directions, the process proceeds to step S144. In step S144, for each combination (k, ig, jg) corresponding to the position at which the edge was detected, the calculation circuit 24 produces (determines) a plane passing through the pixel Gobs(k, ig, jg) and having a slope equal to the slope p of the edge. The calculation circuit 24 then calculates the value (pixel value) at the position (I', J') of interest in the plane. Thereafter, the process proceeds from step S144 to step S145.

In the case in which it is determined in step S143 that there is no edge in any of the four directions, the process proceeds to step S145. Note that the process also proceeds to step S145 after completion of step S144. In step S145, the calculation circuit 24 produces a spring equation in the form (34) for green light intensity, using all combinations of (k, ig, ig) determined in step S142. Thereafter, the process proceeds to step S146. For a pixel value Gobs(k, ig, jg) at a position corresponding to (k, ig, jg) in the reference coordinate system at which an edge was detected in step S143, the calculation circuit 24 employs the value (pixel value) at the position (I', J') in the plane determined in step S144 as the pixel value Gobs(k, ig, ig) of (k, ig, jg) at which the edge was detected, and the calculation circuit 24 substitutes it into Gobs'(k, ig, jg) in equation (34). However, for the pixel value Gobs(k, ig, ig), if it is determined in step S143 that there is no edge in any of the four directions at the position in the reference coordinate system corresponding to (k, ig, jg), the calculation circuit 24 directly substitutes the pixel value Gobs (k, ig, jg) of (k, ig, ig) into Gobs'(k, ig, jg) in equation (34).

In step S146, the calculation circuit 24 determines all combinations of integers (k, ir, jr) that satisfy I'−1≦x<I'+1 and J'−1≦y<J'+1 with respect to the position (x, y) in the reference coordinate system obtained by converting, based on conversion parameters (θk, Tkx, Tky, Sk), the center position (ir−0.5, jr−0.5) of the pixel that. senses a red component of the k-th image, for the position (I', J') of interest of each of first to N-th images. Thereafter, the process proceeds to step S147.

In step S147, the calculation circuit 24 determines whether there is a vertical edge, a horizontal edge, an edge extending from upper left to lower right, or an edge extending from upper right to lower left, for each of combinations of integers (k, ir, jr) determined in step S146. If it is determined in step S147 that there is an edge extending in one of the four directions, the process proceeds to step S148. In step S148, for each combination (k, ir, jr) corresponding to the position at which the edge was detected, the calculation circuit 24 produces (determines) a plane passing through the pixel Robs(k, ir, jr) and having a slope equal to the slope p of the edge. The calculation circuit 24 then calculates the value (pixel value) at the position (I', J') of interest in the plane. Thereafter, the process proceeds from step S148 to step S149.

In the case in which it is determined in step S147 that there is no edge in any of the four directions, the process proceeds to step S149. Note that the process also proceeds to step S149 after completion of step S148. In step S149, the calculation circuit 24 produces a spring equation in the form (35) for red light intensity, using all combinations of (k, ir, jr) determined in step S146. Thereafter, the process proceeds to step S150. For a pixel value Robs(k, ir, jr) at a position corresponding to (k, ir, jr) in the reference coordinate system at which an edge was detected in step S147, the calculation circuit 24 employs the value (pixel value) at the position (I', J') in the plane determined in step S148 as the pixel value Robs(k, ir, jr) of (k, ir, jr) at which the edge was detected, and the calculation circuit 24 substitutes it into Robs'(k, ir, jr) in equation (35). However, for the pixel value Robs(k, ir, jr), if it is determined in step S147 that there is no edge in any of the four directions at the position in the reference coordinate system corresponding to (k, ir, jr), the calculation circuit 24 directly substitutes the pixel value Robs(k, ir, jr) of (k, ir, jr) into Robs'(k, ir, jr) in equation (35).

In step S150, the calculation circuit 24 determines all combinations of integers (k, ib, jb) that satisfy I'−1≦x<I'+1 and J'−1≦y<J'+1 with respect to the position (x, y) in the reference coordinate system obtained by converting, based on conversion parameters (θk, Tkx, Tky, Sk), the center position (ib−0.5, jb−0.5) of the pixel that senses a blue component of the k-th image, for the position (I', J') of interest of each of first to N-th images. Thereafter, the process proceeds to step S151.

In step S151, the calculation circuit 24 determines whether there is a vertical edge, a horizontal edge, an edge extending from upper left to lower right, or an edge extending from upper right to lower left, for each of combinations of integers (k, ib, jb) determined in step S152. If it is determined in step S151 that there is an edge extending in one of the four directions, the process proceeds to step S152. In step S152, for each combination (k, ib, jb) corresponding to the position at which the edge was detected, the calculation circuit 24 produces (determines) a plane passing through the pixel Bobs(k, ib, jb) and having a slope equal to the slope p of the edge. The calculation circuit 24 then calculates the value (pixel value) at the position (I', J') of interest in the plane. Thereafter, the process proceeds from step S152 to step S153.

In the case in which it is determined in step S151 that there is no edge in any of the four directions, the process proceeds to step S153. Note that the process also proceeds to step S153 after completion of step S152. In step S153, the calculation circuit 24 produces a spring equation in the form (36) for blue light intensity, using all combinations of (k, ib, jb) determined in step S150. Thereafter, the process proceeds to step S154. For a pixel value Bobs(k, ib, jb) at a position corresponding to (k, ib, jb) in the reference coordinate system at which an edge was detected in step S151, employs the value (pixel value) at the position (I', J') in the plane determined in step S152 as the pixel value Bobs(k, ib, jb) of (k, ib, jb) at which the edge was detected, and the calculation circuit 24 substitutes it into Gobs'(k, ib, jb) in equation (36). However, for the pixel value Bobs(k, ib, jb), if it is determined in step S151 that there is no edge in any of the four directions at the position in the reference coordinate system corresponding to (k, ib, jb), the calculation circuit 24 directly substitutes the pixel value Bobs(k, ib, jb) of (k, ib, jb) into Bobs'(k, ib, jb) in equation (36).

In step S154, the calculation circuit 24 solves the spring equation (34) associated with the red light intensity determined in step S145, the spring equation (35) associated with the red light intensity determined in step S149, and the spring equation (36) associated with the blue light intensity determined in step S153, which are all in the form of a linear equation, thereby determining the true green light intensity Lg(I', J'), the true red light intensity Lr(I', J'), and the true blue light intensity Lb(I', J') at the position (I', J') of interest. Thereafter, the process proceeds to step S155.

In step S155, the calculation circuit 24 determines whether the above-described process is completed for all possible positions (I', J'), that is, whether the true green light intensity Lg(I', J'), the true red light intensity Lr(I', J'), and the true blue light intensity Lb(I', J') have been determined by taking the center position of each of all pixels of the first image as the position (I', J') of interest.

If it is determined in step S155 that the process is not completed for all possible positions (I', J') of interest, the process returns to step S141 to repeat steps S141 to S155. That is, the calculation circuit 24 selects, as a new position of interest, a position (I', J') that has not yet been selected as the position of interest, and determines the true green light intensity Lg(I', J'), the true red light intensity Lr(I', J'), and the true blue light intensity Lb(I', J') at the position (I', J') of interest.

On the other hand in the case in which it is determined in step S155 that the process is completed by taking all possible position (I', J') as the position of interest, the process proceeds to step S156. In step S156, the calculation circuit 24 estimates a correct image (signal) from the true green light intensity Lg(I', J'), the true red light intensity Lr(I', J'), and the true blue light intensity Lb(I', J') determined in step S154. The resultant image is supplied as an output image to the D/A converter 9 or the codec 12, and the current process is exited. For example, for the (i-th, j-th) pixel, the calculation circuit 24 estimates a correct image signal thereof from the true green light intensity Lg(i−0.5, j−0.5) determined as the green value (G signal) in step S154, the true red light intensity Lr(i−0.5, j−0.5) determined as the red value (R signal) in step S154, and the true blue light intensity Lb(i−0.5, j−0.5) determined as the blue value (B signal) in step S154. The calculation circuit 24 estimates the output image by estimating the image signal for all pixels whose center is located at the selected position (I', J').

In the sixth embodiment, as described above, for a pixel value observed in an edge part, the pixel value is changed depending on the slope of the edge (the degree of change in pixel value), and the resultant changed pixel value is substituted into a corresponding spring equation. This makes it possible to obtain an image more likely to be a correct image. That is, a sharper image can be obtained.

In the example described above, a pixel value located in an edge part is replaced with a pixel value at the position (I', J')

of interest depending on the slope (steepness) of the edge. Alternatively, for example, the pixel value in the edge part may be directly used, and the weight is modified depending on the distance to the position (I', J') of interest so that the pixel value located in the edge part does not have a significant effect on the spring equation.

In the example described above, the slopes of planes Q1 to Q4 are determined using pixel values observed within nine regions (that is, a region with a size of 3×3 pixels) centered at the position (x, y) in the reference coordinate system. Alternatively, the slopes of planes Q1 to Q4 may be determined using pixel values observed in regions selected differently. For example, sixteen regions (tat is, a region with a size of 4×4 pixels) may be employed.

Now, a correct image estimation process performed by the signal processor 7 according to a seventh embodiment of the present invention is described. The seventh embodiment is a modification to the third embodiment described earlier with reference to FIG. 24.

That is, in the seventh embodiment, in addition to the spring equations (25), (26), and (27), the constraint associated with the color correlation among R, G, and B signals is imposed on the process of determining the green light intensity Lg(x, y), the true red light intensity Lr(x, y), and the true blue light intensity Lb(x, y).

In a local area of an image, there is a color correlation among colors of the true green light intensity Lg(x, y), the true red light intensity Lr(x, y), and the true blue light intensity Lb(x, y) corresponding to light originating from a subject and being incident on the imaging device 4. Therefore, by imposing the color correlation constraint on the estimation of a true image, it becomes possible to produce a sharper low-noise image more likely to be the correct image.

Figure 37:
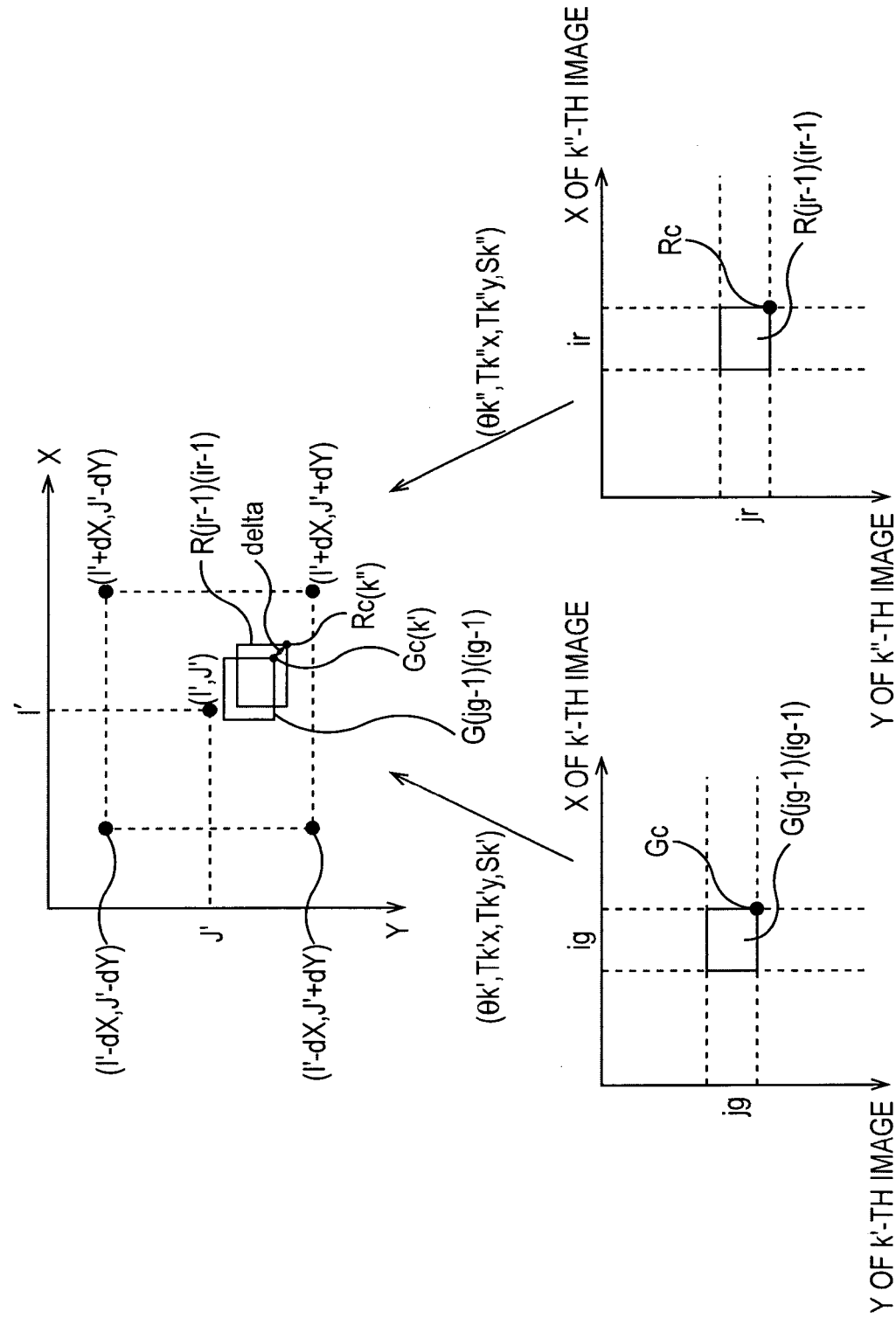
FIG. 37 is a diagram showing a color correlation constraint according to a seventh embodiment.
Figure 38:
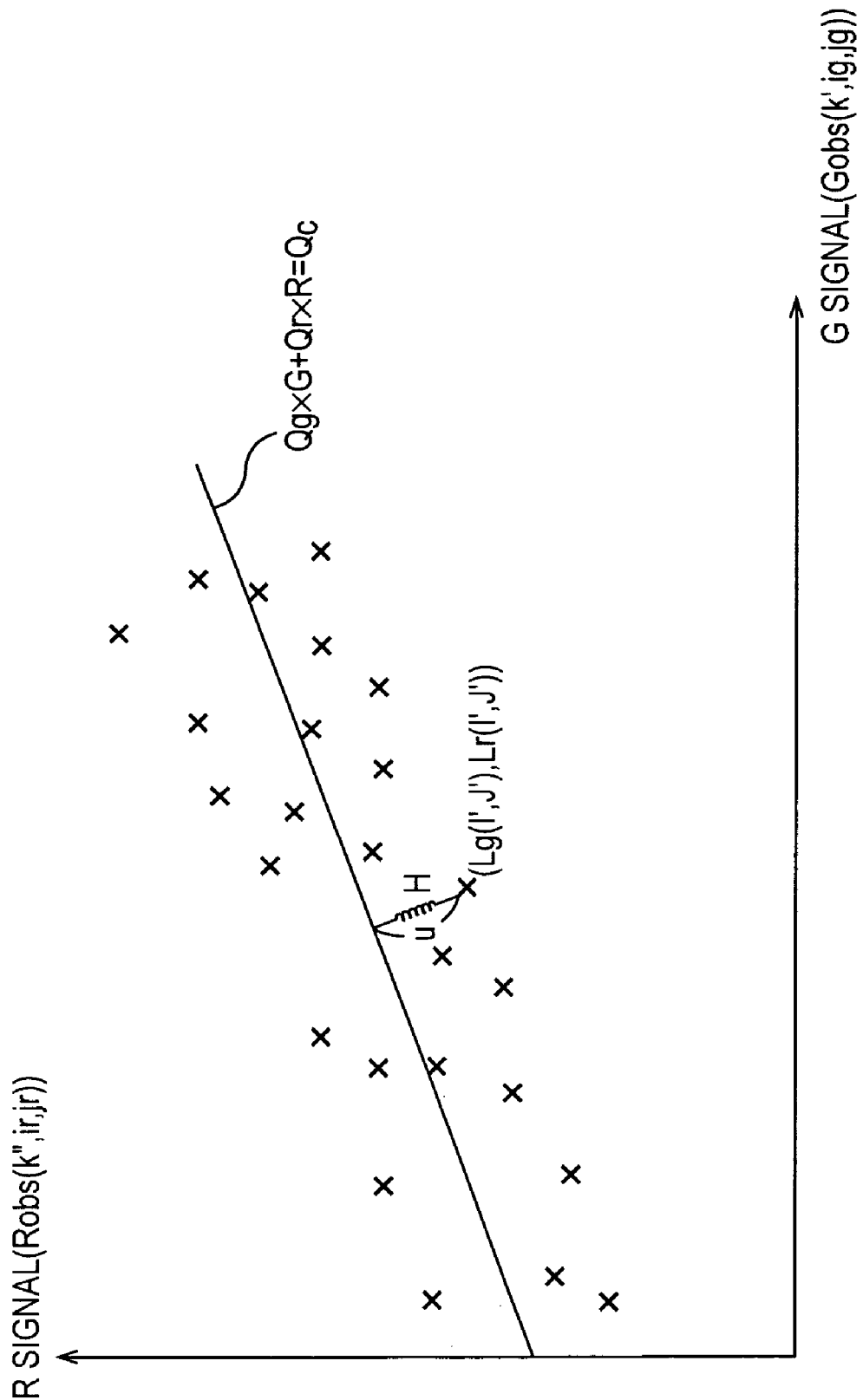
FIG. 38 is a diagram showing a color correlation constraint according to the seventh embodiment.

Referring to FIGS. 37 and 38, a specific method of determining a color correlation constraint is described below. In the following description referring to FIGS. 37 and 38, by way of example, the correlation between green and red colors will be discussed.

By way of example, the discussion will be made for a green pixel G(jg−1)(ig−1) at a (ig-th, jg-th) position of a k'-th image shown in a lower left part of FIG. 37 a red pixel G(jg−1)(ig−1) at a (ir-th, jr-th) position of a k"-th image shown in a lower right part of FIG. 37.

The calculation circuit 24 converts positions of the green pixel G(jg−1)(ig−1) of the k'-th image and the red pixel R(jr−1)(ir−1) of the k"-th image into positions in the coordinate system of the first image on the upper side of FIG. 37 by using conversion parameters (θk', Tk'x, Tk'y, Sk') and (θk", Tk"x, Tk"y, Sk") in a similar manner to that according to the third embodiment.

The calculation circuit 24 then calculates the distance between the green pixel G(jg−1)(ig−1) of the k'-th image at the position converted into the coordinate system of the first image and the red pixel R(jr−1)(ir−1) of the k"-th image at the position converted into the coordinate system of the first image. Furthermore, the calculation circuit 24 determines whether these two pixels can be regarded as locating at the same position by determining whether the calculated distance is less than a maximum allowable value (threshold value) delta (set to, for example, 0.25 times the pixel size).

When positions of pixels G(jg−1)(ig−1) and R(jr−1)(ir−1) are respectively given as positions (ig, jg) and (ir, jr), if the position (ig, jg) of the pixel G(jg−1)(ig−1) in the coordinate system of the k'-th image is denoted as G(c), the position (ir, jr) of the pixel R(jg−1)(ig−1) in the coordinate system of the k"-th image is denoted as R(c), the position (ig, jg) of the pixel G(jg−1)(ig−1) in the coordinate system of the first image is denoted as $G_{c(k')}$, and the position (ir, jr) of the pixel R(jg−1)(ig−1) in the coordinate system of the first image is denoted as $R_{c(k')}$, then a constraint requiring that the distance between point $G_{c(k')}$ and point $R_{c(k'')}$ should be within the allowable value delta is given by formula (37) shown below.

$$Dis[G_{c(k')}, R_{c(k'')}] = Dis\left[Sk'\begin{pmatrix} \cos(\theta k') & -\sin(\theta k') \\ \sin(\theta k') & \cos(\theta k') \end{pmatrix}\begin{pmatrix} ig \\ jg \end{pmatrix} + \begin{pmatrix} Tk'x \\ Tk'y \end{pmatrix},\right.$$
$$\left. Sk''\begin{pmatrix} \cos(\theta k'') & -\sin(\theta k'') \\ \sin(\theta k'') & \cos(\theta k'') \end{pmatrix}\begin{pmatrix} ir \\ jr \end{pmatrix} + \begin{pmatrix} Tk''x \\ Tk''y \end{pmatrix}\right] \leq \text{delta} \quad (37)$$

Formula (37) is referred to as a distance constraint formula. In formula (23), $Dis[G_{c(k')}, R_{c(k'')}]$ denotes the distance between point $G_{c(k')}$ and point $R_{c(k'')}$. The positions of point $G_{c(k')}$ and point $R_{c(k')}$ are obtained by performing the affine transformation on positions (ig, jg) and (ir, jr) using conversion parameters (θk', Tk'x, Tk'y, Sk') and (θk", Tk"x, Tk"y, Sk").

The calculation circuit 24 determines whether there are. a green pixel G(jg−1)(ig−1) of the k'-th image and a red pixel; R(jr−1)(ir−1) of the k"-th image at positions that can be regarded as being the same within an allowable margin delta in a small region (I'±dX, J'±dY) centered at a position (I', J') in the coordinate system of the first image, that is, in a rectangular region whose corners are at (I'−dX, J'−dY), (I'−dX, J'+dY), (I'+dX, J'−dY), and (I'+dX, J'+dY), wherein dX and dY are values that define the region in the vicinity of the position (x, y) and they are set to be equal to, for example, 2 times the size of a pixel in the X direction and Y direction, respectively.

In other words, the calculation circuit 24 determines (k', ig, jg) and (k", ir, jr) that satisfy formula (37) within the small region (I'±dX, J'±dY) centered at the position (I', J') of interest in the coordinate system of the first image, that is, in the rectangular region whose corners are at (I'−dX, J'−dY), (I'−dX, J'+dY), (I'+dX, J'−dY), and (I'+dX, J'+dY).

The calculation circuit 24 then acquires pixel values Gobs (k', ig, jg) and Robs(k", ir, jr) respectively corresponding to (k', ig, jg) and (k", ir, jr) determined.

The calculation circuit 24 determines (k', ig, jg) and (k", ir, jr) that satisfy formula (37) for all possible combinations of k' and k" within the range form 1 to N.

In general, a plurality of combinations of (k', ig, jg) and (k", ir, jr) is detected, and the calculation circuit 24 plots pixel values Gobs(k', ig, jg) and Robs(k", ir, jr) corresponding to the detected (k', ig, jg) and (k", ir, jr) in the GR space in which the horizontal axis represents the G signal (Gobs(k', ig, jg)) and the vertical axis represents the R signal (Robs(k", ir, jr)), as shown in FIG. 38.

FIG. 38 shows the GR space in which sets of pixel values Gobs(k', ig, jg) and Robs(k", ir, jr) satisfying formula (37) are plotted.

In FIG. 38, each x-like mark indicates a pair of pixel values Gobs(k', ig, jg) and Robs(k' , ir, jr) corresponding to (k', ig, jg) and (k", ir, jr) detected by the calculation circuit 24, that is, a pair of pixel values Gobs(k', ig, jg) and Robs(k", ir, jr) satisfying formula (37).

The plots shown in FIG. 38 indicate that there is a correlation between the true green light intensity Lg(I', J') and the true red light intensity Lr(I', J') to be determined in the vicinity of the position (I', J') of interest.

Thus, in the seventh embodiment, in addition to spring constraints given by equations (25) to (27) in the third embodiment, the correlation between green and red colors shown in FIG. 38 is added as a constrain.

The calculation circuit 24 performs principal component analysis for the plurality of points plotted in the GR space shown in FIG. 38, wherein each plotted point corresponds to a pair of pixel values Gobs(k', ig, jg) and Robs(k'', ir, jr) that the calculation circuit 24 has detected as satisfying the distance constraint (37).

The calculation circuit 24 then determines a principal direction as a result of the principal component analysis and determines a line Qg×G+Qr×R=Qc representing the determined direction (axis) where Qg, Qr, and Qc are constants associated with the line in the GR space, and G and R are variables associated with the G and R signals in the GR space. Furthermore, the calculation circuit 24 determines the variance in a direction perpendicular to the principal direction.

Herein, a spring with a natural length of 0 and with a spring constant (strength) H is introduced. The spring constant may be an arbitrary monotonically decreasing function of the variance of the component perpendicular to the direction of the principal component determined in the GR space. For example, H=(1/variance) may be used. In any case, the strength of the spring (spring constant) increases with decreasing variance.

One end of the spring with the spring constant H is connected to point (Lg(I', J'), Lr(I', J')) in the GR space, and the other end of the spring is connected such that it can movable to an arbitrary point on the line Qg×G+Qr×R=Qc. As a result, the point (Lg(I', J'), Lr(I', J')) is pulled in a direction of the perpendicular line from the point (Lg(I', J'), Lr(I', J')) to the line Qg×G+Qr×R=Qc. That is, the point (Lg(I', J'), Lr(I', J')) is pulled such that the color correlation constraint (between the G and R signals) is satisfied.

Herein, if the distance between the point (Lg(I', J'), Lr(I', J')) and the line Qg×G+Qr×R=Qc extending in the direction of the main component is represented by u, then the pulling force of the spring with the spring constant H exerted on the point (Lg(I', J'), Lr(I', J')) is given by H×u (hereinafter, this force will be referred to as GR spring force). The GR spring force H×u in the GR space is broken down into a G signal component and a R signal component, and these components are respectively added to the left-hand sides of equations (25) and (26) such that the color correlation is taken into account in equations (25) and (26).

The color correlation between the green (G) signal and the B (Blue) signal is dealt with as follows.

As in the case of the color correlation between the green and red signals described above with reference to FIG. 37, the calculation circuit 24 converts positions of the green pixel G(jg−1)(ig−1) of the k'-th image and the blue pixel B(jb−1)(ib−1) of the k'''-th image into positions in the coordinate system of the first image by using conversion parameters (θk', Tk'x, Tk'y, Sk') and (θk''', Tk'''x, Tk'''y, Sk''').

The calculation circuit 24 then calculates the distance between the green pixel G(jg−1)(ig−1) of the k'-th image at the position converted into the coordinate system of the first image and the blue pixel B(jb−1)(ib−1) of the k'''-th image at the position converted into the coordinate system of the first image. Furthermore, the calculation circuit 24 determines whether these two pixels can be regarded as locating at the same position by determining whether the calculated distance is less than a maximum allowable value (threshold value) delta.

When positions of pixels G(jg−1)(ig−1) and B(jb−1)(ib−1) are respectively given as positions (ig, jg) and (ib, jb), if the position (ig, jg) of the pixel G(jg−1)(ig−1) in the coordinate system of the k'-th image is denoted as point $G_{(c)}$, the position (ib, jb) of the pixel B(jb−1)(ib−1) in the coordinate system of the k'''-th image is denoted as point $B_{(c)}$, the position (ig, jg) of the pixel G(jg−1)(ig−1) in the coordinate system of the first image is denoted as $G_{c(k')}$, and the position (ib, jb) of the pixel B(jb−1)(ib−1) in the coordinate system of the first image is denoted as $B_{c(k''')}$, then a constraint requiring that the distance between point $G_{c(k')}$ and point $B_{c(k''')}$ should be within the allowable value delta is given by formula (38) shown below.

$$Dis[G_{c(k')}, B_{c(k''')}] = Dis\left[Sk'\begin{pmatrix} \cos(\theta k') & -\sin(\theta k') \\ \sin(\theta k') & \cos(\theta k') \end{pmatrix}\begin{pmatrix} ig \\ jg \end{pmatrix} + \begin{pmatrix} Tk'x \\ Tk'y \end{pmatrix}, \right.$$
$$\left. Sk'''\begin{pmatrix} \cos(\theta k''') & -\sin(\theta k''') \\ \sin(\theta k''') & \cos(\theta k''') \end{pmatrix}\begin{pmatrix} ib \\ jb \end{pmatrix} + \begin{pmatrix} Tk'''x \\ Tk'''y \end{pmatrix}\right] \le \text{delta} \quad (38)$$

Formula (38) is referred to as a distance constraint formula. In formula (23), $Dis[G_{c(k')}, B_{c(k''')}]$ denotes the distance between point $G_{c(k')}$ and point $B_{c(k''')}$. The positions of point $G_{c(k')}$ and point BC(k'''.) are obtained by performing the affine transformation on positions (ig, jg) and (ib, jb) using conversion parameters (θk', Tk'x, Tk'y, Sk') and (θk''', Tk'''x, Tk'''y, Sk''').

The calculation circuit 24 determines whether there are a green pixel G(jg−1)(ig−1) of the k'-th image and a blue pixel B(jb−1)(ib−1) of the k'''-th image at positions that can be regarded as being the same within an allowable margin delta in a small region (I'+dX, J'+dY) centered at a position (I', J') in the coordinate system of the first image, that is, in a rectangular region whose corners are at (I'−dX, J'−dY), (I'−dX, J'+dY), (I'+dX, J'−dY), and (I'+dX, J'+dY), wherein dX and dY are values that define the region in the vicinity of the position (x, y) and they are set to be equal to, for example, 2 times the size of a pixel in the X direction and Y direction, respectively.

In other words, the calculation circuit 24 determines (k', ig, jg) and (k''', ib, jb) that satisfy formula (38) within the small region (I'±dX, J'±dY) centered at the position (I', J') of interest in the coordinate system of the first image, that is, in the rectangular region whose corners are at (I'−dX, J'−dY), (I'−dX, J'+dY), (I'+dX, J'−dY), and (I'+dX, J'+dY).

The calculation circuit 24 then acquires pixel values Gobs (k', ig, jg) and Bobs(k''', ib, jb) respectively corresponding to (k', ig, jg) and (k''', ib, jb) determined.

The calculation circuit 24 determines (k', ig, jg) and (k''', ib, jb) that satisfy formula (38) for all possible combinations of k' and k''' within the range form 1 to N.

In general, a plurality of combinations of (k', ig, jg) and (k''', ib, jb) is detected, and the calculation circuit 24 plots pixel values Gobs(k', ig, jg) and Bobs(k''', ib, jb) corresponding to the detected (k', ig, jg) and (k''', ib, jb) in the GB space in which the horizontal axis represents the G signal (Gobs(k', ig, jg)) and the vertical axis represents the B signal (Bobs(k''', ib, jb)).

Thus, in the seventh embodiment, in addition to spring constraints given by equations (25) to (27) in the third embodiment, the correlation between green and blue colors shown is added as a constrain.

The calculation circuit 24 performs principal component analysis for the plurality of points plotted in the GB space, wherein each plotted point corresponds to a pair of pixel values Gobs(k', ig, jg) and Bobs(k''', ib, jb) that the calculation circuit 24 has detected as satisfying the distance constraint (38).

The calculation circuit 24 then determines a principal direction as a result of the principal component analysis and determines a line Qg'×G+Qb'×R=Qc' representing the determined direction (axis), where Qg', Qb', and Qc' are constants associated with the line in the GB space, and G and B are variables associated with the G and B signals in the GB space. Furthermore, the calculation circuit 24 determines the variance in a direction perpendicular to the principal direction.

Herein, a spring with a natural length of 0 and with a spring constant (strength) H is introduced. The spring constant may be an arbitrary monotonically decreasing function of the variance of the component perpendicular to the direction of the principal component determined in the GB space. For example, H=(1/variance) may be used. In any case, the strength of the spring (spring constant) increases with decreasing variance.

One end of the spring with the spring constant H is connected to point (Lg(I', J'), Lb(I', J')) in the GB space, and the other end of the spring is connected such that it can movable to an arbitrary point on the line Qg'×G+Qb'×B=Qc'. As a result, the point (Lg(I', J'), Lb(I', J')) is pulled in a direction of the perpendicular line from the point (Lg(I', J'), Lb(I', J')) to the line Qg'×G+Qb'×B =Qc'. That is, the point (Lg(I', J'), Lb(I', J')) is pulled such that the color correlation constraint (between the G and B signals) is satisfied.

Herein, if the distance between the point (Lg(I', J'), Lb(I', J')) and the line Qg'×G+Qb'×B=Qc' extending in the direction of the main component is represented by u, then the pulling force of the spring with the spring constant H exerted on the point (Lg(I', J'), Lb(I', J')) is given by H×u (hereinafter, this force will be referred to as GB spring force). The GB spring force H×u in the GB space is broken down into a G signal component and a B signal component, and these components are respectively added to the left-hand sides of equations (25) and (27) such that the color correlation is taken into account in equations (25) and (27).

Although in the present embodiment, the constraint associated with the color correlation in the GR space and the constraint associated with the color correlation in the GB space, a similar constraint associated with a color correlation between the R signal and the B signal (in a RB space) may also be employed in addition to the above constraints.

Figure 39:
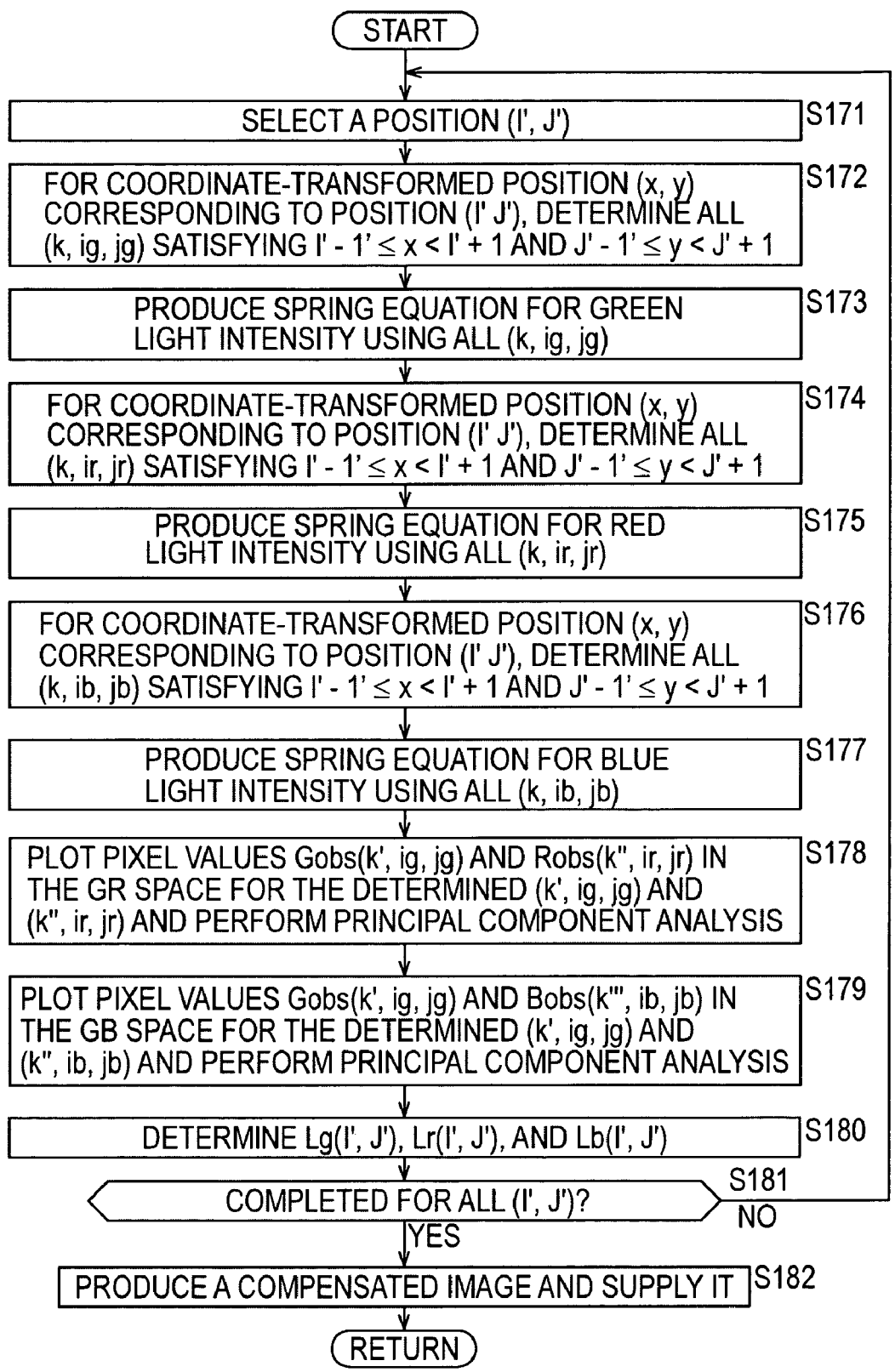
FIG. 39 a flow chart showing an image estimation process according to the seventh embodiment.

Now, referring to a flow chart shown in FIG. 39, a correct image estimation process in step S4 shown in FIG. 2 according to a seventh embodiment of the present invention is described.

Steps S171 to S177 are similar to steps S71 to S77 in the correct image estimation process according to the third embodiment described above with reference to FIG. 24.

That is, in step S171, the calculation circuit 24 selects a position (I', J') in the reference coordinate system (hereinafter, such a selected position will be referred to a position (I', J') of interest). Note that the position (I', J') of interest is at the center (i−0.5, j−0.5) of a (i-th, j-th) pixel of the first image taken as the reference image.

Thereafter, the process proceeds from step S171 to step S172. In step S172, the calculation circuit 24 determines all combinations of integers (k, ig, jg) that satisfy I'−1≦x<I'+1 and J'−1≦y<J'+1 with respect to the position (x, y) in the reference coordinate system obtained by converting, based on conversion parameters (θk, Tkx, Tky, Sk), the center position (ig−0.5, jg−0.5) of the pixel that senses a green component of the k-th image, for the position (I', J') of interest of each of first to N-th images. Thereafter, the process proceeds to step S173.

In step S173, the calculation circuit 24 produces a spring equation in the form (25) for green light intensity, using all combinations of (k, ig, jg) determined in step S172. Thereafter, the process proceeds to step S174.

In step S174, the calculation circuit 24 determines all combinations of integers (k, ir, jr) that satisfy I'−1≦x<I'+1 and J'−1≦y<J'+1 with respect to the position (x, y) in the reference coordinate system obtained by converting, based on conversion parameters (θk, Tkx, Tky, Sk), the center position (ir−0.5, jr−0.5) of the pixel that senses a red component of the k-th image, for the position (I', J') of interest of each of first to N-th images. Thereafter, the process proceeds to step S175.

In step S175, the calculation circuit 24 produces a spring equation in the form (26) for red light intensity, using all combinations of (k, ir, jr) determined in step S174. Thereafter, the process proceeds to step S176.

In step S176, the calculation circuit 24 determines all combinations of integers (k, ib, jb) that satisfy I'−1≦x<I'+1 and J'−1≦y<J'+1 with respect to the position (x, y) in the reference coordinate system obtained by converting, based on conversion parameters (θk, Tkx, Tky, Sk), the center position (ib−0.5, jb−0.5) of the pixel that senses a blue component of the k-th image, for the position (I', J') of interest of each of first to N-th images. Thereafter, the process proceeds to step S177.

In step S177, the calculation circuit 24 produces a spring equation in the form (27) for blue light intensity, using all combinations of (k, ib, jb) determined in step S176. Thereafter, the process proceeds to step S178.

In step S178, the calculation circuit 24 determines all pairs of (k', ig, jg) and (k", ir, jr) that satisfy formula (37) in the region defined by (I'±dx, J'±dY) and centered at the position (I', J') of interest. Furthermore, the calculation circuit 24 plots, in the GR space, points (Gobs(k', ig, jg) and Robs(k", ir, jr)) identified by the determined pairs of (k', ig, jg) and (k", ir, jr), and performs principal component analysis. The calculation circuit 24 then determines the variance in a direction perpendicular to the principal direction and employs the reciprocal of the variance as the spring constant H. Furthermore, the calculation circuit 24 determines a line Qg×G+Qr×R=Qc representing the direction of the principal component and defines an unknown quantity H×u indicating the GR spring force where u is the distance between a point (Lg(I', J'), Lr(I', J')) in the GR space and the line Qg×G+Qr×R=Qc. The calculation circuit 24 adds the G signal component of the GR spring force H×u to the left-hand side of equation (25) and adds the R signal component of the GR spring force H×u to the left-hand side of equation (26). Thereafter, the process proceeds from step S178 to step S179.

In step S179, and the calculation circuit 24 determines all pairs of (k', ig, jg) and (k''', ib, jb) that satisfy formula (38) in the region defined by (I'±dx, J'±dY) and centered at the position (I', J') of interest. Furthermore, the calculation circuit 24 plots, in the GB space, points (Gobs(k', ig, jg) and Bobs(k''', ib, jb)) identified by the determined pairs of (k', ig, jg) and (k''', ib, jb), and performs principal component analysis. The calculation circuit 24 then determines the variance in a direction perpendicular to the principal direction and employs the reciprocal of the variance as the spring constant H. Furthermore, the calculation circuit 24 determines a line Qg'×G+Qb'×R=Qc' representing the direction of the principal component and defines an unknown quantity H×u indicating the GB spring force where u is the distance between a point (Lg(I', J'), Lb(I', J')) in the GB space and the line Qg'×G+Qb'×R=Qc'. The calculation circuit 24 adds the G signal component of the GB spring force H×u to the left-hand side of equation (25) and adds the B signal component of the GB spring force H×u to the left-hand side of equation (27). Thereafter, the process proceeds from step S179 to step S180.

In step S180, the calculation circuit 24 solves linear equations, that is, the spring equation associated with the green light intensity and including the additional terms associated with the color correlations in the GR and GB spaces, the spring equation associated with the red light intensity and including the additional term associated with the color correlation in the GR space, and the spring equation associated with the blue light intensity and including the additional term associated with the color correlation in the GB space thereby determining the true green light intensity Lg(I', J'), the true red light intensity Lr(I', J'), and the true blue light intensity Lb(I', J') at the position (I', J') of interest. Thereafter, the process proceeds to step S181.

In step S181, the calculation circuit 24 determines whether the above-described process is completed for all possible positions (I', J'), that is, whether the true green light intensity Lg(I', J'), the true red light intensity Lr(I', JY), and the true blue light intensity Lb(I', J') have been determined by taking the center position of each of all pixels of the first image as the position (I', J') of interest.

If it is determined in step S181 that the process is not completed for all possible positions (I', J') of interest, the process returns to step S171 to repeat steps S171 to S181. That is, the calculation circuit 24 selects, as a new position of interest, a position (I', J') that has not yet been selected as the position of interest, and determines the true green light intensity Lg(I', J'), the true red light intensity Lr(I', J'), and the true blue light intensity Lb(I', J') at the position (I', J') of interest.

On the other hand in the case in which it is determined in step S181 that the process is completed by taking all possible position (I', J') as the position of interest, the process proceeds to step S182. In step S182, the calculation circuit 24 estimates a correct image (signal) from the true green light intensity Lg(I', J'), the true red light intensity Lr(I', J'), and the true blue light intensity Lb(I', J') determined in step S180. The resultant image is supplied as an output image to the D/A converter 9 or the codec 12, and the current process is exited. For example, for the (i-th, j-th) pixel, the calculation circuit 24 estimates the correct image signal thereof from the true green light intensity Lg(i−0.5, j−0.5) determined as the green value (G signal) in step S180, the true red light intensity Lr(i−0.5, j−0.5) determined as the red value (R signal) in step S180, and the true blue light intensity Lb(i−0.5, j−0.5) determined as the blue value (B signal) in step S180. The calculation circuit 24 estimates the output image by estimating the image signal for all pixels whose center is located at the selected position (I', J').

As described above, in the seventh embodiment, the error due to noise or the like is reduced by taking into account the color correlation when the output image is produced. This makes it possible to produce a sharper output image more likely to be the correct image.

To provide a better understanding of the features of the present invention, the difference between the present invention and the conventional technique is further described below.

Figure 40:
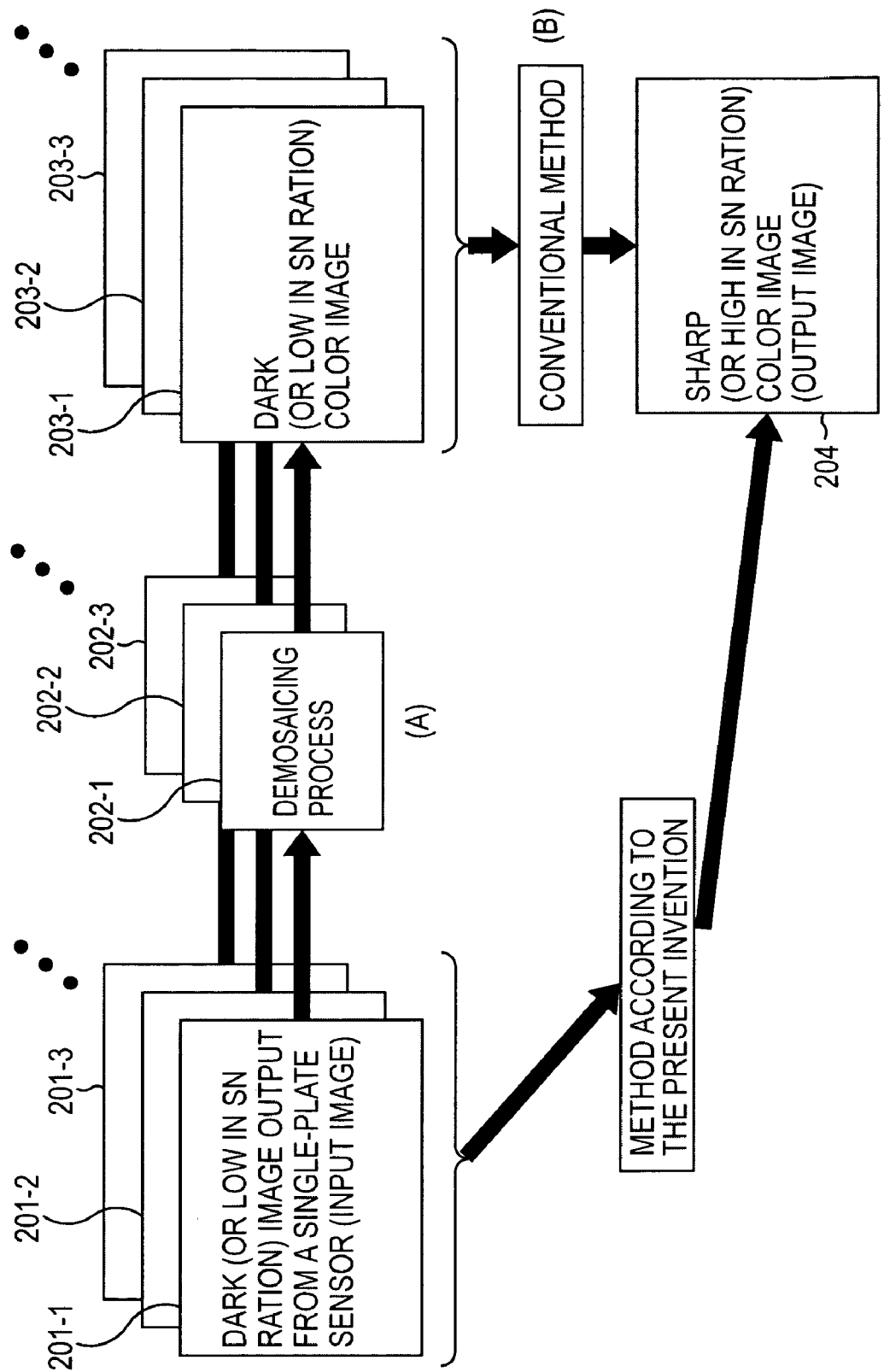
FIG. 40 is a diagram showing the difference between the present invention and a conventional technique.

FIG. 40 shows a processing flow of the method according to the present invention and that of the conventional method.

As shown in FIG. 40, many methods (denoted by (A) in FIG. 40) to convert an image output from a single-plane sensor (for example, a Bayer-array image in which each pixel has only one of R, G, and B signals) to a normal color image (having R, G, and B signals for each pixel) are known in the art. In fact, this conversion capability is implemented in some digital still cameras using a single-plane sensor available in the market. This conversion is called demosaicing.

A method (denoted by (B) in FIG. 40) of producing a sharp color image (having R, G, and B signals for each pixel) (with a high signal-to-noise ratio) from a plurality of dark color images (having R, G, and B signals for each pixel) (with a low signal-to-noise ratio) is also known in the art. Specific examples of this method include Japanese Unexamined Patent Application Publication No. 2000-217032 and Japanese Unexamined Patent Application Publication No. 2000-224460 cited earlier in Background Art.

By combining these two methods, it is possible to produce a sharp color image (having R, G, and B signals for each pixel) (with a high signal-to-noise ratio) from an image output from a single-plane sensor (for example, a Bayer-array image in which each pixel has only one of R, G, and B signals).

More specifically, a demosaicing process 202-m denoted by (A) in FIG. 40 is performed on each of a plurality (m) of dark images 201-m output from a single-plane sensor (for example, Bayer-array images in which each pixel has only one of R, G, and B signals) (with a low signal-to-noise ratio) to produce dark color images (having R, G, and B signals for each pixel) (with a low signal-to-noise ratio) 203-m. Thereafter, a sharp color image (having R, G, and B signals for each pixel) (with a high signal-to-noise ratio) 204 is produced from the color images 203-m by the method denoted by (B) in FIG. 40 such as a method disclosed in Japanese Unexamined Patent Application Publication No. 2000-217032 or Japanese Unexamined Patent Application Publication No. 2000-224460. Note that m is an integer indicating the number of images.

Interpolation or similar processing performed in the demosacing process causes a reduction in sharpness of the image. In the process disclosed in Japanese Unexamined Patent Application Publication No. 2000-217032 or 2000-224460, interpolation is performed for registration among digitally sampled data, and thus degradation in sharpness also occurs. That is, interpolation is performed in the process denoted by (A) in FIG. 40 and also in the process (B). The interpolation performed a total of two times causes significant degradation in sharpness. The interpolation is used to reproduce missing data at a particular point from data at adjacent points. The more times interpolation is performed, the more degradation in sharpness occurs.

In contrast, in the present invention, a sharp color image (having R, G, and B signals for each pixel) (with a high signal-to-noise ratio) is produced directly from an image output from a single-plane sensor (for example, a Bayer-array image in which each pixel has only one of R, G, and B signals). Therefore, interpolation or similar processing is performed only once. Thus, it is possible to produce a sharper image than the conventional method can. As can be seen from the above discussion, it is obvious that the present invention is different from the conventional technique and the present invention has great advantages.

Another problem with the conventional technique is that demosacing is performed for each image. For example, when eight images are given as the plurality of images, demosacing (denoted by (A) in FIG. 40) is performed eight times. This implies that a large amount of computation is required.

The different between the present invention and the conventional technique is further described below.

In the conventional technique disclosed in Japanese Unexamined Patent Application Publication No. 2000-217032 cited earlier in Background Art, when a plurality of images are superimposed, images are displaced to register them such that a positional displacement among original images due to a camera shake is cancelled out. To produce images displaced by an amount necessary to cancel out the camera shake, interpolation is necessary. Superimposing N images together is performed by superimposing N data at each pixel of an output image. After N images are superimposed, the pixel value of each pixel is divided by a particular value (equal to N or equal to (optimum exposure time)/(actual exposure time)/N). It is also known in the art to achieve a high resolution image by capturing a plurality of images while displacing pixel positions by a fixed amount each time one image is captured and superimposing the plurality of captured images while properly registering them. In this technique, the amount of displacement is fixed, the pixel value of each pixel of the output image is divided (normalized) by a fixed value.

In contrast, in the first or second embodiment according to the present invention, the number of pixel values observed at a given position (x, y) of an output image available to estimate a true value varies depending on a situation. For example, when a picture of a scene is taken by a user, there is a possibility that there are a large number of input pixel values Gobs(k, ig, jg) in the vicinity of a position (x, y). In such a case, a large number of constraints associated with the position (x, y) in the form of a mathematical expression (20) are available. Conversely, if there are only a small number of input pixels Gobs(k, ig, jg) in the vicinity of the position (x, y), only a small number of constraints associated with the position (x, y) in the form of the mathematical expression (20) are available. As described above, the number of mathematical constraints associated with each position (x, y) of an output image is variable depending on the state in which a picture is taken (more particularly, for example, depending on the camera shake). That is, in the process of estimating the true value at each pixel, observation points of candidates for pixel values to be used in the estimation and the number thereof are adaptively changed depending on the state in which the picture is taken (depending on the motion among the plurality of captured images). For example, the number of observation points of candidates for pixel values, and a particular number of observations are selected from the candidates. Alternatively, both the number of observation points of candidates and the number of observation points to be selected may be changed. The above-described two methods may be selectively used depending on the positions, numbers, and/or distribution of observation points.

In the third to seventh embodiments of the present invention, when images are superimposed, images are displaced so as to cancel out displacement due to a camera shake. However, in the Bayer-array structure, there is not necessarily data to be added, at all output positions. When a k-th image is displaced in position, if there is no position-corrected data within a 2×2 pixel area shown in FIG. 21, any data of the k-th image has no contribution to those 2×2 pixels of the output image. Conversely, if there are two position-corrected data within the 2×2 pixel area shown in FIG. 21, the two (weighted) data are added to the output pixel. For example, if ten data are added at a particular pixel, the final pixel value of the output image is obtained by dividing the sum by ten. If 3.5 data are added together at another pixel, the pixel value at that pixel of the output image is obtained by dividing the sum by 3.5. That is, in the present invention, the number of times summation E is executed in equations (25), (26), and (27) varies depending on the state in which a picture is taken (more particularly, for example, depending on the camera shake). That is, in the process of estimating the true value at each pixel, observation points of candidates for pixel values to be used in the estimation and the number thereof are adaptively changed depending on the state in which the picture is taken (depending on the motion among the plurality of captured images).

In the present invention, as described above, when a sharp image is restored from a plurality of images output from a single-plane sensor (Bayer-array sensor), the number of constraint equations or the weights are varied depending on the situation. In this regard, the present invention is very different from the conventional techniques.

The sequence of processing steps described above may be performed by means of hardware or software. For example, the digital camera 1 may be realized by executing a program on a computer such as that shown in FIG. 41.

Figure 41:
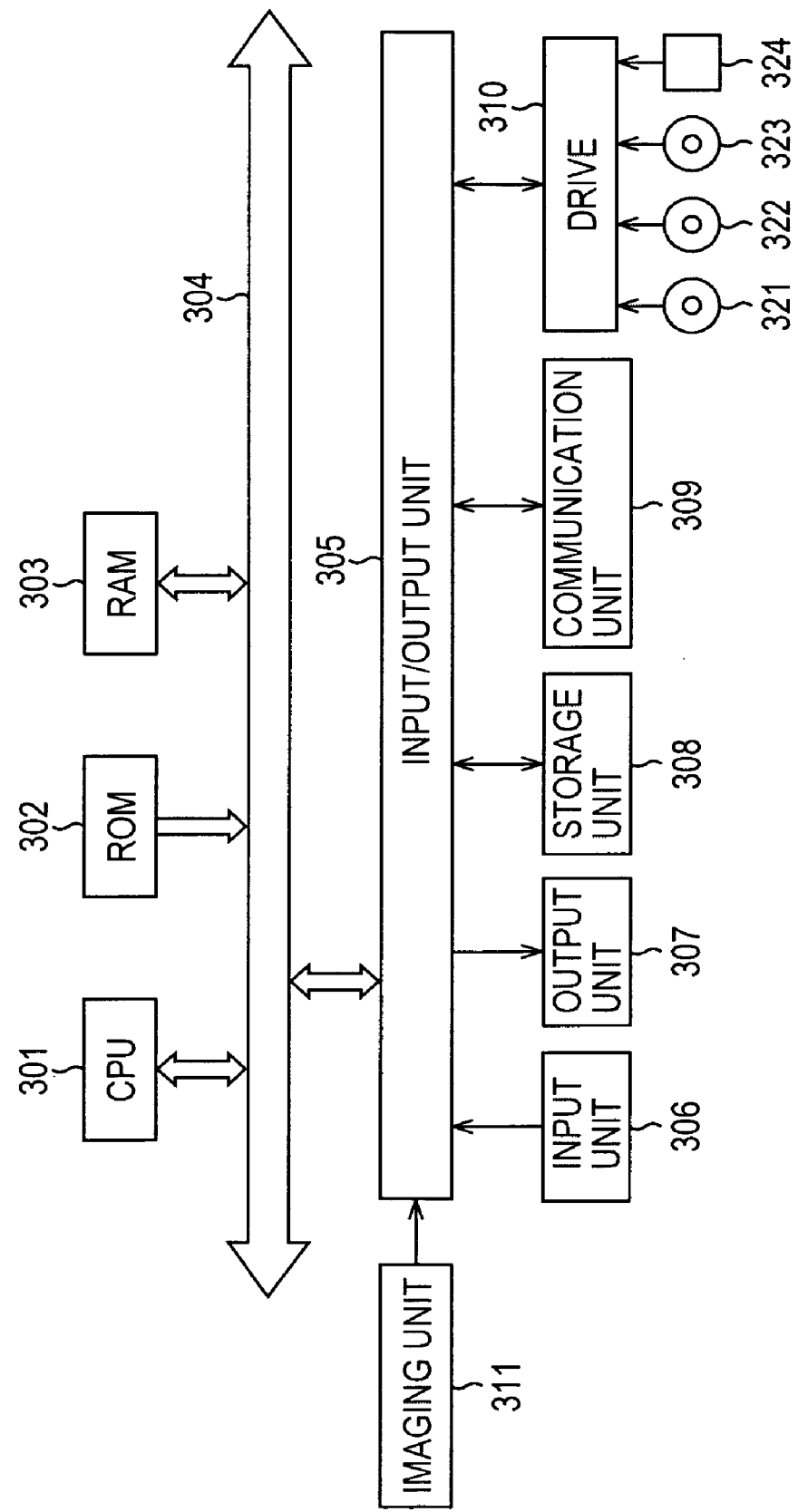
FIG. 41 is a block diagram showing an example of a configuration of a computer according to an embodiment of the present invention.

In FIG. 41, a CPU (Central Processing Unit) 301 performs various processes in accordance with a program stored in a ROM (Read Only Memory) 302 or in accordance with a program loaded into a RAM (Random Access Memory) 303 from a storage unit 308. The RAM 303 is also used to store data used by the CPU 301 in the execution of various processes. The CPU 301 executes the process performed by the motion detector 23 and the calculation circuit 24 of the signal processor 7.

The CPU 301, the ROM 302, and the RAM 303 are connected to each other via a bus 304. The bus 304 is also connected to an input/output interface 305.

The input/output interface 305 is connected to an input unit 306 including a keyboard, a mouse, and/or the like, an output unit 307 including a display such as a CRT (Cathode Ray Tube) or a LCD (Liquid Crystal Display), a loudspeaker, and/or the like, the storage unit 308 such as a hard disk, and a communication unit 309 including a modem, a terminal adapter, and/or the like. The communication unit 309 allows communication via a network such as the Internet. The imaging unit 311 includes the imaging device 4 shown in FIG. 1 and serves to capture images of a subject. The resultant image data of the subject is supplied to the CPU 301 via the input/output interface 305.

The input/output interface 305 is also connected to a drive 310, as required. A storage medium such as a magnetic disk 321, an optical disk 322, a magnetooptical disk 323, or a semiconductor memory 324 is mounted on the drive 310 as required, and a computer program is read from the storage medium and installed into the storage unit 308, as required.

Now, a correct image estimation process performed by the signal processor 7 according to an eighth embodiment of the present invention is described. In this eighth embodiment, the third embodiment described above with reference to FIG. 24 is partially improved.

In the third embodiment described above, data (light intensity) sensed by each pixel of the imaging device 4 (FIG. 1) is regarded as point-sampled data, the relationship between a pixel value observed at the center of each pixel and an ideal image signal of a sharp image including no blur due to a camera shake is represented by the spring model, and a sharp image likely to be a true image is determined based on the spring model.

For example, of G, R, and B signals of an image signal of a sharp image with no blur due to camera shake, estimation of the true G signal according to the third embodiment is performed as follows. That is, the constraint on the true green light intensity Lg(I', J') to be determined for the center position (I', J') of each pixel is expressed by the spring equation (25) associated with the green light intensity, as described earlier.

In equation (25), $\{\sqrt{2}-F((x, y), (I', J'))\}$ of the spring constant $\{\sqrt{2}-F((x,y), (I', J'))\}/(Mk \times E)$ represents the weight that decreases with distance between the position (I', J') and the position (x, y) in the vicinity of the position (I', J'). This means that the pulling force of the spring exerted between the pixel value Gobs(k, ig, jg) at the position (x, y) and the true green light intensity Lg(I', J') at the position (I', J') decreases with distance between the position (I', J') and the position (x, y).

Conversely, the pulling force of the spring increases with decreasing distance between the position (I', J') and the position (x, y).

On the other hand, {√2−F((x, y), (I', J'))}/(Mk×E) of the spring constant {√2−F((x, y), (I', J'))}/(Mk×E) in equation (25) represents residual noise E included that cannot be removed by the correlated double sampler 5 (FIG. 1) gained up by a factor of Mk (k=1 to N). Thus, 1/(Mk×E) represents a weight associated with noise, which decreases with noise E. Therefore, the pulling force of the spring exerted between the pixel value Gobs(k, ig, jg) at the position (x, y) and the true green light intensity Lg(I', J') at the position (I', J') decreases with increasing noise E and increases with decreasing noise.

In the eighth embodiment, {√2−F((x, y), (I', J'))} in equation (25), that is, the weight depending on the distance between the position (I', J') and the position (x, y) of the pixel value Gobs(k, ig, jg) (hereinafter, referred to simply as a distance weight) is replaced with a function including cubic functions: Cubic(I'−x)×Cubic(J'−y). That is, in the eighth embodiment, {√2−F((x, y), (I', J'))} in equation (25) is replaced with Cubic(I'−x)×Cubic(J'−y).

The cubic function Cubic(z) is in a form (39) shown below.

$$\text{Cubic}(z) = \begin{cases} (a+2)|z|^3 - (a+3)|z|^2 + 1 & (|z| < 1) \\ a|z|^3 - 5a|z|^2 + 8a|z| - 4a & (1 \le |z| < 2) \\ 0 & (2 \le |z|) \end{cases} \quad (39)$$

where a is a predetermined constant, which is set, for example, to −1.

Figure 42:
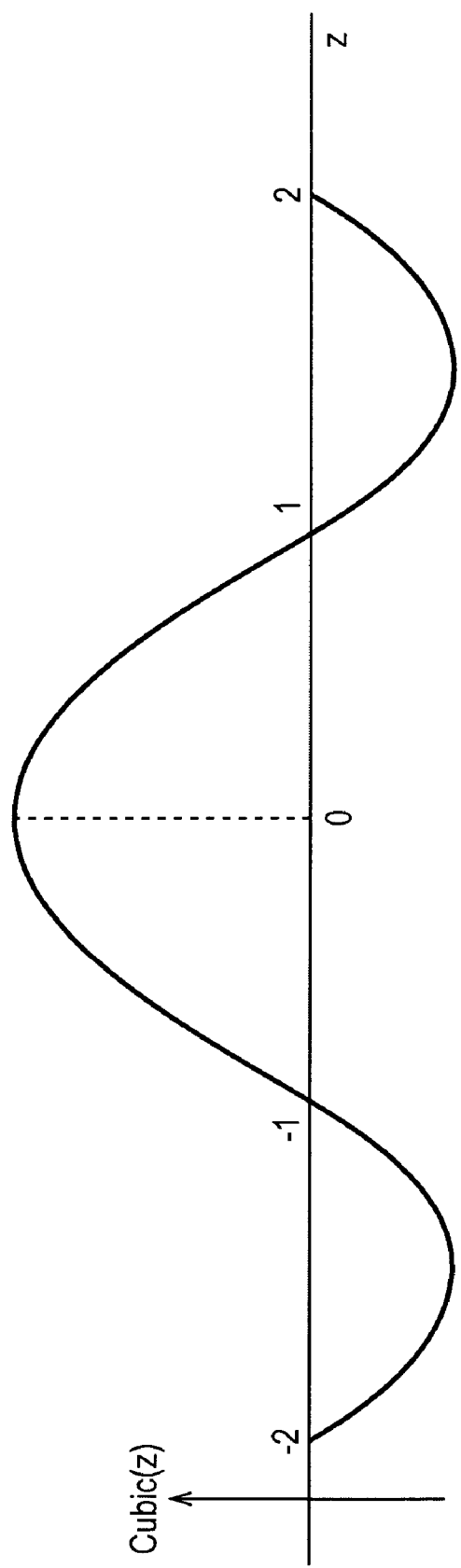
FIG. 42 is a diagram showing a cubic function.

As shown in FIG. 42, the cubic function Cubic(z) has a value of 0 when 2≦|z| or when |z|=1, and the cubic function Cubic(z) is negative when 1<|z|<2. When |z|<1, Cubic(z) is positive and decreases with |z|. In other words, the cubic function Cubic(z) serves as a lowpass filter in the frequency domain (for Fourier-transformed variable).

In equation (25), if p-th pixel value Gobs(k, ig, jg) subjected to summation Σ is denoted by $v_p$, the spring constant {√2−F((x, y), (I', J'))}/(Mk×E) associated with the p-th pixel value $v_p$ is denoted as a spring constant $K_p$, and if the resultant equation is solved with respect to the true green light intensity Lg(I', J'), equation (40) is obtained.

$$Lg(I', J') = \frac{\sum K_p v_p}{\sum K_p} \quad (40)$$

where Σ denotes the sum with respect to p.

From equation (40), it can be seen that, in the spring model, the true green light intensity Lg(I', J') is given by the weighted sum of pixel values $v_p$ wherein the spring constants $K_p$ are employed as weights. The true red light intensity Lr(I', J') and the true blue light intensity Lb(I', J') can be determined in a similar manner.

Figure 43:
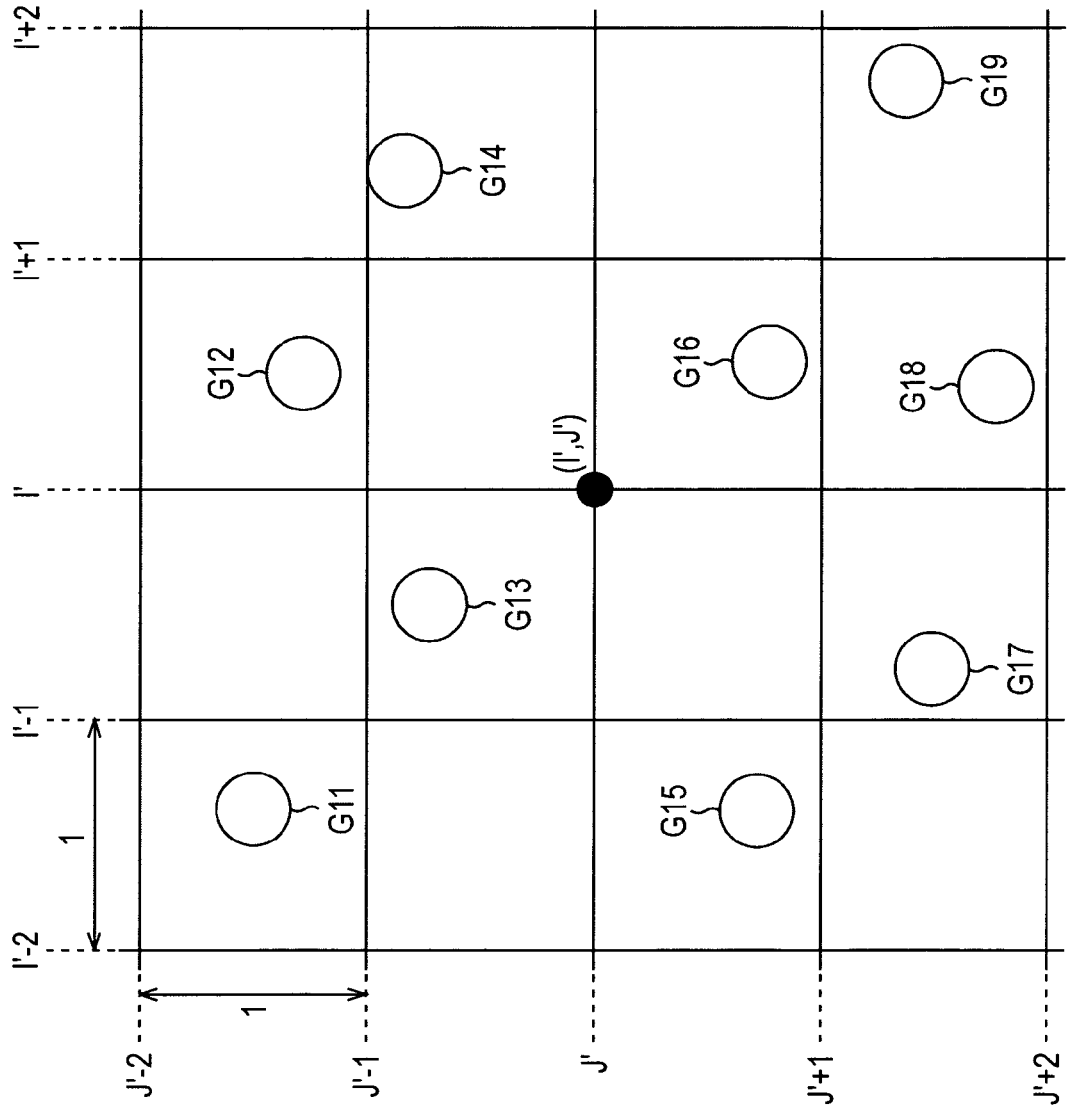
FIG. 43 is a diagram showing pixel values at a position (I', J') in a reference coordinate system.

In FIG. 43, for the position (I', J'), when positions (ig−0.5, jg−0.5) of N captured images are converted into positions (x, y) in the reference coordinate system (coordinate system defined on the first image), all combinations of integers k, ig, and jg that satisfy I'−2≦x<I'+2 and J'−2≦y<J'+2 are determined, and points G11 to G19 at which pixel values Gobs(k, ig, jg) are observed are shown.

In FIG. 43, for a position (I', J') denoted by a solid circle, combinations of integers (k, ig, jg) identifying nine pixel values Gobs(k, ig, jg) observed at points G11 to G19 denoted by open circles are obtained. Note that combinations of integers k, ig and jg are different among points G11 to G19.

In the third embodiment described earlier, as shown in FIG. 21, for a position (I', J'), positions (ig−0.5, jg−0.5) on N captured images are converted into positions (x, y) in the reference coordinate system (coordinate system defined on the first image), and all combinations of integers k, ig, and jg that satisfy I'−1≦x<I'+1 and J'−1≦y<J'+1 are determined. In contrast, in the eighth embodiment, as shown in FIG. 43, combinations of integers k, ig, and jg that satisfy I'−2≦x<I'+2 and J'−2≦y<J'+2 are determined. As described above, the cubic function Cubic(z) in the form (39) has a value depending on argument z for −2<z<2 (Cubic(z) has a value of 0 for any z in the range of |z|>2), and the true green light intensity Lg(I', J') at the position (I', J') is estimated using pixel values Gobs(k, ig, jg) observed in the range −2≦z<2, that is, in the range defined by I'−2≦x<I'+2 and J'−2≦y<J'+2. In the third embodiment described earlier, a position (ig−0.5, jg−0.5) on the k-th captured image is converted to a position ((ig−0.5)$_{(k)}$, (ig−0.5)$_{(k)}$) in the reference coordinate system defined on the first captured image as follows. That is, the motion detector 23-(k−1) determines the affine conversion parameters (θk, Tkx, Tky, Sk) including a rotation angle θk, a scale Sk, and a parallel displacement (Tkx, Tky) from the positional relationship between the first captured image and the k-th captured image. The resultant conversion parameters (θk, Tkx, Tky, Sk) are supplied to the calculation circuit 24. Based on the conversion parameters (θk, Tkx, Tky, Sk) from the motion detector 23-(k−1), the calculation circuit 24 converts the position (ig−0.5, jg−0.5) on the k-th captured image to a position ((ig−0.5)$_{(k)}$, (ig−0.5)$_{(k)}$) in the reference coordinate system in accordance with affine conversion equation (3).

On the other hand, in the eighth embodiment, the motion detector 23-(k−1) determines affine conversion parameters of an affine conversion equation (41) representing the positional relationship between the first captured image and the k-th captured image.

$$\begin{pmatrix} XI_{(k)} \\ YI_{(k)} \end{pmatrix} = \begin{pmatrix} ak' & bk' \\ ck' & dk' \end{pmatrix} \begin{pmatrix} Xk \\ Yk \end{pmatrix} + \begin{pmatrix} Tkx' \\ Tky' \end{pmatrix} \quad (41)$$

More specifically, the motion detector 23-(k−1) determines a matrix (ak', bk', ck', dk') and a 2-dimensional vector (Tkx', Tky') in equation (41) representing the positional relationship between the first captured image and the k-th captured image, and supplies the resultant matrix (ak', bk', ck', dk') and the 2-dimensional vector (Tkx', Tky') to the calculation circuit 24. Hereinafter, the affine conversion parameters including the matrix (ak', bk', ck', dk') and the 2-dimensional vector (Tkx', Tky') in equation (41) will be referred to simply as conversion parameters (ak', bk', ck', dk', Tkx', Tky').

If respective parameters are given such that ak'=dk'=Sk×cos(θk) and −bk'=ck'=Sk×sin(θk), equation (41) becomes equivalent to equation (3).

In equation (41), as in equation (3), (Xk, Yk) represents the position of a pixel of the k-th captured image, and (X1$_{(k)}$, Y1$_{(k)}$) represents a position on the first captured image (in the reference coordinate system) obtained by affine-converting the position (Xk, Yk) in accordance with equation (41). Note that a subscript (k) is used to indicate a position of the k-th captured image converted into the reference coordinate system. If the conversion parameters for the first captured image are given as (a1', b1', c1', d1', T1x', T1y')=(1, 0, 0, 1, 0, 0), then equation (41) holds for all values of k in the range from 1 to N.

For example, the motion detector 23-1 determines affine conversion parameters (a2', b2', c2', d2', T2x', T2y') of equation (42) representing the positional relationship between the first captured image and a second captured image, and supplies the resultant conversion parameters (a2', b2', c2', d2', T2x', T2y') to the calculation circuit 24.

$$\begin{pmatrix} X1_{(2)} \\ Y1_{(2)} \end{pmatrix} = \begin{pmatrix} a2' & b2' \\ c2' & d2' \end{pmatrix} \begin{pmatrix} X2 \\ Y2 \end{pmatrix} + \begin{pmatrix} T2x' \\ T2y' \end{pmatrix} \quad (42)$$

On the other hand, the motion detector 23-2 determines affine conversion parameters (a3', b3', c3', d3', T3x', T3y') of equation (43) representing the positional relationship between the first captured image and a third captured image, and supplies the resultant conversion parameters (a3', b3', c3', d3', T3x', T3y') to the calculation circuit 24.

$$\begin{pmatrix} X1_{(3)} \\ Y1_{(3)} \end{pmatrix} = \begin{pmatrix} a3' & b3' \\ c3' & d3' \end{pmatrix} \begin{pmatrix} X3 \\ Y3 \end{pmatrix} + \begin{pmatrix} T3x' \\ T3y' \end{pmatrix} \quad (43)$$

equation (43) represents that a position (X3, Y3) on the third captured image is displaced, because of camera shake or the like, by an amount corresponding to the conversion parameters (a3', b3', c3', d3', T3x', T3y') with respect to a position (x1, y1) on the first captured image.

Instead of determining the conversion parameters (ak', bk', ck', dk', Tkx', Tky') from the positional relationship of the k-th captured image with respect to the first captured image in the above-described manner, the conversion parameters (ak', bk', ck', dk', Tkx', Tky') may be mechanically determined from a signal output from an acceleration sensor disposed on the digital camera 1. In the case of camera shaking that occurs when a camera is held in hands, the positional relationship between the first captured image and the k-th captured image includes substantially no rotation component. Therefore, the rotation component in the conversion parameters (ak', bk', ck', dk', Tkx', Tky') may be neglected (that is, it may be assumed that no rotation occurs).

In the eighth embodiment, the weight associated with noise in equation (25) is set based on the assumption that all N captured images are gained up by the same factor (by means of n'-bit shifting). That is, in the eight embodiment, it is assumed that all N images (input images) captured by the imaging device 4 have brightness that is 1/M=1/Mk times the brightness obtained with optimum exposure. For example, if captured images have brightness equal to ⅛ times the brightness of an image captured with optimum exposure, then M=8, and thus shifter 21 (FIG. 1) gains up the captured image by performing 3-bit shifting.

In the eighth embodiment, because the shifter 21 gains up all N captured images by the same factor, the weight 1/(Mk× E) associated with noise in equation (25) can be simply rewritten as 1/(M×E).

Thus, in this eighth embodiment, equation (25) used in the third embodiment can be rewritten as equation (44).

$$\sum \left[ \frac{\text{Cubic}(I'-x) \times \text{Cubic}(J'-y)}{M \times E} \times \{Gobs(k, ig, jg) - Lg(I', J')\} \right] = 0 \quad (44)$$

For the given position (I', J'), the sum Σ in equation (44) is taken for all combinations (k, ig, jg) that satisfy I'−2≦x<I'+2 and J'−2≦y<J'+2 with respect to the position (x, y) in the reference coordinate system obtained by converting, based on conversion parameters (ak', bk', ck', dk', Tkx', Tky'), the position (ig−0.5, jg−0.5). In the specific example shown in FIG. 43, the sum is taken for nine combinations of integers (k, ig, jg) corresponding to points G11 to G19.

equation (44) can be regarded as a spring equation associated with the green light intensity using the cubic function Cubic(z) according to the eighth embodiment, corresponding to the spring equation (25) associated with the green light intensity.

In equation (44), the weight 1/(M×E) associated with noise is constant regardless of the combinations of integers (k, ig, jg) subjected to the summation Σ, and thus the weight 1/(M× E) can be moved out to the outside of Σ. Thus, equation (44) can be rewritten as (45).

$$\frac{1}{M \times E} \sum [\text{Cubic}(I'-x) \times \text{Cubic}(J'-y) \times \{Gobs(k, ig, jg) - Lg(I', J')\}] = 0 \quad (45)$$

$$\sum [\text{Cubic}(I'-x) \times \text{Cubic}(J'-y) \times \{Gobs(k, ig, jg) - Lg(I', J')\}] = 0$$

If equation (45) is solved with respect to the true green light intensity Lg(I', J'), equation (46) is obtained.

$$\sum \text{Cubic}(I'-x) \times \text{Cubic}(J'-y) \times Gobs(k, ig, jg) =$$
$$\sum \text{Cubic}(I'-x) \times \text{Cubic}(J'-y) \times Lg(I', J')$$
$$Lg(I', J') = \frac{\sum \text{Cubic}(I'-x) \times \text{Cubic}(J'-y) \times Gobs(k, ig, jg)}{\sum \text{Cubic}(I'-x) \times \text{Cubic}(J'-y)}$$

In this eighth embodiment, the true green light intensity Lg(I', J') is determined using equation (46).

equation (46) indicates that the green light intensity Lg(I', J') can be obtained by calculating the weighted sum of pixel values Gobs(k, ig, jg) by using Cubic(I'−x)×Cubic(J'−y) as the weight. Note that the weight Cubic(I'−x)×Cubic(J'−y) serves as a lowpass filter for the distance between the position (I', J') and the position (x, y) of the pixel value Gobs(k, ig, jg).

Hereinafter, equation (46) will be referred to as a weighted sum equation associated with the green light intensity. The denominator and the numerator of equation (46) associated with the weighted sum of green light intensities are separately rewritten as equations (47) and (48), respectively.

$$\Sigma \text{Cubic}(I'-x) \times \text{Cubic}(J'-y) \times Gobs(k, ig, ig) \quad (47)$$

$$\Sigma \text{Cubic}(I'-x) \times \text{Cubic}(J-y) \quad (48)$$

If the original data (light intensity) in the state in which the pixel value Gobs(k, ig, jg) is not yet gained up by a factor of M by the shifter 21 is denoted as $D_{Gobs(k, ig, ig)}$, then equation (46) can be written as (49).

$$Lg(I', J') = \frac{\sum \text{Cubic}(I'-x) \times \text{Cubic}(J'-y) \times M \times D_{Gobs(k,ig,jg)}}{\sum \text{Cubic}(I'-x) \times \text{Cubic}(J'-y)} \quad (49)$$

The true red light intensity Lr(I', J') and the true blue light intensity Lb(I', J') at the position (I', J') of interest can be respectively represented by equations (50) and (51), which is similar to equation (46).

$$Lr(I', J') = \frac{\sum \text{Cubic}(I' - x) \times \text{Cubic}(J' - y) \times Robs(k, ir, jr)}{\sum \text{Cubic}(I' - x) \times \text{Cubic}(J' - y)} \quad (50)$$

Hereinafter, equation (50) will be referred to as a weighted sum equation associated with the red light intensity. For the given position (I', J'), the sum $\Sigma$ in equation (50) is taken for all combinations (k, ir, jr) that satisfy I'$-2 \leq x <$I'$+2$ and J'$-2 \leq y <$J'$+2$ with respect to the position (x, y) in the reference coordinate system obtained by converting, based on conversion parameters (ak', bk', ck', dk', Tkx', Tky'), the position (ir$-0.5$, jr$-0.5$).

$$Lb(I', J') = \frac{\sum \text{Cubic}(I' - x) \times \text{Cubic}(J' - y) \times Bobs(k, ib, jb)}{\sum \text{Cubic}(I' - x) \times \text{Cubic}(J' - y)} \quad (51)$$

Hereinafter, equation (51) will be referred to as a weighted sum equation associated with the blue light intensity. For the given position (I', J'), the sum $\Sigma$ in equation (51) is taken for all combinations (k, ib, jb) that satisfy I'$-2 \leq x <$I'$+2$ and J'$-2 \leq y <$J'$+2$ with respect to the position (x, y) in the reference coordinate system obtained by converting, based on conversion parameters (ak', bk'', ck', dk', Tkx', Tky'), the position (ib$-0.5$, jb$-0.5$).

The denominator and the numerator of equation (50) associated with the weighted sum of green light intensities are separately rewritten as equations (52) and (53), respectively.

$\Sigma\text{Cubic}(I'-x)\times\text{Cubic}(J'-y)\times Robs(k, ir, ir)$ (52)

$\Sigma\text{Cubic}(I'-x)\times\text{Cubic}(J'-y)$ (53)

The denominator and the numerator of equation (51) associated with the weighted sum of green light intensities are separately rewritten as equations (54) and (55), respectively.

$\Sigma\text{Cubic}(I'-x)\times\text{Cubic}(J'-y)\times Bobs(k, ib, jb)$ (54)

$\Sigma\text{Cubic}(I'-x)\times\text{Cubic}(J'-y)$ (55)

By calculating the weighted sum associated with the green light intensity according to equation (46), the weighted sum associated with the red light intensity according to equation (50), and the weighted sum associated with the blue light intensity according to equation (51), the calculation circuit 24 determines the true green light intensity Lg(I', J'), the true red light intensity Lr(I', J'), and the true blue light intensity Lb(I', J'). The process performed by the calculation circuit 24 to determine those light intensities is referred to as a normal process to distinguish it from an exceptional process that will be described later.

The weighted sum associated with the green light intensity given by equation (46), the weighted sum associated with the red light intensity given by equation (50), and the weighted sum associated with the blue light intensity given by equation (51) will be further discussed below.

equation (46) indicates that the weighted sum associated with the green light intensity is obtained by dividing the sum of products of the pixel value Gobs(k, ig, jg) at the position (x, y) and the distance weight Cubic(I'$-$x)$\times$Cubic(J'$-$y) (that is, the sum of pixel values Gobs(k, ig, jg) weighted with the distance weight Cubic(I'$-$x)$\times$Cubic(J'$-$y)) by the sum of the distance weights Cubic(I'$-$x)$\times$Cubic(J'$-$y), that is, by dividing the value given by equation (47) that is equal to the numerator of equation (46) by the value given by equation (48) that is equal to denominator of equation (46).

If the value given by equation (48) that is equal to the denominator of equation (46) becomes equal to 0, equation (46) representing the true green light intensity Lg(I', J') becomes unstable (uncertain), and thus the result is unreliable. In other words, at a position (I', J') at which the value given by equation (48) that is equal to the denominator of equation (46) becomes equal to 0, small noise (error) included in the pixel values Gobs(k, ig, jg) in equation (46) that is equal to the numerator of equation (48) is divided by the denominator equal to 0, and thus the result becomes very large. In this case, the true green light intensity Lg(I', J') calculated according to equation (46) includes large noise and is unreliable.

The value given by equation (48) that is equal to the denominator of equation (46) becomes equal to 0, for example, when at least one of cubic functions Cubic(I'$-$x) and Cubic(J'$-$y) becomes equal to 0 over all the range of the summation in equation (48). As can be seen from FIG. 42, cubic functions Cubic(I'$-$x) or Cubic(J'$-$y) becomes equal to 0 when I'$-$x$=\pm 1$ or J'$-$y$=\pm 1$, that is, when x=I'$\pm 1$ or y=J'$\pm 1$.

Therefore, for a given position (I', J'), when positions (ig$-0.5$, jg$-0.5$) are converted into the reference coordinate system using conversion parameters (ak', bk', ck', dk', Tkx', Tky'), if all positions (x, y) of pixel values Gobs(k, ig, jg) of (k, ig, jg) appearing within the range defined by I'$-2 \leq x <$I'$+2$ and J'$-2 \leq y <$J'$+2$ satisfy x=I'$\pm 1$ or y=J'$\pm 1$, the denominator of equation (46) representing the true green light intensity Lg(I', J') becomes equal to 0 (or nearly equal to 0), and thus the result becomes unstable and unreliable. However, all positions (x, y) of pixel values Gobs(k, ig, jg) appearing within the range defined by I'$-2 \leq x <$I'$+2$ and J'$-2 \leq y <$J'$+2$ satisfy x=I'$\pm 1$ or y=J'$\pm 1$ only in a very rare and exceptional state. Hereinafter, such a special state will be referred to simply as an exceptional state.

Hereinafter, a position (x, y) converted from a position (k, i, j) on a k-th captured image into the reference coordinate system using conversion parameters (ak', bk', ck', dk', Tkx', Tky') will be referred simply as a converted (corrected) position (x, y).

Figure 44:
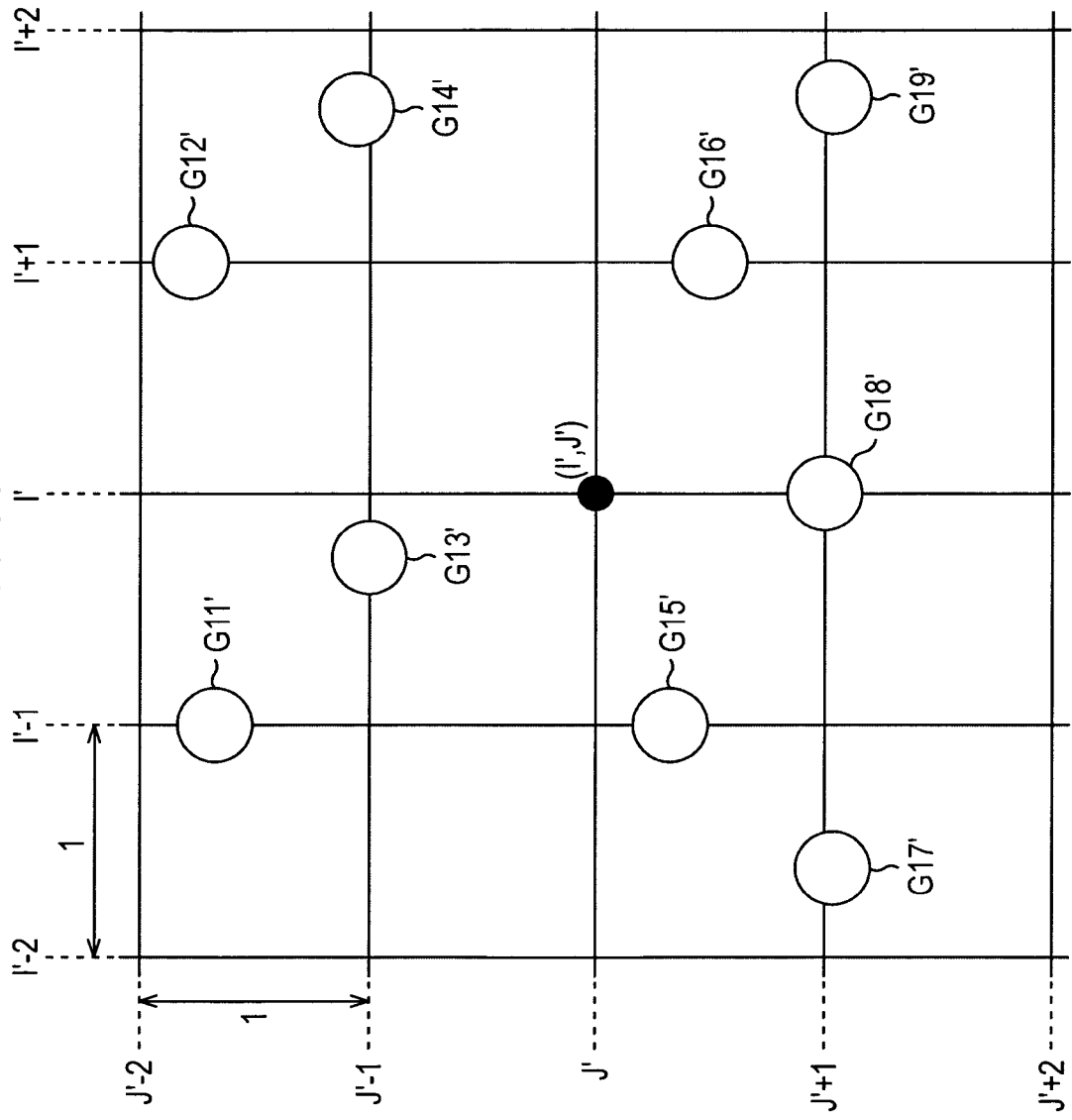
FIG. 44 is a diagram showing pixel values in an exceptional state at a position (I', J') in the reference coordinate system.

FIG. 44 shows an exceptional state at a position (I', J').

In the specific example shown in FIG. 44, when positions (ig$-0.5$, jg$-0.5$) are converted using conversion parameters (ak', bk', ck', dk', Tkx', Tky'), converted points (converted positions) G11' and G15' are located at positions where x=I'$-1$ is satisfied, and converted points G12' and G16' are located at positions where x=I'$+1$ is satisfied.

Furthermore, converted points G13' and G14' are located at positions where y=J'$-1$ is satisfied, and converted points G17' and G19' are located at positions where y=J'$+1$ is satisfied.

In the specific example shown in FIG. 44, converted positions (x, y) falling within the region in the coordinate system defined by I'$-2 \leq x <$I'$+2$ and J'$-2 \leq y <$J'$+2$ have a special relation with the position (I', J'), that is, x=I'$\pm 1$ or y=J'$\pm 1$ for all combinations of integers (k, ig, jg). In this state, there is no G signal data (pixel value Gobs(k, ig, jg)) in a region (I'$\pm 1$, J'$\pm 1$) (a square region with a size of 2$\times$2) centered at the position (I', J').

In such a state (exceptional state), if the true green light intensity Lg(I', J') at the position (I', J') is determined in accordance with equation (46), the resultant true green light intensity Lg(I', J') is unreliable (unstable), as described above.

To avoid the above problem, when a pixel at the position (I', J') is in such an exceptional state, the calculation circuit 24 performs an exceptional process.

Figure 45:
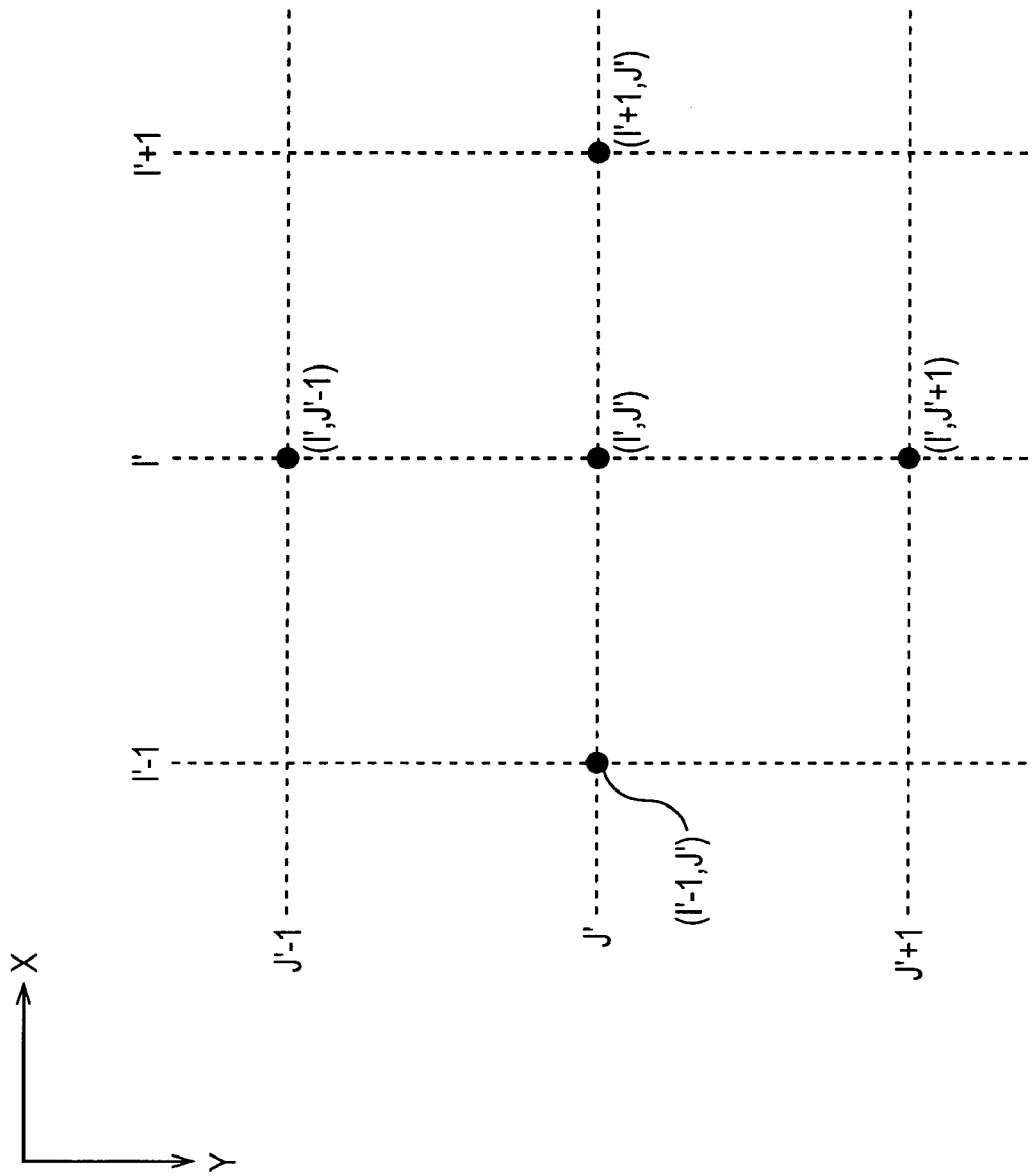
FIG. 45 is a diagram showing an exception handling process for a G signal.

More specifically, for a given position (I', J') of interest, when the true green light intensity Lg(I', J') of a pixel of an output image at the position (I', J') of interest is estimated (hereinafter, such a pixel will be referred to simply as a pixel of interest), if the pixel of the interest (the position (I', J') of the pixel of interest) is in the exceptional state, the calculation circuit 24 determines the true green light intensity Lg(I', J') at the position (I', J') of interest of the pixel of the interest in the exceptional state by using pixel values Gobs(k, ig, jg) of the k-th captured image whose corrected position (x, y) is located in the vicinity of the position of a pixel of the output image located in the vicinity of the pixel of interest, in addition to pixel values Gobs(k, ig, jg) of the k-th captured image whose corrected position (x, y) is located in the vicinity of the position (I', J') of interest. As for the pixel (adjacent pixel) located adjacent to the pixel of interest located at the position (I', J') of interest, pixels at positions (I'−1, J'), (I'+1, J'), (I', J'−1), and (I', J'+1) shown in FIG. 45 may be employed.

As described earlier with reference to FIG. 3, the imaging device 4 of the digital camera 1 according to the present embodiment has a Bayer-array structure. In the Bayer-array structure, pixels for sensing the green light component are disposed every two pixel positions in both X and Y direction (FIG. 3). In this eighth embodiment, it is assumed that the pixels of the imaging device 4 arranged such that W pixels are arranged in a horizontal (X) direction and H pixels are arranged in a vertical (Y) direction, and thus the imaging device 4 has a total of W×H pixels.

When there is no observed value (pixel value) Gobs(k, ig, jg) of the G signal in the vicinity of the position (I', J') of interest, the pixel of interest at the position (I', J') of interest cannot be a pixel for sensing the green light component in the Bayer-array structure.

Figure 46:
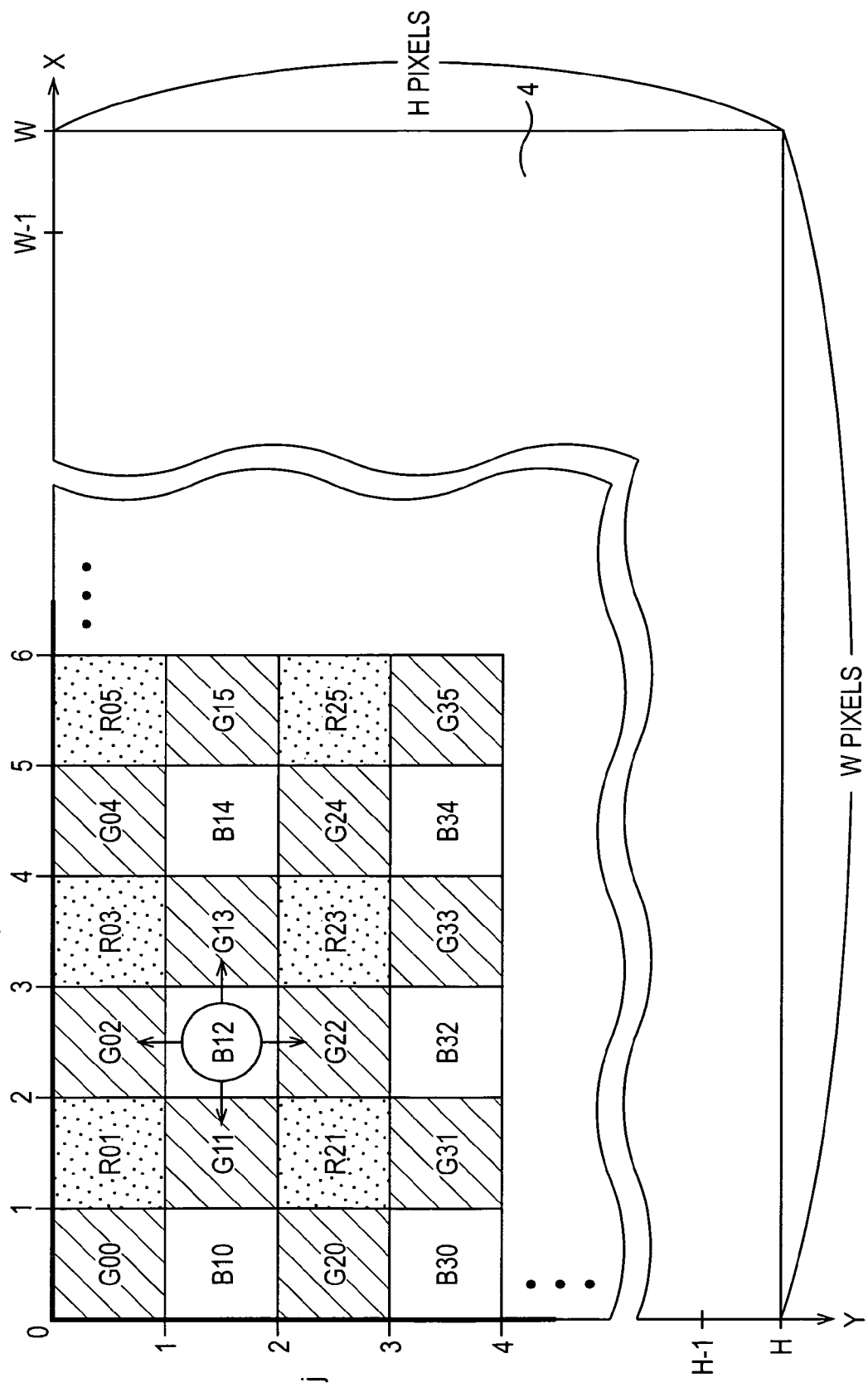
FIG. 46 is a diagram showing an exception handling process for a G signal.

For example, as shown in FIG. 46, when the pixel of interest at the position (I', J') of interest is a pixel B12 denoted by an open circle for sensing the blue light component in the Bayer-array structure, there is a pixel for sensing the green light component at an immediately adjacent location to the left or right of or above or below the pixel B12. Similarly, when the pixel of interest is a pixel of the imaging device 4 for sensing the red or blue light component, there is a pixel for sensing the green light component at an immediately adjacent location to the left or right of or above or below the pixel of interest.

Therefore, when there is no observed value Gobs(k, ig, jg) of the G signal in the vicinity of the position (I', J') of interest (when there is no green pixel of the captured image whose converted position (x, y) is located in the vicinity of the position (I', J') of interest), there is an observed value of the G signal in the vicinity of one of positions (I', J'−1), (I', J'+1), (I'−1, J'), and (I'+1, J') of adjacent pixels at immediately adjacent locations above or below or to the left or right of the pixel of interest at the position (I', J') of interest. When there is an observed value Gobs(k, ig, jg) of the G signal in the vicinity of particular one of adjacent pixels located at positions (I'−1, J'), (I'+1, J'), (I', J'−1), and (I', J'+1), the particular one of adjacent pixels is not in the exceptional state. For this particular adjacent pixel located at position (I'−1, J'), (I'+1, J'), (I', J'−1), or (I', J'+1), a reliable value of the green light intensity Lg(I', J') can be determined using equation (46).

As described above, when the pixel of interest is in the exceptional state, the calculation circuit 24 determines the true green light intensity Lg(I', J') at the position (I', J') of interest by using pixel values Gobs(k, ig, jg) of pixels whose corrected position (x, y) is located in the vicinity of an adjacent pixel located at (I'−1, J'), (I'+1, J'), (I', J'−1), or (I', J'+1) adjacent to the pixel of interest, in addition to pixel values Gobs(k, ig, jg) of pixels whose corrected position (x, y) is located in the vicinity of the position (I', J') of interest.

More particularly, in this case, the calculation circuit 24 determines the true green light intensity Lg(I', J') at the position (I', J') of interest by performing the exceptional process in accordance with equation (56).

$$Lg(I', J') = \{\text{numerator value of } G \text{ signal at } (I', J') + \\ \text{numerator value of } G \text{ signal at } (I'-1, J') + \\ \text{numerator value of } G \text{ signal at } (I'+1, J') + \\ \text{numerator value of } G \text{ signal at } (I', J'-1) + \\ \text{numerator value of } G \text{ signal at } (I', J'+1)\}/ \\ \{\text{denominator value of } G \text{ signal at } (I', J') + \\ \text{denominator value of } G \text{ signal at } (I'-1, J') + \\ \text{denominator value of } G \text{ signal at } (I'+1, J') + \\ \text{denominator value of } G \text{ signal at } (I', J'-1) + \\ \text{denominator value of } G \text{ signal at } (I', J'+1)\} \quad (56)$$

equation (56) represents that the true green light intensity Lg(I', J') is obtained by dividing the sum of the values of the numerator of equation (46) obtained in the normal process for total of five positions, that is, the position (I', J') of interest of the pixel of interest and the positions (I'−1, J'), (I'+1, J'), (I', J'−1), and (I', J'+1) of pixels adjacent to the pixel of interest by the sum of the values of the denominator of equation (46) obtained in the normal process for total of five positions, that is, the position (I', J') of interest of the pixel of interest and the positions I'−1, J'), (I'+1, J'), (I', J'−1), and (I', J'+1) of pixels adjacent to the pixel of interest, that is, by dividing the sum of the values of equation (47) by the sum of the values of equation (48).

Note that when the pixel of interest is in the exceptional state, the equation used to determine the true green light intensity Lg(I', J') at the position (I', J') of interest is not limited to equation (56) but other equations may be used. For example, equation (57) shown below may be used for this purpose.

$$LG(I', J) = \{(\text{numerator value of } G \text{ signal at } (I'-1, J'))/ \\ (\text{denominator value of } G \text{ signal at } (I'-1, J')) + \\ (\text{numerator value of } G \text{ signal at } (I'+1, J'))/ \\ (\text{denominator value of } G \text{ signal at } (I'+1, J')) + \\ (\text{numerator value of } G \text{ signal at } (I', J'-1))/ \\ (\text{denominator value of } G \text{ signal at } (I', J'-1)) + \\ (\text{numerator value of } G \text{ signal at } (I', J'+1))/ \\ (\text{denominator value of } G \text{ signal at } (I', J'+1))\}/4 \quad (57)$$

equation (57) represent that the estimated true green light intensity Lg(I', J') at the (I', J') of interest is obtained by calculating the mean value of true green light intensities Lg(Il−1, J'), Lg(I'+1, J'), Lg(I', J'−1) and Lg(I', J'+1) calculated using equation (46) for four positions (I'−1, J'), (I'+1, J'), (I', J'−1), and (I', J'+1) of pixels adjacent to the pixel of interest.

The weighted sum associated with the red light intensity given by equation (50) will be further discussed below.

As with the case in which the true green light intensity Lg(I', J') is calculated according to equation (46), when the true red light intensity Lr(I', J') is calculated according to equation (50), the solution becomes unstable if the pixel of interest is in the exceptional state. More specifically, for a given position (I', J') of interest, when positions (ir−0.5, jr−0.5) are converted into the reference coordinate system using conversion parameters (ak', bk', ck', dk', Tkx', Tky'), there is a possibility that all converted positions (x, y) of pixel values Robs(k, ir, jr) appearing within the range defined by I'−2≦x<I'+2 and J'−2≦y<J'+2 satisfy x=I'±1 or y=J'±1 as shown in FIG. 44. In such a state (exceptional state), there is no R signal data (pixel value Robs(k, ir, jr)) in a region (I'±1, J'±1) (a square region with a size of 2×2) centered at the position (I', J').

In this case, the calculation circuit 24 performs an exceptional process as described below.

Figure 47:
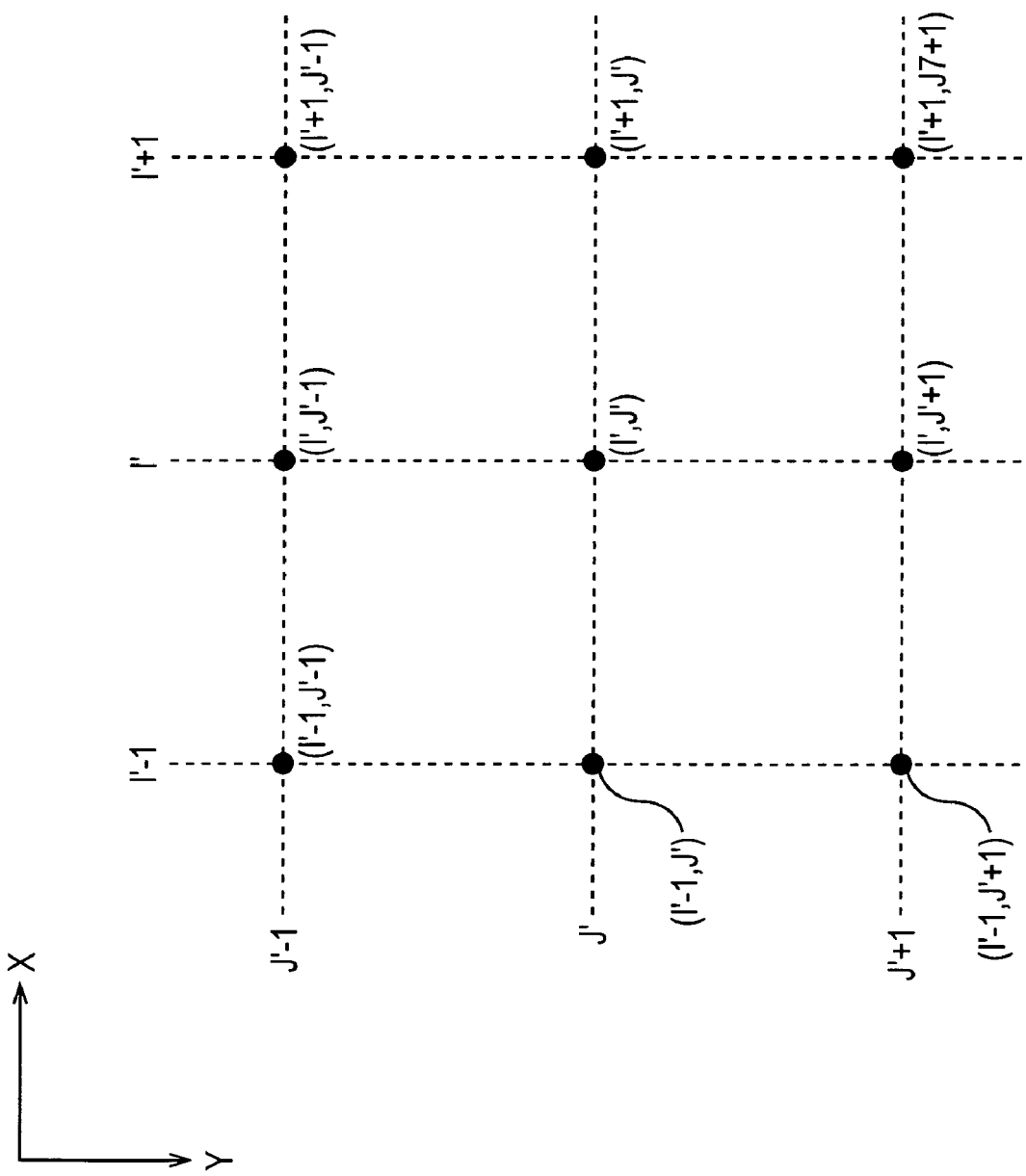
FIG. 47 is a diagram showing an exception handling process for a R signal.

That is, the calculation circuit 24 determines the true red light intensity Lr(I', J') at the position (I', J') of interest of the pixel of the interest in the exceptional state by using pixel values Robs(k, ir, jr) of the k-th captured image whose corrected position is located in the vicinity of the position of a pixel of the output image located in the vicinity of the pixel of interest, in addition to pixel values Gobs(k, ir, jr) of the k-th captured image whose corrected position is located in the vicinity of the pixel of interest. As for the pixel (adjacent pixel) located adjacent to the pixel of interest located at the position (I', J') of interest, pixels at positions (I'−1, J'−1), (I', J'−1), (I'+1, J'−1), (I'−1, J'), (I'+1, J'), (I'−1, J'+1), (I', J'+1), and (I'+1, J'+1) shown in FIG. 47 may be employed.

When there is no observed value (pixel value) Robs(k, ir, jr) of the R signal in the vicinity of the position (I', J') of interest, the pixel of interest at the position (I', J') of interest cannot be a pixel for sensing the red light component in the Bayer-array structure.

Figure 48:
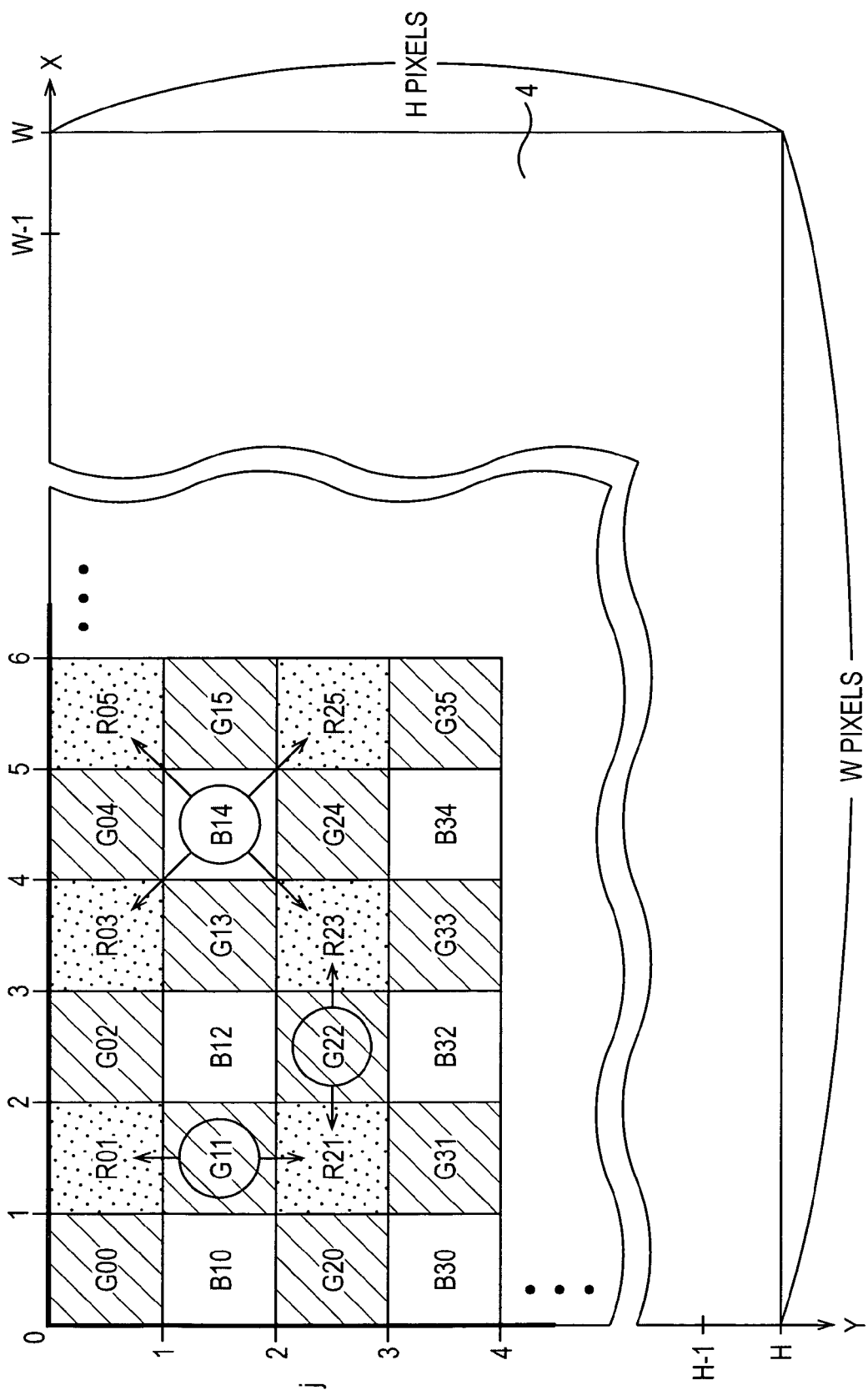
FIG. 48 is a diagram showing an exception handling process for a R signal.

For example, as shown in FIG. 48, when the pixel of interest at the position (I', J') of interest is a pixel G11 denoted by an open circle for sensing the green light component in the Bayer-array structure, there is a pixel for sensing the red light component at an immediately adjacent location above or below the pixel G11.

On the other hand, for example, as shown in FIG. 48, when the pixel of interest at the position (I', J') of interest is a pixel G22 denoted by an open circle for sensing the green light component in the Bayer-array structure, there is a pixel for sensing the red light component at an immediately adjacent location to the left or right of the pixel G22.

Furthermore, for example, as shown in FIG. 48, when the pixel of interest at the position (I', J') of interest is a pixel B14 denoted by an open circle for sensing the blue light component in the Bayer-array structure, there is a pixel for sensing the red light component at an immediately adjacent location to the upper right, lower right, upper left, or lower left of the pixel B14.

Similarly, when the pixel of interest is a pixel other than pixels for sensing the red light component, there is a pixel for sensing the red light component at an immediately adjacent location to the left, right, upper right, lower right, upper left, lower left of the pixel B14 or above or below the pixel B14.

Therefore, when there is no observed value Robs(k, ir, jr) of the R signal in the vicinity of the position (I', J') of interest (when there is no red pixel of the captured image whose converted position (x, y) is located in the vicinity of the position (I', J') of interest), there is an observed value of the R signal in the vicinity of one of positions (I'−1, J'−1), (I', J'−1), (I'+1, J'−1), (I'−1, J'), (I'+1, J'), (I'−1, J'+1), (I', J'+1), and (I'+1, J'+1) of adjacent pixels at immediately adjacent locations above or below or to the left, right, upper right, lower right, upper left, lower left of the pixel of interest at the position (I', J') of interest. When there is an observed value Robs(k, ir, jr) of the R signal in the vicinity of particular one of adjacent pixels located at positions (I'−1, J'−1), (I', J'−1), (I'+1, J'−1), (I'−1, J'), (I'+1, J'), (I'−1, J'+1), (I', J'+1), and (I'+1, J'+1), the particular one of adjacent pixels is not in the exceptional state. For this particular adjacent pixel located at position (I'−1, J'−1), (I', J'−1), (I'+1, J'−1), (I'−1, J'), (I'+1, J'), (I'−1, J'+1), (I', J'+1), or (I'+1, J'+1), a reliable value of the red light intensity Lr(I', J') can be determined using equation (50).

As described above, when the pixel of interest is in the exceptional state, the calculation circuit 24 determines the true red light intensity Lr(I', J') at the position (I', J') of interest by using pixel values Robs(k, ir, jr) of pixels whose corrected position (x, y) is located in the vicinity of an adjacent pixel located at (I'−1, J'−1), (I', J'−1), (I'+1, J'−1), (I'−1, J'), (I'+1, J'), (I'−1, J'+1), (I', J'+1), or (I'+1, J'+1) adjacent to the pixel of interest, in addition to pixel values Robs(k, ir, jr) of pixels whose corrected position (x, y) is located in the vicinity of the position (I', J') of interest.

More particularly, in this case, the calculation circuit 24 determines the true red light intensity Lr(I', J') at the position (I', J') of interest by performing the exceptional process in accordance with equation (58).

$$Lr(I', J') = (\text{numerator value of } R \text{ signal at } (I', J') +$$
$$\text{numerator value of } R \text{ signal at } (I'-1, J'-1) +$$
$$\text{numerator value of } R \text{ signal at } (I', J'-1) +$$
$$\text{numerator value of } R \text{ signal at } (I'+1, J'-1) +$$
$$\text{numerator value of } R \text{ signal at } (I'-1, J') +$$
$$\text{numerator value of } R \text{ signal at } (I'+1, J') +$$
$$\text{numerator value of } R \text{ signal at } (I'-1, J'+1) +$$
$$\text{numerator value of } R \text{ signal at } (I', J'+1) +$$
$$\text{numerator value of } R \text{ signal at } (I'+1, J'+1))/$$
$$((\text{denominator value of R signal at } (I', J') +$$
$$\text{denominator value of } R \text{ signal at } (I'-1, J'-1) +$$
$$(\text{denominator value of } R \text{ signal at } (I', J'-1) +$$
$$\text{denominator value of } R \text{ signal at } (I'+1, J'-1) +$$
$$\text{denominator value of } R \text{ signal at } (I'-1, J') +$$
$$\text{denominator value of } R \text{ signal at } (I'+1, J') +$$
$$\text{denominator value of } R \text{ signal at } (I'-1, J'+1) +$$
$$\text{denominator value of } R \text{ signal at } (I', J'+1) +$$
$$\text{denominator value of } R \text{ signal at } (I'+1, J'+1))$$

(58)

equation (58) represents that the true red light intensity Lr(I', J') is obtained by dividing the sum of the values of the numerator of equation (50) obtained in the normal process for total of nine positions, that is, the position (I', J') of interest of the pixel of interest and the positions (I'−1, J'−1), (I', J'−1), (I'+1, J'−1), (I'−1, J'), (I'+1, J'), (I'−1, J'+1), (I', J'+1), and (I'+1, J'+1) of pixels adjacent to the pixel of interest by the sum of the values of the denominator of equation (50) obtained in the normal process for total of nine positions, that is, the position (I', J') of interest of the pixel of interest and the positions (I'−1, J'−1), (I', J'−1), (I'+1, J'−1), (I'−1, J'), (I'+1, J'), (I'−1, J'+1), (I', J'+1), and (I'+1, J'+1) of pixels adjacent to the pixel of interest, that is, by dividing the sum of the values of equation (52) by the sum of the values of equation (53).

As with equation (57) associated with the G signal, instead of using equation (58), the true red light intensity Lr(I', J') at the position (I', J') of interest may be determined by calculating the mean value of true red light intensities Lr(I'−1, J'−1), Lr(I', J'−1), Lr(I'+1, J'−1), Lr(I'−1, J'), Lr(I'+1, J'), Lr(I'−1, J'+1), Lr(I', J'+1), and Lr(I'+1, J'+1) of pixels at eight positions (I'−1, J'−1), (I', J'−1), (I'+1, J'−1), (I'−1, J'), (I'+1, J'), (I'−1, J'+1), (I', J'+1), and (I'+1, J'+1) adjacent to pixel of interest.

When the true blue light intensity Lb(I', J') is determined using the weighted sum equation (51) associated with the blue light intensity, as with the true green light intensity Lg(I', J') determined using the weighted sum equation (46) associated with the green light intensity or as with the true red light intensity Lr(I', J') determined using the weighted sum equation (50) associated with the red light intensity, the solution becomes unstable if the pixel of interest at the position of interest is in the exceptional state.

In this case, the calculation circuit 24 performs an exceptional process as described below.

In the Bayer-array structure, pixels for sensing the blue light component are arranged in a similar manner in terms of positional relationship to the manner in which pixels for sensing the red light component are arranged. Therefore, the calculation circuit 24 determines the true blue light intensity Lb(I', J') at the position (I', J') of interest of the pixel of the interest in the exceptional state according to equation (59) similar to equation (58).

$$Lb(I', J') =$$

(numerator value of $B$ signal at $(I', J')$ + numerator value of $B$ signal at $(I'-1, J'-1)$ + numerator value of $B$ signal at $(I', J'-1)$ + numerator value of $B$ signal at $(I'+1, J'-1)$ + numerator value of $B$ signal at $(I'-1, J')$ + numerator value of $B$ signal at $(I'+1, J')$ + numerator value of $B$ signal at $(I'-1, J'+1)$ + numerator value of $B$ signal at $(I', J'+1)$ + numerator value of $B$ signal at $(I'+1, J'+1))/$ ((denominator value of B signal at $(I', J')$ + denominator value of $B$ signal at $(I'-1, J'-1)$ +

(denominator value of $B$ signal at $(I', J'-1)$ + denominator value of $B$ signal at $(I'+1, J'-1)$ + denominator value of $B$ signal at $(I'-1, J')$ + denominator value of $B$ signal at $(I'+1, J')$ + denominator value of $B$ signal at $(I'-1, J'+1)$ + denominator value of $B$ signal at $(I', J'+1)$ + denominator value of $B$ signal at $(I'+1, J'+1))$ equation (59) represents that the true blue light intensity Lb(I', J') is obtained by dividing the sum of the values of the numerator of equation (51) obtained in the normal process for total of nine positions, that is, the position (I', J') of interest of the pixel of interest and the positions (I'−1, J'−1), (I', J'−1), (I'+1, J'−1), (I−1, J'), (I'+1, J'), (I'−1, J'+1), (I', J'+1), and (I'+1, J'+1) of pixels adjacent to the pixel of interest the sum of the values of the denominator of equation (51) obtained in the normal process for total of nine positions, that is, the position (I', J') of interest of the pixel of interest and the positions (I'−1, J'−1), (I', J'−1), (I'+1, J'−1), (I−1, J'), (I'+1, J'), (I'−1, J'+1), (I', J'+1), and (I'+1, J'+1) of pixels adjacent to the pixel of interest, that is, by dividing the sum of the values of equation (54) by the sum of the values of equation (55).

As with equation (57) associated with the G signal, instead of using equation (59), the true blue light intensity Lb(I', J') at the position (I', J') of interest may be determined by calculating the mean value of true blue light intensities Lb(I'−1, J'−1), Lb(I', J'−1), Lb(I'+1, J'−1), Lb(I'−1, J'), Lb(I'+1, J'), Lb (I−1, J'+1), Lb(I', J'+1), and Lb(I'+1, J'+1) of pixels at eight positions (I'−1, J'−1), (I', J'−1), (I'+1, J'−1), (I'−1, J'), (I'+1, J'), (I'−1, J'+1), (I', J'+1), and (I'+1, J'+1) adjacent to pixel of interest.

Figure 49:
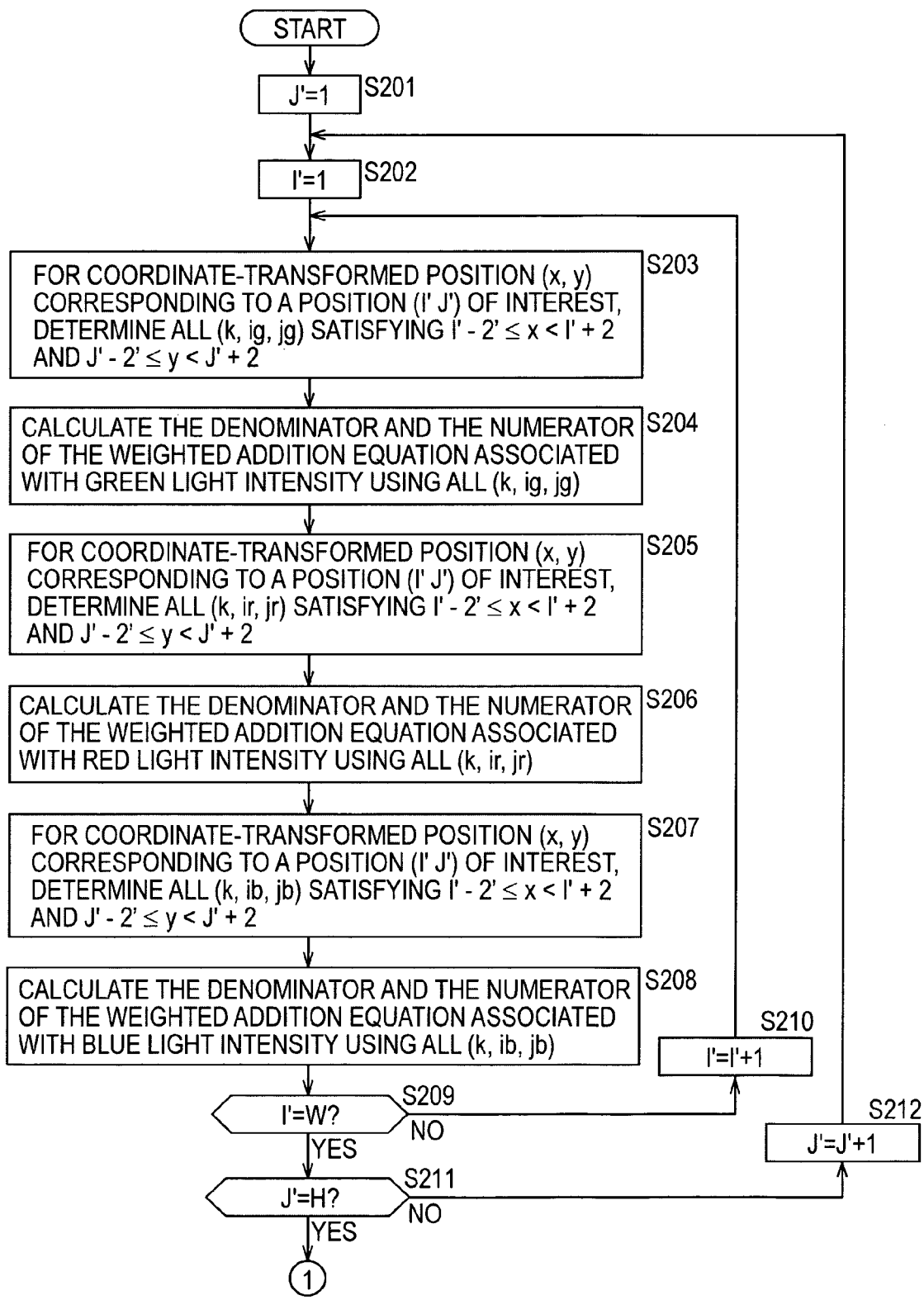
FIG. 49 a flow chart showing an image estimation process according to an eighth embodiment.
Figure 50:
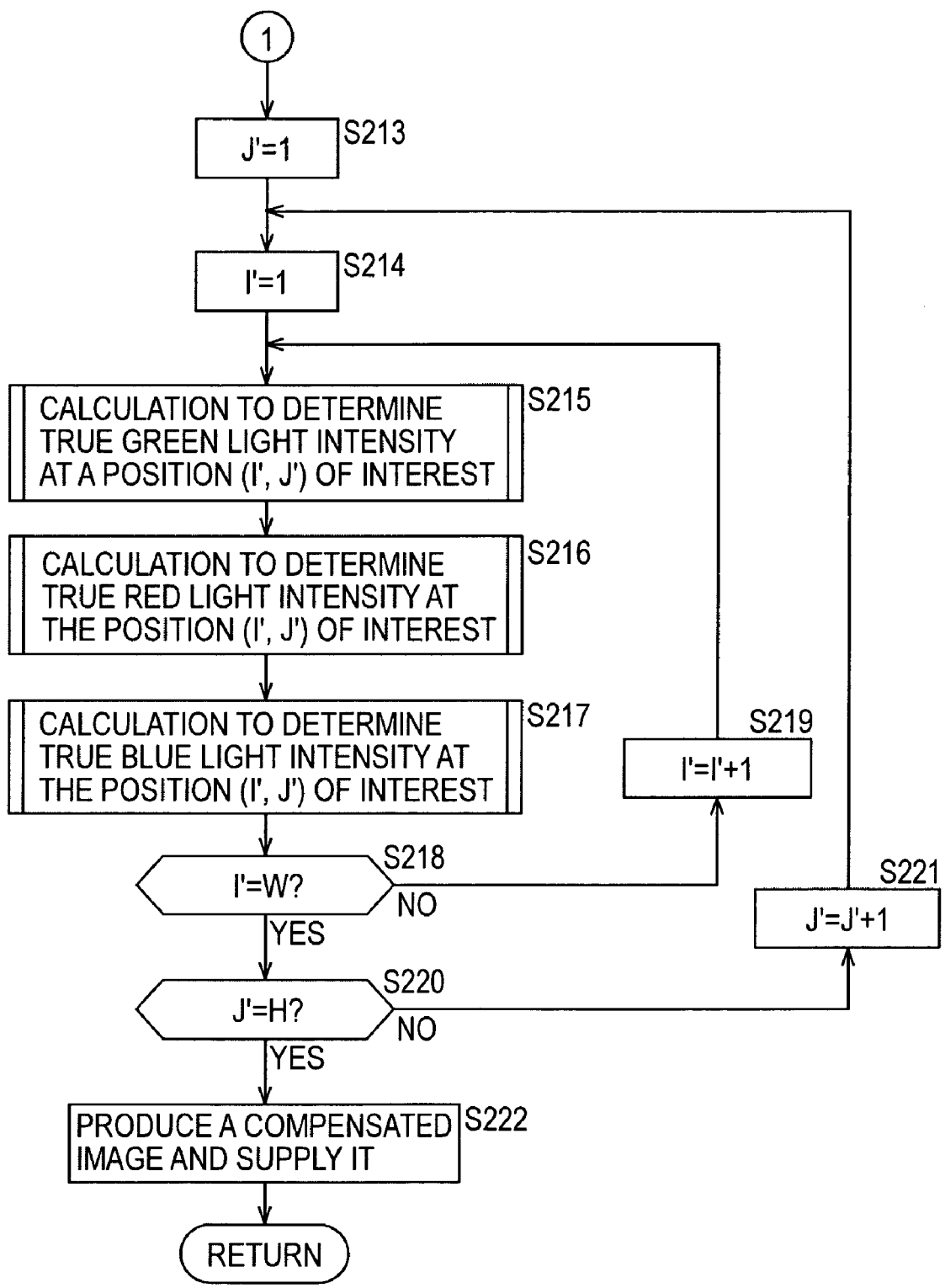
FIG. 50 a flow chart showing an image estimation process according to the eighth embodiment.

Now, referring to flow charts shown in FIGS. 49 and 50, a correct image estimation process in step S4 shown in FIG. 2 according to an eighth embodiment of the present invention is described.

First, in step S201, the calculation circuit 24 sets a variable J' of (I', J') to 1 to indicate the position in the Y direction of a pixel in the reference coordinate system. Thereafter, the process proceeds to step S202.

In step S202, the calculation circuit 24 calculates sets a variable I' of (I', J') to 1 to indicate the position in the X direction of a pixel in the reference coordinate system. Thereafter, the process proceeds to step S203. Note that variables I' and J' are also used to indicate the position in the X and Y directions of a pixel of an output image.

In step S203, the calculation circuit 24 selects the position (I', J') as a position of interest, and, for the position (I', J') of interest, the calculation circuit 24 determines all combinations of integers (k, ig, jg) that satisfy I'−2≦x<I'+2 and J'−2≦y<J'+2 with respect to the converted position (x, y) in the reference coordinate system obtained by converting, based on conversion parameters (ak', bk', ck', dk', Tkx', Tky'), the center position (ig−0.5, jg−0.5) of the pixel that senses the green component of the k-th image, for all of first to N-th images. Thereafter, the process proceeds to step S204.

In step S204, the calculation circuit 24 calculates the denominator of the weighted sum equation associated with the green light intensity according to equation (48) and the numerator of the weighted sum equation associated with the green light intensity according to equation (47) by using all combinations of integers (k, ig, jg) determined in step S203. The calculation circuit 24 stores the result of the calculation in a memory (not shown). Thereafter, the process proceeds to step S205.

In step S205, for the position (I', J') of interest, the calculation circuit 24 determines all combinations of integers (k, ir, jr) that satisfy I'−2≦x<I'+2 and J'−2≦y<J'+2 with respect to the converted position (x, y) in the reference coordinate system obtained by converting, based on conversion parameters (ak', bk', ck', dk', Tkx', Tky'), the center position (ir−0.5, jr−0.5) of the pixel that senses the red component of the k-th image, for all of first to N-th images. Thereafter, the process proceeds to step S206.

In step S206, the calculation circuit 24 calculates the denominator of the weighted sum equation associated with the red light intensity according to equation (53) and the numerator of the weighted sum equation associated with the red light intensity according to equation (52) by using all combinations of integers (k, ir, jr) determined in step S205. The calculation circuit 24 stores the result of the calculation in the memory. Thereafter, the process proceeds to step S207.

In step S207, for the position (I', J') of interest, the calculation circuit 24 determines all combinations of integers (k, ib, jb) that satisfy I'−2≦x<I'+2 and J'−2≦y<J'+2 with respect to the converted position (x, y) in the reference coordinate system obtained by converting, based on conversion parameters (ak', bk', ck', dk', Tkx', Tky'), the center position (ib−0.5, jb−0.5) of the pixel that senses the blue component of the k-th image, for all of first to N-th images.

In step S208, the calculation circuit 24 calculates the denominator of the weighted sum equation associated with the blue light intensity according to equation (55) and the numerator of the weighted sum equation associated with the blue light intensity according to equation (54) by using all combinations of integers (k, ib, jb) determined in step S207. The calculation circuit 24 stores the result of the calculation in the memory. Thereafter, the process proceeds to step S209.

In step S209, the calculation circuit 24 determines whether the variable I' is equal to the number of pixels W in the X direction. If it is determined in step S209 that the variable I' is not equal to the number of pixel W, that is, if steps S203 to S208 are not completed for all pixels whose Y position is J', the process proceeds to step S210. In step S210, the calculation circuit 24 increments the variable I' by 1. Thereafter, the process returns to step S203.

In the case in which it is determined in step S209 that the variable I' is equal to the number of pixel W, that is, if steps S203 to S208 are completed for all pixels whose Y position is J', the process proceeds to step S211.

In step S211, the calculation circuit 24 determines whether the variable J' is equal to the number of pixels H in the Y direction. If it is determined in step S211 that the variable J' is not equal to the number of pixel H, that is, if steps S203 to S208 are not completed for all Y positions of the imaging device 4, the process proceeds to step S212. In step S212, the calculation circuit 24 increments the variable J' by 1. Thereafter, the process returns to step S202.

On the other hand, if it is determined in step S211 that the variable J' is equal to the number of pixel H, that is, if steps S203 to S208 are completed for all Y positions of the imaging device 4, the process proceeds to step S213 in FIG. 50. Note that the numbers of pixels W and H are equal to the numbers of pixels of the output image in the X and Y directions, respectively.

In step S213, as in step S201, the calculation circuit 24 sets the variable J' to 1. Thereafter, the process proceeds to step S214.

In step S214, ass in step S202, the calculation circuit 24 sets the variable I' to 1. Thereafter, the process proceeds to step S215.

In step S215, the calculation circuit 24 calculates employs the position (I', J') as the position of interest, and calculates the true green light intensity Lg(I', J') at the position (I', J') of interest. Thereafter, the process proceeds to step S216. More specifically, in step S215 described above, the true green light intensity Lg(I', J') at the position (I', J') of interest is determined by performing either the normal process (first calculation process) using the weighted sum equation (46) associated with the green light intensity or the exceptional process (second calculation process) according to equation (56), as will be described in further detail later.

In step S216, the calculation circuit 24 calculates employs the position (I', J') as the position of interest, and calculates the true red light intensity Lr(I', J') at the position (I', J') of interest. Thereafter, the process proceeds to step S217. More specifically, in step S216 described above, the true red light intensity Lr(I', J') at the position (I', J') of interest is determined by performing either the normal process (first calcu- lation process) using the weighted sum equation (50) associated with the red light intensity or the exceptional process (second calculation process) according to equation (58), as will be described in further detail later.

In step S217, the calculation circuit 24 employs the position (I', J') as the position of interest, and calculates the true blue light intensity Lb(I', J') at the position (I', J') of interest. Thereafter, the process proceeds to step S218. More specifically, in step S217 described above, the true blue light intensity Lb(I', J') at the position (I', J') of interest is determined by performing either the normal process (first calculation process) using the weighted sum equation (51) associated with the blue light intensity or the exceptional process (second calculation process) according to equation (59), as will be described in further detail later.

In step S218, the calculation circuit 24 determines whether the variable I' is equal to the number W of pixels in the X direction. If it is determined in step S218 that the variable I' is not equal to the number of pixel W, that is, if steps S215 to S217 are not completed for all pixels whose Y position is J', the process proceeds to step S219. In step S219, the calculation circuit 24 increments the variable I' by 1. Thereafter, the process returns to step S215.

In the case in which it is determined in step S218 that the variable I' is equal to the number of pixel W, that is, if steps S215 to S217 are completed for all pixels whose Y position is J', the process proceeds to step S220.

In step S220, the calculation circuit 24 determines whether the variable J' is equal to the number of pixels H in the Y direction. If it is determined in step S220 that the variable J' is not equal to the number of pixel H, that is, if steps S215 to S217 are not completed for all Y positions of the imaging device 4, the process proceeds to step S221. In step S221, the calculation circuit 24 increments the variable J' by 1. Thereafter, the process returns to step S214.

On the other hand, if it is determined in step S220 that the variable J' is equal to the number of pixel H, that is, if steps S215 to S217 are completed for all Y positions of the imaging device 4, the process proceeds to step S222.

In step S222, the calculation circuit 24 estimates an output image (signal) from the true green light intensity Lg(I', J'), the true red light intensity Lr(I', J'), and the true blue light intensity Lb(I', J') determined respectively steps S215, S216, and S217. The resultant output image is supplied to the D/A converter 9 or the codec 12. Thereafter, the processing flow returns from the current process. More specifically, for the (i-th, j-th) pixel, the calculation circuit 24 estimates a correct image signal of the (i-th, j-th) pixel from the true green light intensity Lg (=Lg(I', J')) determined as the green value (G signal) in step S215, the true red light intensity Lr(i−0.5, j−0.5) (=Lr(I', J')) determined as the red value (R signal) in step S216, and the true blue light intensity Lb(i−0.5, j−0.5) (=Lb(I', J')) determined as the blue value (B signal) in step S217. The calculation circuit 24 estimates an output image by performing the above-described process for all pixels of the output image whose center is located at the position (I', J') (=(i−0.5, j−0.5)).

Figure 51:
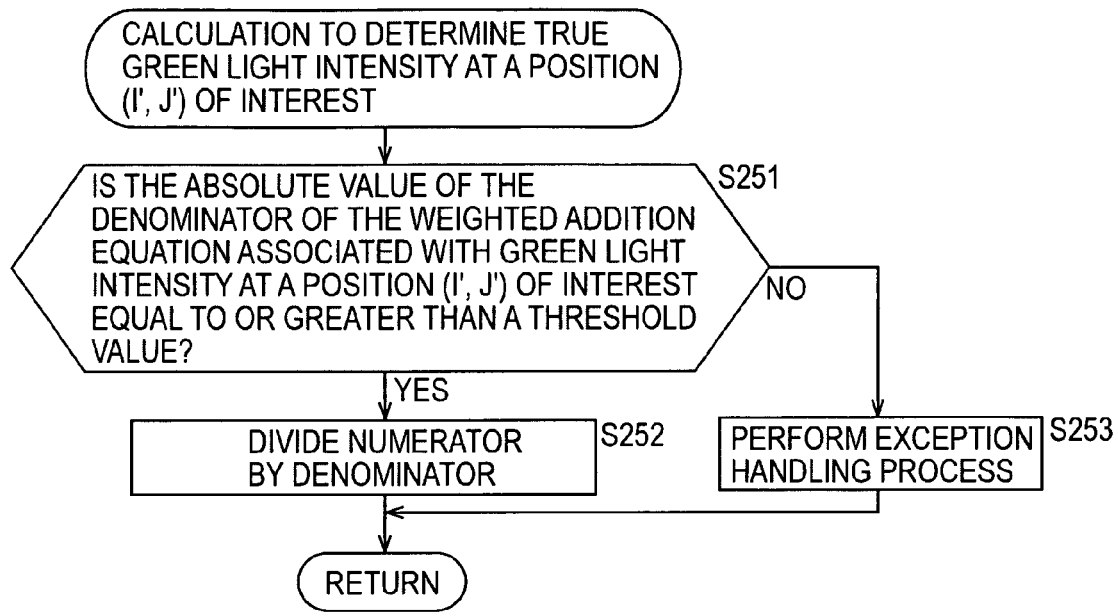
FIG. 51 a flow chart showing an image estimation process according to the eighth embodiment.

Now referring to a flow chart shown in FIG. 51, the process performed in step S215 in FIG. 50 to calculate the true green light intensity Lg(I', J') at the position (I', J') of interest is described below.

First, in step S251, the calculation circuit 24 determines whether the absolute value of the denominator of the weighted sum of green light intensities in equation (46) calculated in step S204 in FIG. 49 for the position (I', J') of interest, that is, the absolute value of equation (48), is equal to or greater than a threshold value. The threshold value is used to determine whether the absolute value of equation (48) should be regarded as being equal to 0 and thus the exception handling process should be performed. The threshold value is set in advance in the calculation circuit 24. The threshold value may be set variably to a value specified by a user.

If it is determined in step S251 that the absolute value of equation (48) for the position (I', J') of interest is equal to or greater than the threshold value, that is, if the absolute value of equation (48) for the position (I', J') of interest is not so small that it can be regarded as equal to 0, the process proceeds to step S252. In step S252, the calculation circuit 24 selects the normal process and calculates the weighted sum equation (46) associated with the green light intensity. That is, the calculation circuit 24 divides the value of the numerator of the weighted sum equation (46) associated with the green light intensity calculated in step S204, that is, the value of equation (47) by the value of the denominator of the weighted sum equation (46) associated with the green light intensity calculated in step S204, that is, the value of equation (48). Thus, in step S252, the true green light intensity Lg(I', J') at the position (I', J') of interest is determined.

On the other hand, if it is determined in step S251 that the absolute value of equation (48) for the position (I', J') of interest is less than the threshold value, that is, the absolute value of equation (48) is equal to or nearly equal to 0, the process proceeds to step S253. In step S253, the calculation circuit 24 selects the exceptional process and performs it. That is, the calculation circuit 24 determines the light intensity Lg(I', J') of the true green color at a position (I', J') of interest by calculating equation (56).

Figure 52:
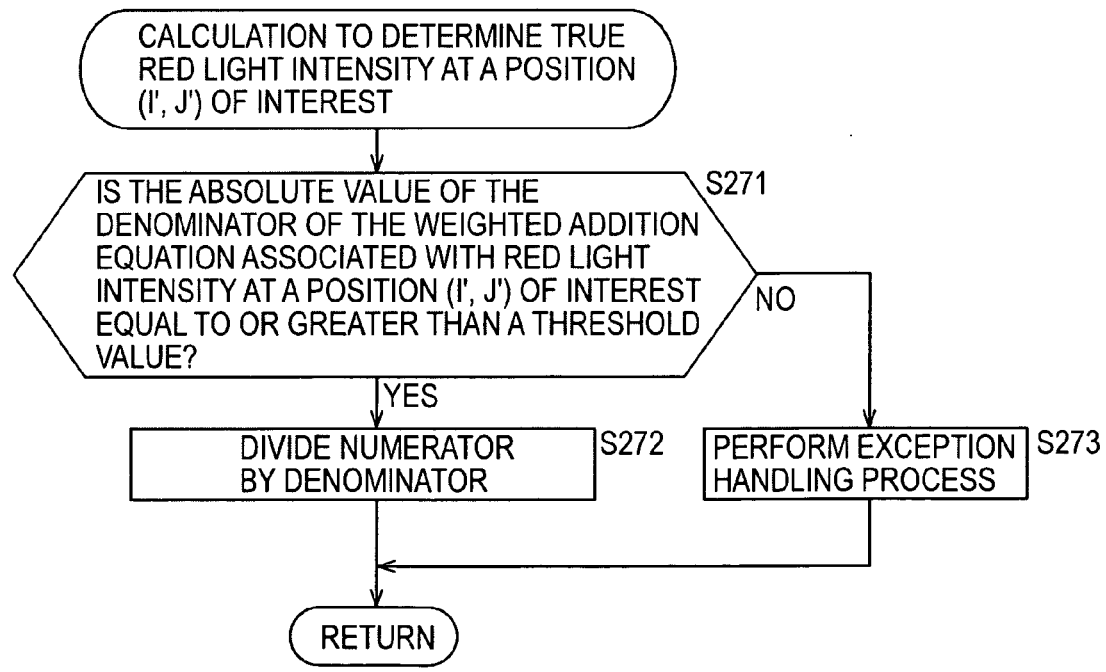
FIG. 52 a flow chart showing an image estimation process according to the eighth embodiment.

Now referring to a flow chart shown in FIG. 52, the process performed in step S216 in FIG. 50 to calculate the true red light intensity Lr(I', J') at the position (I', J') of interest is described below.

First, in step S271, and the calculation circuit 24 determines whether the absolute value of the denominator of the weighted sum of red light intensities in equation (50) calculated in step S206 in FIG. 49 for the position (I', J') of interest, that is, the absolute value of equation (53), is equal to or greater than a threshold value. The threshold value is used to determine whether the absolute value of equation (53) should be regarded as being equal to 0 and thus the exception handling process should be performed. The threshold value is set in advance in the calculation circuit 24. The threshold value may be set variably to a value specified by a user. Note that the threshold value may or may not be equal to the threshold value used in step S251 in FIG. 51.

If it is determined in step S271 that the absolute value of equation (53) for the position (I', J') of interest is equal to or greater than the threshold value, that is, if the absolute value of equation (53) for the position (I', J') of interest is not so small that it can be regarded as equal to 0, the process proceeds to step S272. In step S272, the calculation circuit 24 selects the normal process and calculates the weighted sum equation (50) associated with the red light intensity. That is, the calculation circuit 24 divides the value of the numerator of the weighted sum equation (50) associated with the red light intensity calculated in step S206, that is, the value of equation (52) by the value of the denominator of the weighted sum equation (50) associated with the red light intensity calculated in step S206, that is, the value of equation (53). Thus, in step S272, the true red light intensity Lr(I', J') at the position (I', J') of interest is determined.

On the other hand, if it is determined in step S271 that the absolute value of equation (53) for the position (I', J') of interest is less than the threshold value, that is, the absolute value of equation (53) is equal to or nearly equal to 0, the process proceeds to step S273. In step S273, the calculation circuit 24 selects the exceptional process and performs it. That is, the calculation circuit 24 determines the light intensity Lr(I', J') of the true red color at a position (I', J') of interest by calculating equation (58).

Figure 53:
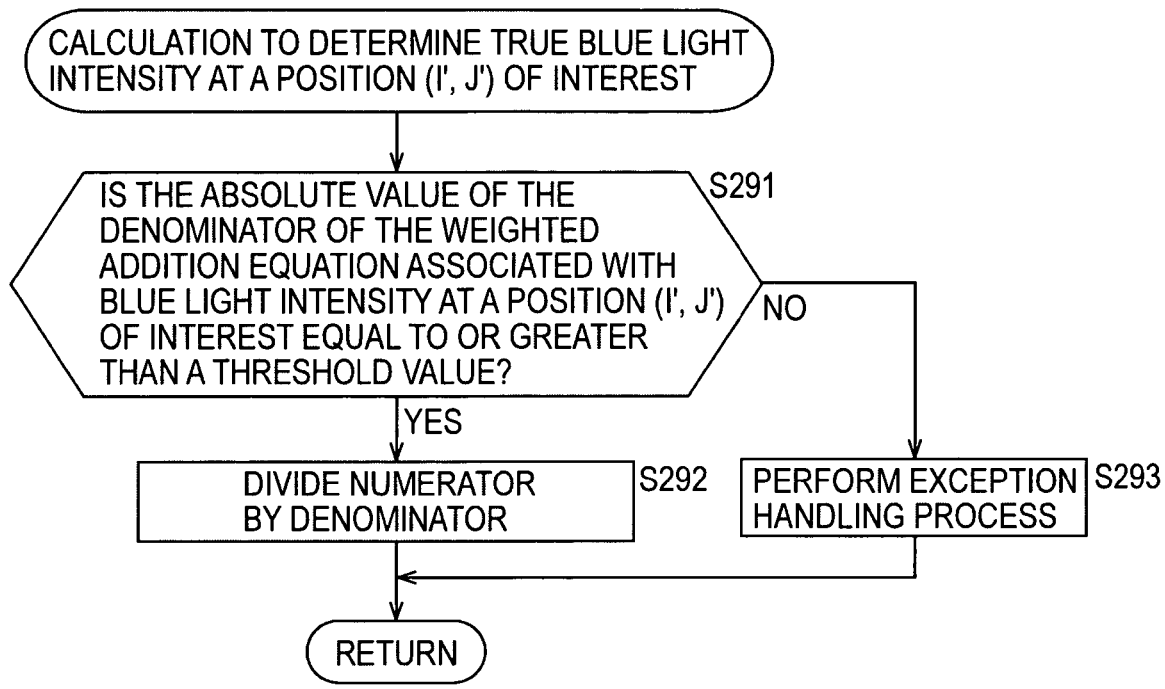
FIG. 53 a flow chart showing an image estimation process according to the eighth embodiment.

Now referring to a flow chart shown in FIG. 53, the process performed in step S217 in FIG. 50 to calculate the true blue light intensity Lg(I', J') at the position (I', J') of interest is described below.

First, in step S291, and the calculation circuit 24 determines whether the absolute value of the denominator of the weighted sum of blue light intensities in equation (49) calculated in step S208 in FIG. 49 for the position (I', J') of interest, that is, the absolute value of equation (55), is equal to or greater than a threshold value. The threshold value is used to determine whether the absolute value of equation (55) should be regarded as being equal to 0 and thus the exception handling process should be performed. The threshold value is set in advance in the calculation circuit 24. The threshold value may be set variably to a value specified by a user. Note that the threshold value may or may not be equal to the threshold value used in step S251 in FIG. 51 or that used in step S271 in FIG. 52.

If it is determined in step S291 that the absolute value of equation (55) for the position (I', J') of interest is equal to or greater than the threshold value, that is, if the absolute value of equation (55) for the position (I', J') of interest is not so small that it can be regarded as equal to 0, the process proceeds to step S292. In step S292, the calculation circuit 24 selects the normal process and calculates the weighted sum equation (51) associated with the blue light intensity. That is, the calculation circuit 24 divides the value of the numerator of the weighted sum equation (51) associated with the blue light intensity calculated in step S208, that is, the value of equation (54) by the value of the denominator of the weighted sum equation (51) associated with the blue light intensity calculated in step S208, that is, the value of equation (55). Thus, in step S292, the true blue light intensity Lb(I', J') at the position (I', J') of interest is determined.

On the other hand, if it is determined in step S291 that the absolute value of equation (55) for the position (I', J') of interest is less than the threshold value, that is, the absolute value of equation (55) is equal to or nearly equal to 0, the process proceeds to step S293. In step S293, the calculation circuit 24 selects the exceptional process and performs it. That is, the calculation circuit 24 determines the light intensity Lb(I', J') of the true blue color at a position (I', J') of interest by calculating equation (59).

As described above, in the eighth embodiment, the true green light intensity Lg(I', J'), the true red light intensity Lr(I', J'), and the true blue light intensity Lb(I', J') are determined by calculating the weighted sum using the cubic function having a characteristic similar to that of the lowpass filter as the weight depending on the distance between the position (I', J') of interest and the converted position (x, y) in the vicinity of the position (I', J') of interest, thereby determining a sharp image very close to an ideal image.

In the eighth embodiment, for the position (I', J') of interest, when positions (ig−0.5, jg−0.5) are converted into the reference coordinate system using conversion parameters (ak', bk', ck', dk', Tkx', Tky'), if one or more converted positions (x, y) of pixel values Gobs(k, ig, jg) fall within the range defined by I'−2≦x<I'+2 and J'−2≦y<J'+2, then the weighted sum of those pixel values Gobs(k, ig, jg) whose converted positions (x, y) are located in the above-described range in the vicinity of the position (I', J') of interest is calculated in accordance with the weighted sum equation (46) associated with the green light intensity, and the result is employed as the true green light intensity Lg(I', J') (normal process).

However, if the absolute value of the denominator of the weighted sum equation (46) associated with the green light intensity calculated for the position (I', J') of interest, that is, the value of equation (48), is less than the predetermined small threshold value that can be regarded as substantially equal to 0, the solution of the weighted sum equation (46) becomes unstable. In such a case, the weighted sum of pixel values Gobs(k, ig, jg) whose conversion position (x, y) falls in the vicinity of the position (I', J') of interest and pixel values Gobs(k, ig, jg) whose conversion position (x, y) falls in the vicinity of a pixel adjacent to the pixel of interest is calculated in accordance with the weighted sum equation (56), and the result is employed as the true green light intensity Lg(I', J') (exceptional process).

The true red light intensity Lr(I', J') and the true blue light intensity Lb(I', J') are determined in a similar manner.

Thus, it is possible to obtain a good output image including substantially no noise.

The normal process and the exceptional process will be further discussed below from another point of view.

For example, for the green light intensity, in the normal process described above, the weighted sum is calculated using pixel values Gobs(k, ig, jg) of pixels of the captured image whose converted position (x, y) falls within the vicinity of the position (I', J') of interest of the pixel of interest. On the other hand, in the exceptional process, the weighted sum is calculated using pixel values Gobs(k, ig, jg) of pixels of the captured image whose converted position (x, y) falls within the vicinity of the position (I', J') of interest of the pixel of interest and also using pixel values Gobs(k, ig, jg) of pixels of the captured image whose converted position (x, y) falls within the vicinity of the position of a pixel adjacent to the pixel of interest.

That is, in the exceptional process, the weighted sum is calculated using not only pixel values Gobs(k, ig, jg) of pixels of the captured image whose converted position (x, y) falls within the vicinity of the position (I', J') of the pixel of interest but also pixel values Gobs(k, ig, jg) of pixels of the captured image whose converted position (x, y) falls within the vicinity of a pixel adjacent to the pixel of interest.

That is, as described above, in the normal process, the true green light intensity Lg(I', J') at the position (I', J') of interest is determined by calculating the weighted sum of pixel values Gobs(k, ig, jg) of the captured image observed within the region in the vicinity of the position (I', J') of interest, that is, within the region defined by $I'-2 \leq x < I'+2$ and $J'-2 \leq y < J'+2$. In contrast, in the exceptional process, the true green light intensity Lg(I', J') at the position (I', J') of interest is determined by calculating the weighted sum of pixel values Gobs(k, ig, jg) of the captured image observed within the region in the vicinity of the position (I', J') of interest, which is greater than the vicinity region used in the normal process, that is, more specifically within the region defined by $I'-3 \leq x < I'+3$ and $J'-3 \leq y < J'+3$.

In other words, when the true green light intensity Lg(I', J') at the position (I', J') of interest is determined, the region in the vicinity of the position (I', J') of interest is defined by $I'-3 \leq x < I'+3$ and $J'-3 \leq y < J'+3$. In the normal process, the true green light intensity Lg(I', J') at the position (I', J') of interest is determined by calculating the weighted sum equation (46), in which the weight is set to 0 for those pixel values Gobs(k, ig, jg) that are observed within the vicinity region defined above but that are outside the region defined by $I'-2 < x < I'+2$ and $J'-2 \leq y < J'+2$. On the other hand, in the exceptional process, the true green light intensity Lg(I', J') at the position (I', J') of interest is determined according to equation (56), in which, for those pixel values Gobs(k, ig, jg) that are observed within the vicinity region defined above but that are outside the region defined by $I'-2 \leq x < I'+2$ and $J'-2 \leq y < J'+2$, that is, for pixel values Gobs(k, ig, jg) observed in the vicinity of a pixel adjacent to the pixel of interest, the weight is set not to 0 but to a value given by the cubic function Cubic(z) whose origin is taken at the position of that adjacent pixel.

That is, when the true green light intensity Lg(I', J') is determined by calculating the weighted sum, the weight is set differently (to a first or second weight) depending on whether the calculation is performed in the normal process or the exceptional process.

Although in the eighth embodiment, the cubic function Cubic(z) in the form of equation (39) is used to define the weight depending on the distance z between a position (I', J') of interest and a nearby position (x, y) at which a pixel value Gobs(k, ig, jg) is observed, the weight may be defined by using another arbitrary function serving as a lowpass filter in characteristic, such as sin(z)/z.

In the embodiments described above, the first captured image is used as the reference image, and second to N-th captured images are employed as target images. Instead of the first captured image, any one of the second to N-th captured images may be used as the reference image.

Figure 54:
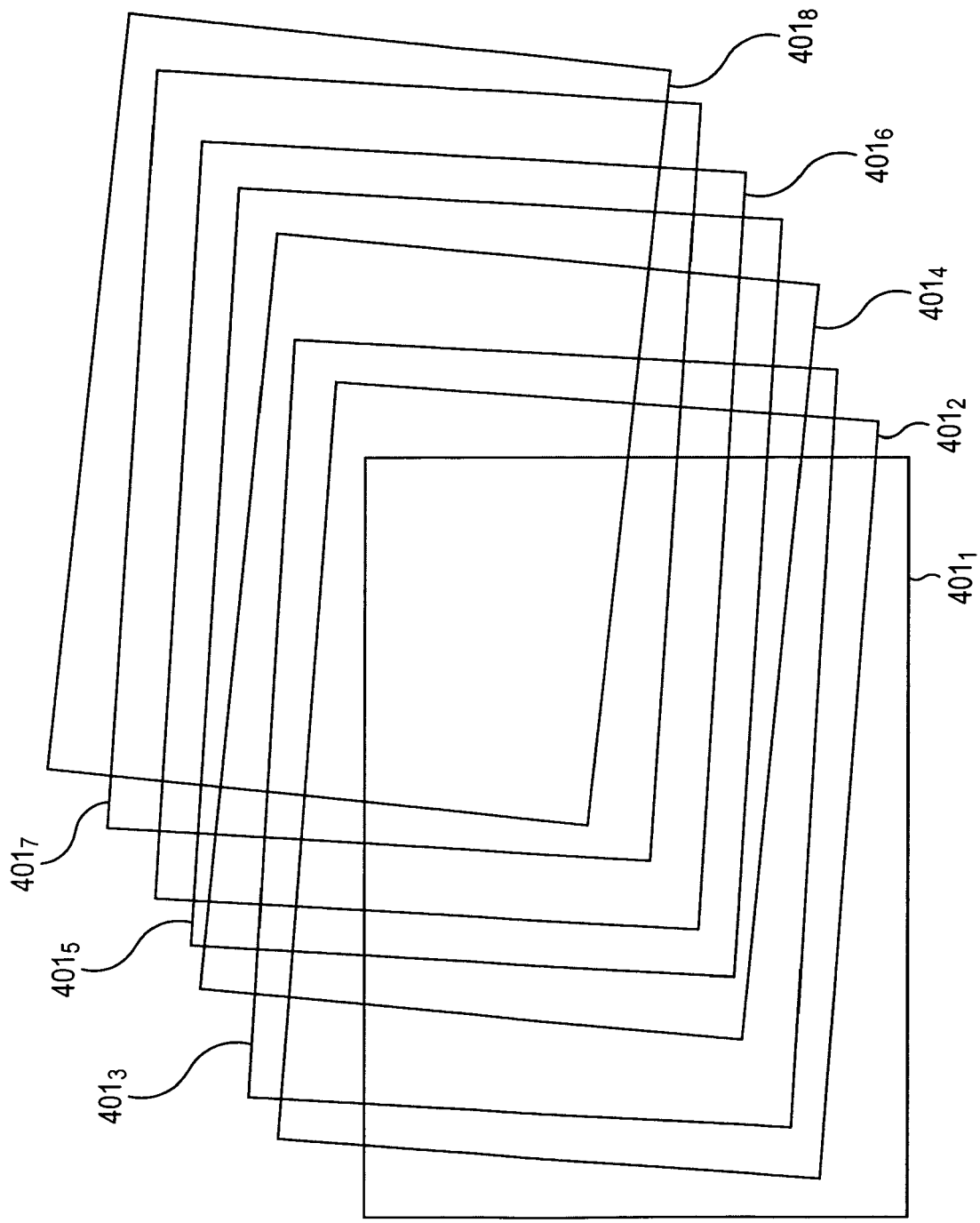
FIG. 54 is a diagram showing captured images $401_1$ to $401_8$.

FIG. 54 shows N images obtained by successive N capturing operations (at a high shutter speed). In this specific example shown in FIG. 54, N=8.

First to eighth captured images $401_1$ to $401_8$ (k-th image $401_k$) are captured sequentially in time and displaced in a direction to upper right with passage of time due to camera shake.

Figure 55:
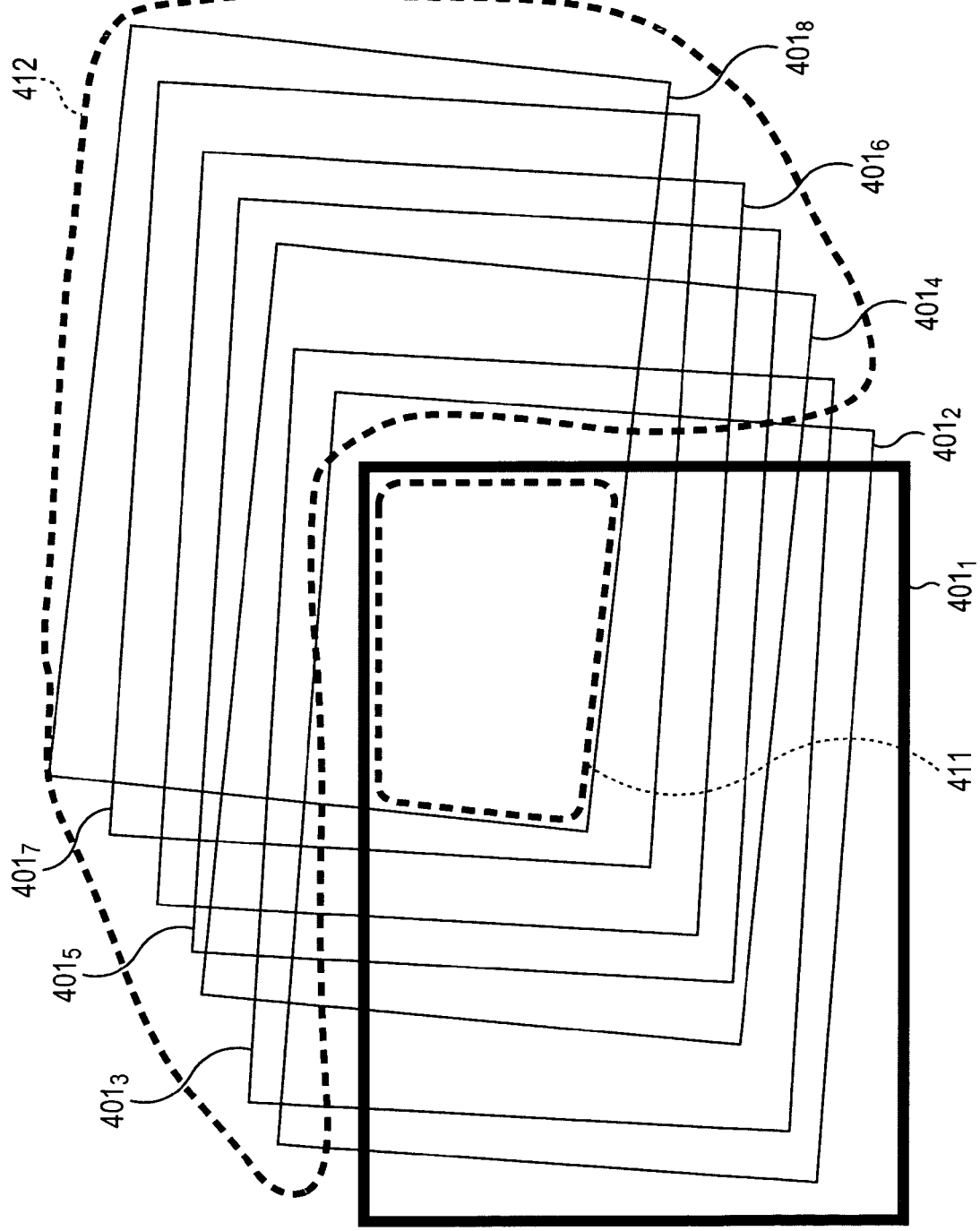
FIG. 55 is a diagram showing an output image produced from captured images by using a first captured image as a reference image.

FIG. 55 shows eight captured images $401_1$ to $401_8$ similar to those shown in FIG. 54.

In the case in which the signal processor 7 estimates an output image by using the first one of the captured images $401_1$ to $401_8$ as the reference image and second to eighth images as target images, the output image is obtained as an image formed in a coordinate system defined on the first image $401_1$ employed as the reference image. In FIG. 55, the first image $401_1$, that is, the output image is represented by a bold line.

The region of the output image represented by the bold line in FIG. 55 includes a region 411 located in the upper right corner and denoted by a dotted line in which all of eight captured images consisting of first to eighth images $401_1$ to $401_8$ can be used in estimation of light intensity (pixel value) expected to be true. In this region 411, high image quality can be obtained because estimation of pixel values is performed using data of all of eight captured images consisting of first to eighth images $401_1$ to $401_8$.

However, in an area of the output image denoted by the bold line in FIG. 55 other than the region 411, only data of some of first to eighth captured images $401_1$ to $401_8$ are available in estimation of the expected output image. In such an area, image quality in terms of sharpness becomes low compared with the region 411, because all data of the first to eighth captured images $401_1$ to $401_8$ cannot be used. As described above, in a set of captured images having successive displacement in the direction to upper right due to camera shake, the amount of data available in estimation of the output image decreases with position in an opposite direction, that is, to upper right, and the image quality in terms of sharpness decreases with respect to the quality of the region 411.

Of data of the second to eighth captured images $401_1$ to $401_8$ used as target images, data in a region 412 outside the output image denoted by the bold line in FIG. 55 cannot be used in estimation of the output image and is discarded uselessly.

As can be understood from the above discussion, when the output image is estimated using the first captured image as the reference image, if displacements occur in a particular direction due to camera shake, degradation in image quality in terms of sharpness occurs in an area located away from the center of the output image in a direction opposite to the direction of displacement, although high image quality is obtained in an area (for example, the region 411 in FIG. 55) located away from the center of the output image in the same direction as the direction of displacement.

In general, when a user views an image, a central part of the image most attracts user's attention. Therefore, it is desirable that image quality in terms of sharpness be high in the central part of the image.

In view of the above, in estimation of an output image, the signal processor 7 may employ, as the reference image, an intermediate image of N successively-captured images. More specifically, of N successively-captured images, an image captured at the exact or nearly exact center of the time during which N images were captured is employed as the reference image (hereinafter, such an image will be referred to simply as an intermediate image), and the other captured images may be used as target images.

For example, as shown in FIG. 56, of eight captured images $401_1$ to $401_8$, the signal processor 7 employs a fourth captured image denoted by a bold line as the reference image and estimates an output image. In this case, data of all of the eight captured images consisting of first to eighth images $401_1$ to $401_8$ are available in a central area 421 when the output image is estimated.

As described above, in estimation of an output image, by employing an intermediate image of a plurality of images captured sequentially in time as the reference image and employing the other captured images as target images, it becomes possible to obtain an output image with higher quality in terms of sharpness in particular in the central area of the output image.

In most cases, when a user takes a picture of a subject, the camera angle is set such that the subject is located at the center of an image (frame). Furthermore, as described above, when a user views an image, a central part of the image most attracts user's attention. From this point of view, an image whose central part is sharper than in peripheral parts can be regarded as a better image than an image that is opposite in terms of sharpness.

In view of the above, as shown in FIG. 56, if an intermediate image is employed as the reference image and the other images are employed as target images, data of all of eight captured images consisting of first to eighth images $401_1$ to $401_8$ are used in estimation of a central part of an output image, and the resultant output image has higher quality in terms of sharpness in particular in the central part than that obtained when the first captured image is employed as the reference image.

The frequency of camera shake generally falls within the range of 10 to 15 Hz. Therefore, in FIG. 56, for a set of eight images $401_1$ to $401_8$ successively captured at a total effective shutter speed of 1/50 sec or higher, the displacement due to camera shake can be approximated by a linear displacement. That is, the camera shake can be regarded as movement in a particular direction at a constant speed. Therefore, for the set of eight images $401_1$ to $401_8$ captured sequentially in time, the displacement due to the camera shake during the exposure time can be approximated by a linear displacement when the displacement is compensated for in the estimation of the output image, in which an intermediate image such as a fourth captured image $401_4$ or a fifth captured image $401_5$ is employed as the reference image thereby obtaining the output image having high image quality in terms of sharpness in particular in its central part, as described above with reference to FIG. 56.

In the signal processor 7 shown in FIG. 4, when, for example, the fourth captured image $401_4$ of the eight captured images $401_1$ to $401_8$ is employed as the reference image, the fourth captured image $401_4$ employed as the reference image is supplied to the frame memory 22-1 and stored therein, and the first to third captured images $401_1$ to $401_3$ and the fifth to eighth captured images $401_5$ to $401_8$ are respectively supplied to the frame memories 22-2 to 22-8 and stored therein.

In addition to high image quality in terms of sharpness in the central part of the output image, use of an intermediate image as the reference image provides a further advantage that the signal processor 7 can be designed more easily.

Herein, let us assume that the displacement due to the camera shake can be approximated by a linear displacement as described above, and let us also assume that when eight images $401_1$ to $401_8$ are captured sequentially in time, an image-to-image displacement of, for example, ten pixels occurs. In this case, if the first captured image is employed as the reference image, a displacement of at most 70 pixels can occur, even if the exposure time of each image is infinitely small. Thus, the signal processor 7 has to be designed so that it can handle a displacement of at most 70 pixels.

In contrast, when an intermediate image, such as the fourth $401_4$ image of the captured images $401_1$ to $401_8$ is employed as the reference image, the maximum possible displacement is 40 pixels. Therefore, it is sufficient for the signal processor 7 to handle a displacement of at most 40 pixels, and thus it becomes easier to design the signal processor 7.

The sequence of processing steps according to the eighth embodiment may be performed by means of hardware or software, as with the other embodiments. In the case in which the sequence of processing steps according to the eighth embodiment is performed by means of software, for example, the digital camera 1 may be realized by executing a program on a computer such as that shown in FIG. 41, as with the other embodiments.

In the present description, the steps described in the program stored in the storage medium may be performed either in time sequence in accordance with the order described in the program or in a parallel or separate fashion.

Although in the embodiments described above, a single-plane sensor is used as the imaging device 4 of the digital camera 1, and an image having three colors for each pixel is produced from an image signal having one color signal for each pixel output from the imaging device 4, the imaging device 4 is not limited to the single-plane sensor. Other types of imaging device 4 capable of outputting n color signals for each pixel may be used, and, in the correct image estimation process, an image having (n+1) or more color signals for each pixel may be produced from the image signal output from the imaging device 4.

In the embodiments described above, a first captured image or an intermediate captured image is used as the reference image, and a positional relationship between a target image and the reference image is detected. Alternatively, instead of the first captured image or the intermediate captured image, an arbitrary captured image may be used as the reference image, and a positional relationship between a target image and the reference image may be detected. The present inven-

The invention claimed is:

1. An image processing method for estimating an output image from input images, the method comprising:
   capturing the input images by using a single-plane sensor, wherein pixels of the input images correspond to n pixel values and to at least one color signal;
   detecting a positional relationship among the input images;
   observing the at least one color signal by using the single-plane sensor, wherein the observed color signal varies depending on positions of the input images;
   estimating the output image by identifying pixel components for pixel positions of the output image, the pixel components being identified from the input images; and
   producing the output image based on the identified pixel components, wherein the output image corresponds to (n+1) or more pixel values for pixels of the output image.

2. An image processing method according to claim 1, further comprising:
   converting analog signals, representing the input images, to digital signals; and
   using the digital signals to detect the positional relationship.

3. An image processing method according to claim 1, further comprising:
   encoding a signal representing the output image; and
   storing the encoded output image.

4. An image processing method according to claim 1, further comprising:
   converting a digital signal representing the output image to an analog signal; and
   displaying the output image using the analog signal.

5. An image processing method according to claim 1, further comprising:
   operating a shutter at a controlled speed; and
   capturing the input images by exposing the single-plane sensor to light using the shutter.

6. An image processing method for estimating an output image from input images, the method comprising:
   capturing the input images with underexposure, wherein pixels of the input images correspond to n pixel values;
   detecting a positional relationship among the input images;
   estimating the output image by identifying pixel components for pixel positions of the output image, the pixel components being identified from the input images;
   producing the output image based on the identified pixel components, wherein the output image corresponds to (n+1) or more pixel values for pixels of the output image; and
   correcting the underexposure by increasing gain of the n pixel values.

7. An image processing method according to claim 6, wherein estimating the output image comprises:
   determining a corrected position of pixels of the output image, based on the positional relationship;
   producing a light intensity integral constraint formula to control a difference between the integral of light intensity in a region centered at the corrected position and a pixel value of a pixel at the corrected position; and
   calculating the light intensity integral constraint formula to maintain the difference at a level less than a predetermined error.

8. An image processing method according to claim 7, wherein the light intensity integral constraint formula is used to change the predetermined error based on a factor of the increase in gain.

9. An image processing method according to claim 6, further comprising:
   converting analog signals, representing the input images, to digital signals; and
   using the digital signals to detect the positional relationship.

10. An image processing method according to claim 6, further comprising:
    encoding a signal representing the output image; and
    storing the encoded output image.

11. An image processing method according to claim 6, further comprising:
    converting a digital signal representing the output image to an analog signal; and
    displaying the output image using the analog signal.

12. An image processing method according to claim 6, further comprising operating a shutter at a controlled speed to control capturing of the input images.

13. An image processing apparatus for estimating an output image from input images, comprising:
    means for capturing the input images by using a single-plane sensor, wherein pixels of the input images correspond to n pixel values and to at least one color signal;
    means for detecting a positional relationship among the input images;
    means for observing the at least one color signal by using the single plane sensor, wherein the observed color signal varies depending on positions of the input images;
    means for estimating the output image by identifying pixel components for pixel positions of the output image, the pixel components being identified from the input images; and
    means for producing the output image based on the identified pixel components, wherein the output image corresponds to (n+1) or more pixel values for pixels of the output image.

14. An image processing apparatus according to claim 13, further comprising means for converting analog signals, representing the input images, to digital signals and using the digital signals to detect the positional relationship.

15. An image processing apparatus according to claim 13, further comprising:
    means for encoding a signal representing the output image; and
    means for storing the encoded output image.

16. An image processing apparatus according to claim 13, further comprising:
    means for converting a digital signal representing the output image to an analog signal; and
    means for displaying the output image using the analog signal.

17. An image processing apparatus according to claim 13, further comprising means for exposing the single-plane sensor to light at a controlled speed, wherein the single-plane sensor captures the input images based on the controlled speed.

18. An image processing apparatus for estimating an output image from input images, comprising:

means for capturing the input images with underexposure, wherein pixels of the input images correspond to n pixel values;

means for detecting a positional relationship among the input images;

means for estimating the output image by identifying pixel components for pixel positions of the output image, the pixel components being identified from the input images;

means for producing the output image based on the identified pixel components, wherein the output image corresponds to (n+1) or more pixel values for pixels of the output image; and means for correcting the underexposure by increasing gain of the n pixel values.

19. An image processing apparatus according to claim 18, wherein the means for estimating the output image is configured to:

determine a corrected position of pixels of the output image, based on the positional relationship;

produce a light intensity integral constraint formula to control a difference between the integral of light intensity in a region centered at the corrected position and a pixel value of a pixel at the corrected position; and calculate the light intensity integral constraint formula to maintain the difference at a level less than a predetermined error.

20. An image processing apparatus according to claim 19, wherein the light intensity integral constraint formula is used to change the predetermined error based on a factor of the increase in gain.

21. An image processing apparatus according to claim 18, further comprising:

means for converting analog signals, representing the input images, to digital signals; and means for using the digital signals to detect the positional relationship.

22. An image processing apparatus according to claim 18, further comprising:

means for encoding a signal representing the output image; and means for storing the encoded output image.

23. An image processing apparatus according to claim 18, further comprising:

means for converting a digital signal representing the output image to an analog signal; and means for displaying the output image using the analog signal.

24. An image processing apparatus according to claim 18, further comprising means for exposing the single-plane sensor to light at a controlled speed, wherein the single-plane sensor captures the input images based on the controlled speed.

25. A computer readable storage medium storing instructions, which when executed on a processor, cause the processor to perform a method for estimating an output image from input images, the method comprising:

capturing the input images by using a single-plane sensor, wherein pixels of the input images correspond to n pixel values and to at least one color signal;

detecting a positional relationship among the input images;

observing the at least one color signal by using the single plane sensor, wherein the observed color signal varies depending on positions of the input images;

estimating the output image by identifying pixel components for pixel positions of the output image, the pixel components being identified from the input images; and producing the output image based on the identified pixel components, wherein the output image corresponds to (n+1) or more pixel values for pixels of the output image.

26. A computer readable storage medium storing instructions, which when executed on a processor, causes the processor to perform a method for estimating an output image from input images, the method comprising:

capturing the input images with underexposure, wherein pixels of the input images correspond to n pixel values;

detecting a positional relationship among the input images;

estimating the output image by identifying pixel components for pixel positions of the output image, the pixel components being identified from the input images;

producing the output image based on the identified pixel components, wherein the output image corresponds to (n+1) or more pixel values for pixels of the output image; and correcting the underexposure by increasing gain of the n pixel values.

* * * * *